(12) United States Patent
Taylor et al.

(10) Patent No.: US 6,292,830 B1
(45) Date of Patent: Sep. 18, 2001

(54) SYSTEM FOR OPTIMIZING INTERACTION AMONG AGENTS ACTING ON MULTIPLE LEVELS

(75) Inventors: Matt Taylor; Gail Taylor, both of Hilton Head Island, SC (US)

(73) Assignee: iTerations LLC, Hilton Head Island, SC (US)

( * ) Notice: Subject to any disclaimer, the term of this patent is extended or adjusted under 35 U.S.C. 154(b) by 0 days.

(21) Appl. No.: 09/131,313

(22) Filed: Aug. 7, 1998

Related U.S. Application Data

(60) Provisional application No. 60/055,051, filed on Aug. 8, 1997, provisional application No. 60/063,699, filed on Oct. 28, 1997, and provisional application No. 60/068,899, filed on Dec. 23, 1997.

(51) Int. Cl.[7] .................................................. G06F 13/00
(52) U.S. Cl. ............................................................ 709/224
(58) Field of Search ................................... 709/201, 202, 709/203, 204, 217, 218, 219, 223, 224, 205

(56) References Cited

U.S. PATENT DOCUMENTS

| | | | |
|---|---|---|---|
| 4,224,769 | 9/1980 | Ball et al. ............................... 52/36 |
| 4,602,817 | 7/1986 | Raftery ................................. 297/440 |
| 4,771,583 | 9/1988 | Ball et al. ............................. 52/221 |
| 4,831,791 | 5/1989 | Ball ......................................... 52/36 |
| 5,094,174 | 3/1992 | Grund et al. .......................... 108/50 |
| 5,103,741 | 4/1992 | Grund et al. .......................... 108/50 |
| 5,220,871 | 6/1993 | Grund et al. .......................... 108/50 |
| 5,239,460 | * 8/1993 | LaRoche ................................. 705/11 |
| 5,253,595 | 10/1993 | Heidmann ............................ 108/157 |
| 5,318,340 | 6/1994 | Henry .................................... 297/232 |
| 5,403,232 | 4/1995 | Helm et al. ........................... 454/230 |
| 5,442,788 | 8/1995 | Bier ....................................... 395/650 |
| 5,486,042 | 1/1996 | Heisler et al. ........................ 312/196 |
| 5,511,348 | 4/1996 | Cornell et al. ......................... 52/239 |
| 5,530,435 | 6/1996 | Toms et al. ...................... 340/825.07 |
| 5,587,935 | 12/1996 | Brooks et al. ........................ 364/578 |
| 5,590,360 | 12/1996 | Edwards ............................... 395/800 |
| 5,628,257 | 5/1997 | Conner et al. ........................ 108/153 |
| 5,630,649 | 5/1997 | Heidmann et al. .............. 297/344.19 |
| 5,651,219 | 7/1997 | Baloga et al. ........................... 52/32 |
| 5,662,478 | 9/1997 | Smith, Jr. ............................. 434/237 |
| 5,664,093 | * 9/1997 | Barnett et al. ......................... 714/31 |
| 5,664,183 | 9/1997 | Cirulli et al. ......................... 395/614 |
| 5,666,887 | 9/1997 | Grabowski et al. .................... 108/91 |
| 5,675,949 | 10/1997 | Forslund et al. .................... 52/220.7 |
| 5,684,469 | 11/1997 | Toms et al. ...................... 340/825.07 |
| 5,732,200 | 3/1998 | Becker et al. ........................ 395/114 |
| 5,765,038 | 6/1998 | Flannery et al. ..................... 395/610 |
| 5,790,847 | 8/1998 | Fisk et al. ............................. 395/604 |
| 5,802,506 | 9/1998 | Hutchison .............................. 706/20 |
| 5,874,955 | 2/1999 | Rogowitz et al. .................... 345/339 |
| 6,041,166 | * 3/2000 | Hart et al. ............................ 709/238 |

* cited by examiner

Primary Examiner—Moustafa M. Meky
(74) Attorney, Agent, or Firm—Michael D. Bednarek; Shaw Pittman

(57) ABSTRACT

A system and method for addressing the paradoxes and problems associated with the Knowledge Economy, and the transition to it. The system and method of the present invention create a unified experience of work that scales from individual thought processes to the building and using of a global system of commerce. Described in several levels of recursion, the system and method of the present invention integrate, into a single system and method several discrete Sub-Systems and methods that comprise a myriad of now unintegrated tools and processes that are conducted across contradictory and non-collaborative environments.

14 Claims, 105 Drawing Sheets

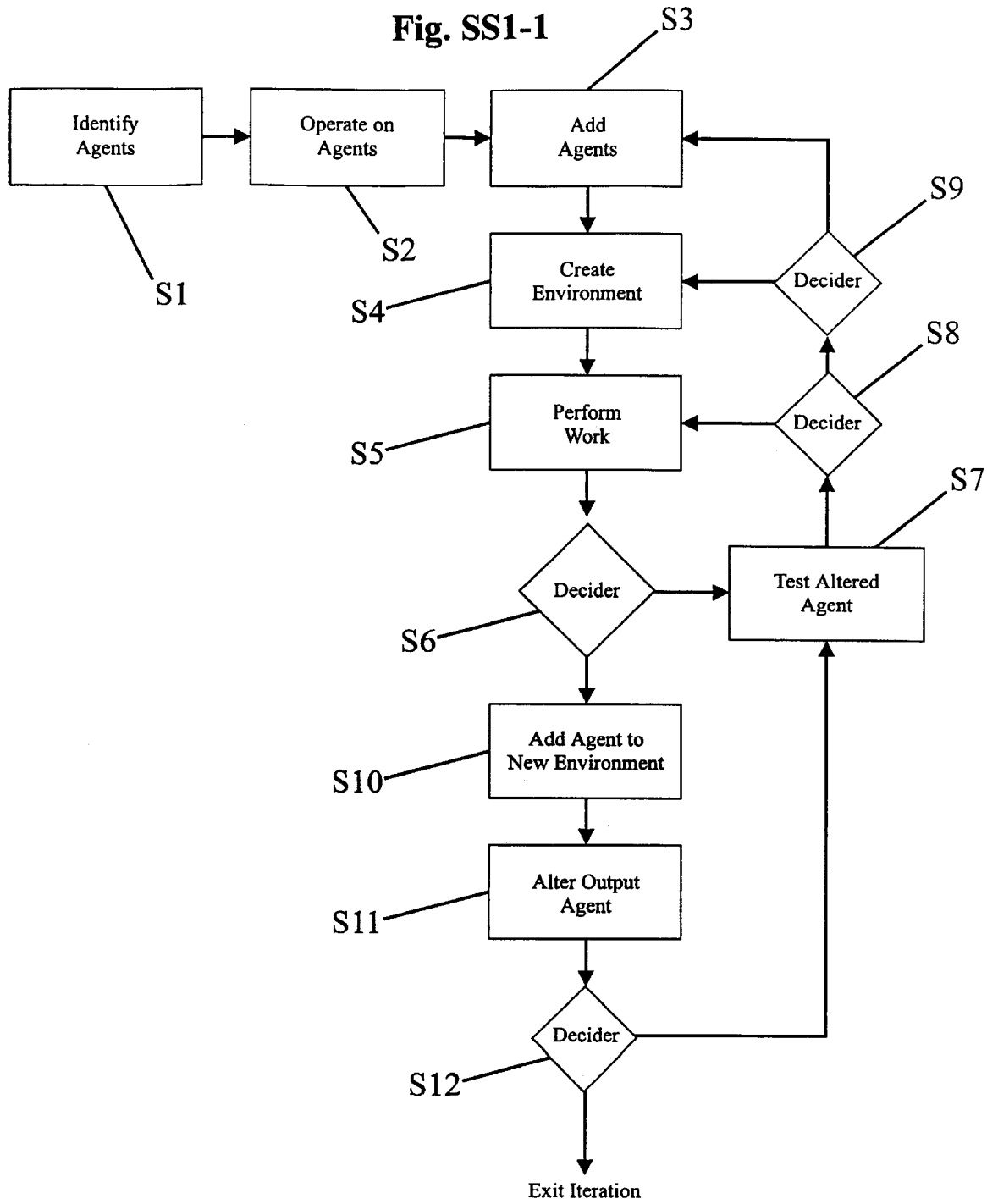

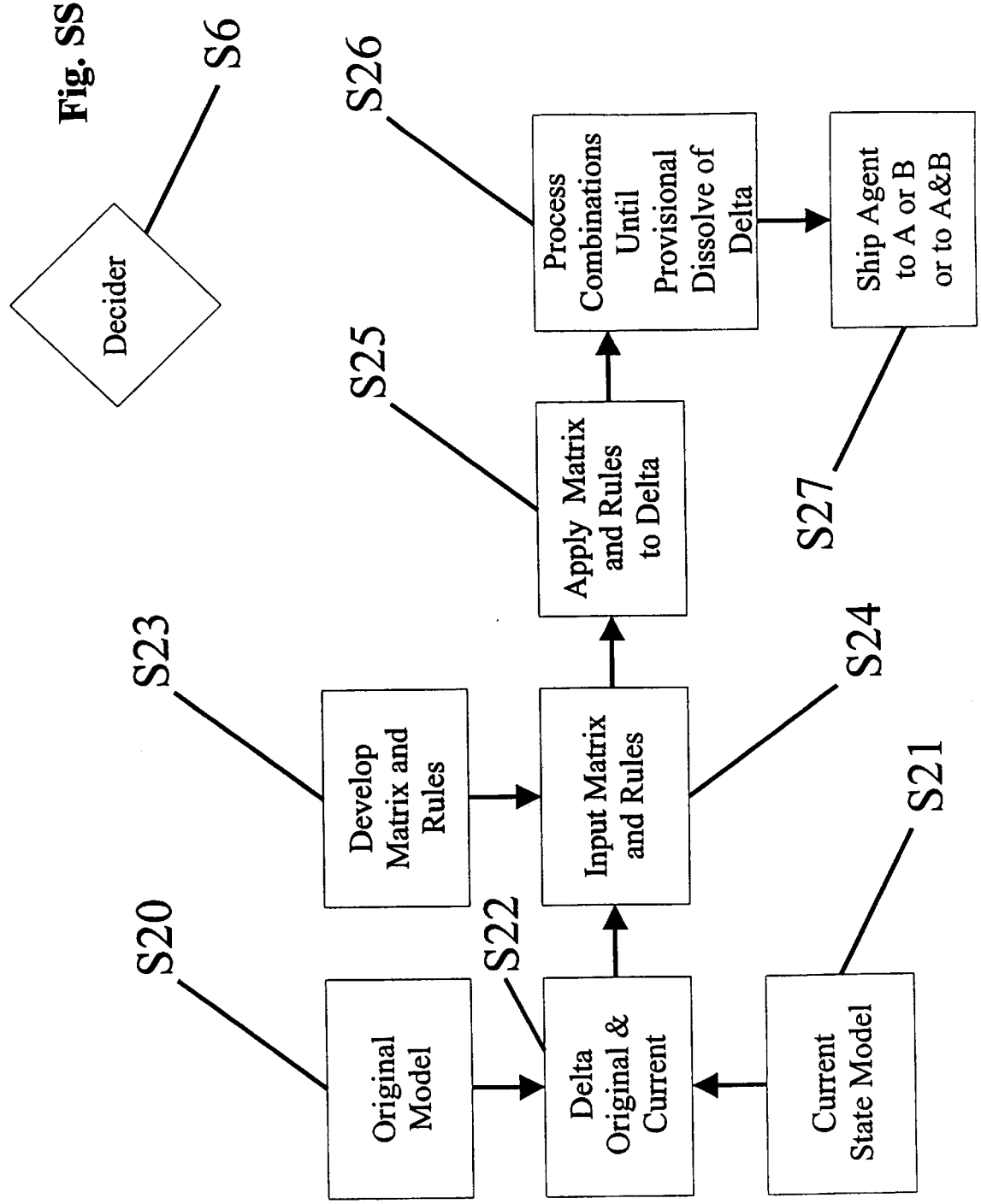

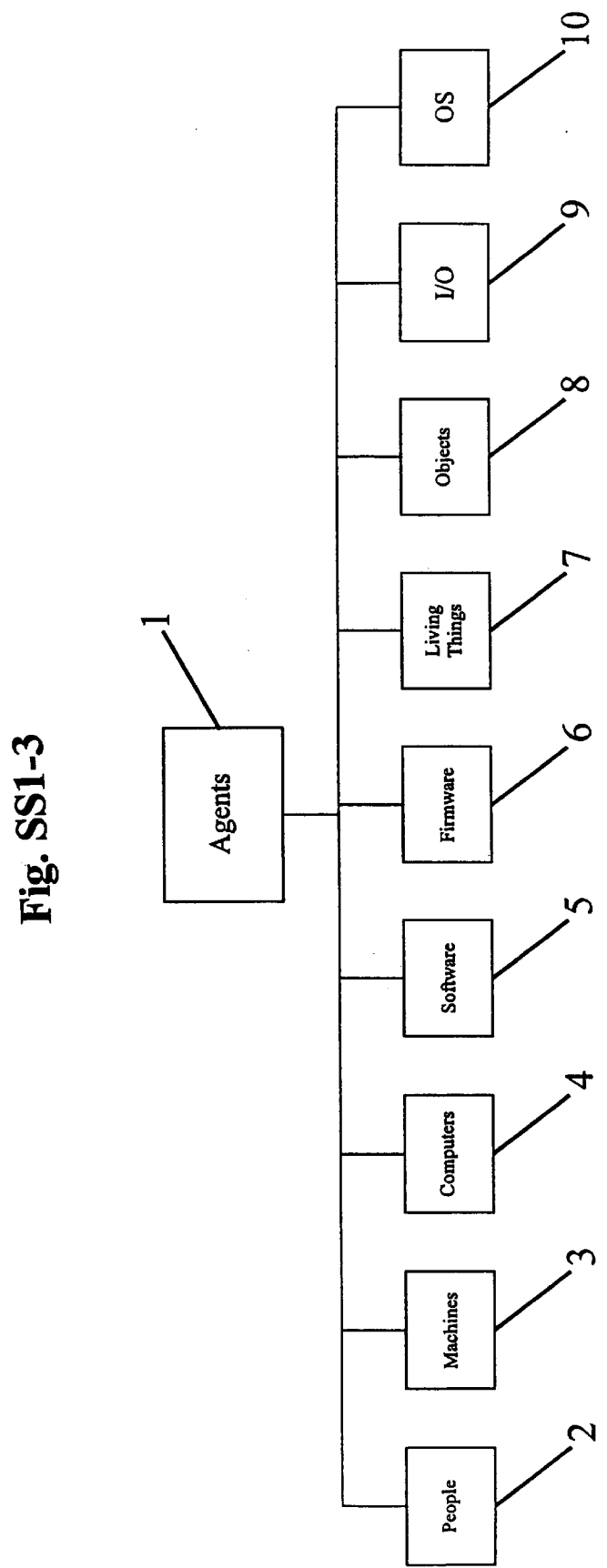
Fig. SS1-3

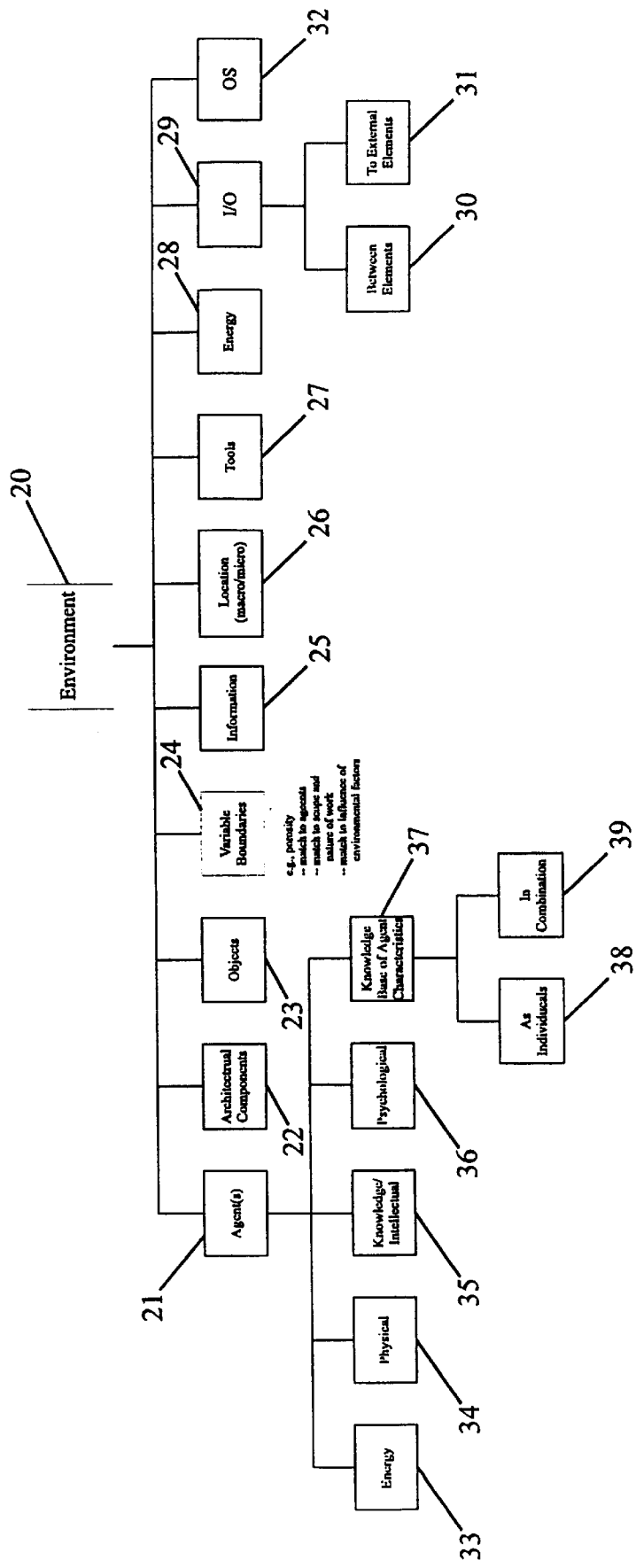
Fig. SS1-4

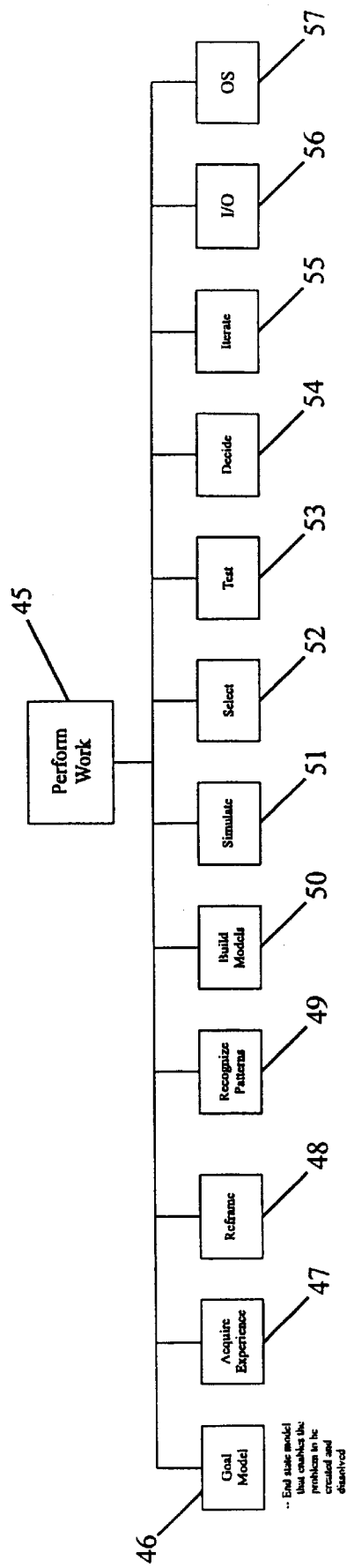
Fig. SS1-5

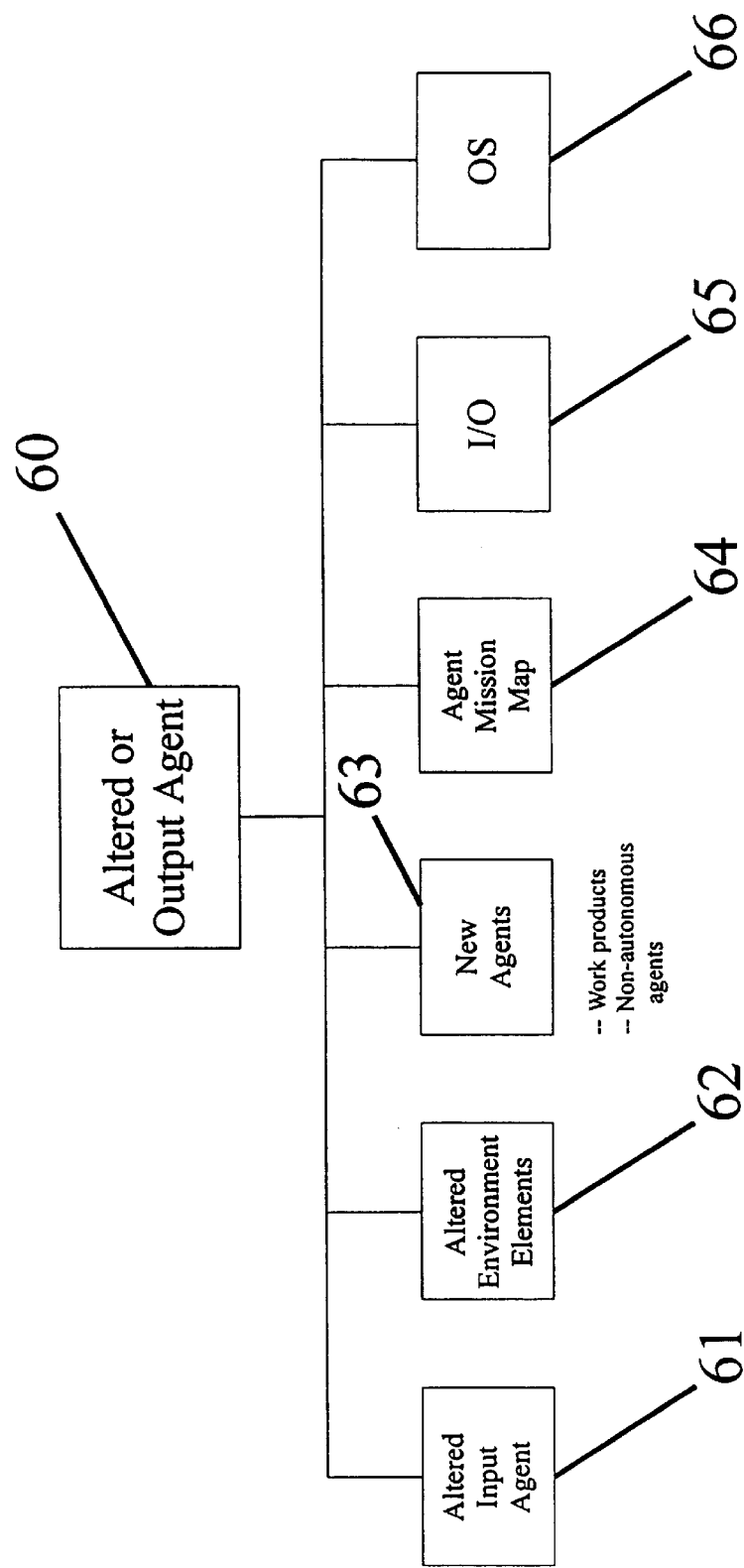
Fig. SS1-6

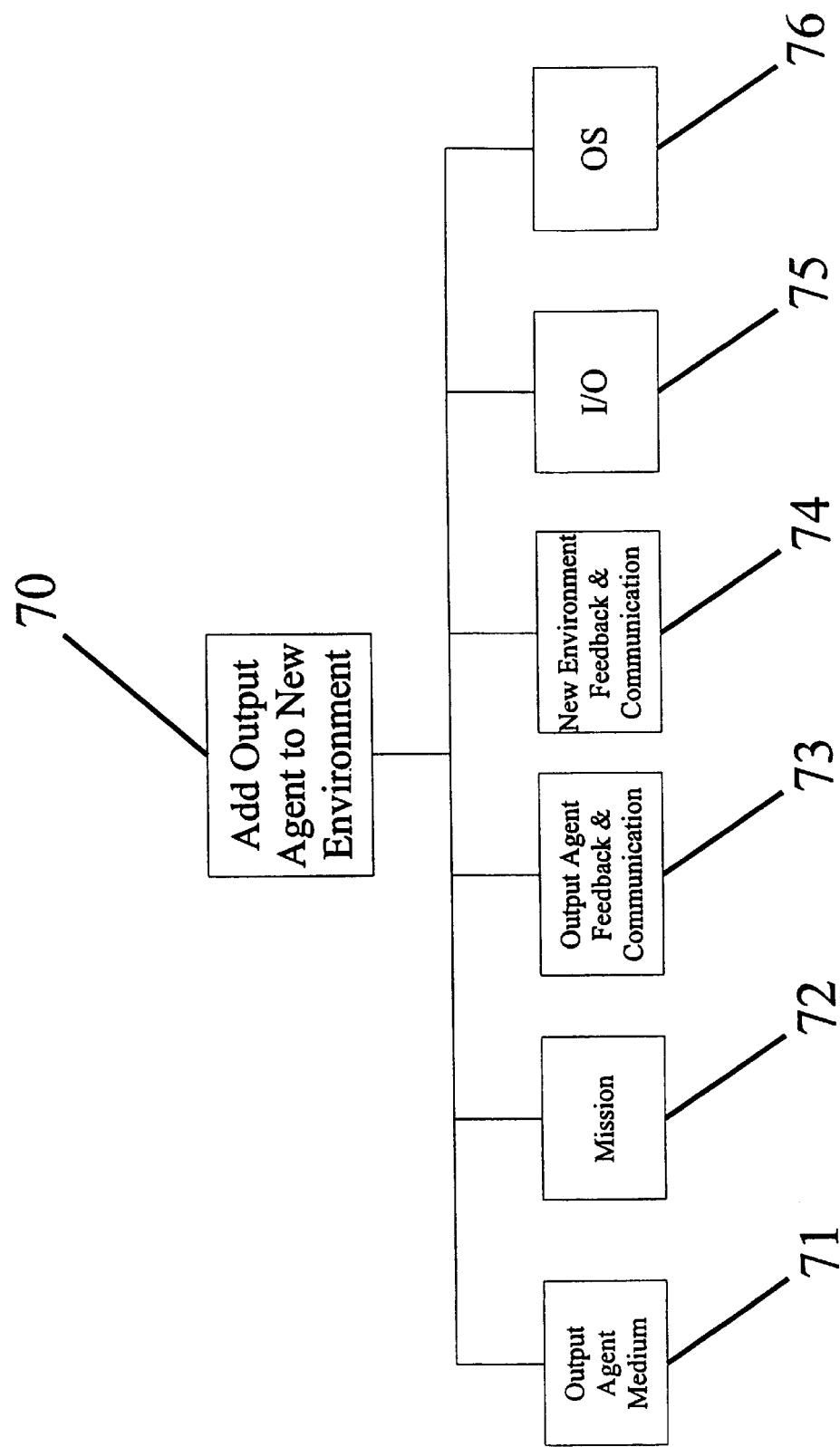
Fig. SS1-7

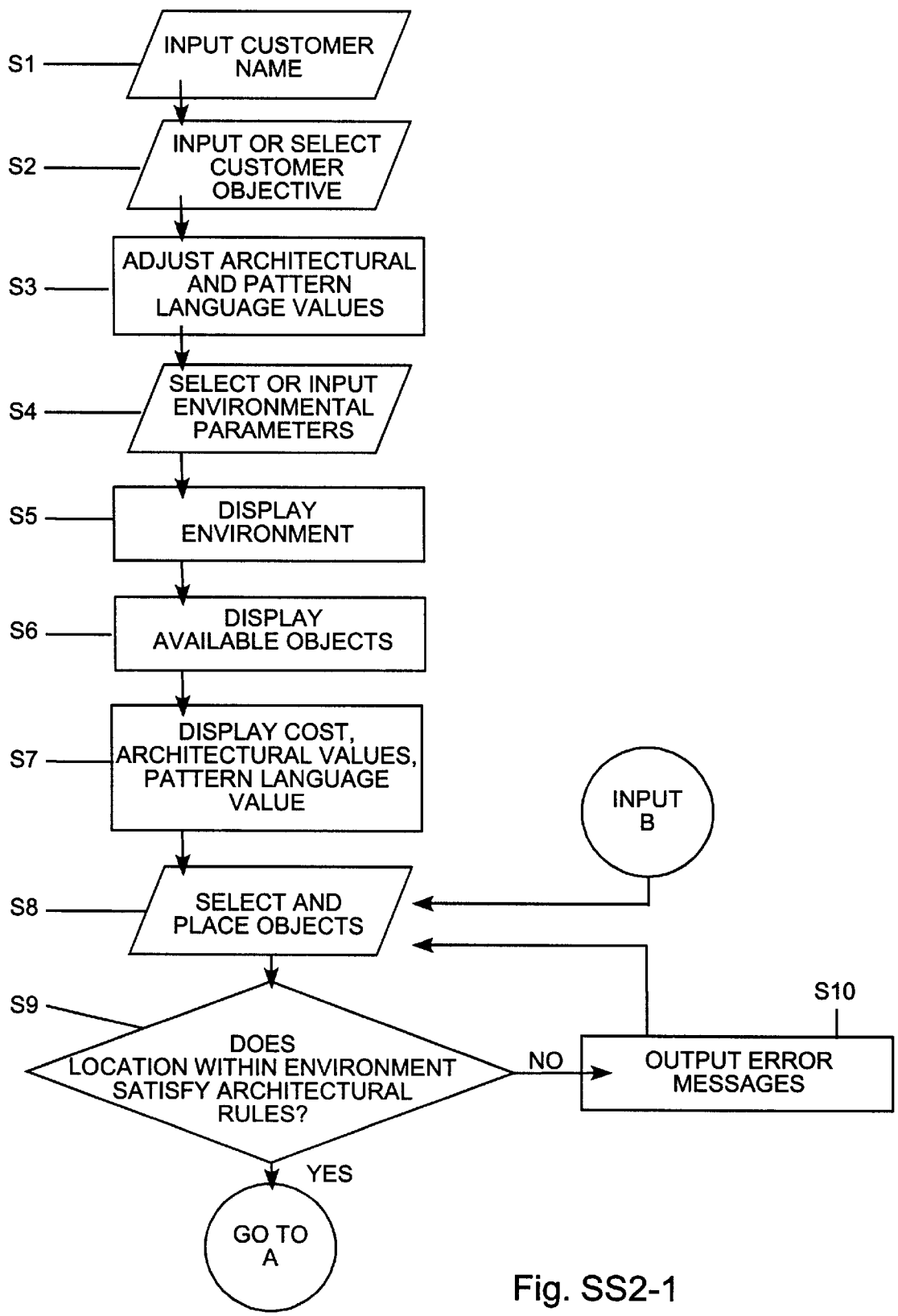
Fig. SS2-1

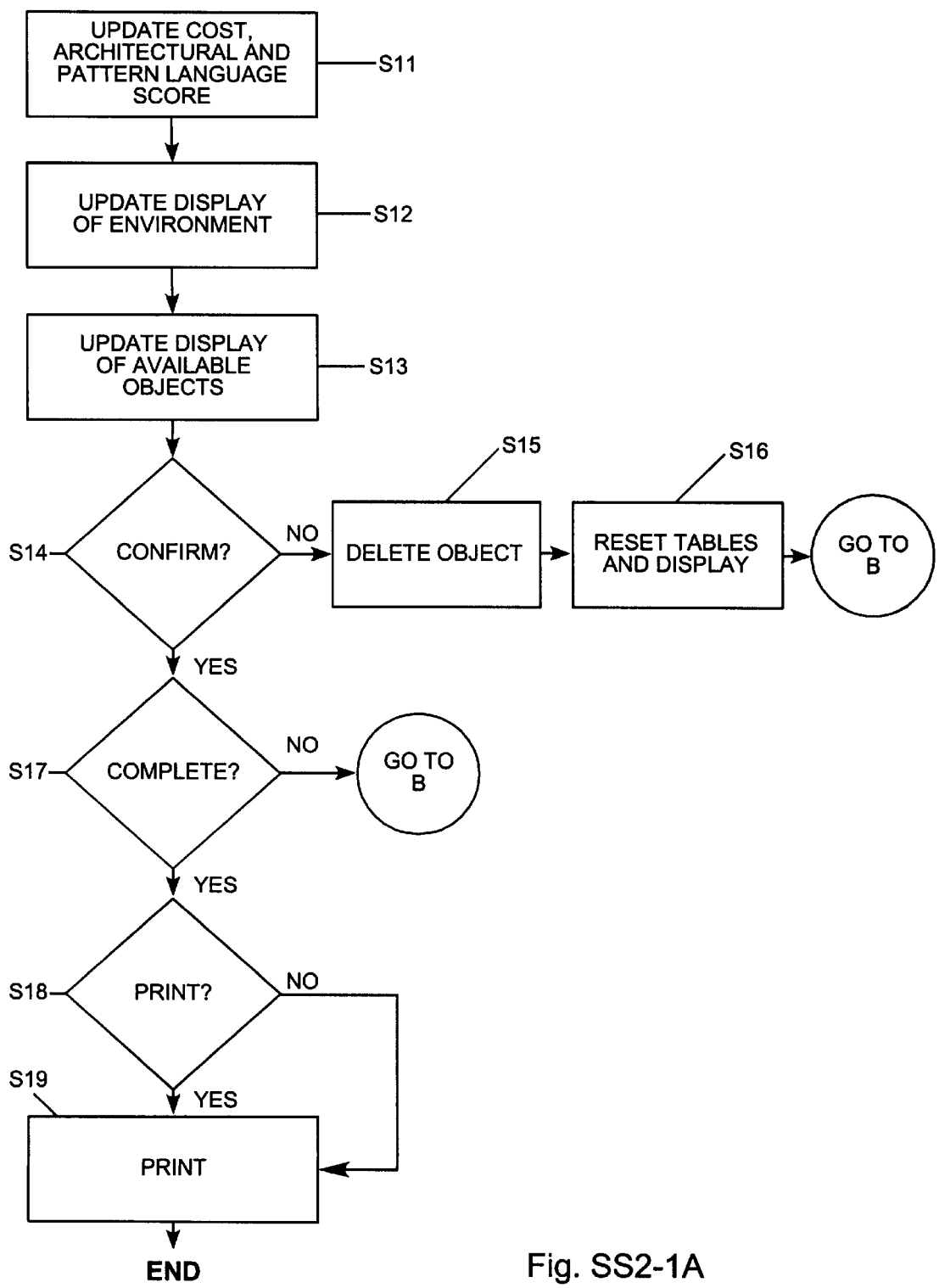
Fig. SS2-1A

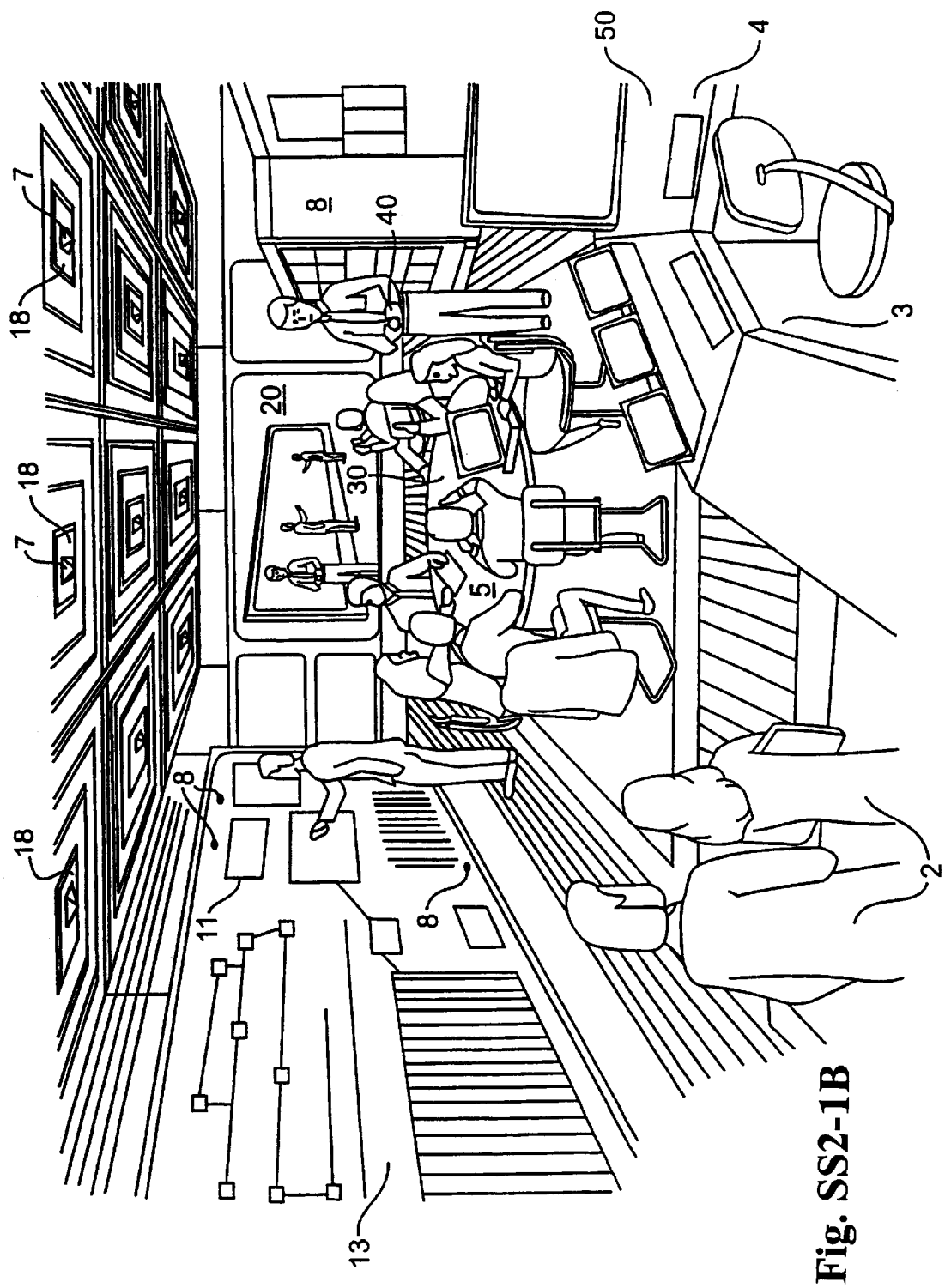
Fig. SS2-1B

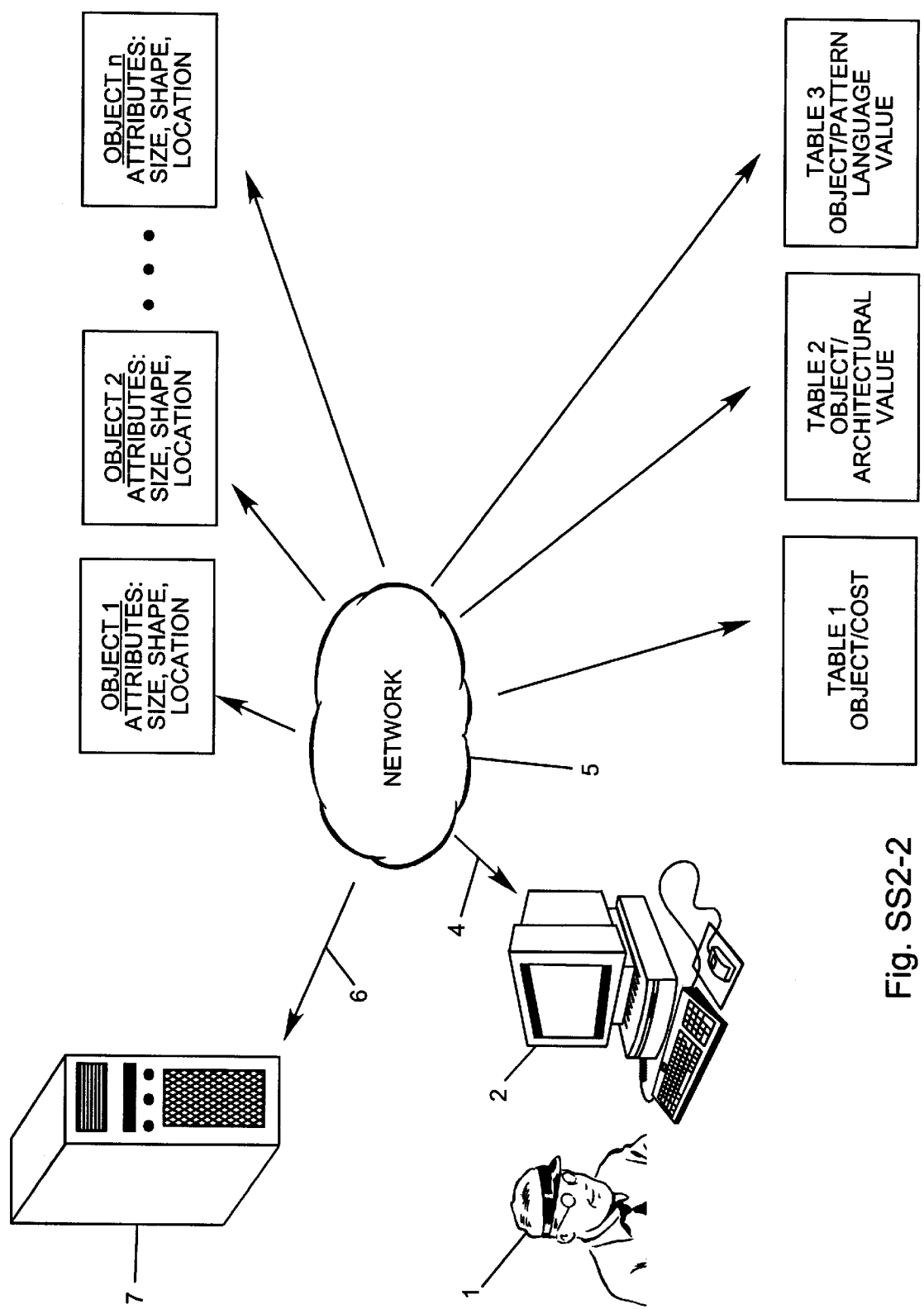
Fig. SS2-2

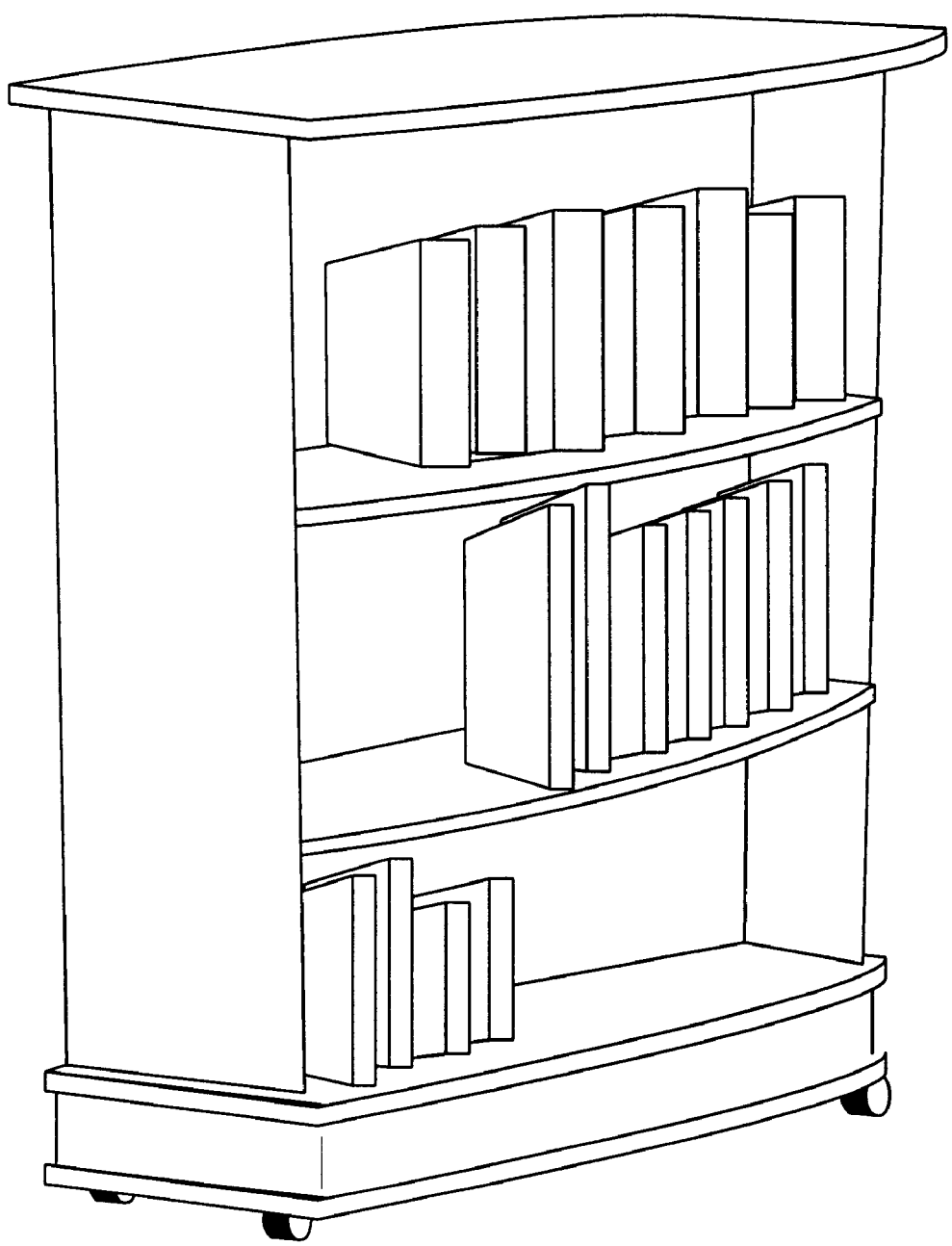
Fig.SS2-3A

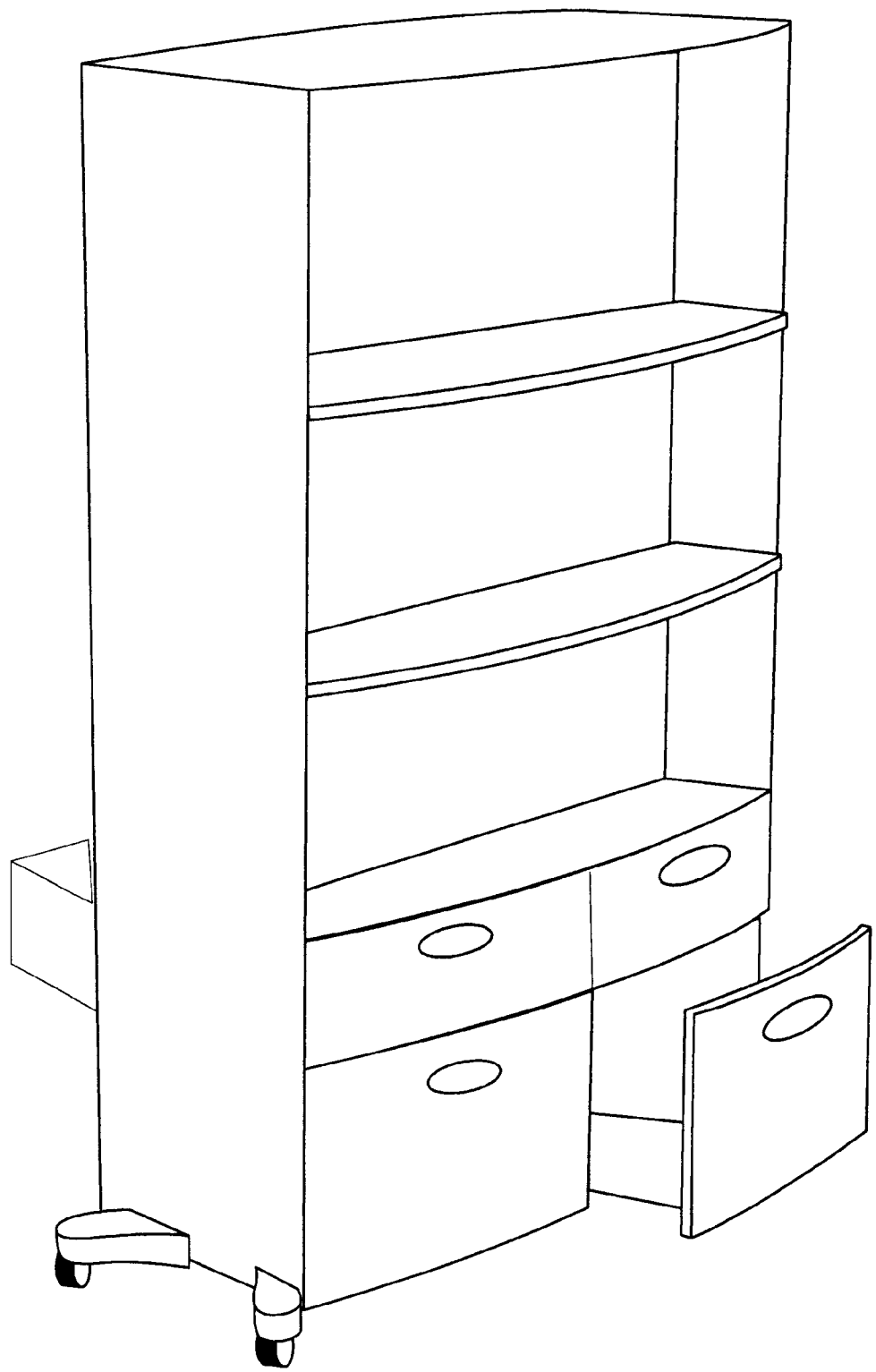
Fig.SS2-3B

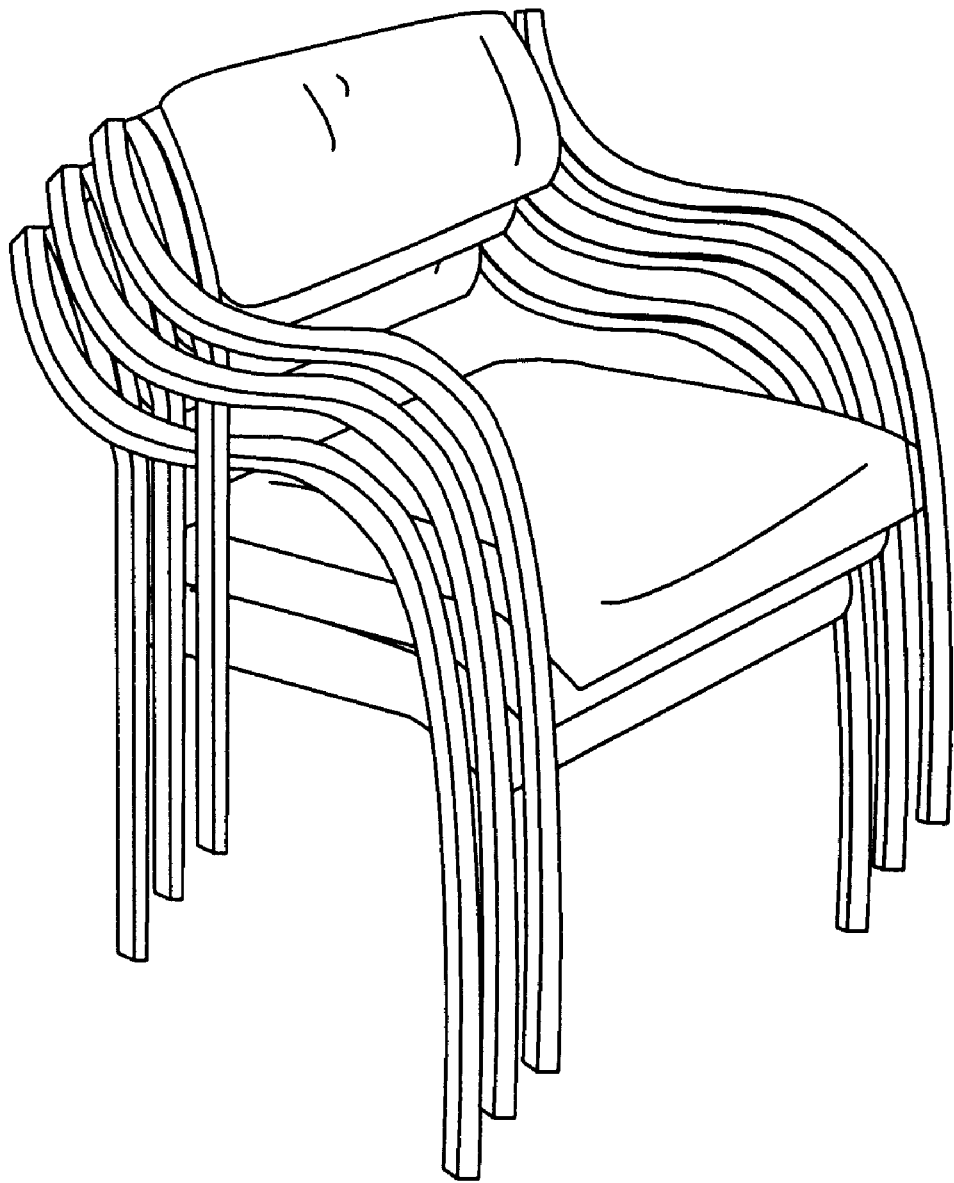
Fig.SS2-3C

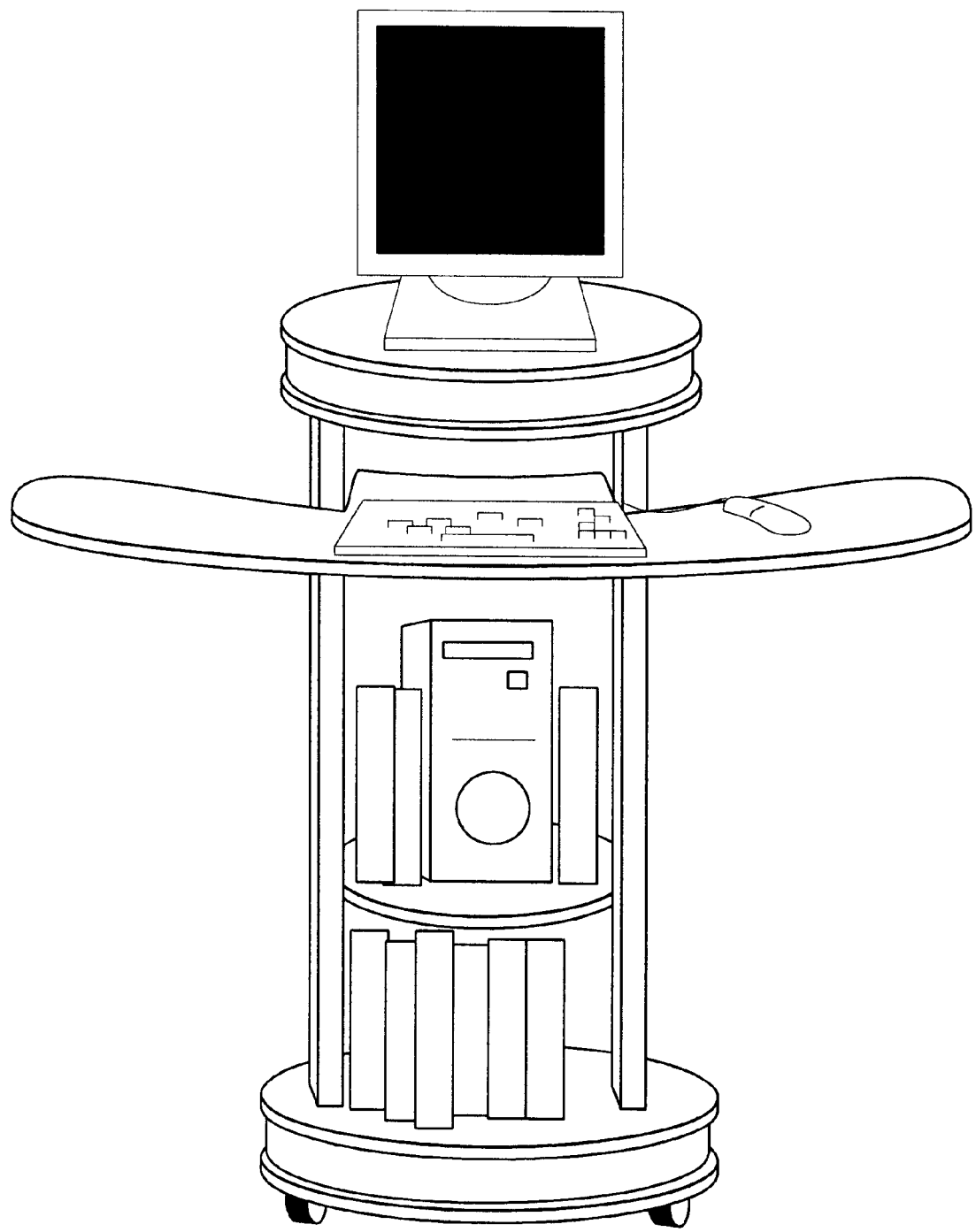
Fig.SS2-4

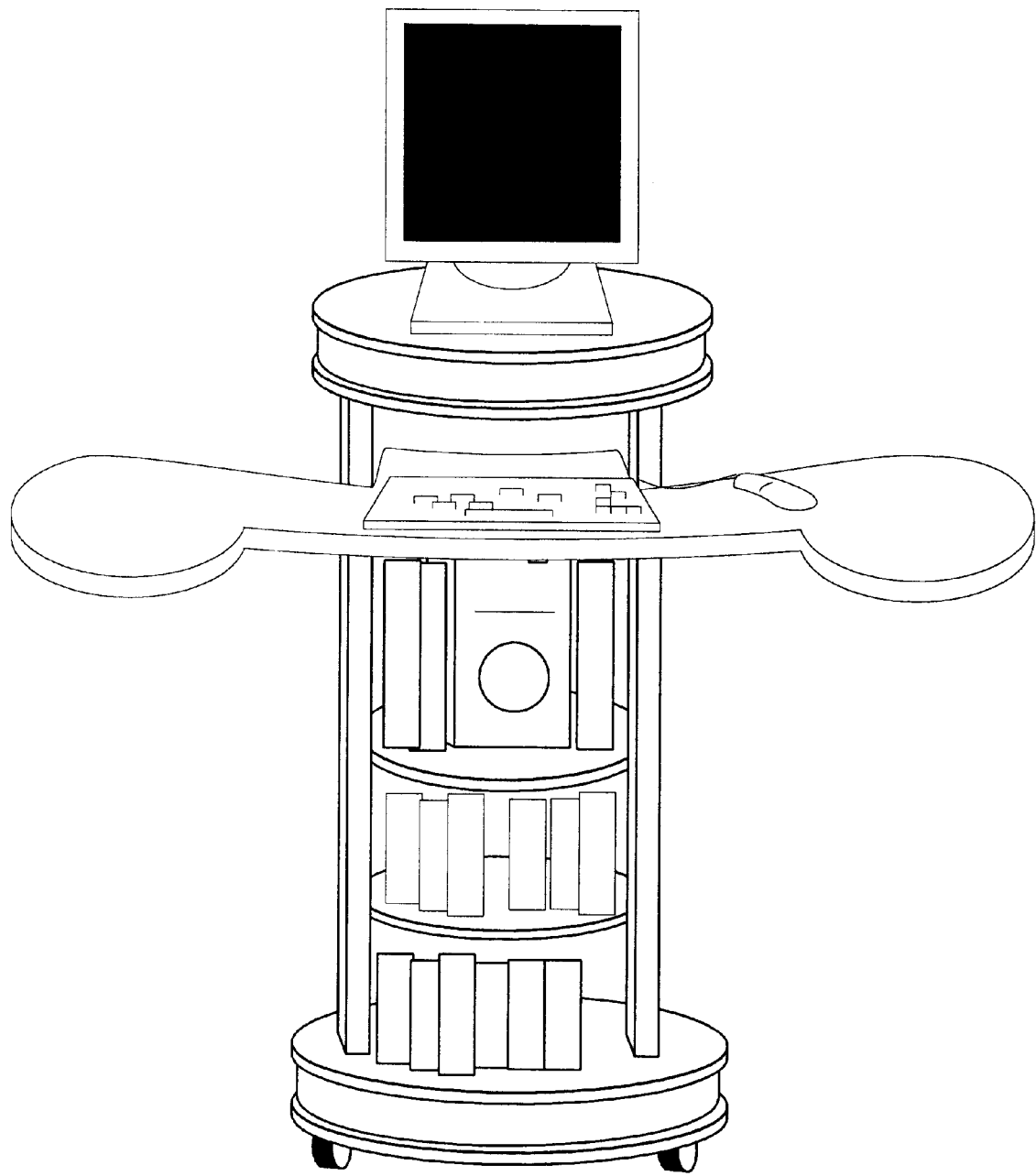
Fig.SS2-5

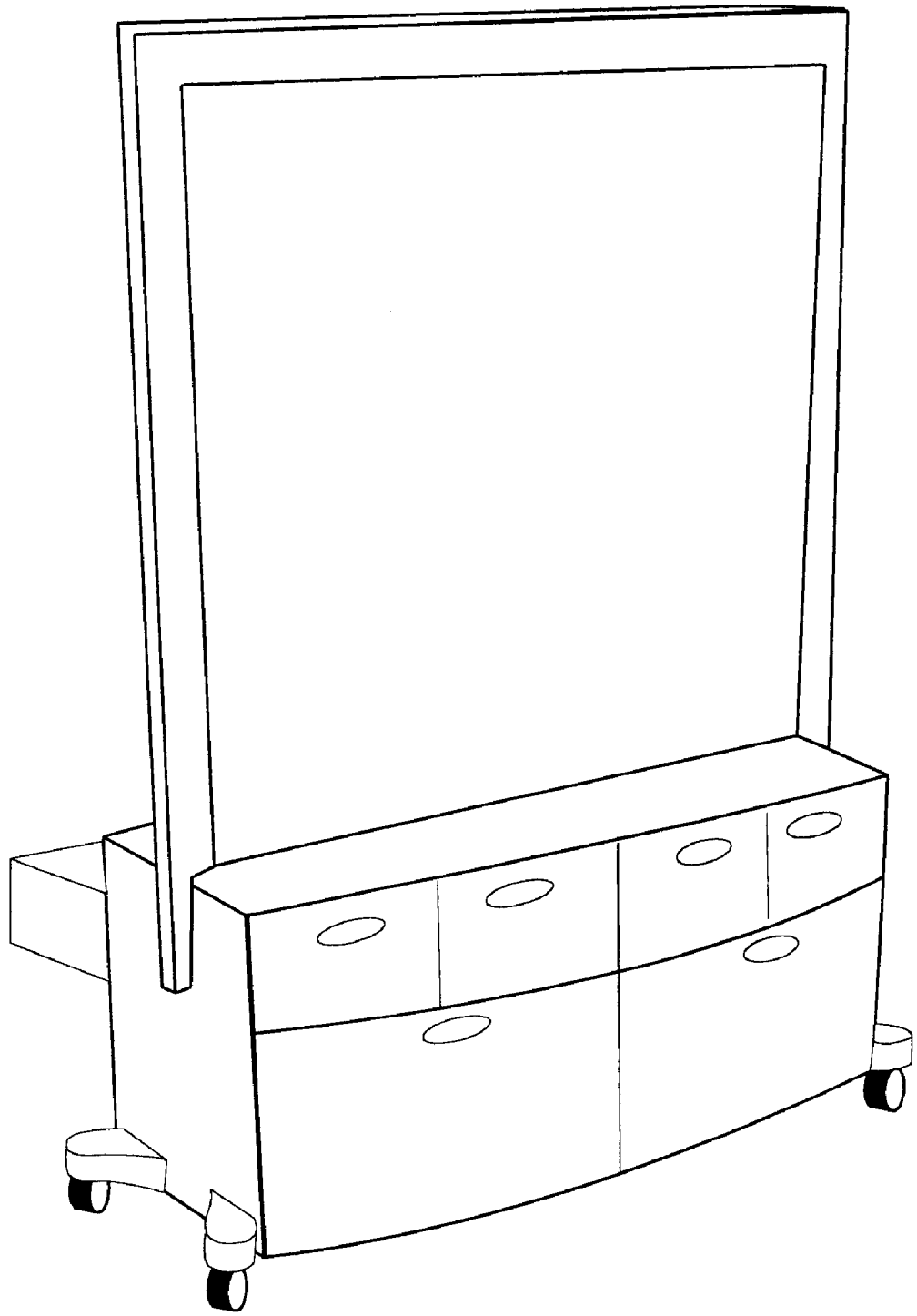
Fig.SS2-6

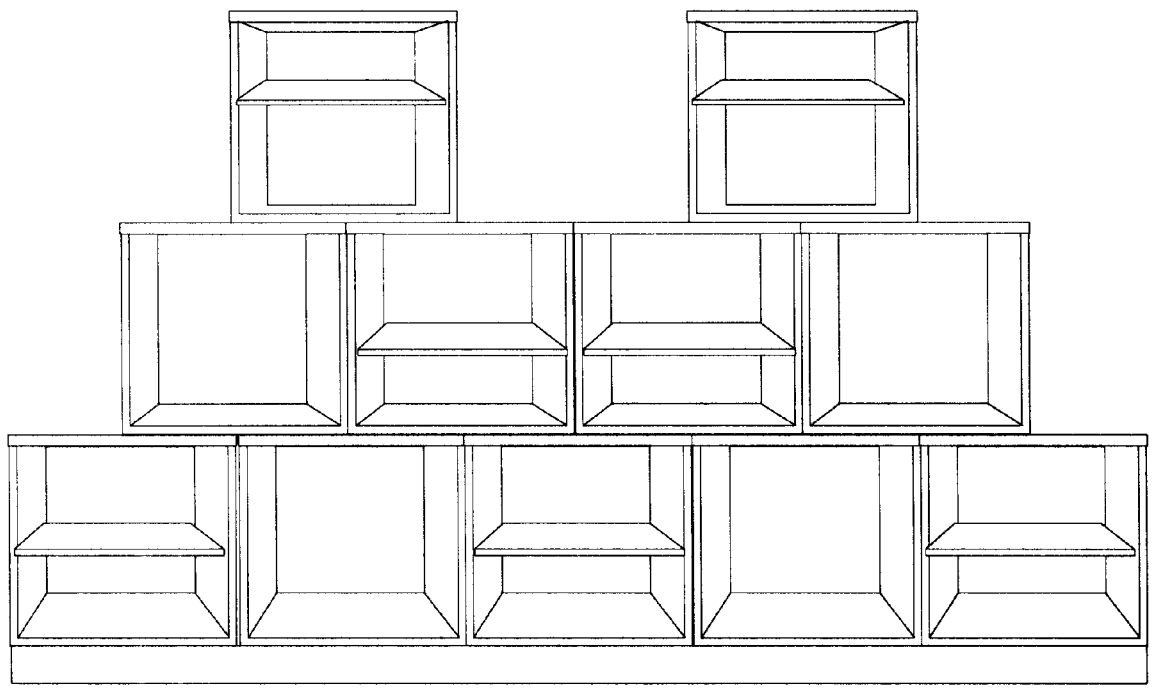
Fig.SS2-7

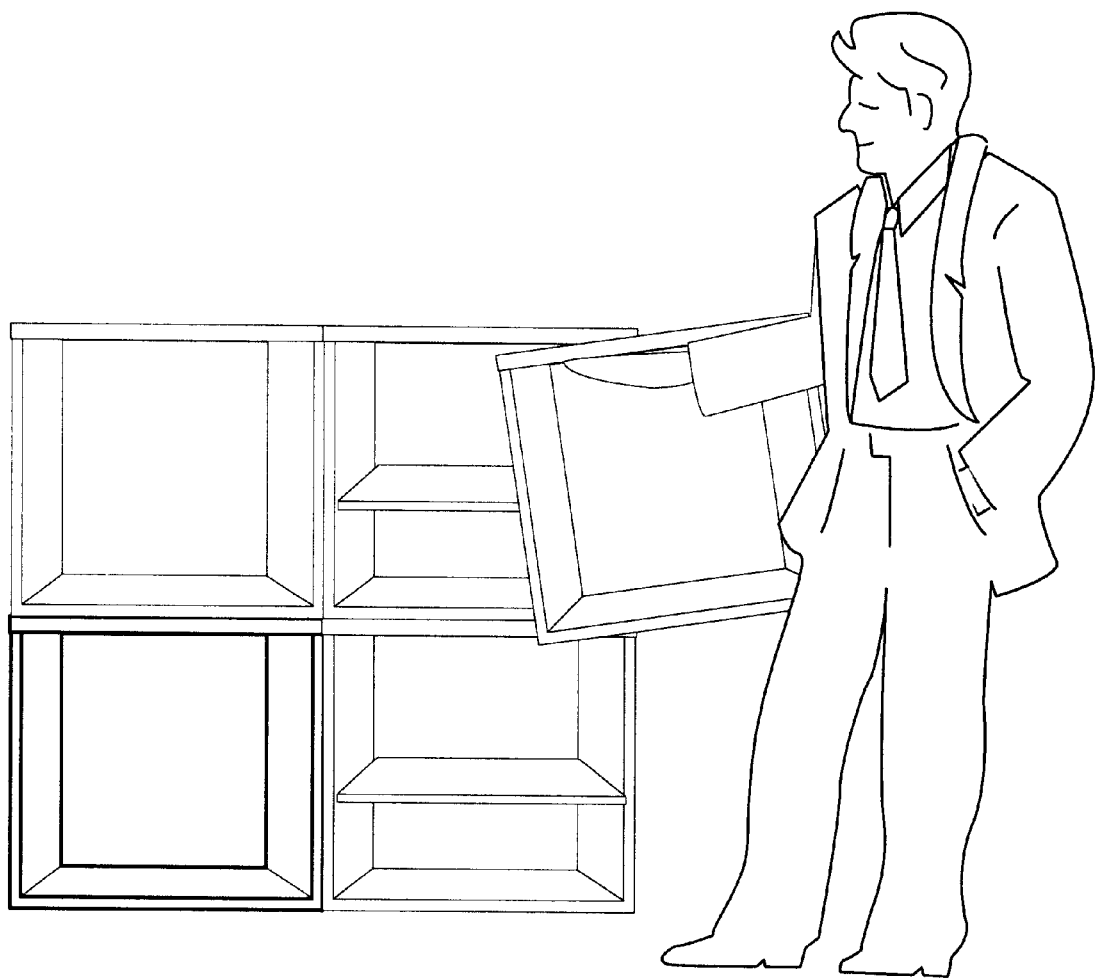
Fig.SS2-8

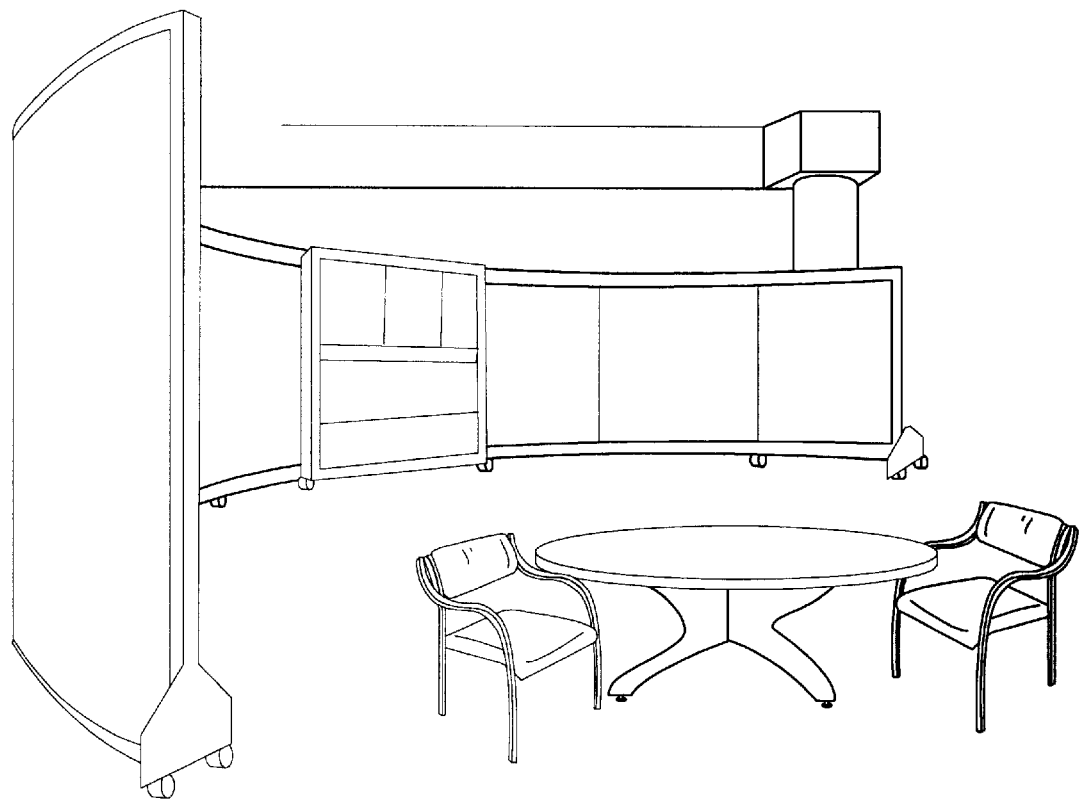
Fig.SS2-9

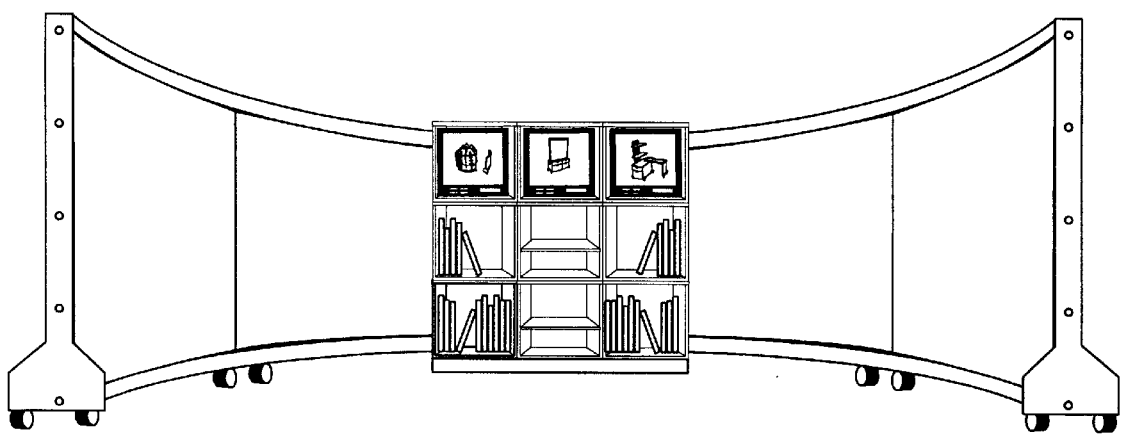
Fig.SS2-10

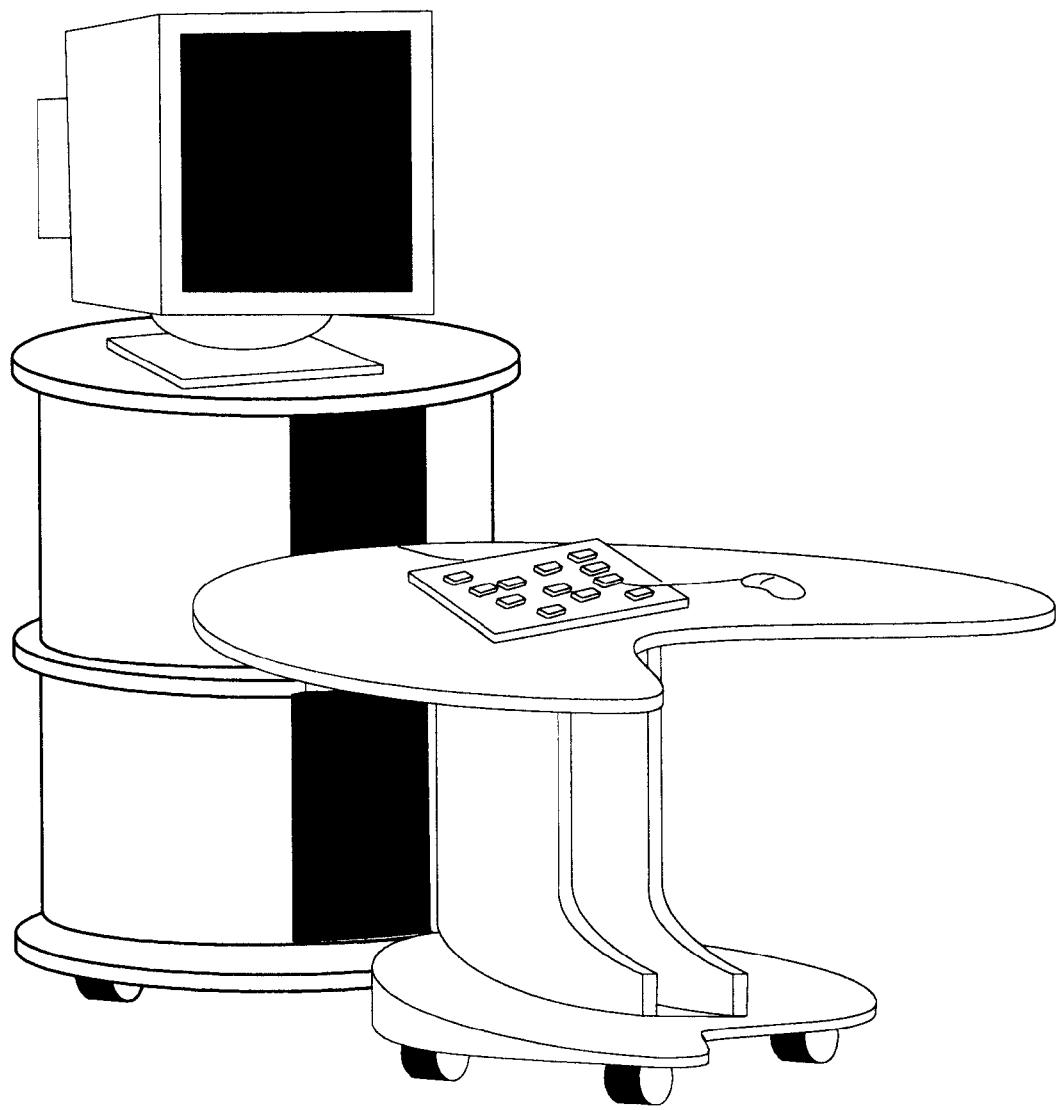
Fig.SS2-1 1

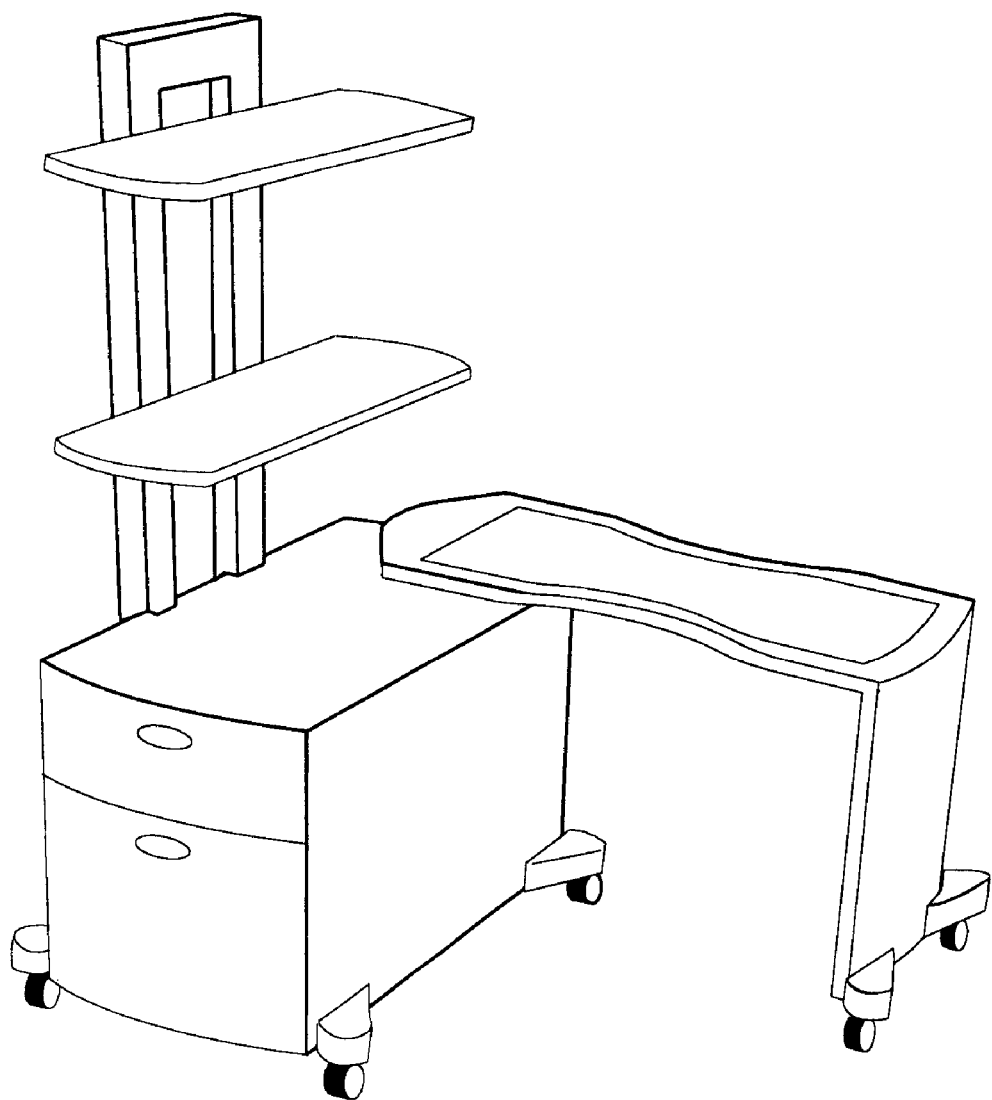
Fig.SS2-12

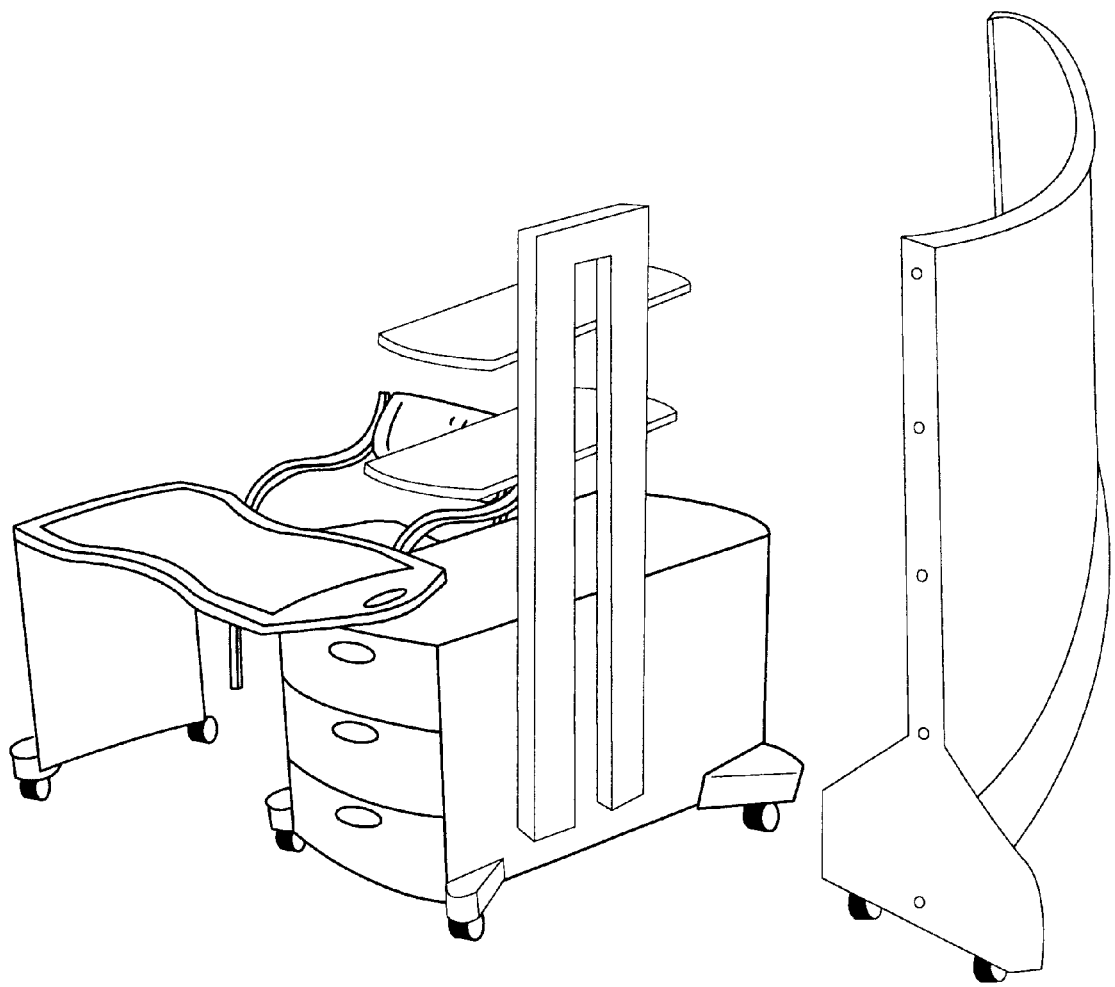
Fig.SS2-13

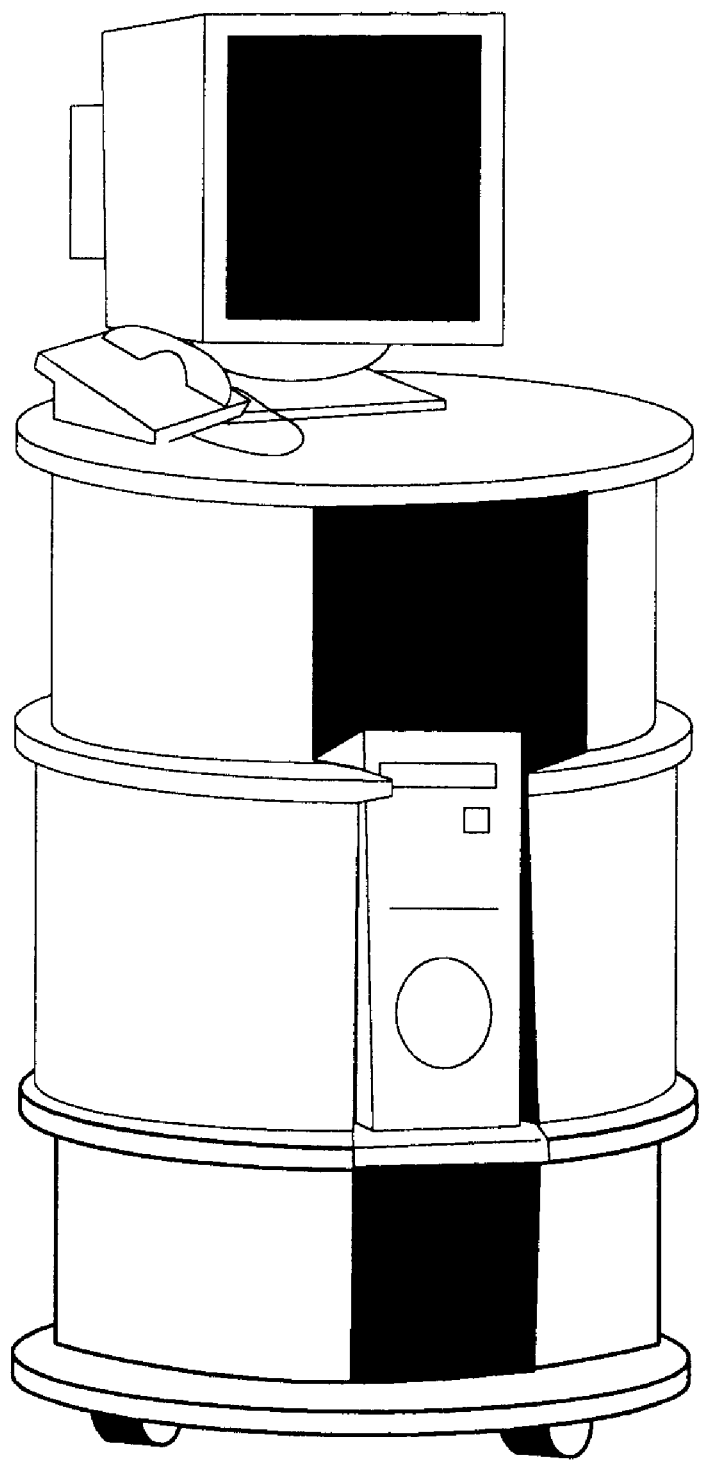
Fig.SS2-14

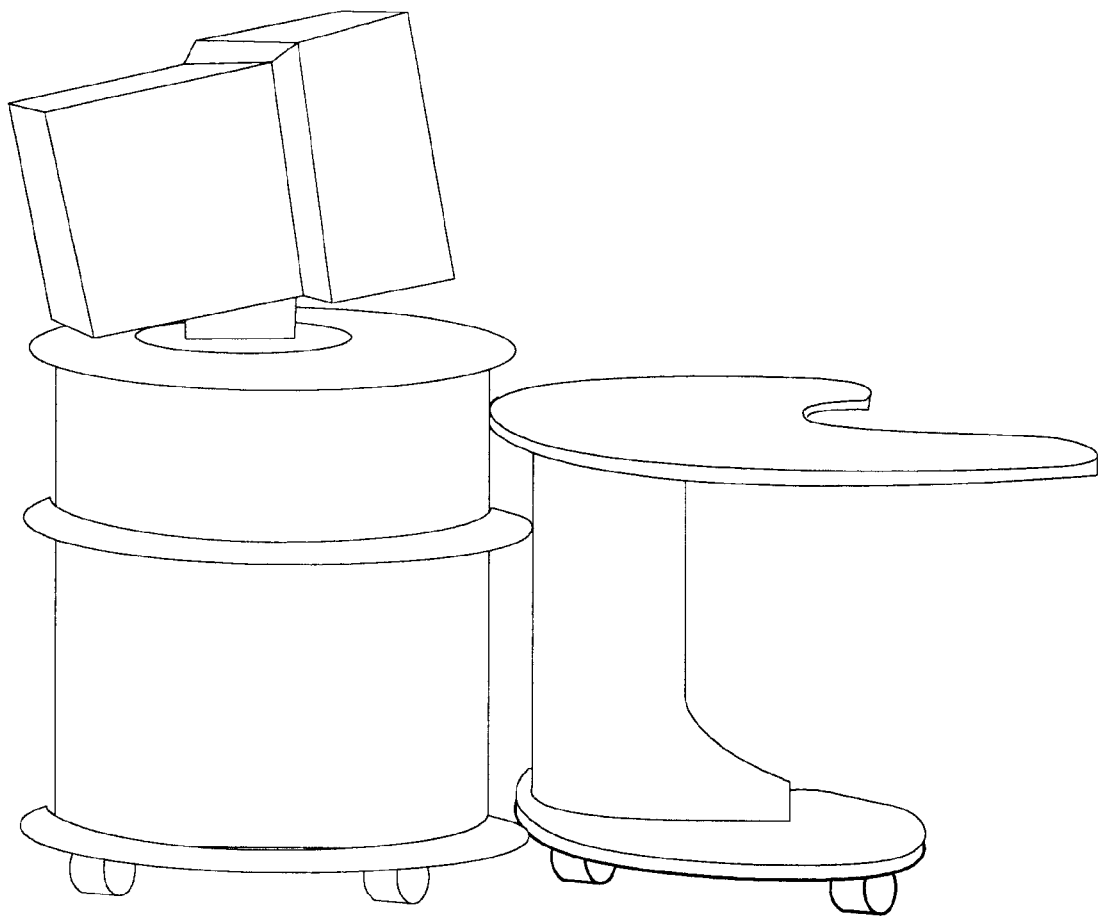
Fig.SS2-15

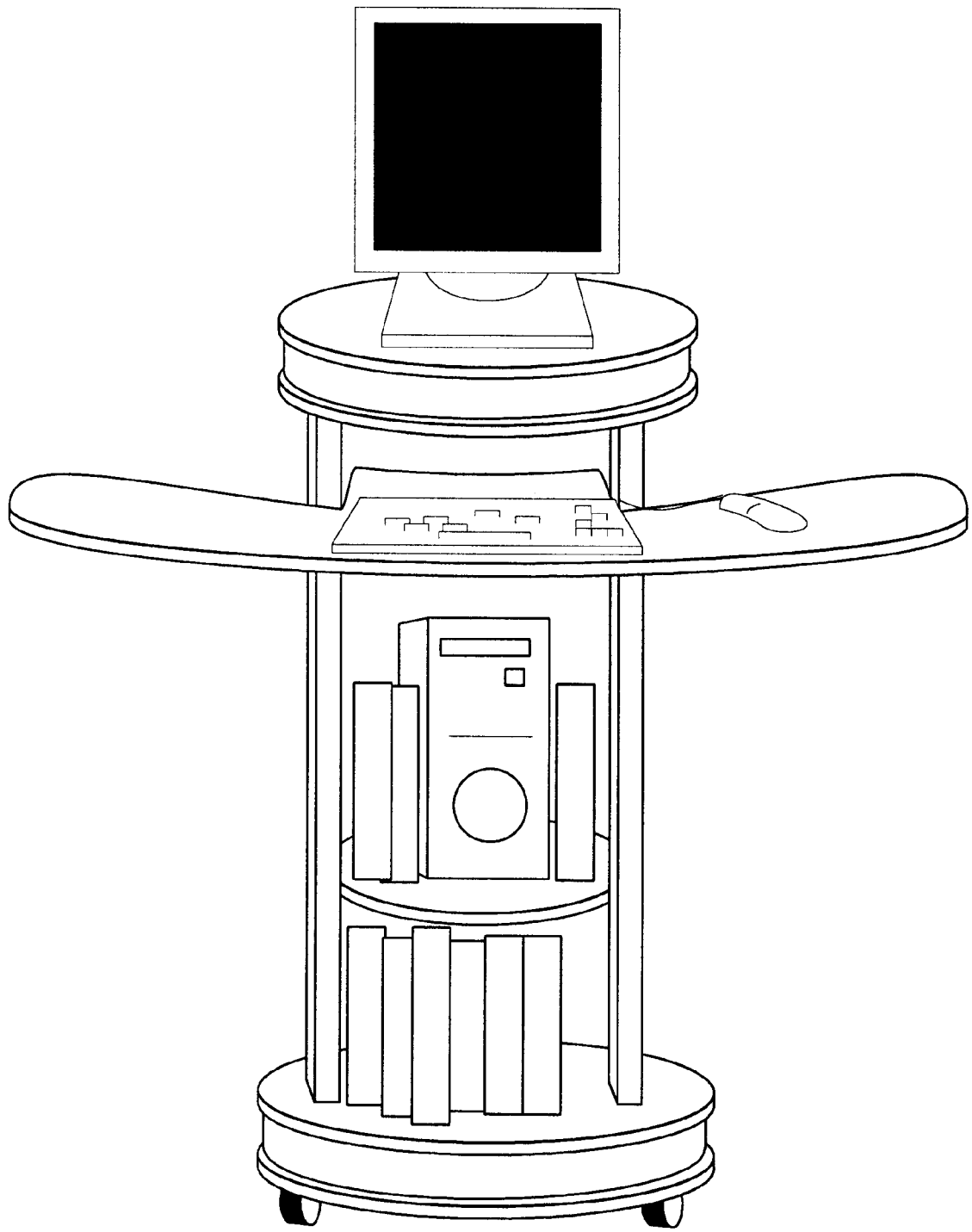
Fig.SS2-16

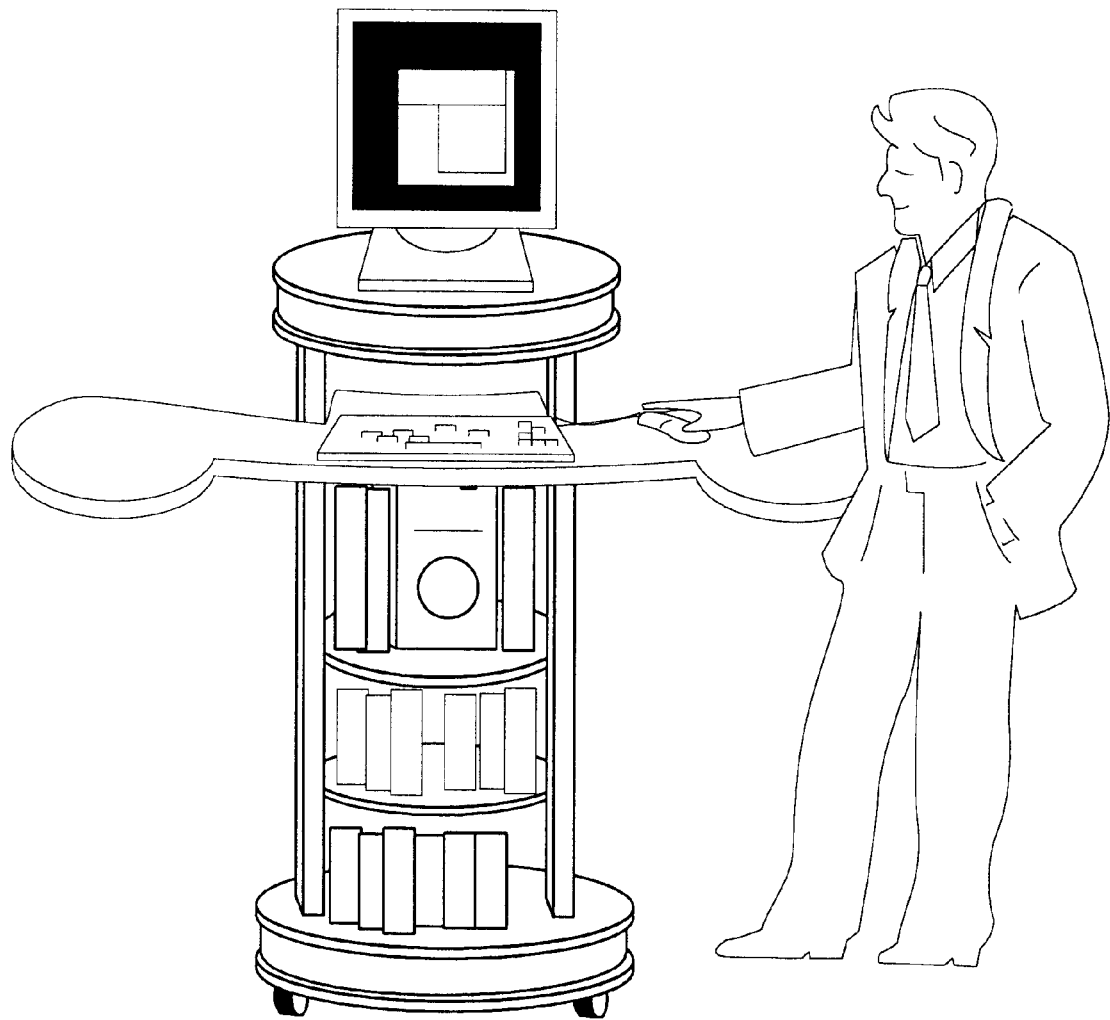
Fig.SS2-17

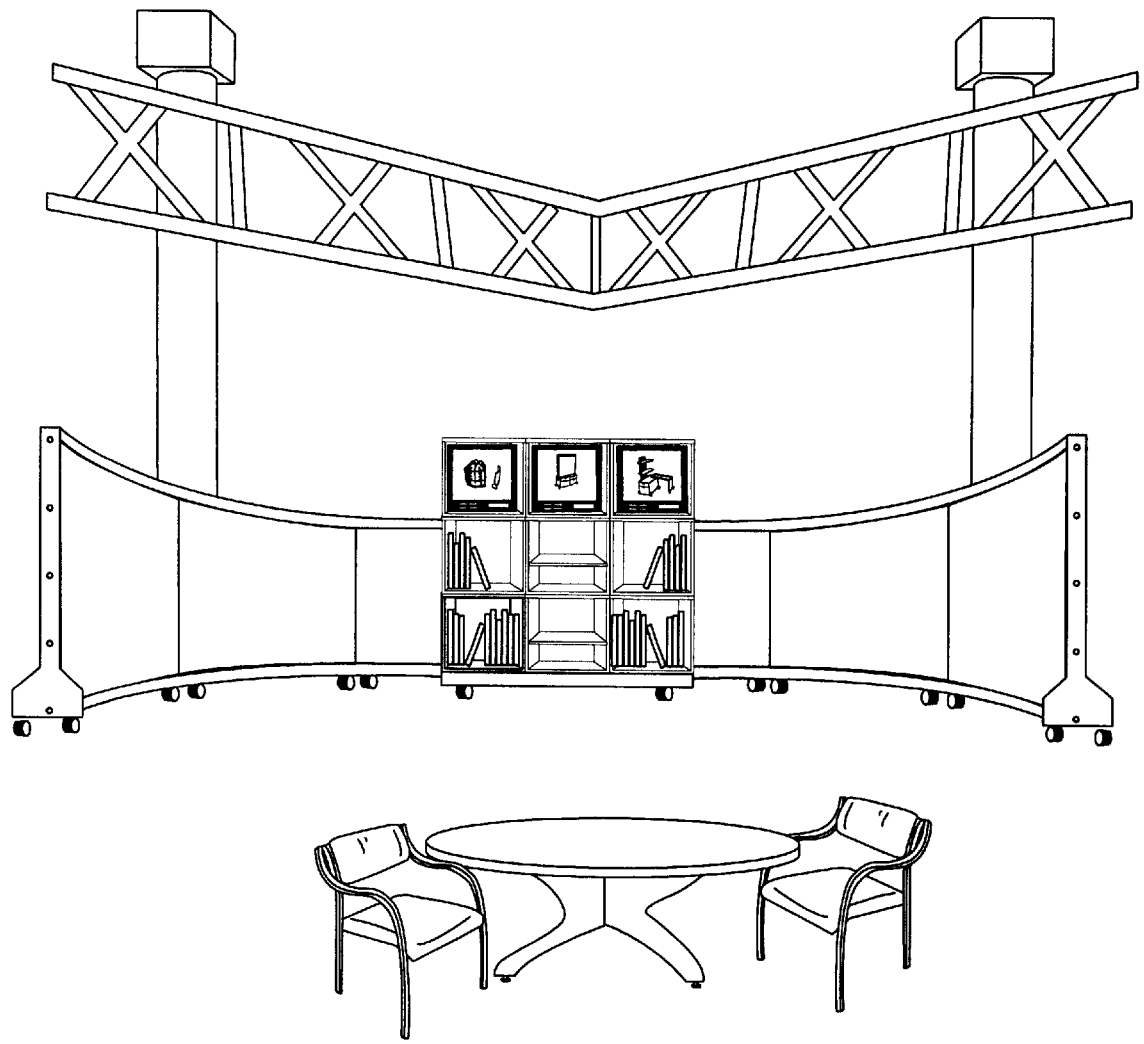
Fig.SS2-18

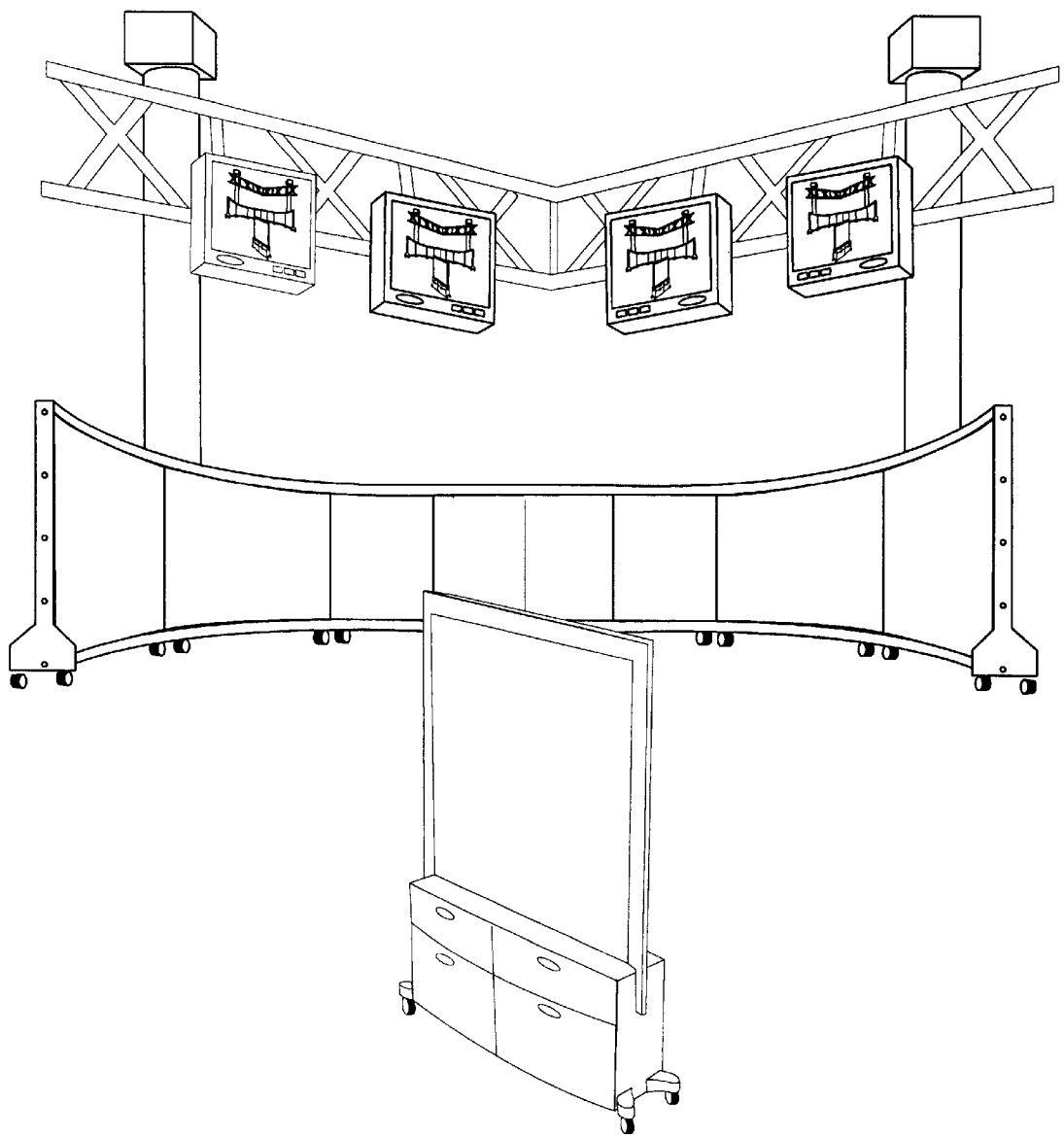
Fig.SS2-19

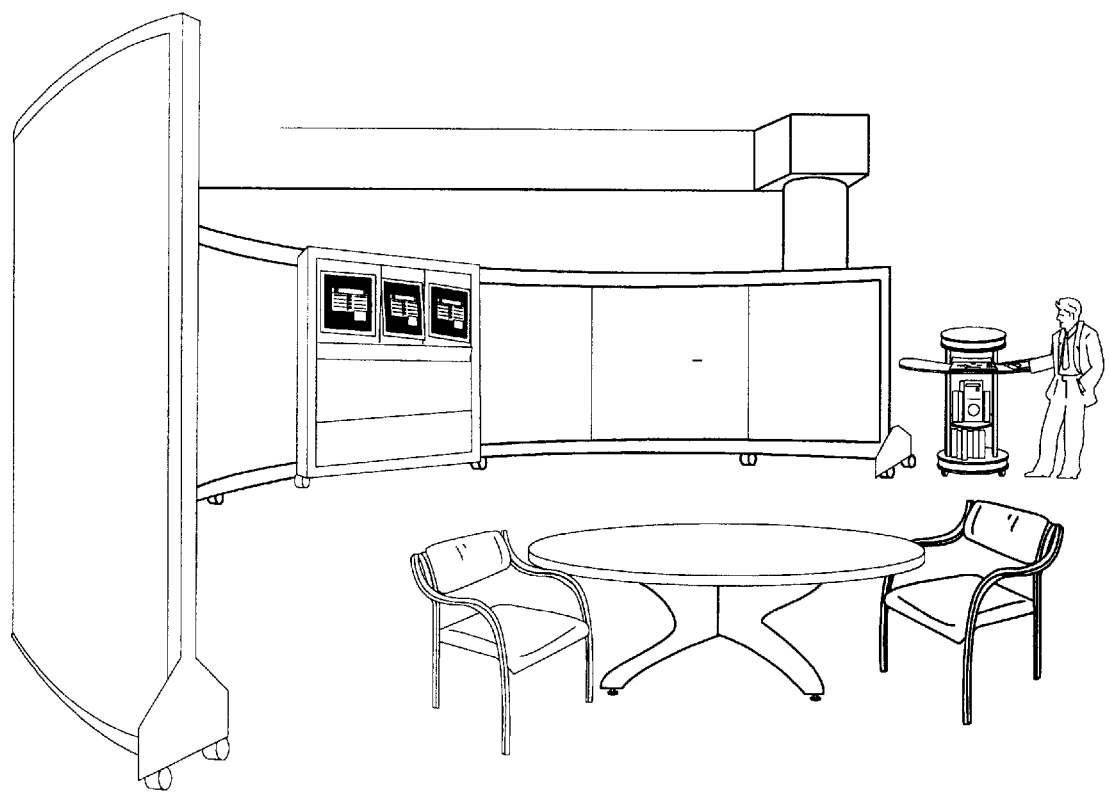
Fig.SS2-20

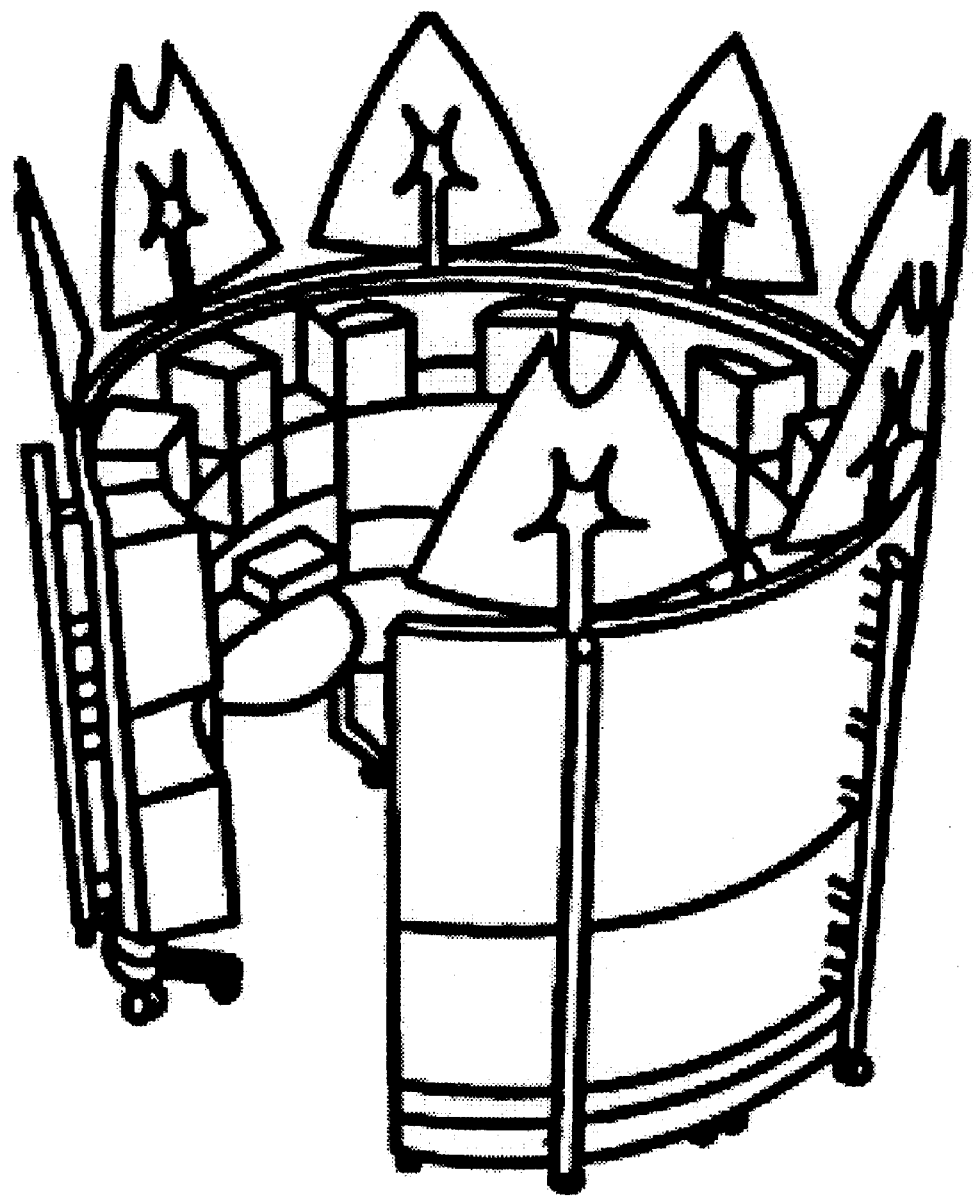
Fig.SS2-21

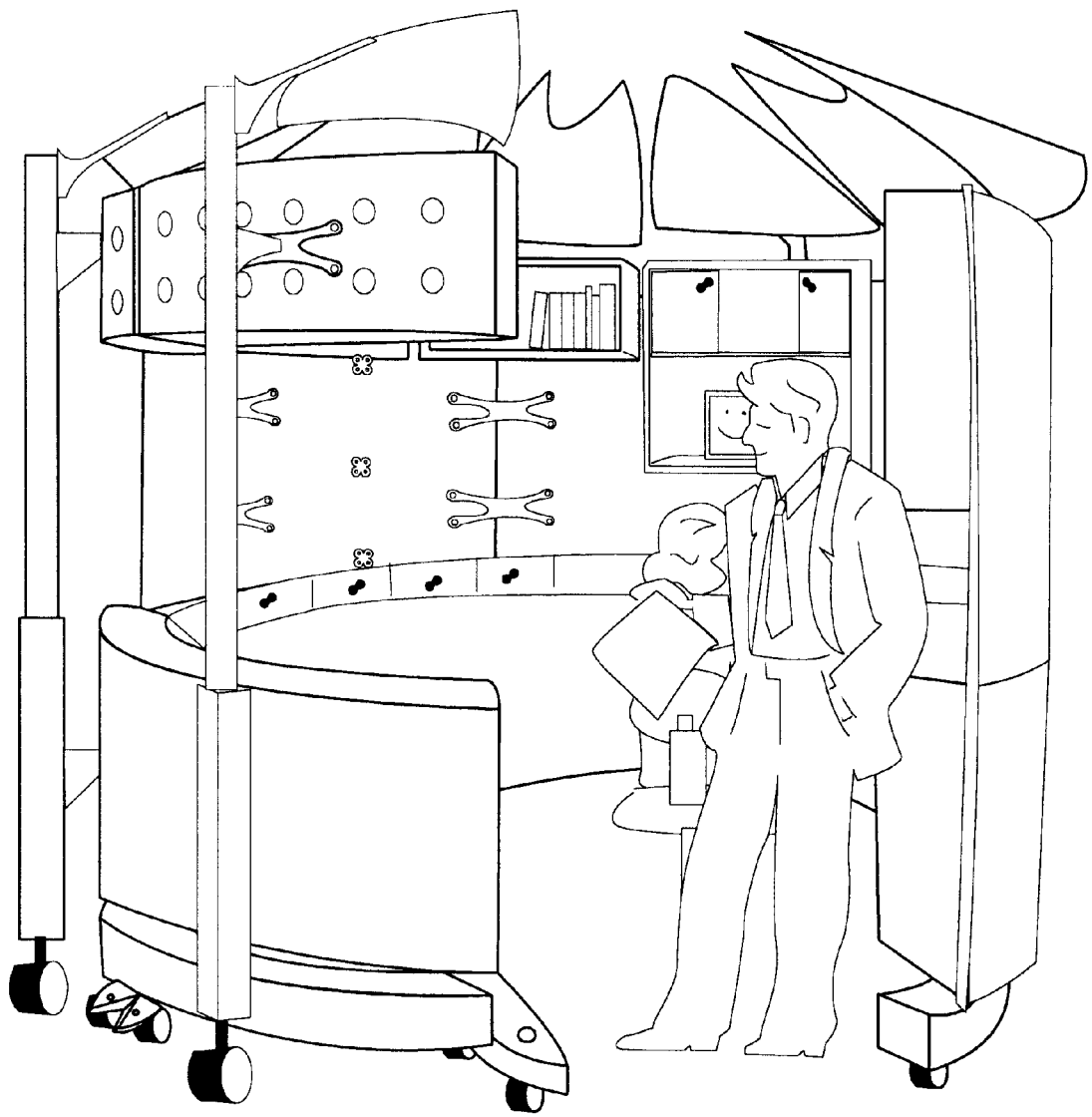
Fig.SS2-22

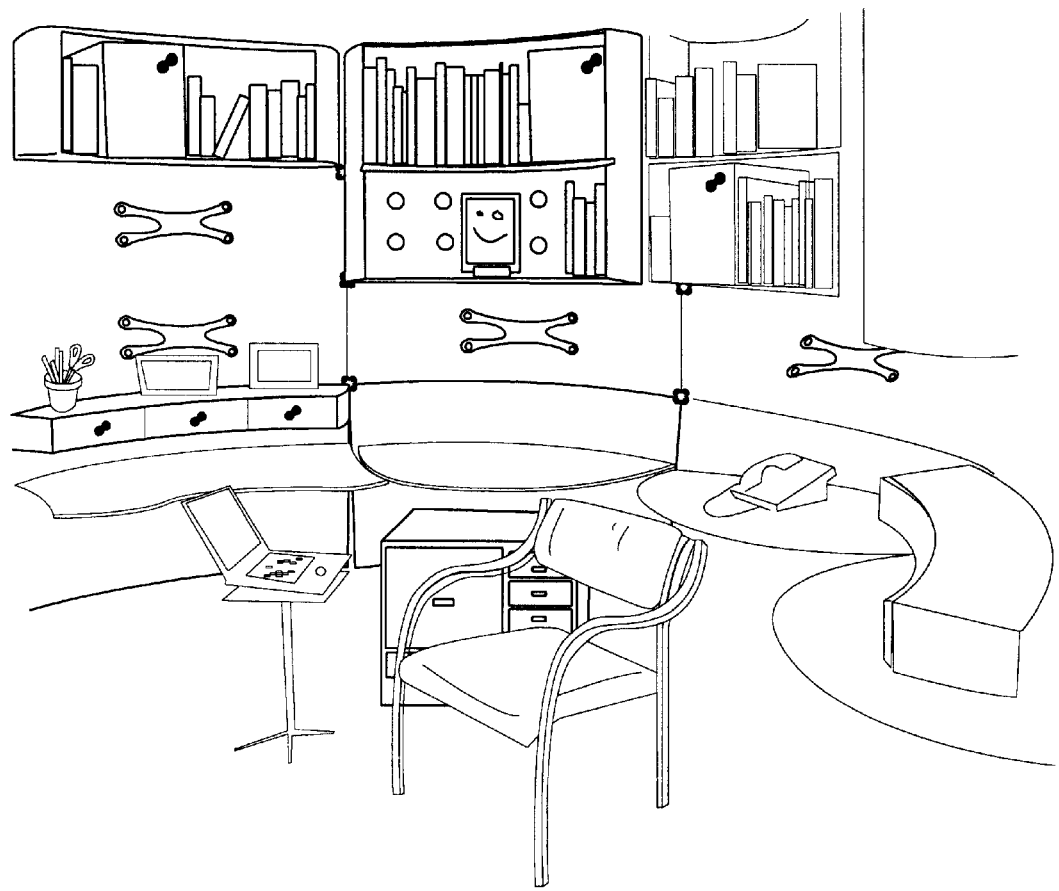
Fig.SS2-23

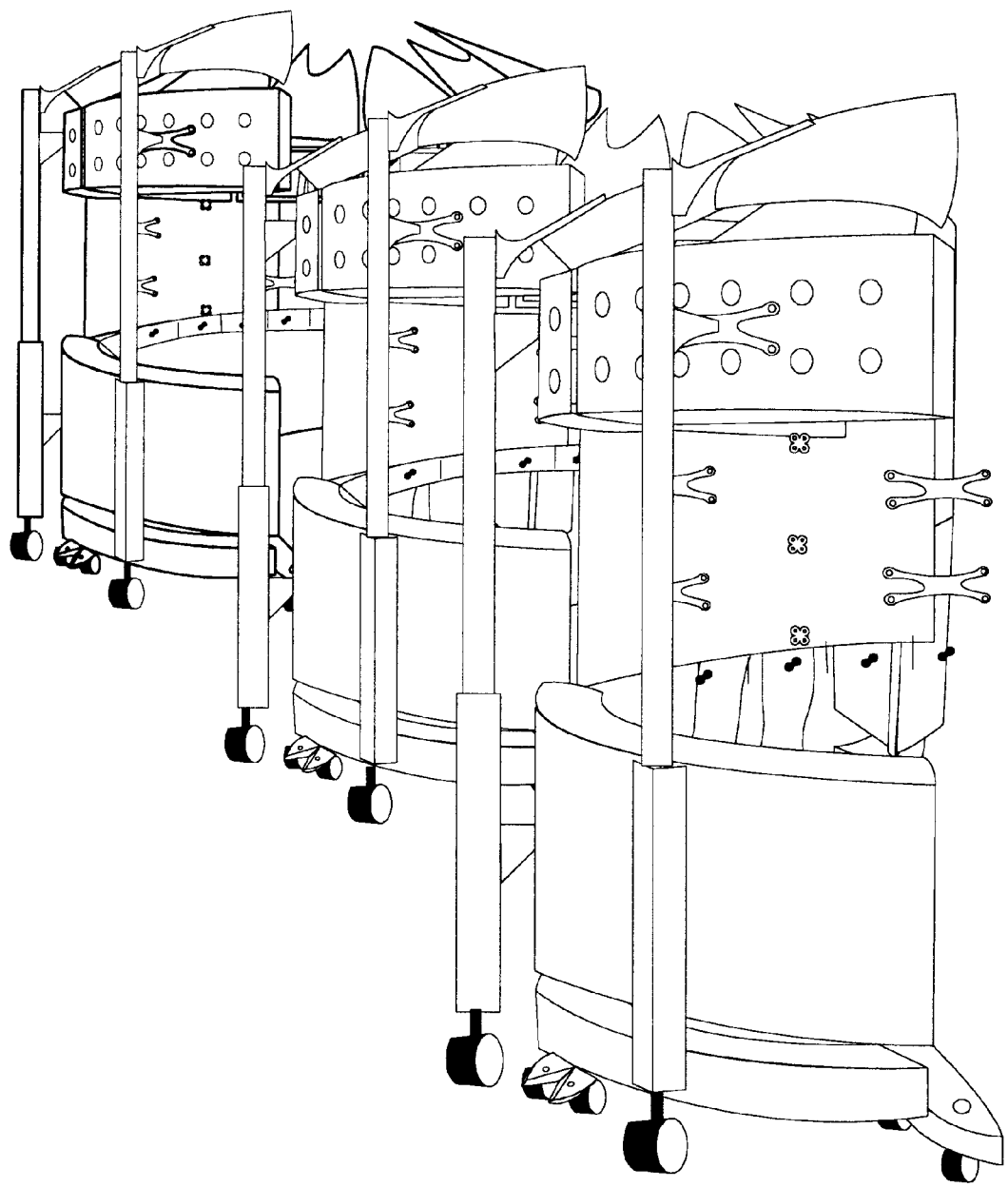
Fig.SS2-24

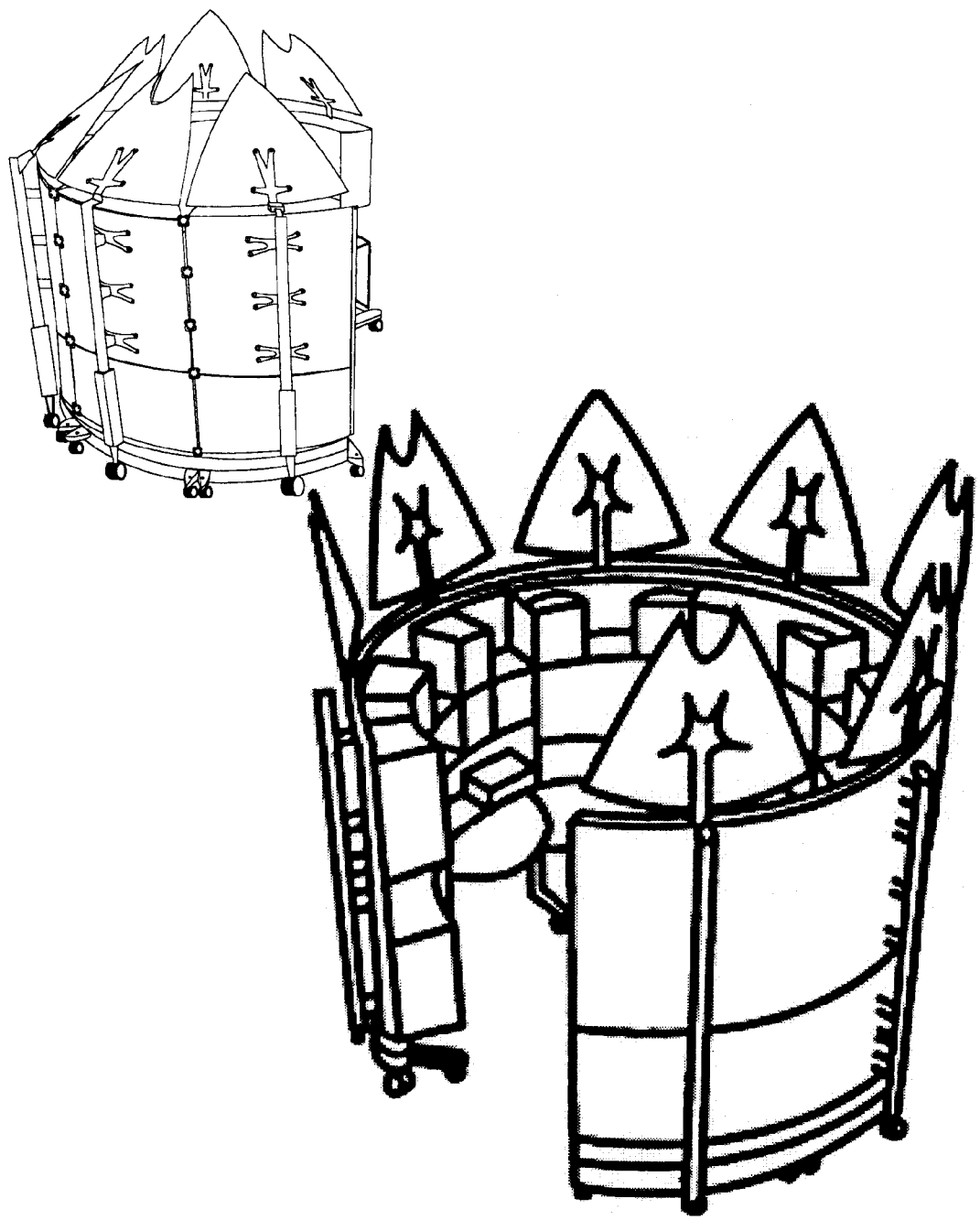
Fig.SS2-25

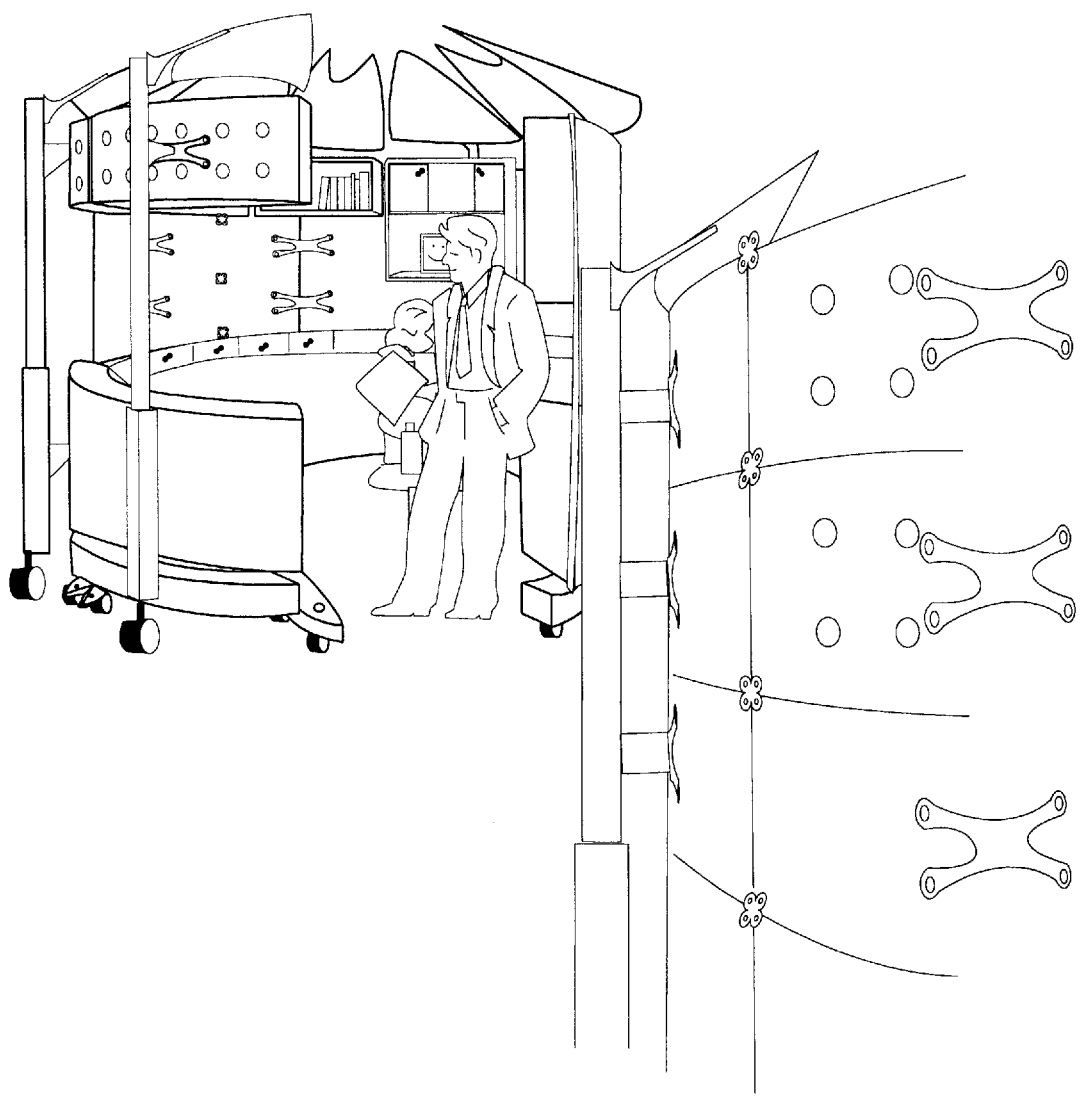
Fig.SS2-26

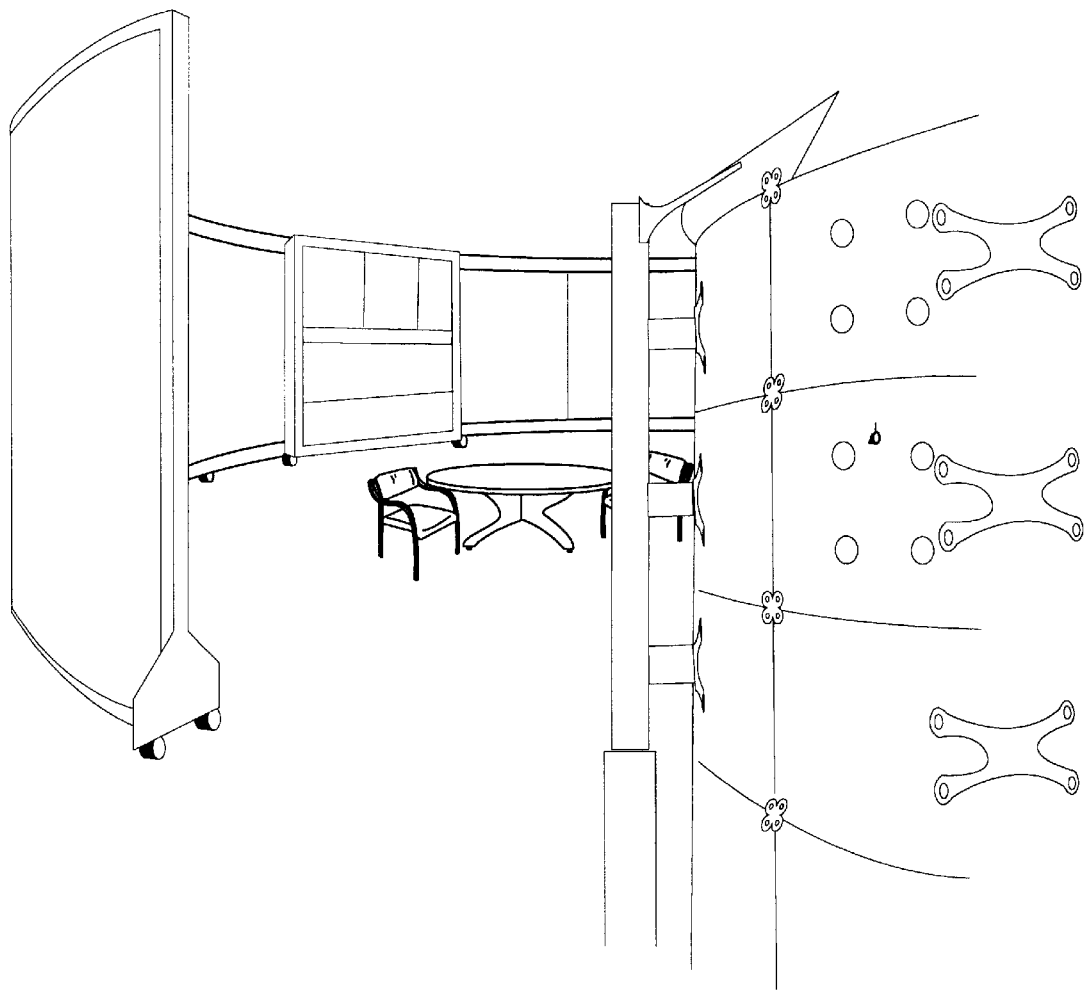
Fig.SS2-27

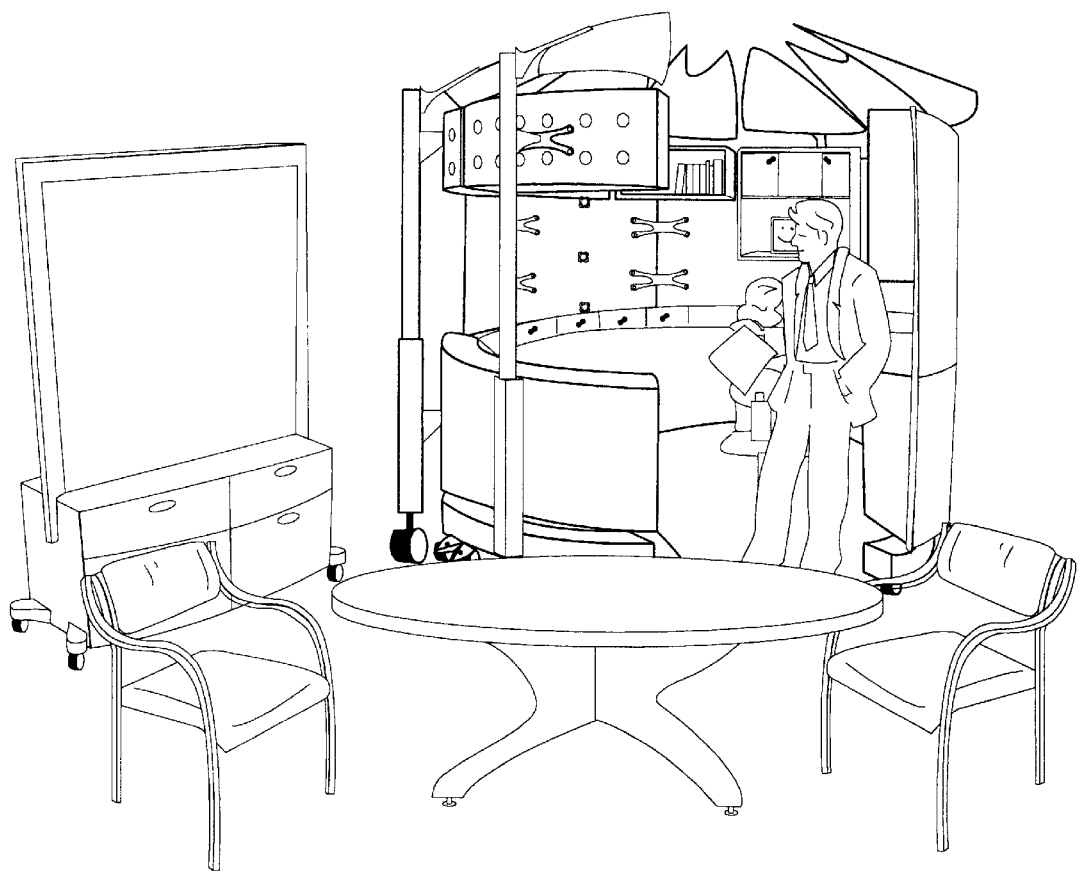
Fig.SS2-28

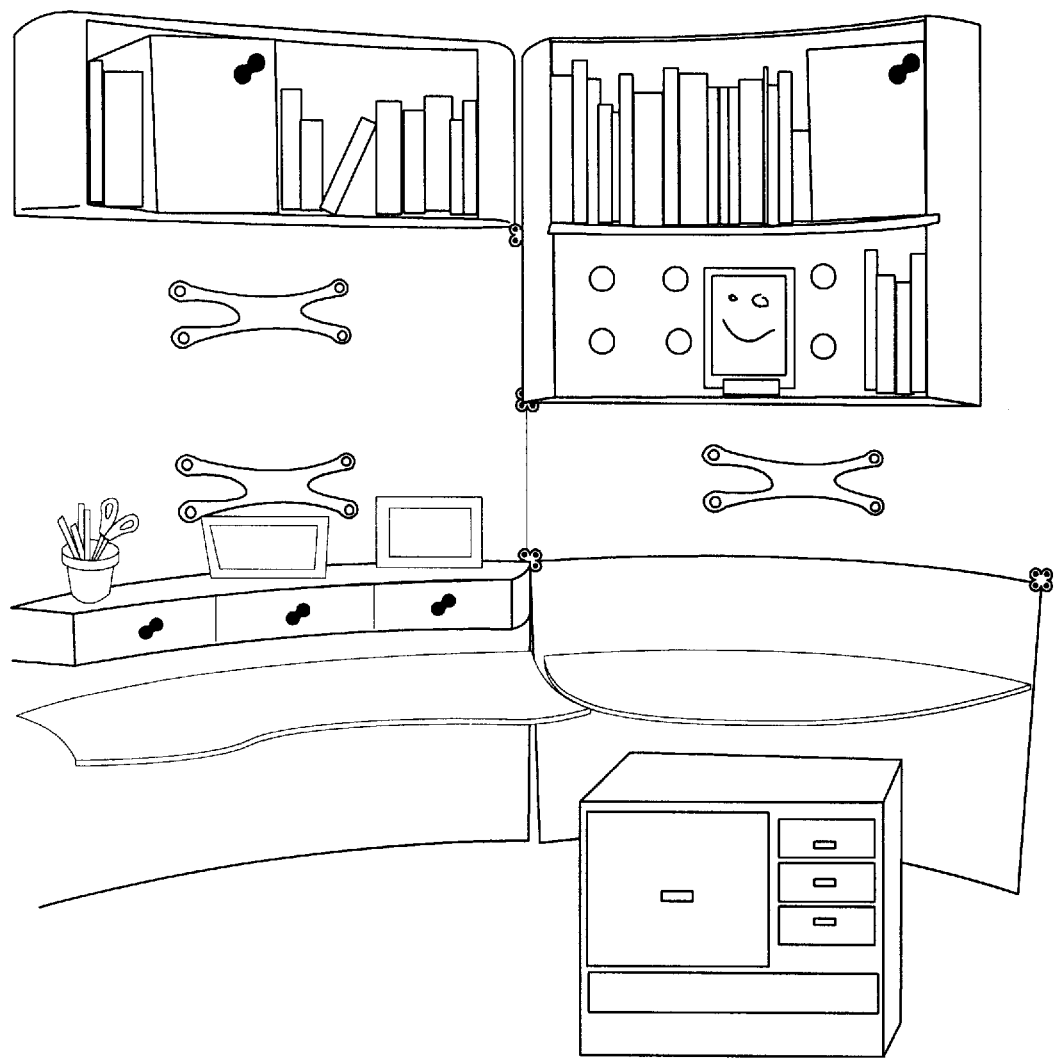
Fig.SS2-29

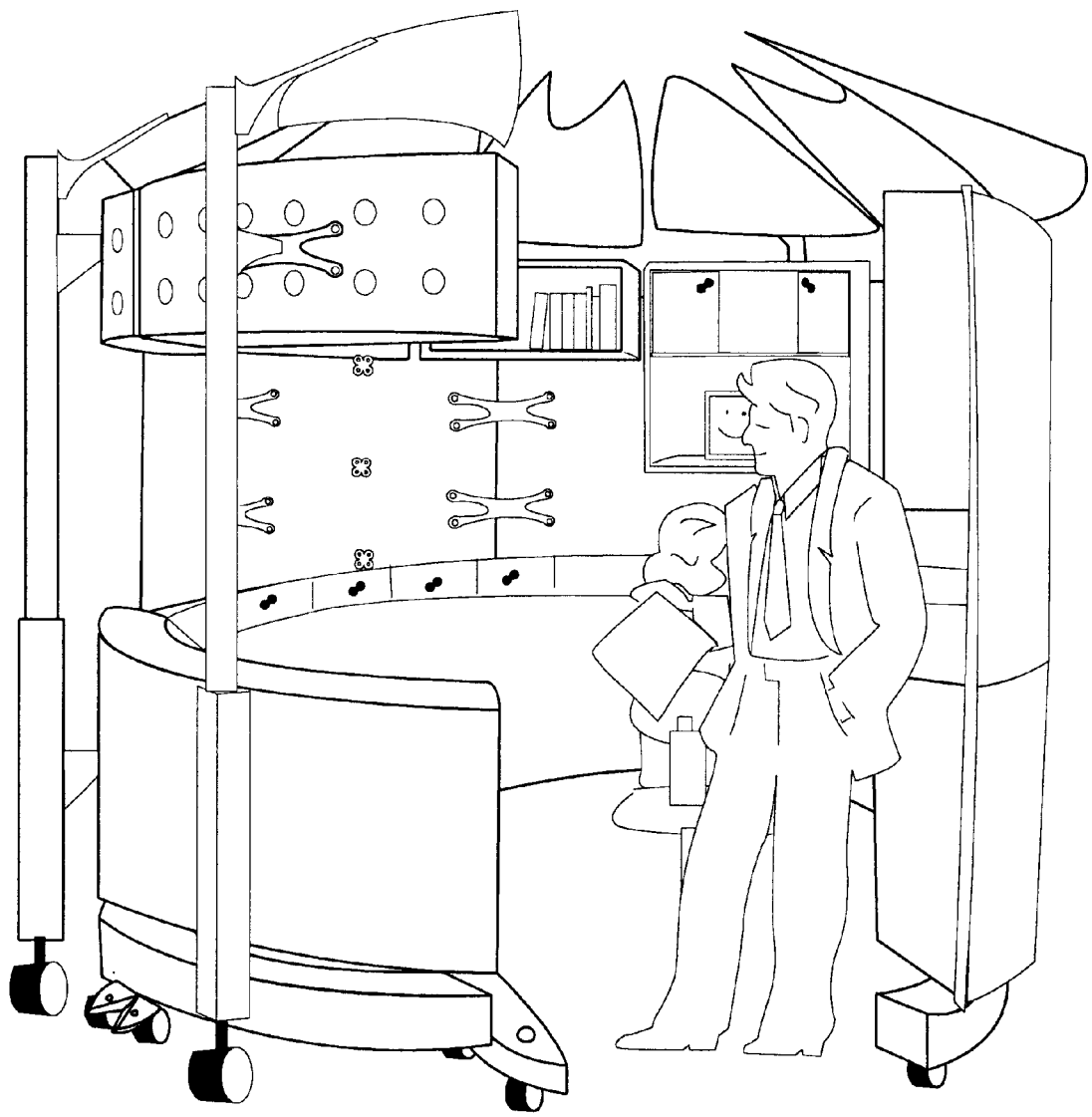
Fig.SS2-30

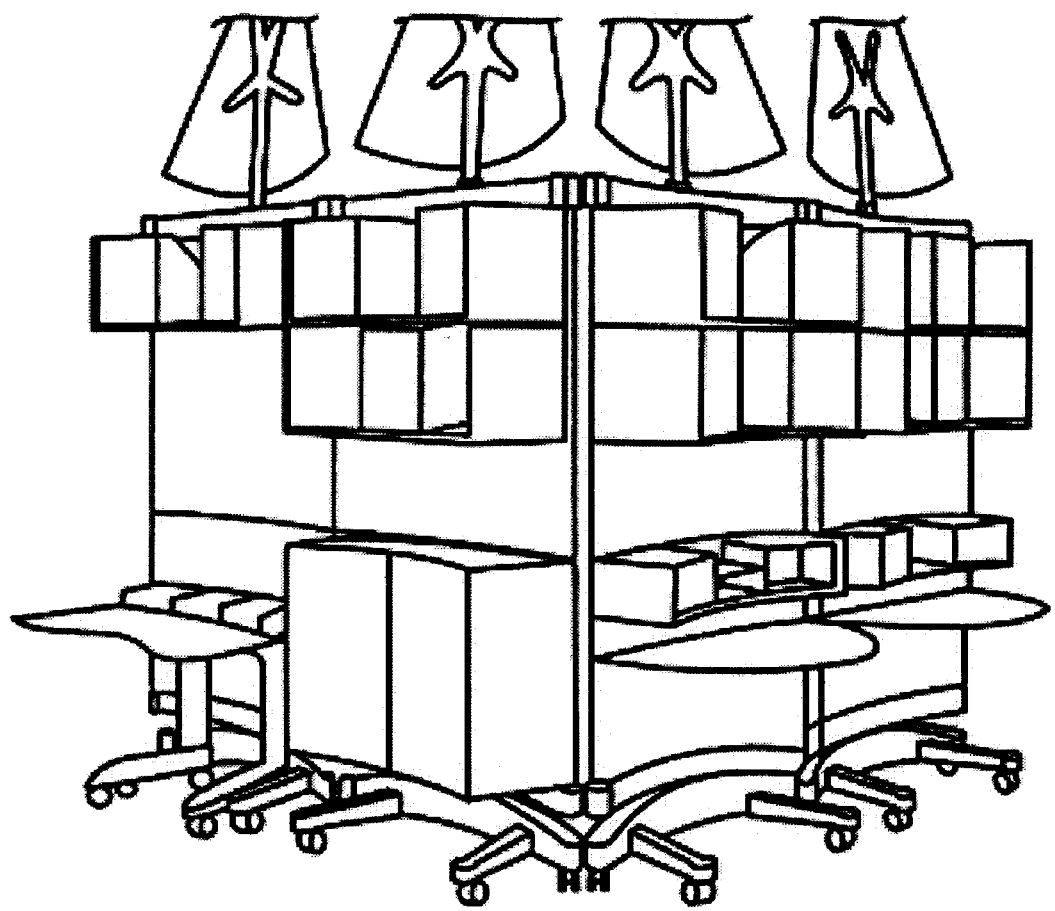
Fig.SS2-31

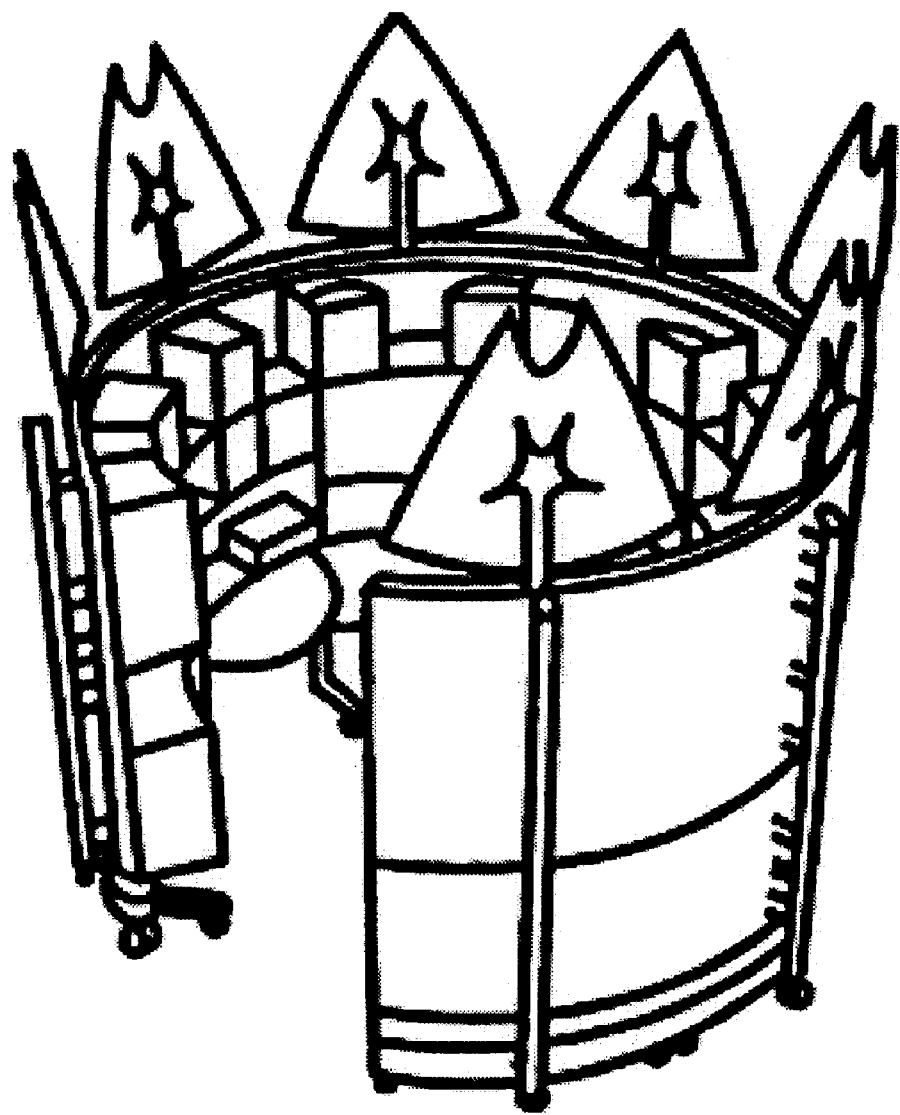
Fig.SS2-32

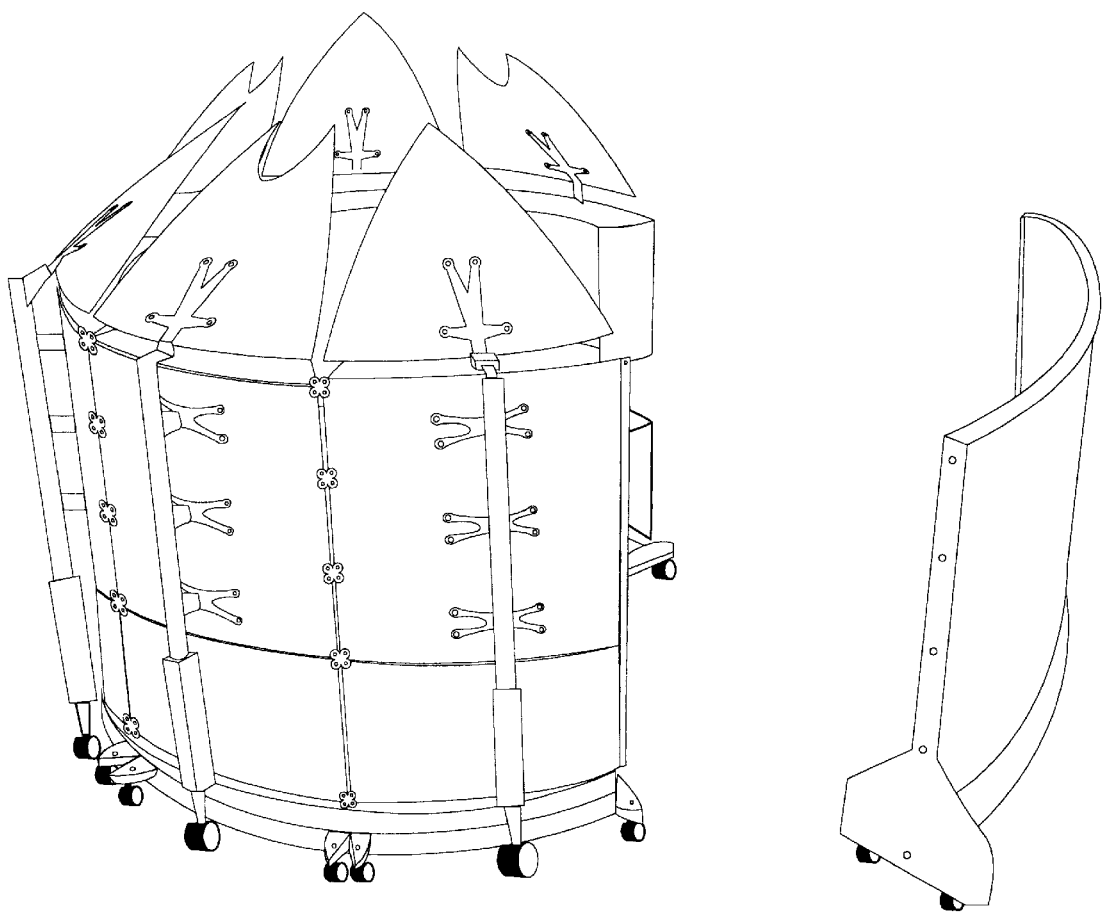
Fig.SS2-33

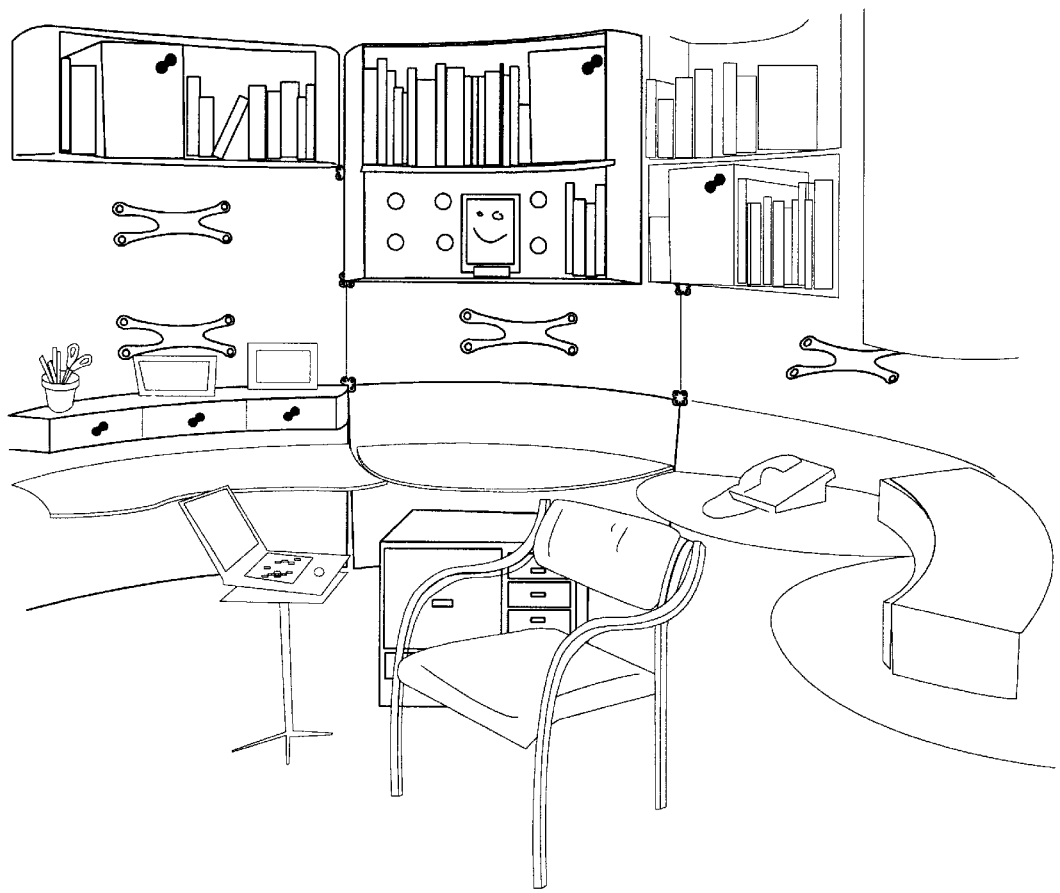
Fig.SS2-34

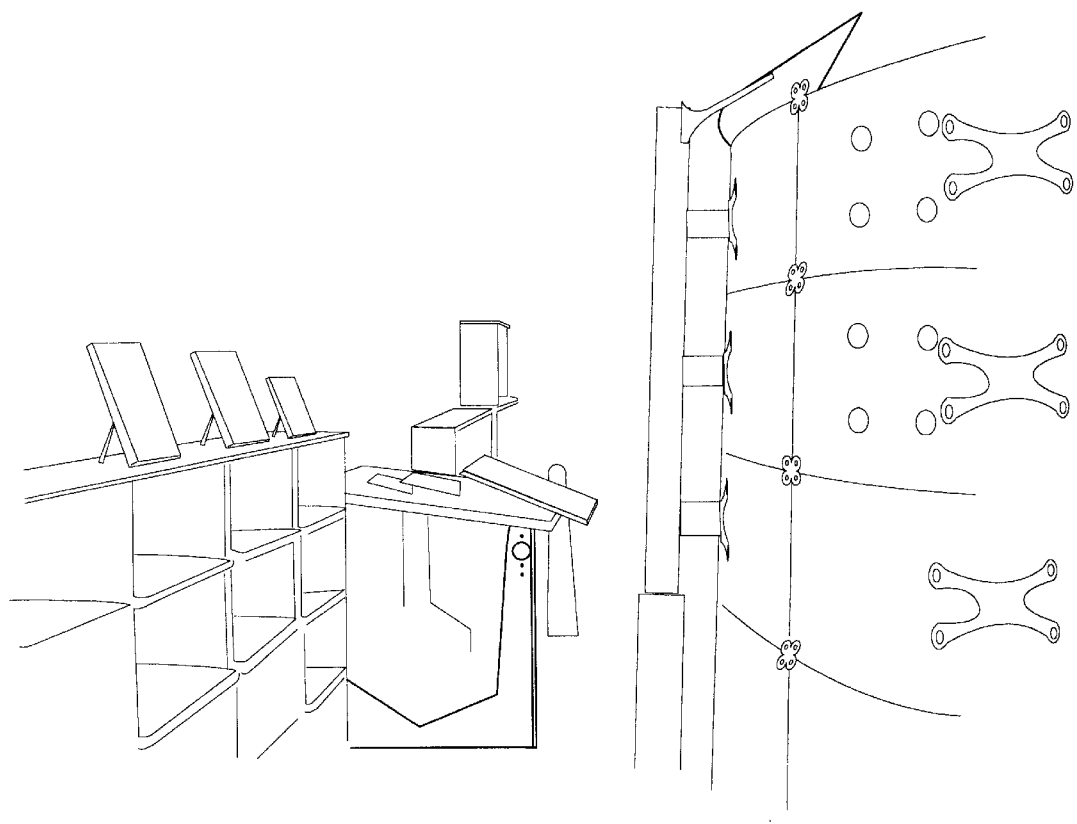
Fig.SS2-35

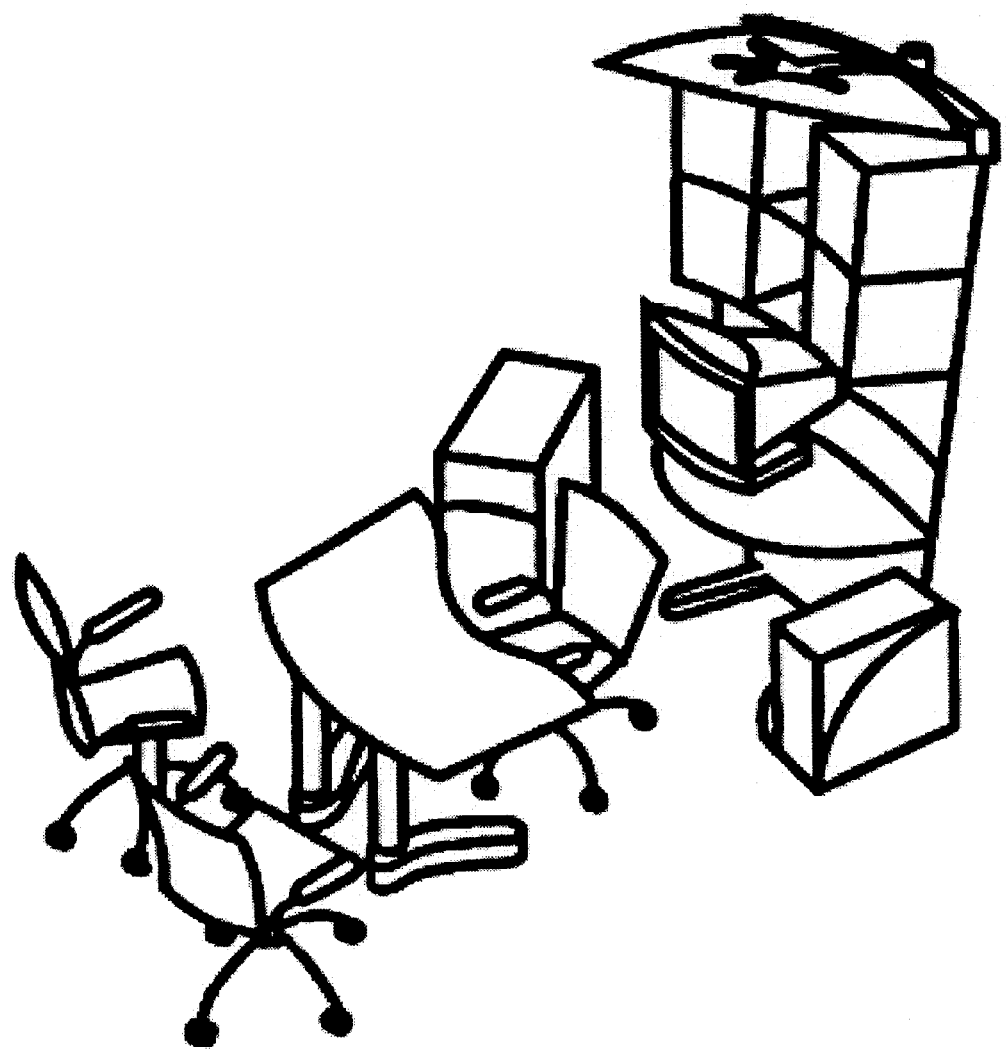
Fig.SS2-36

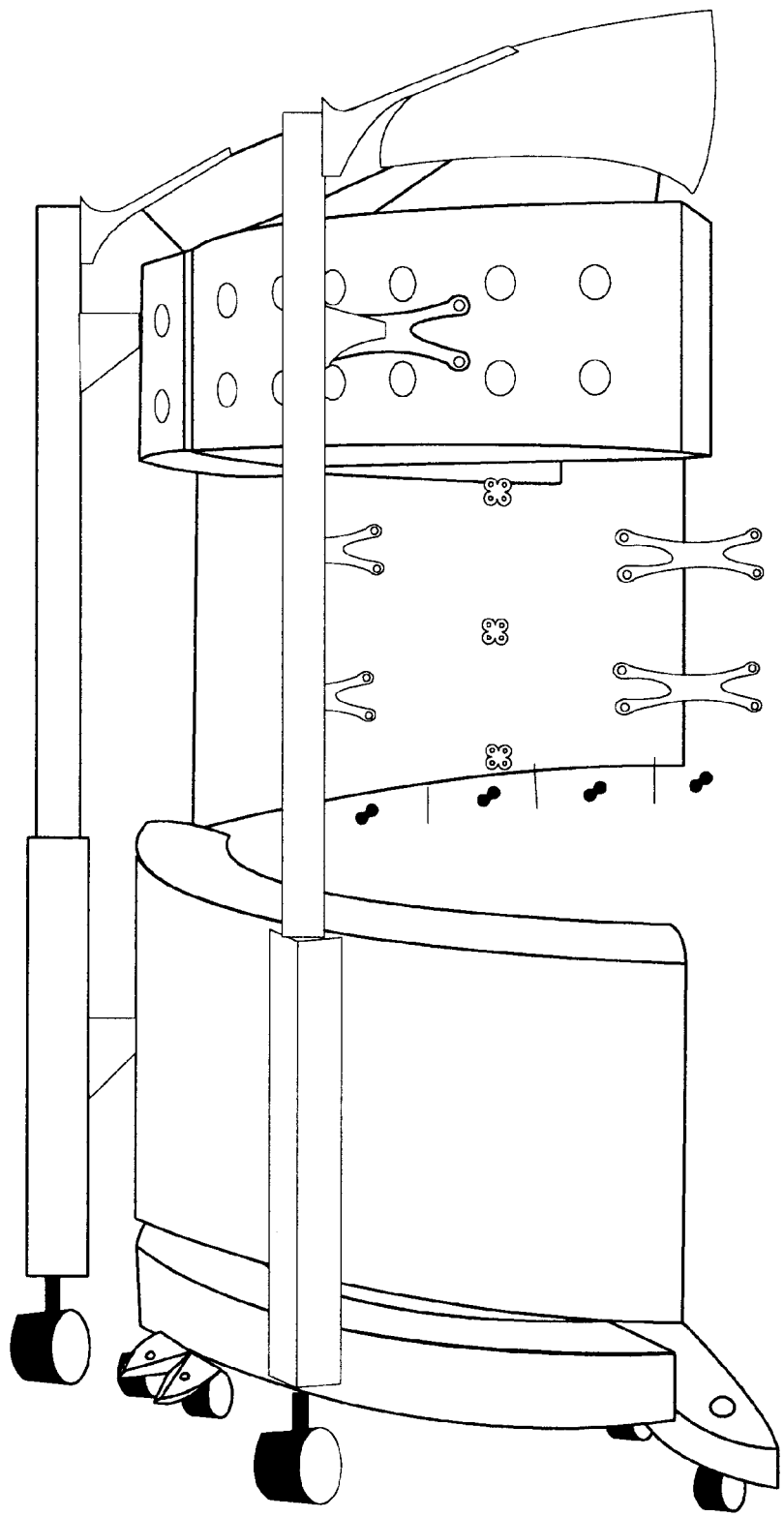
Fig.SS2-37

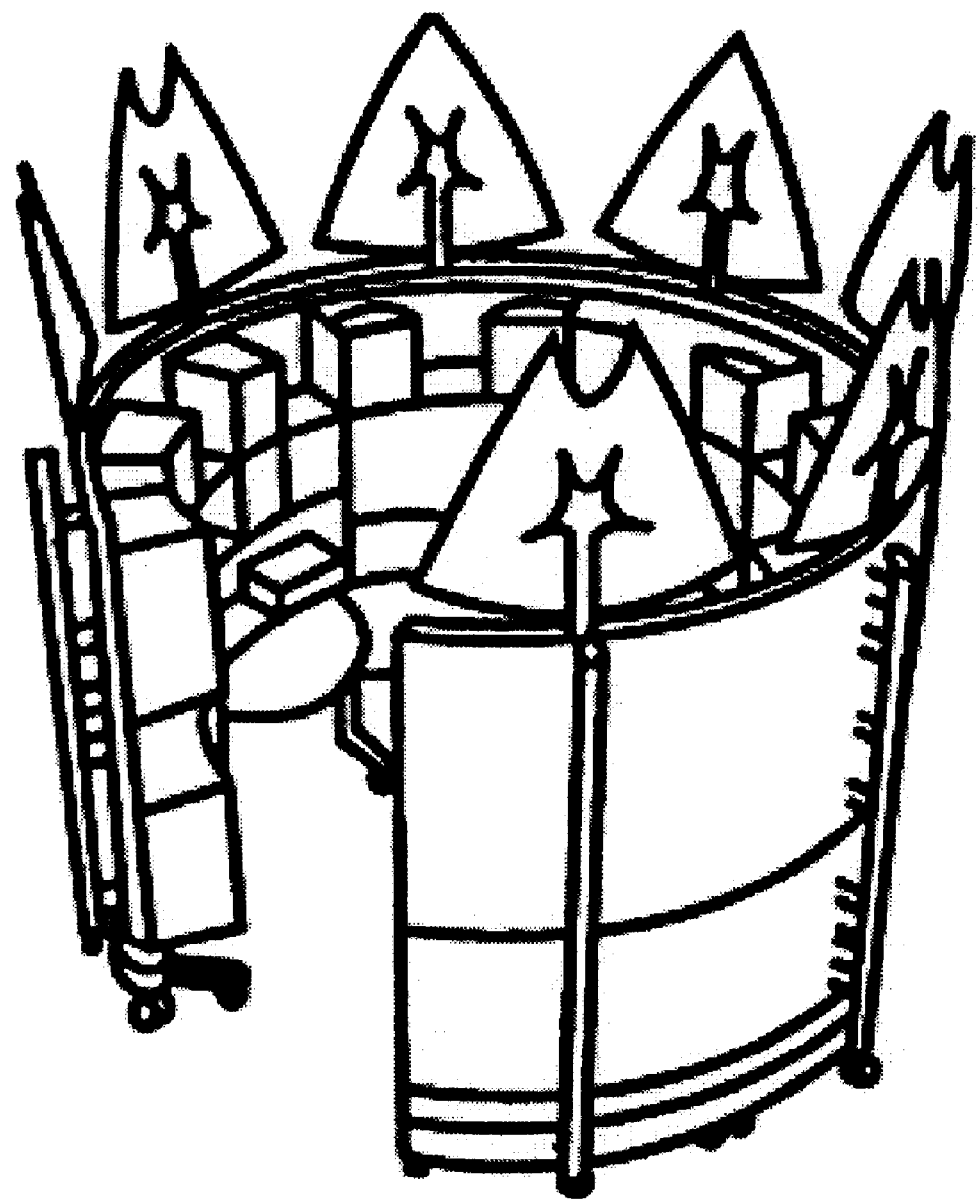
Fig.SS2-38

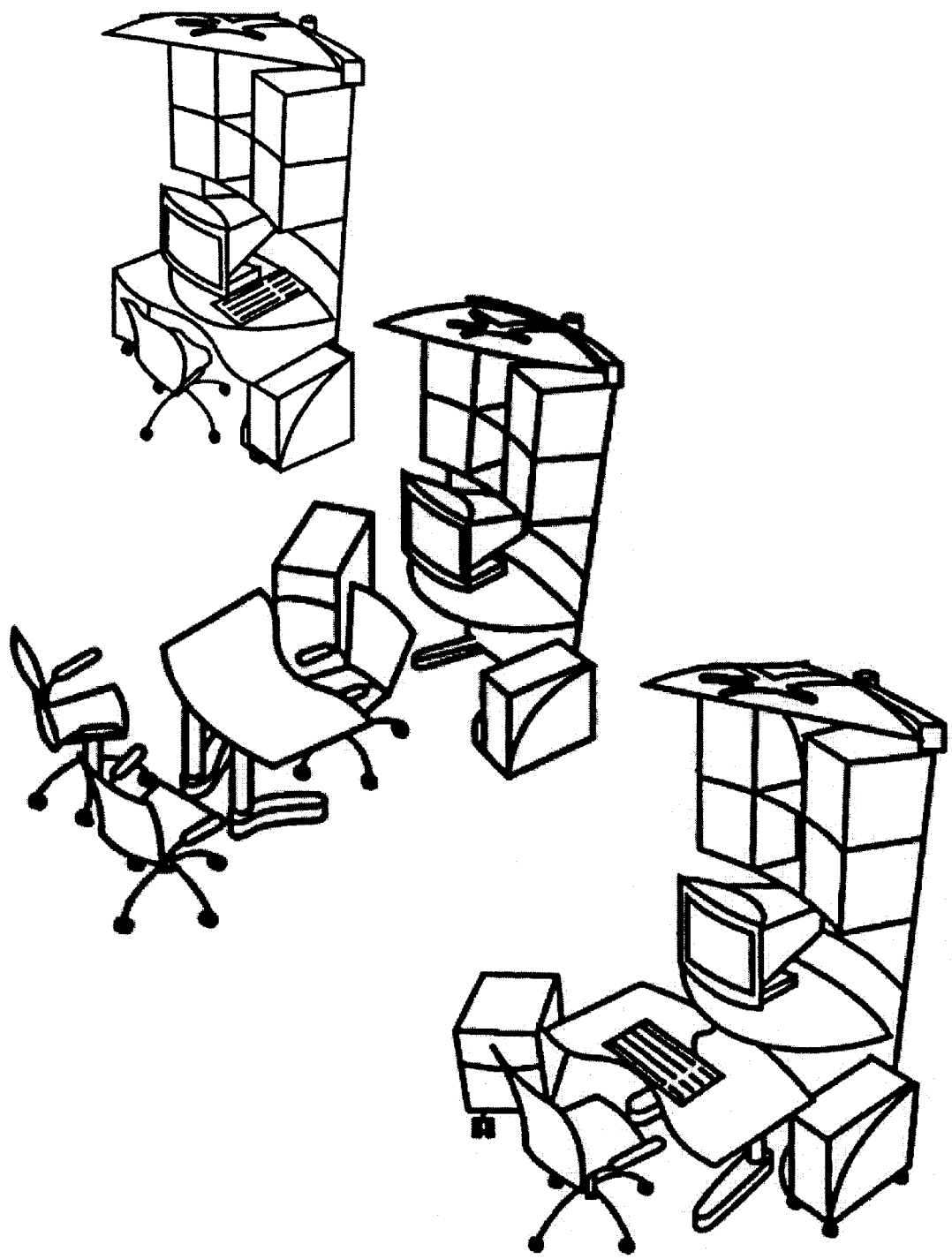
Fig.SS2-39

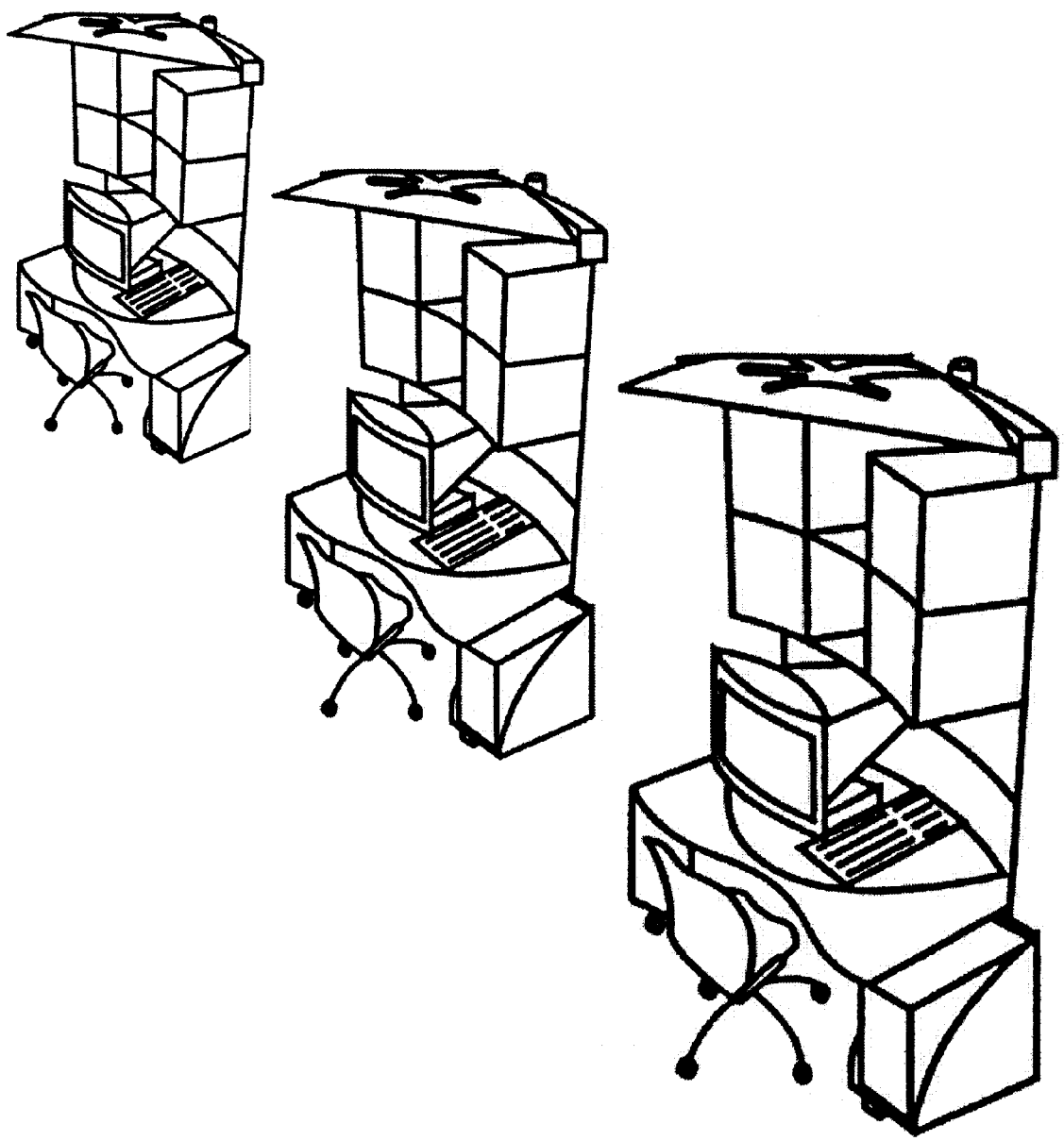
Fig.SS2-40

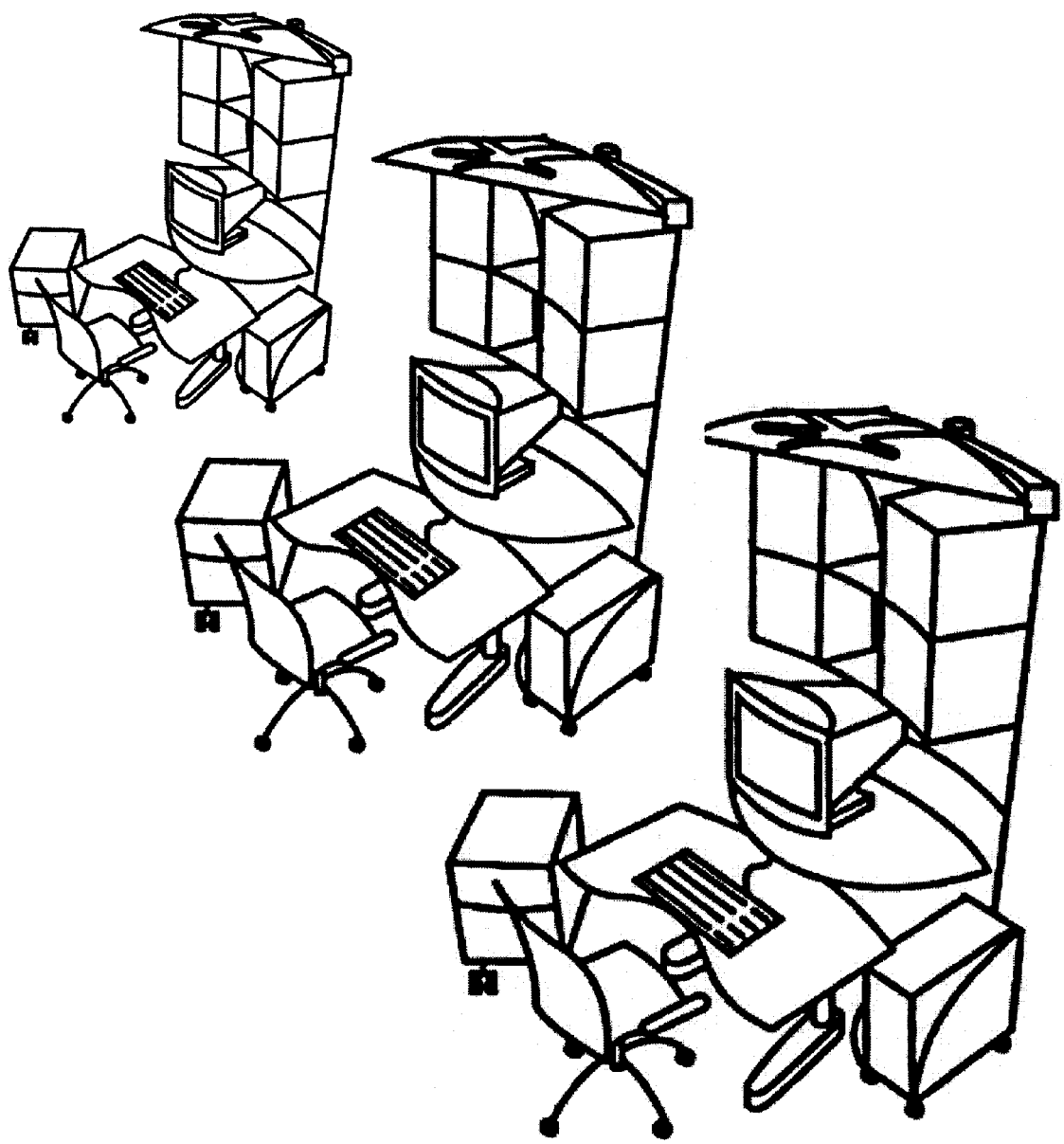
Fig.SS2-41

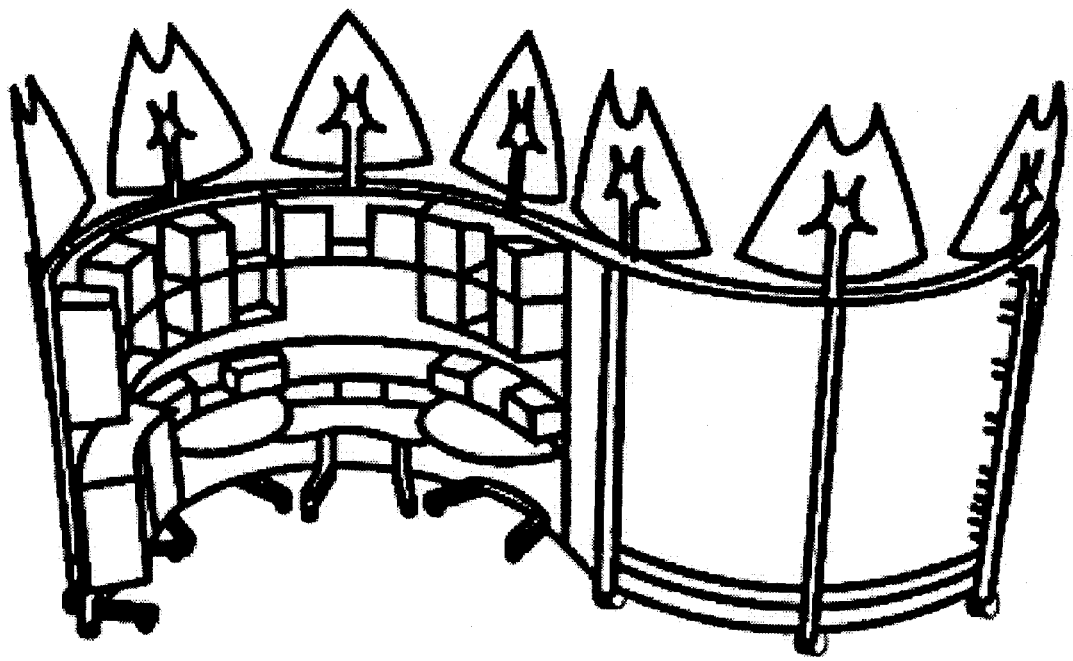
Fig.SS2-42

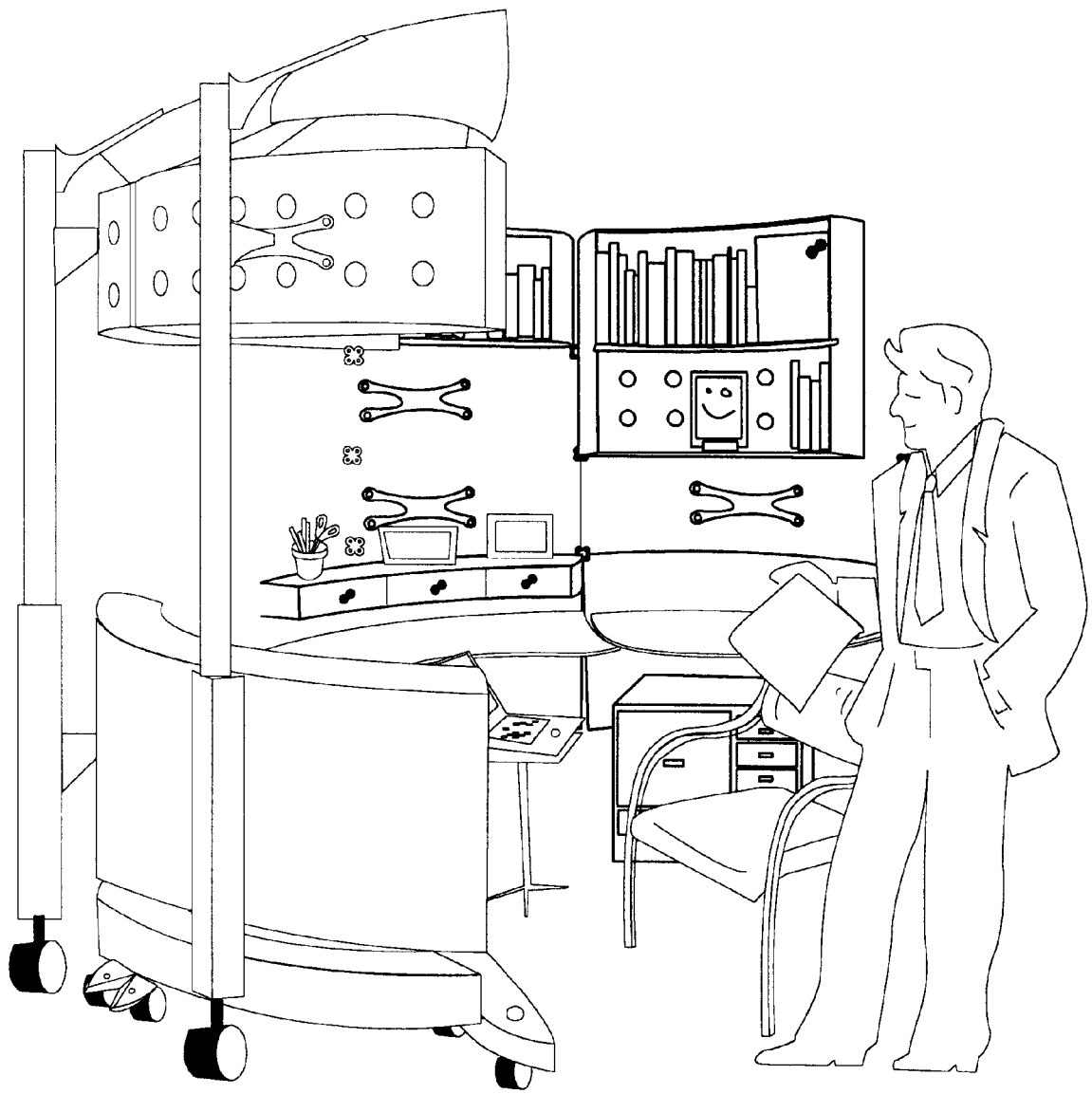
Fig.SS2-43

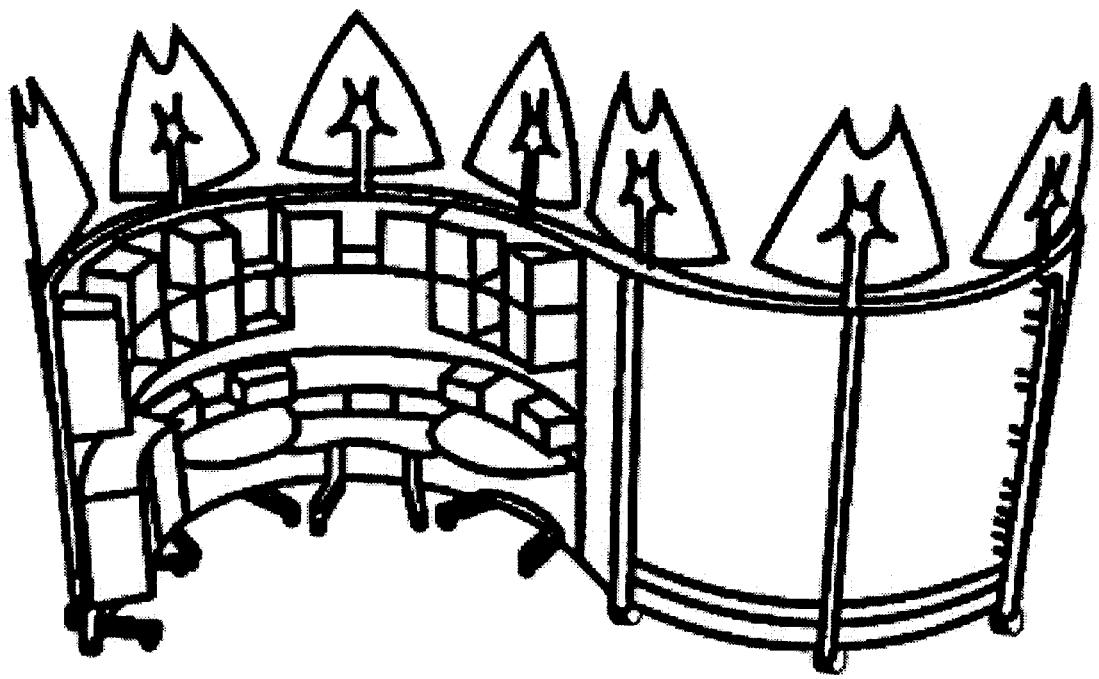
Fig.SS2-44

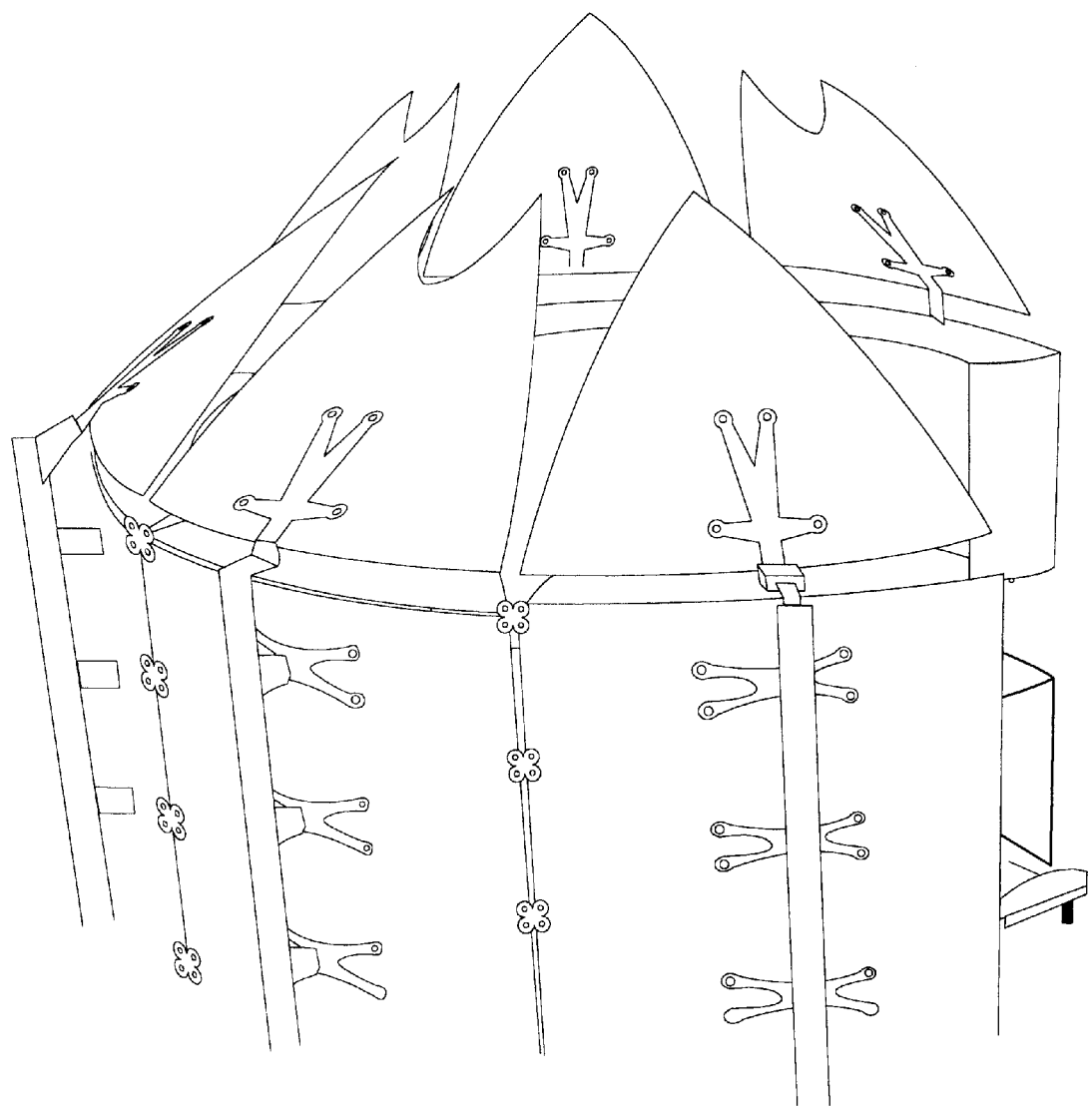
Fig.SS2-45

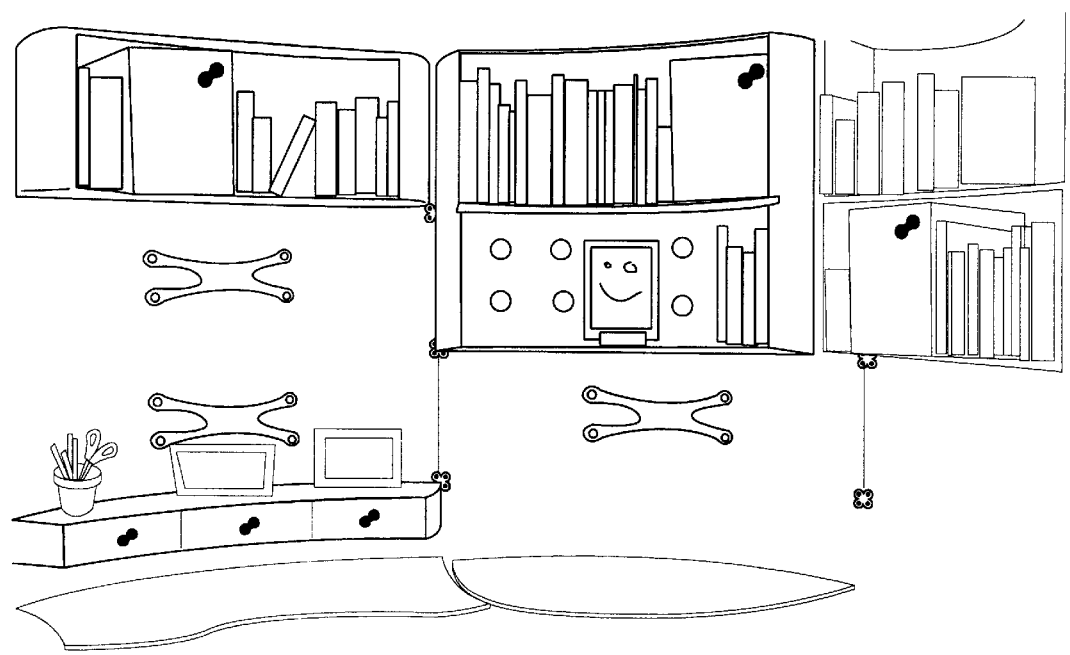
Fig.SS2-46

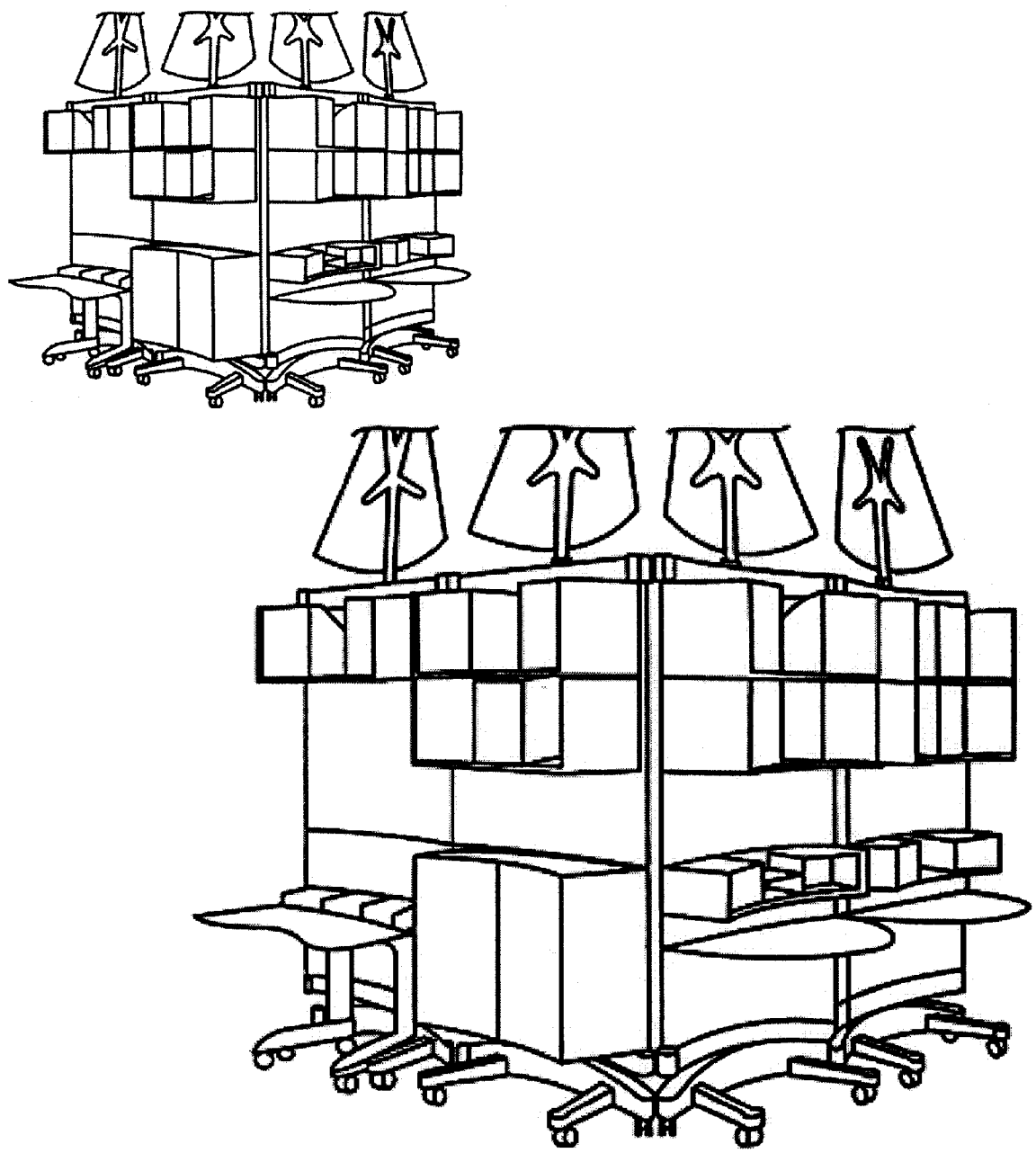
Fig.SS2-47

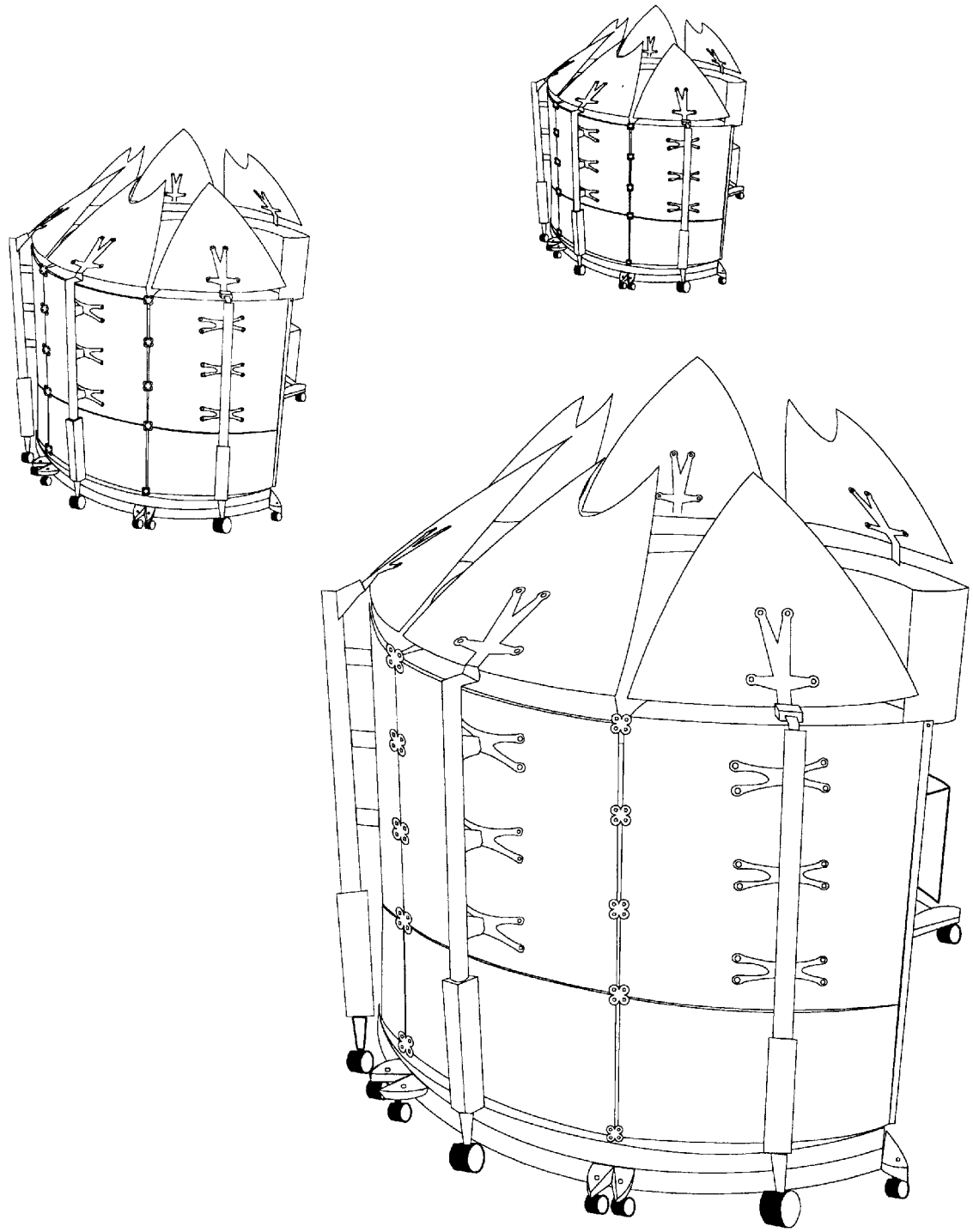
Fig.SS2-48

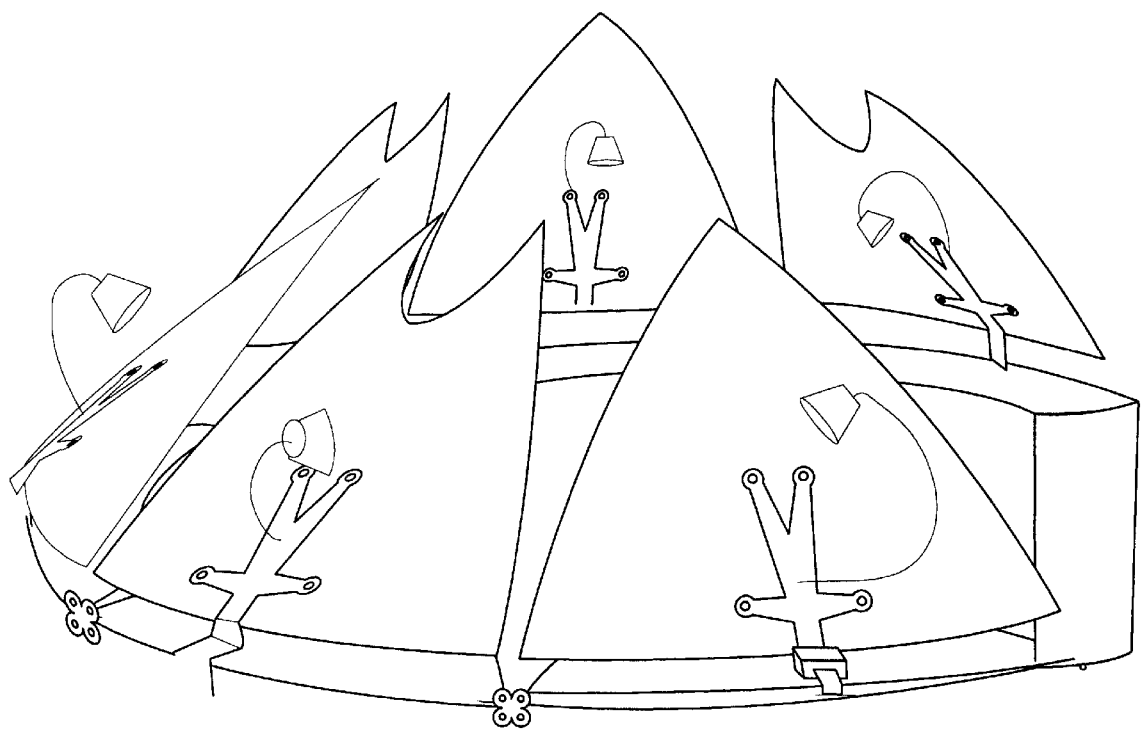
Fig.SS2-49

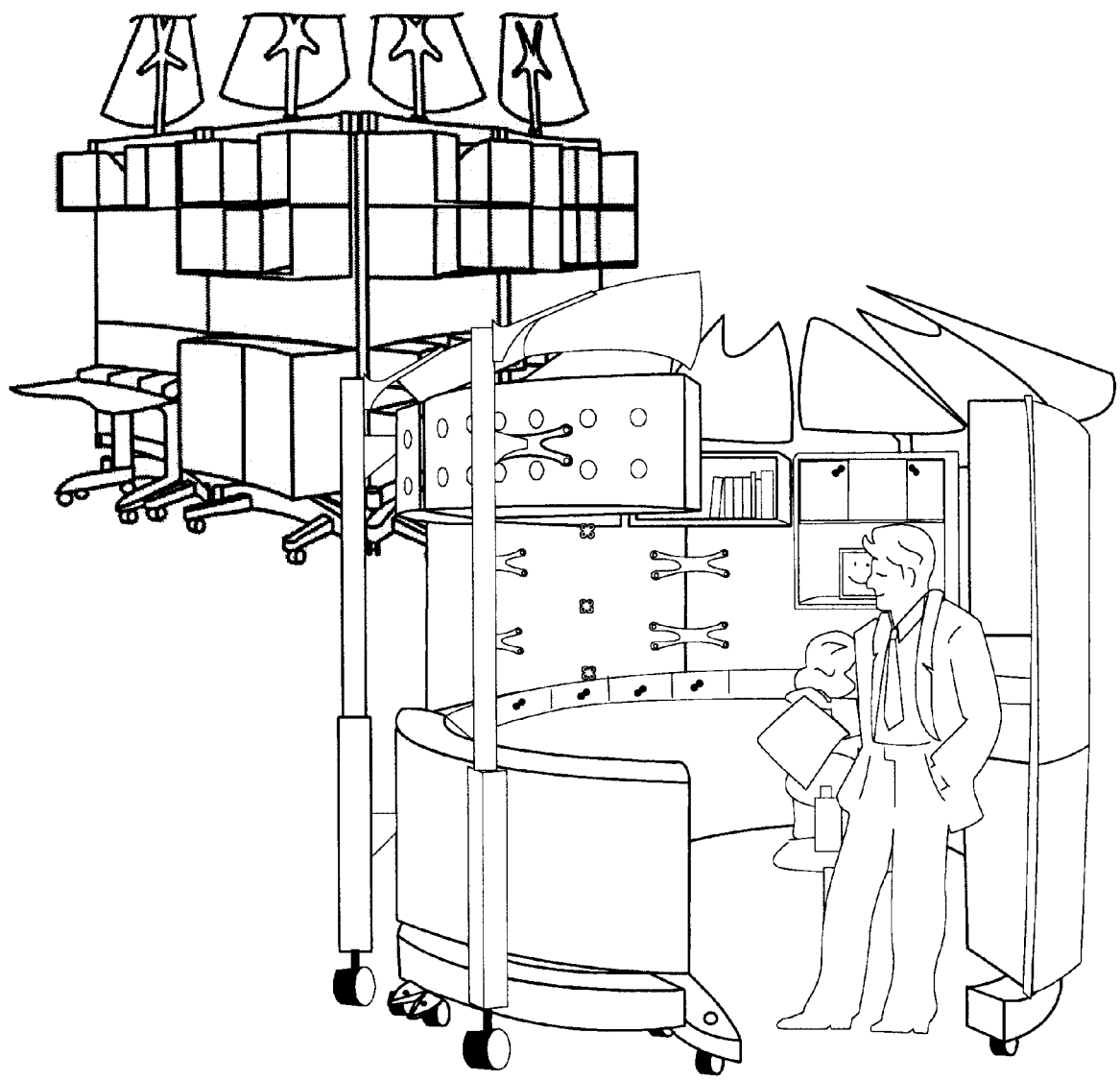
Fig.SS2-50

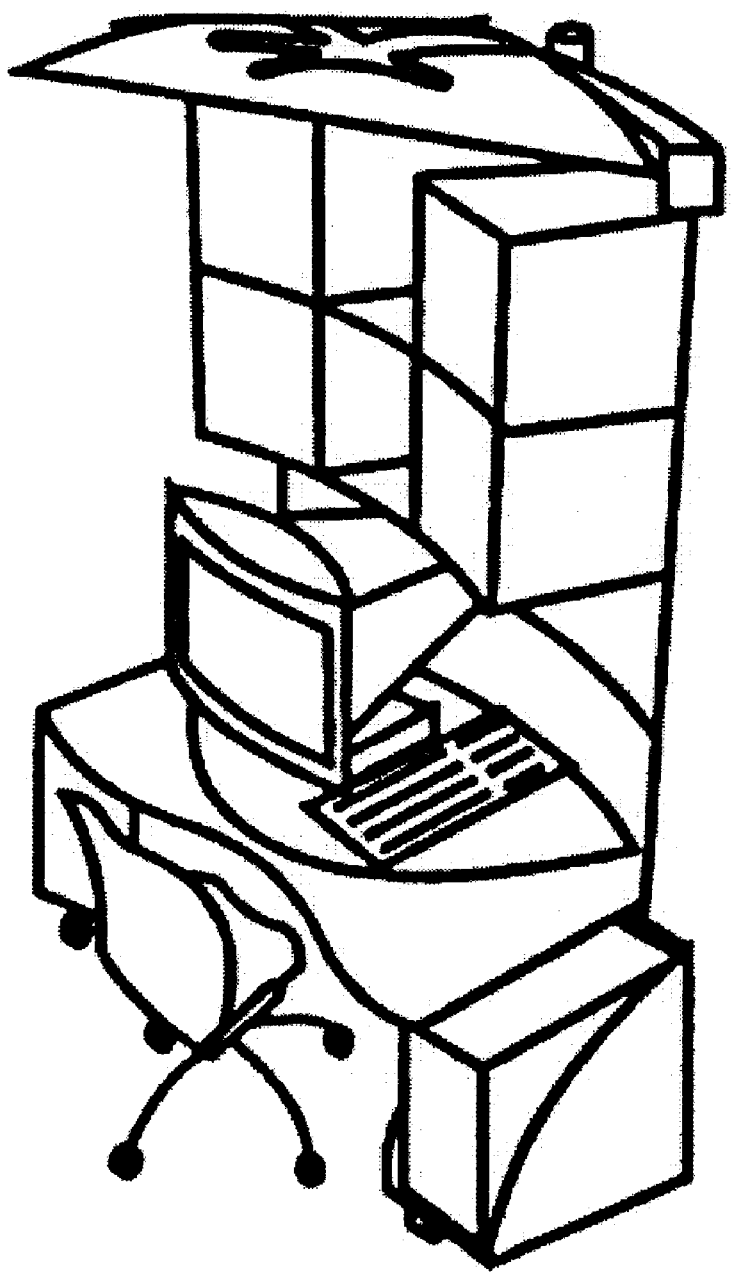
Fig.SS2-51

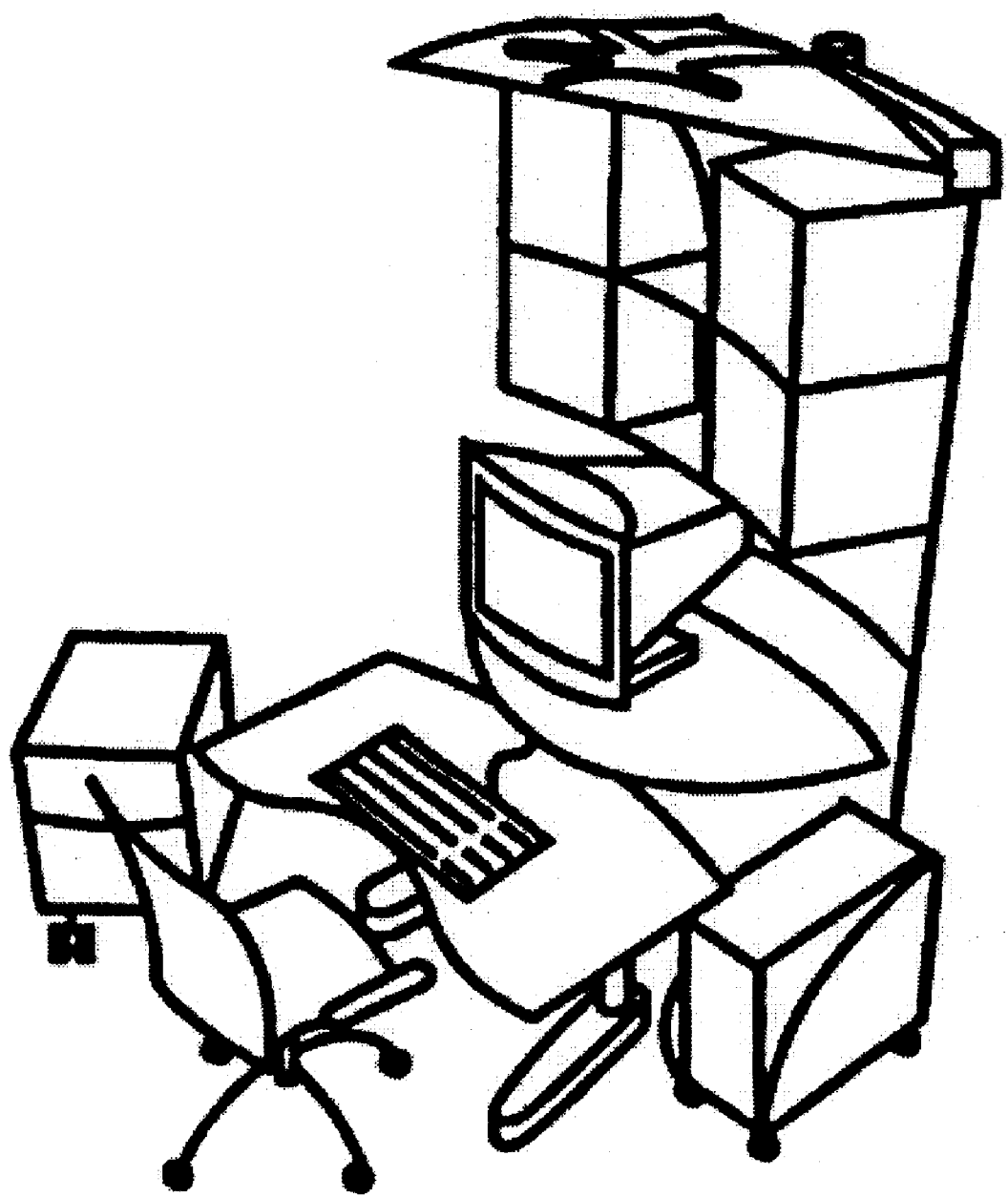
Fig.SS2-52

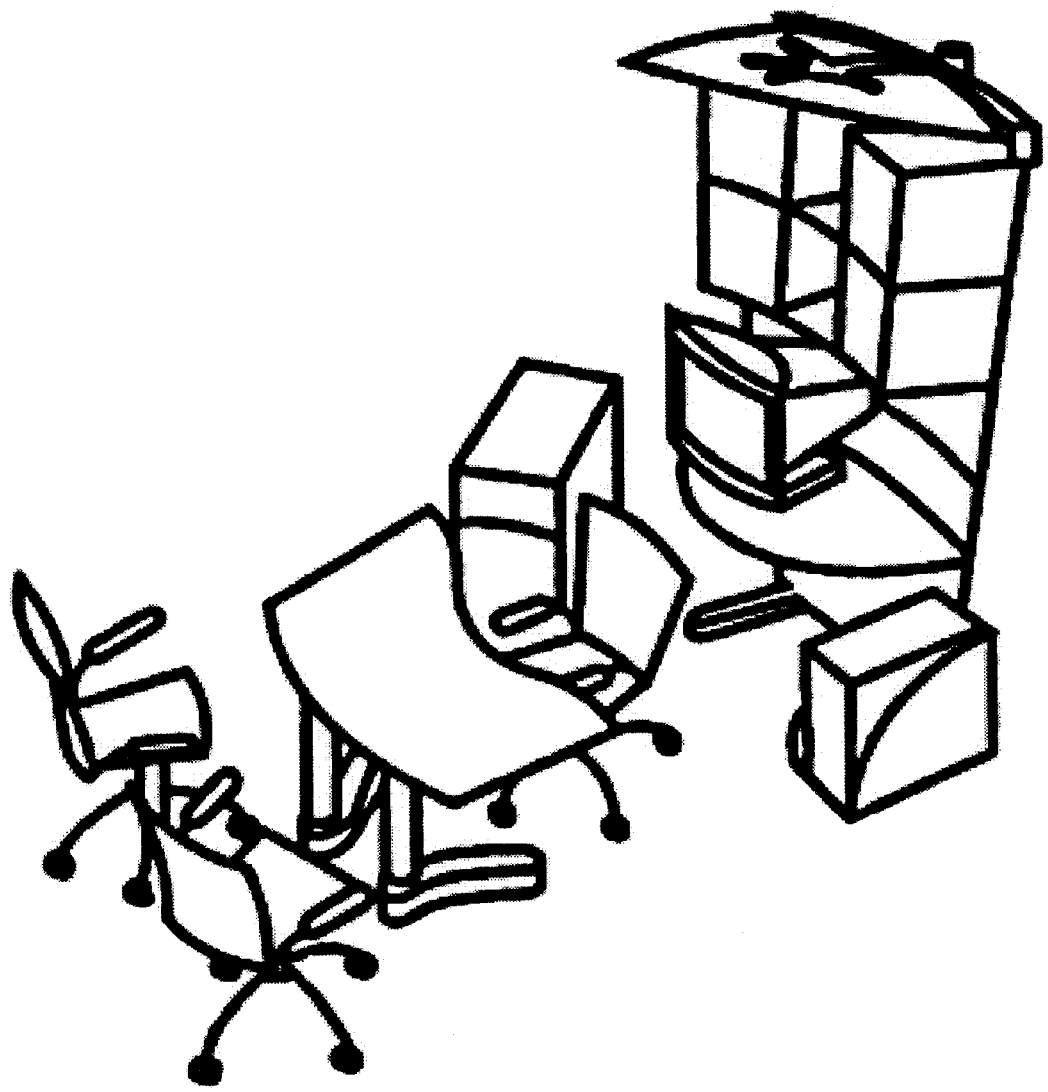
Fig.SS2-53

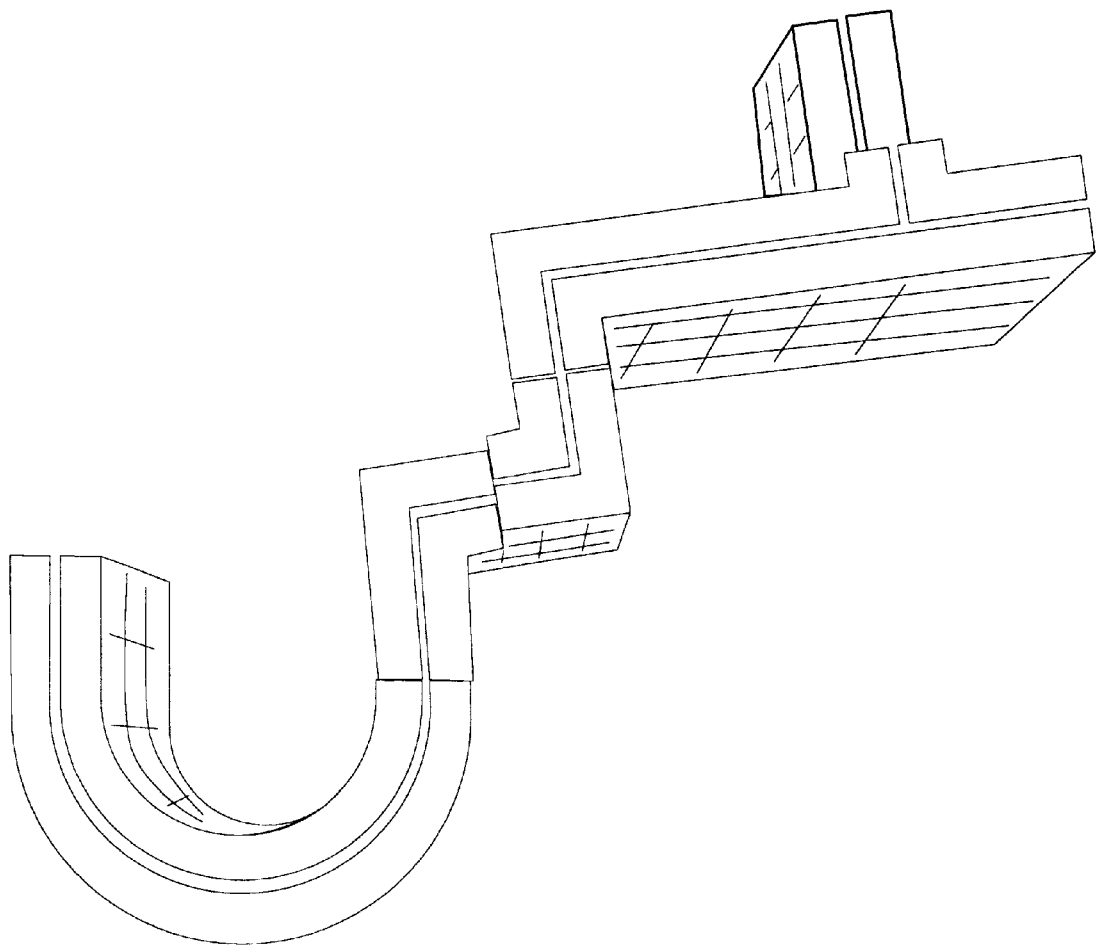
Fig.SS2-54

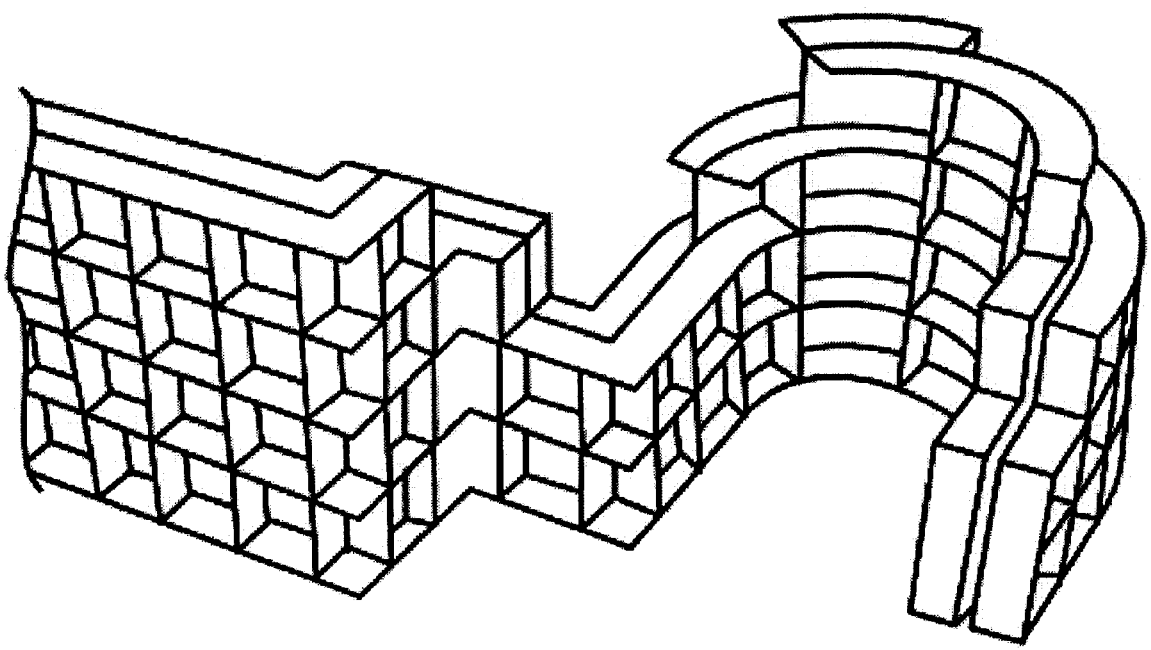
Fig.SS2-55

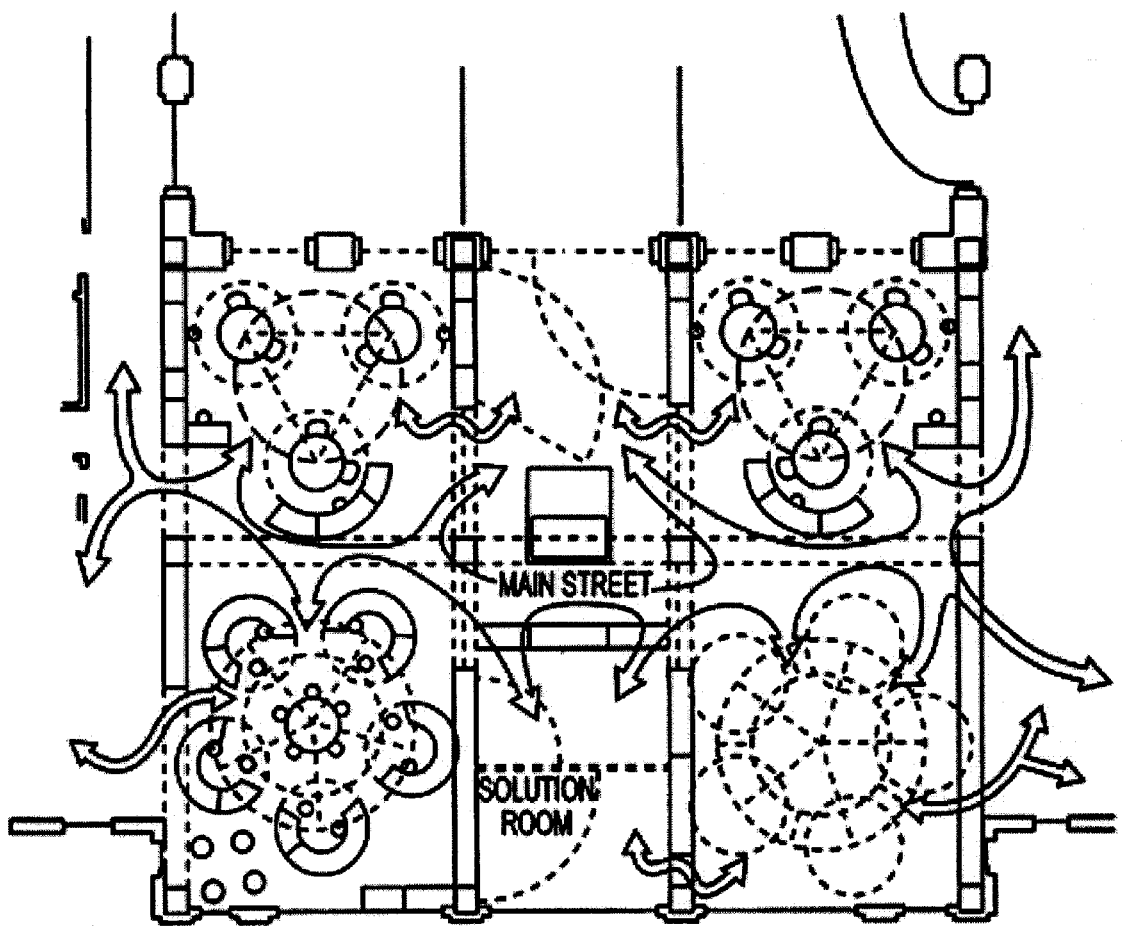
Fig.SS2-56

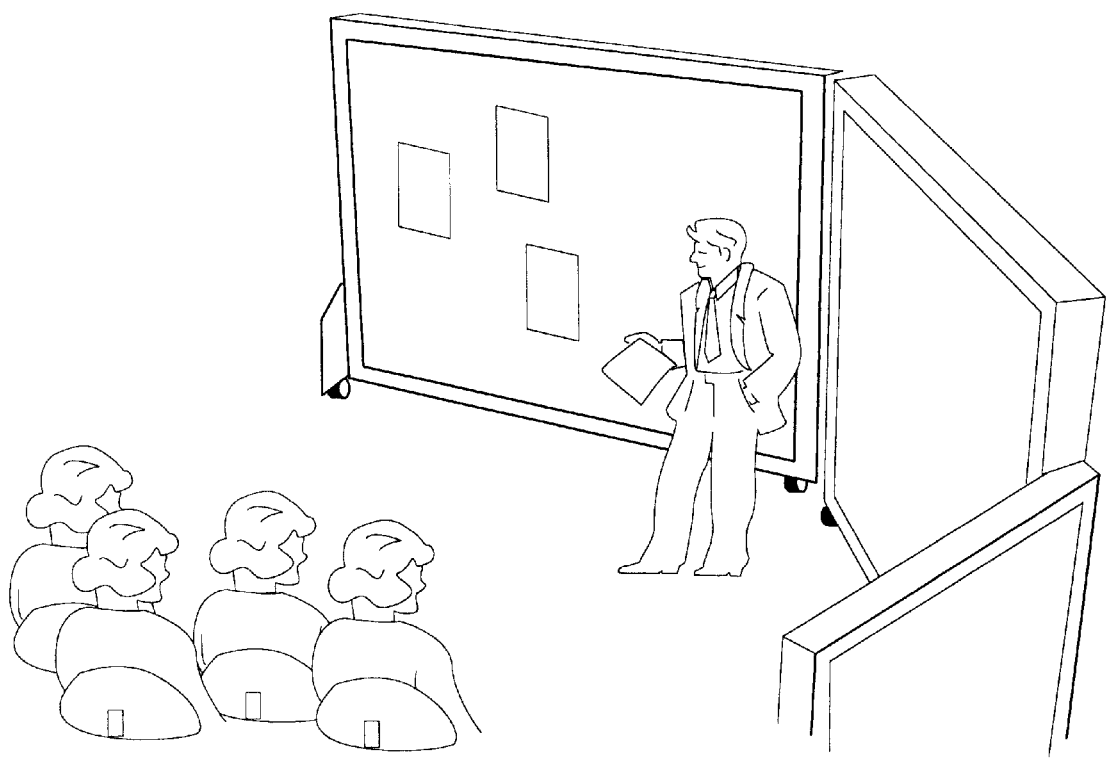
Fig.SS2-57

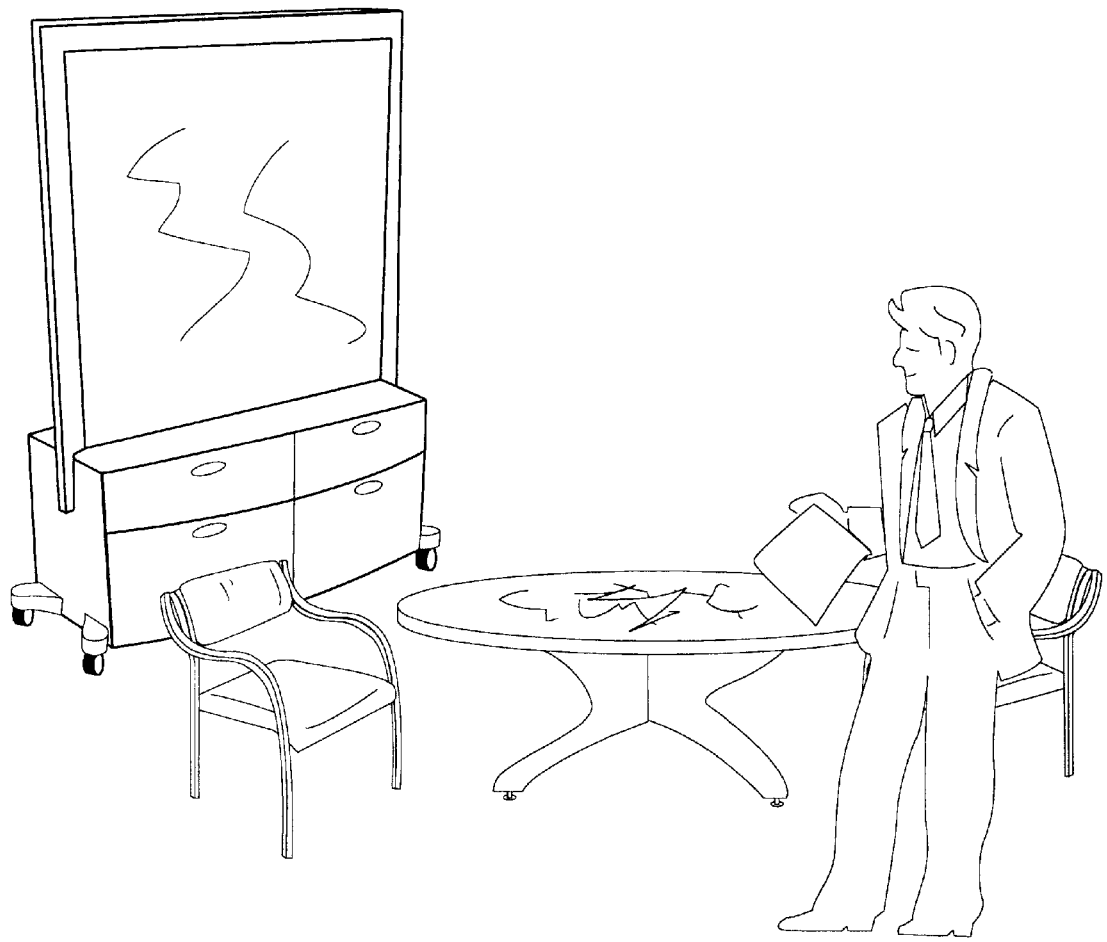
Fig.SS2-58

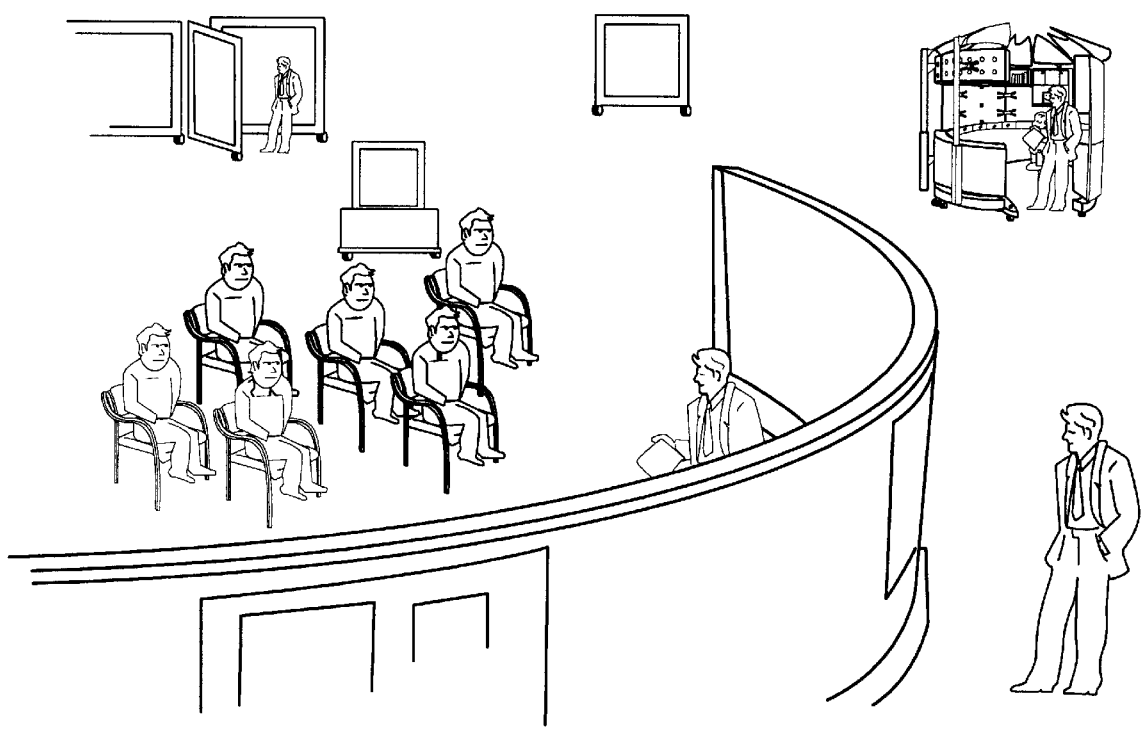
Fig.SS2-59

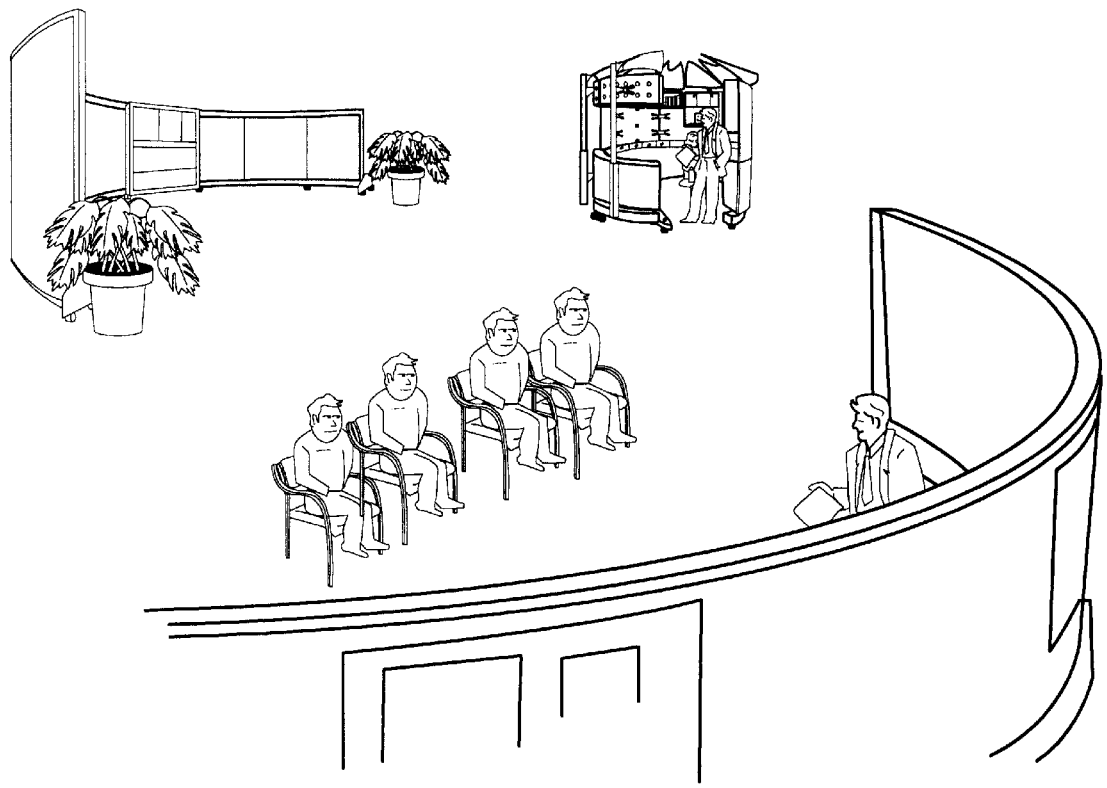
Fig.SS2-60

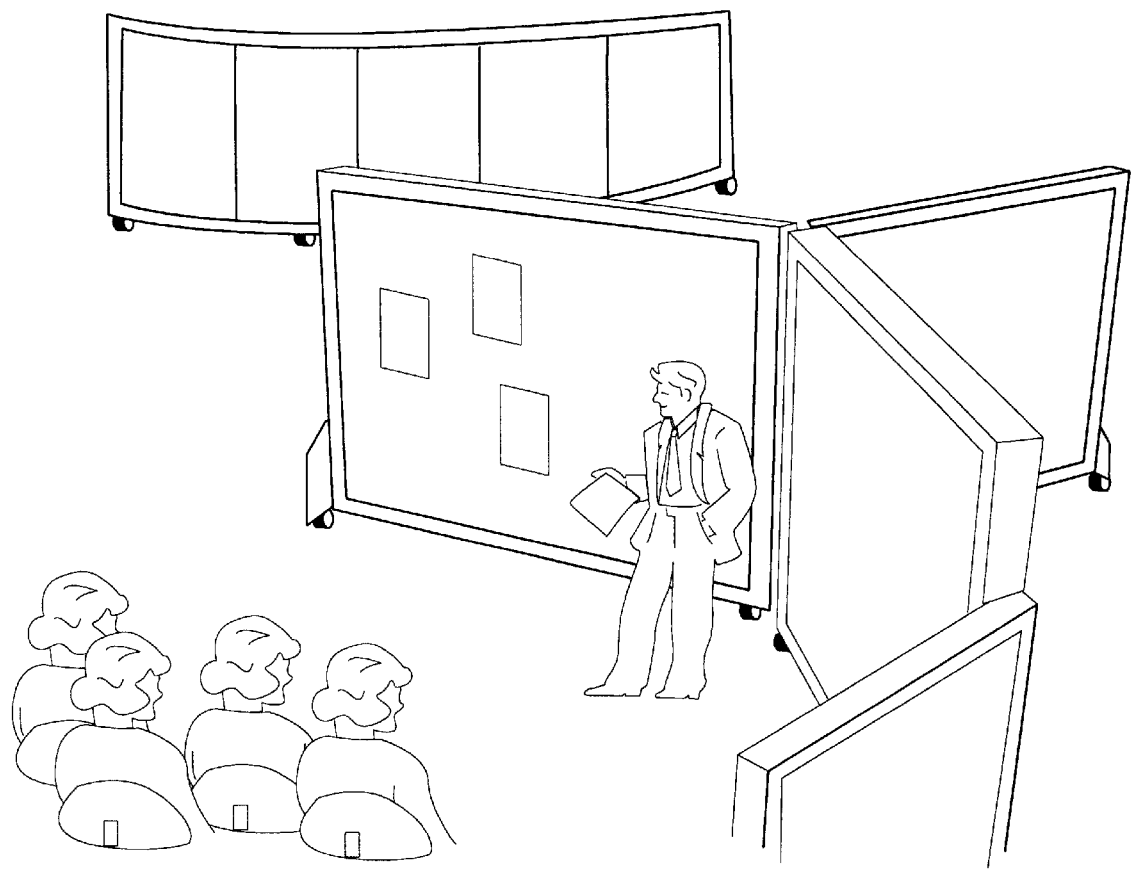
Fig.SS2-61

Fig.SS2-62

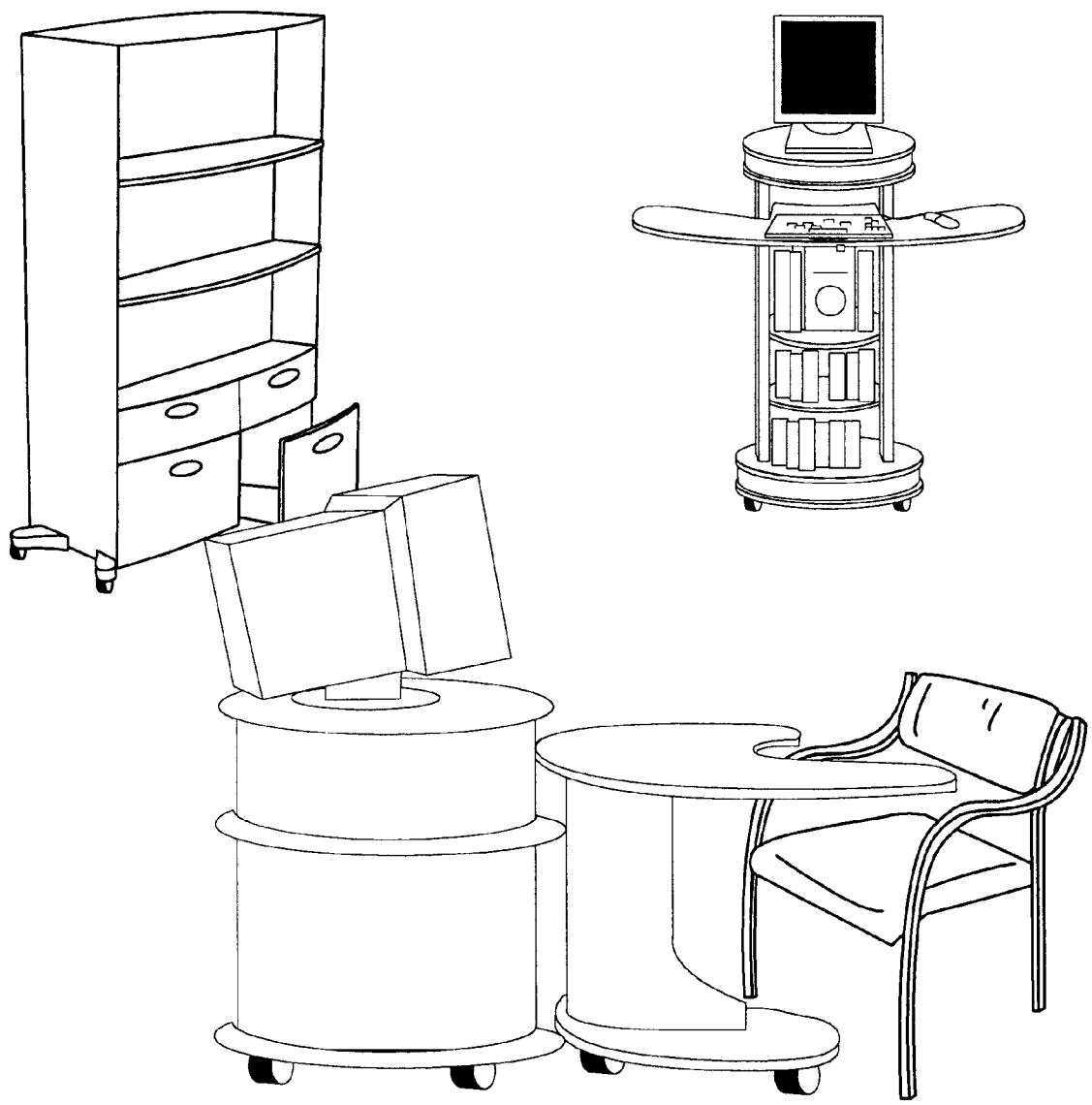
Fig.SS2-63

Fig.SS2-64

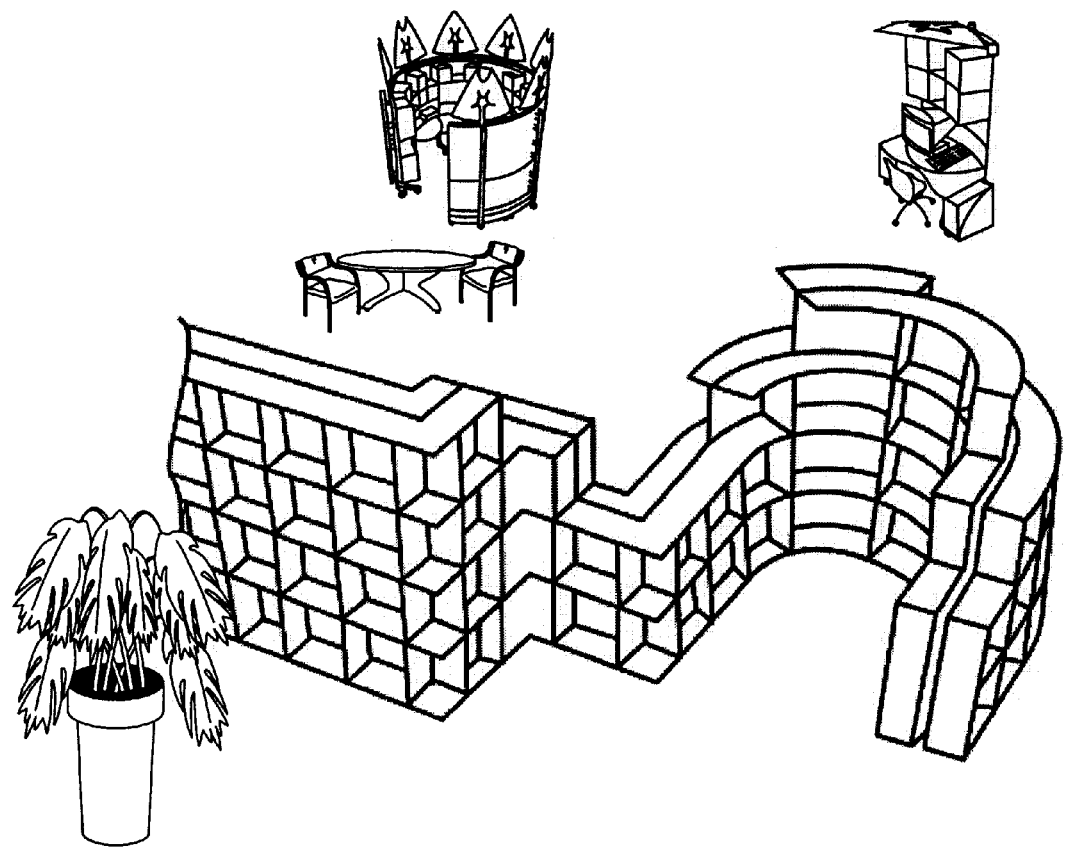
Fig.SS2-65

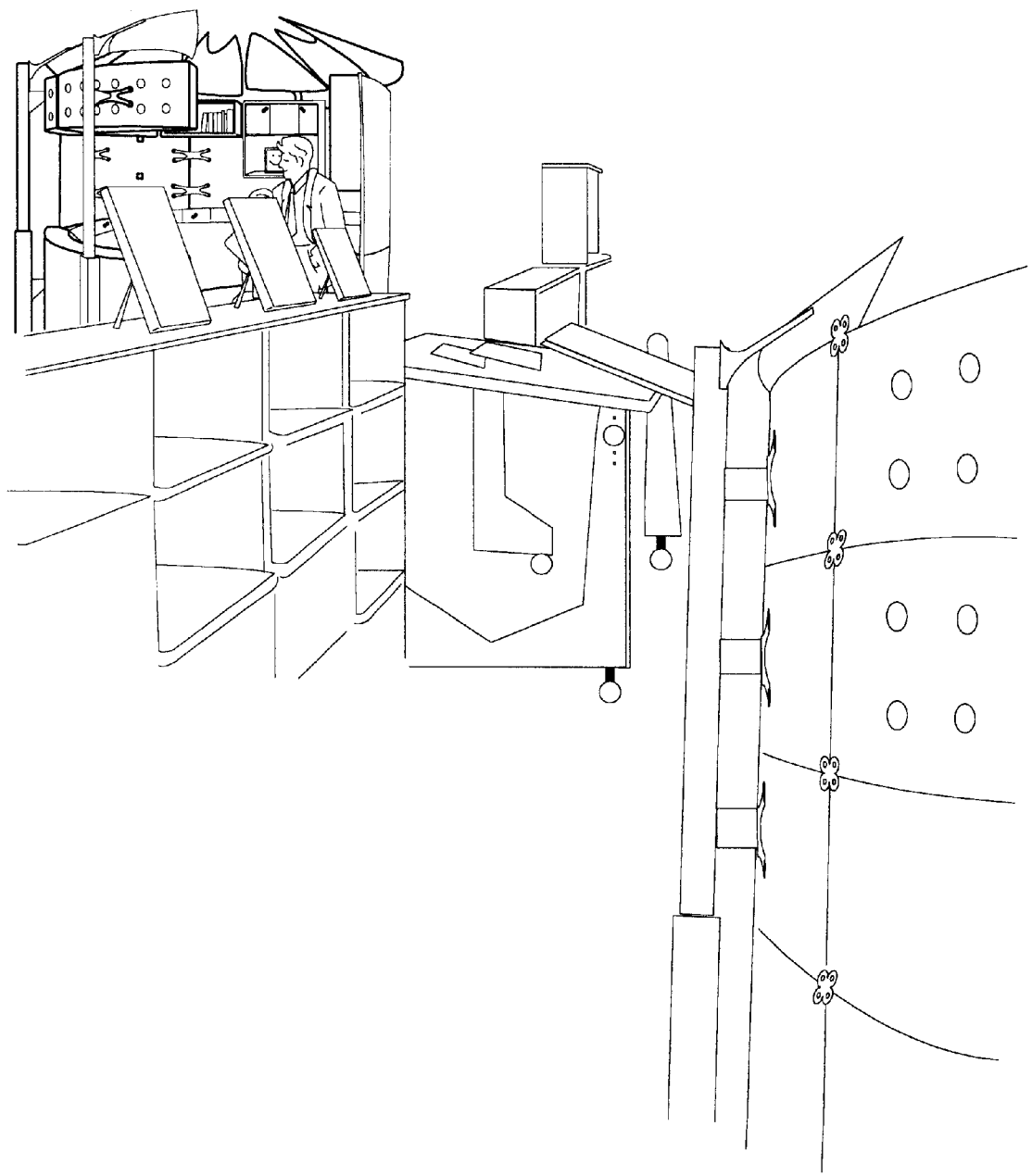
Fig.SS2-66

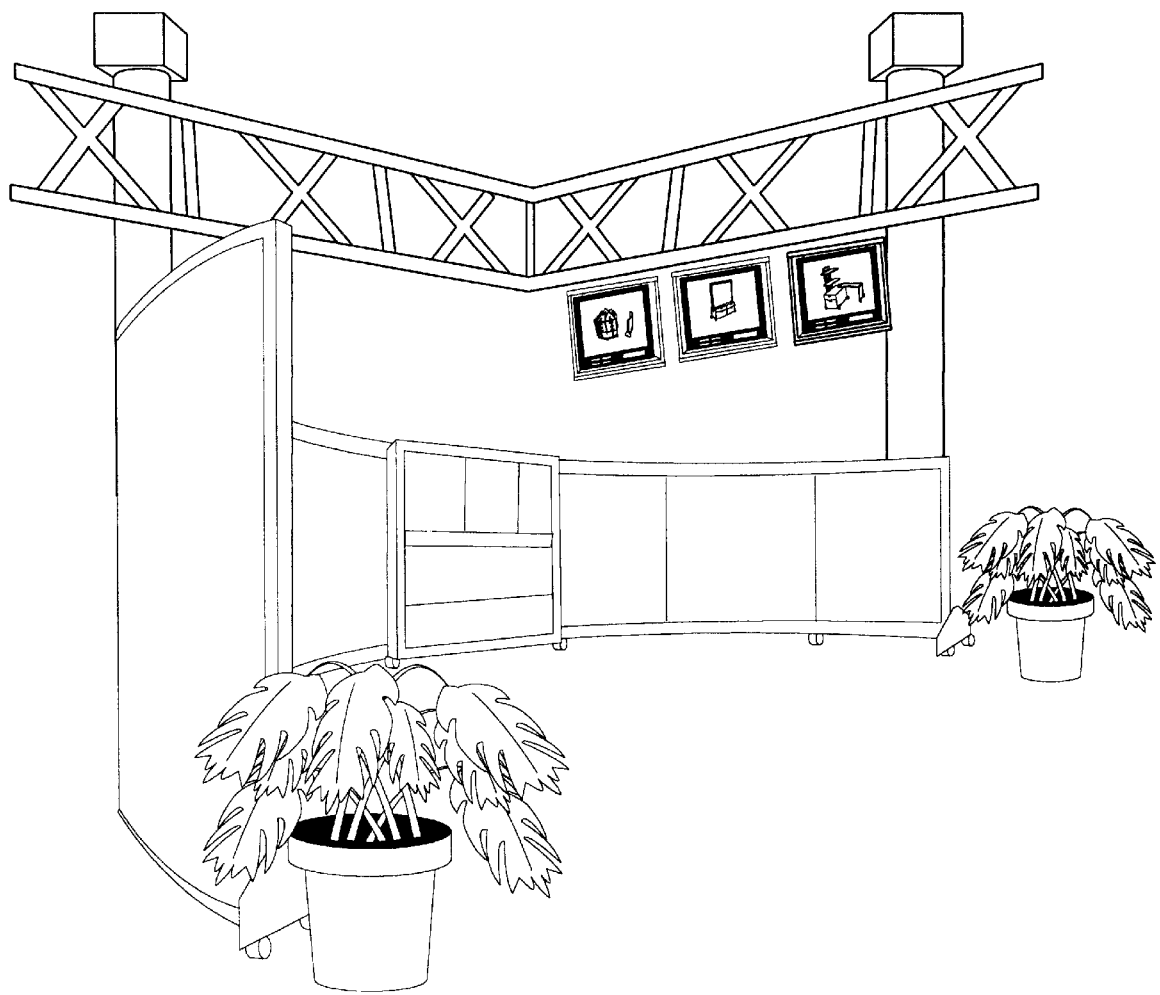
Fig.SS2-67

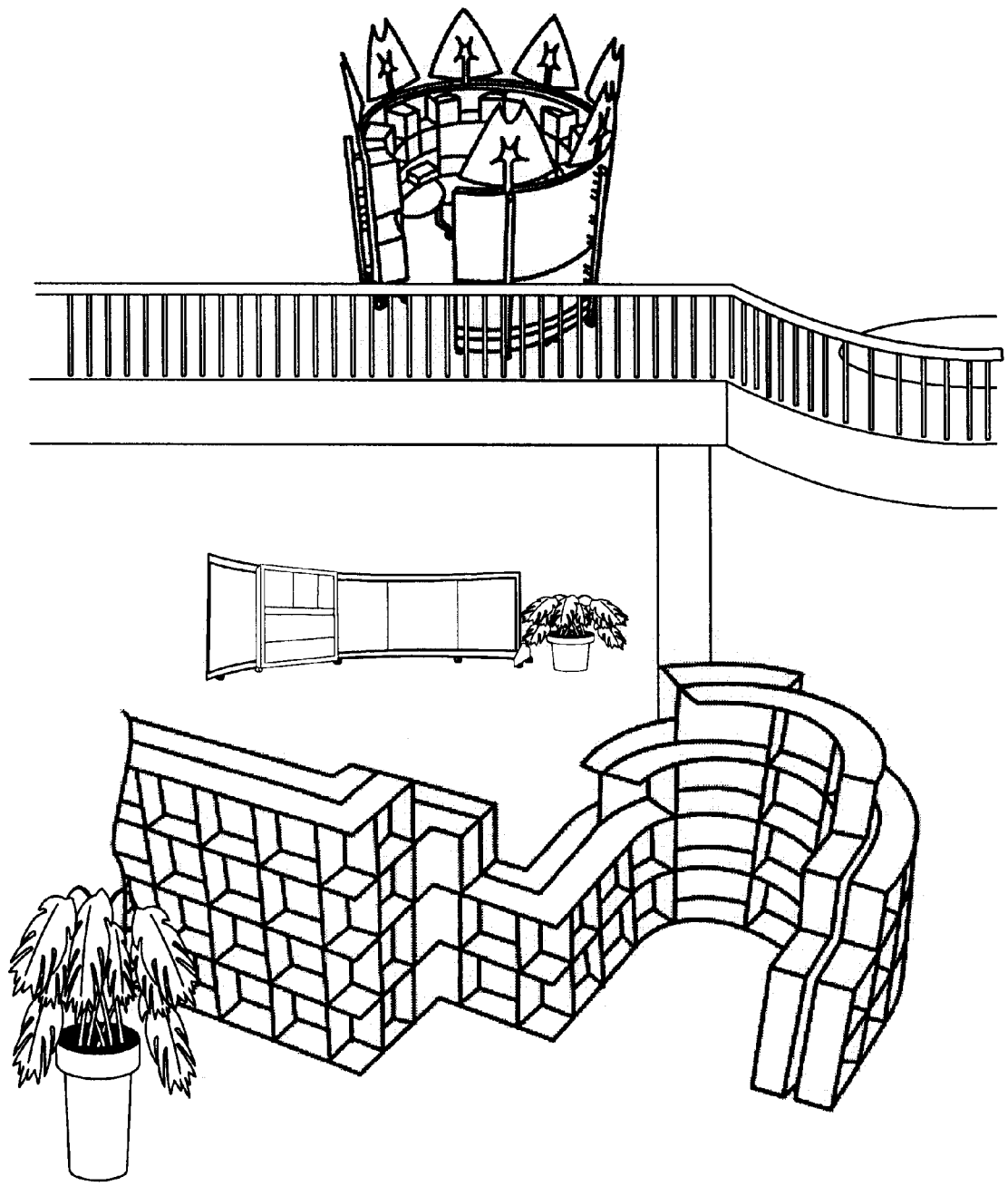
Fig.SS2-68

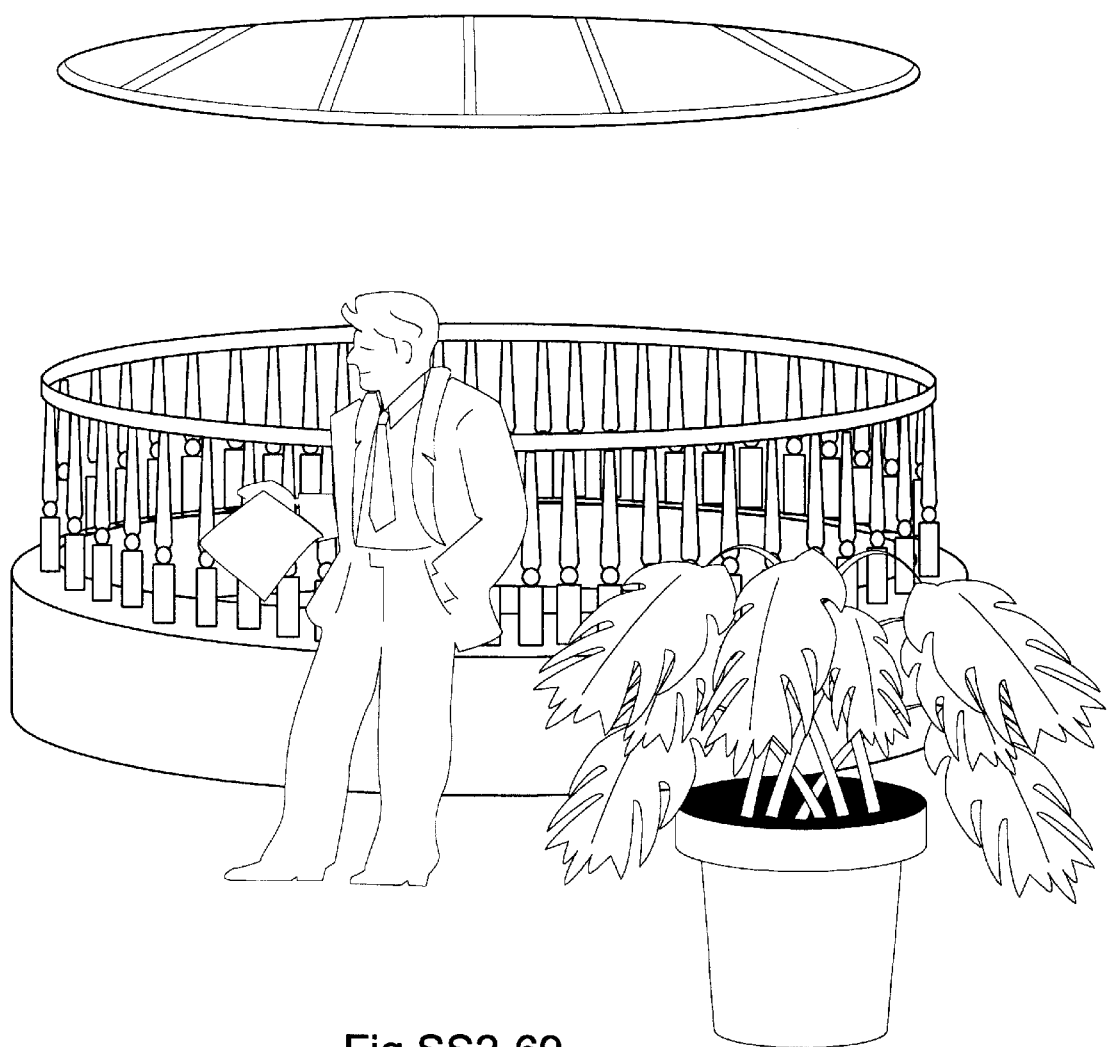
Fig.SS2-69

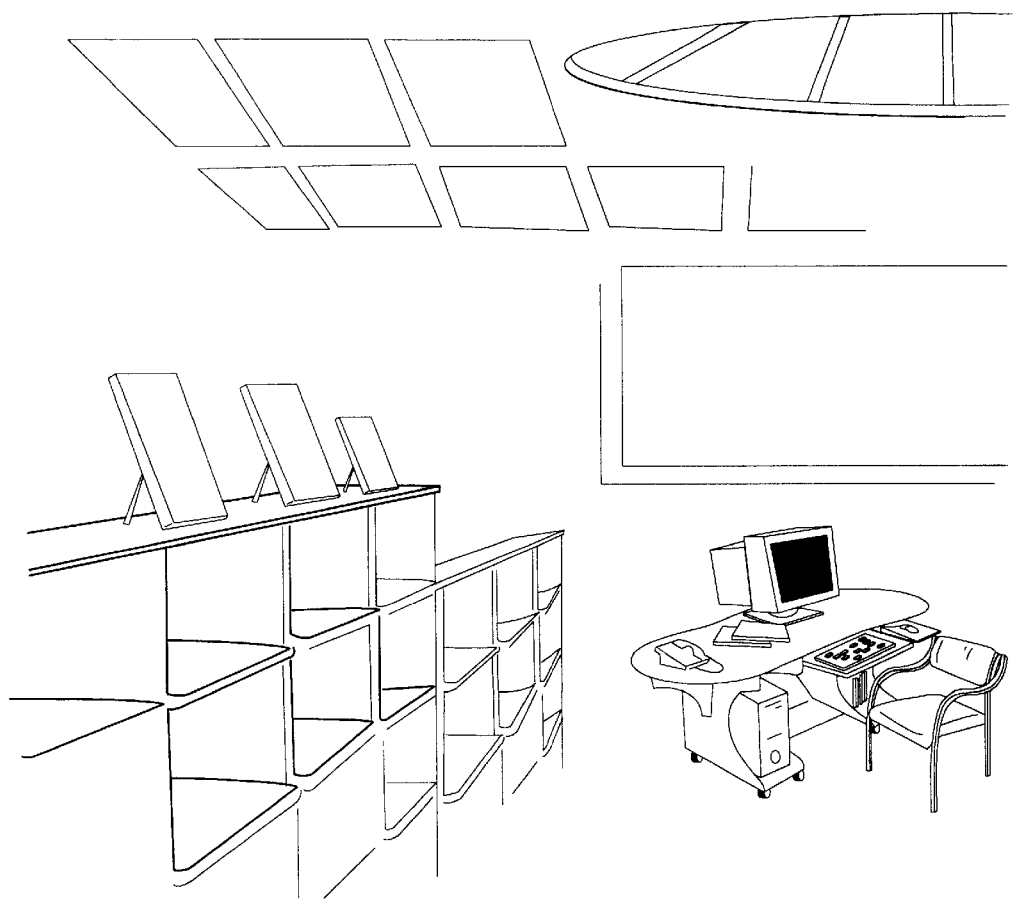
Fig.SS2-70

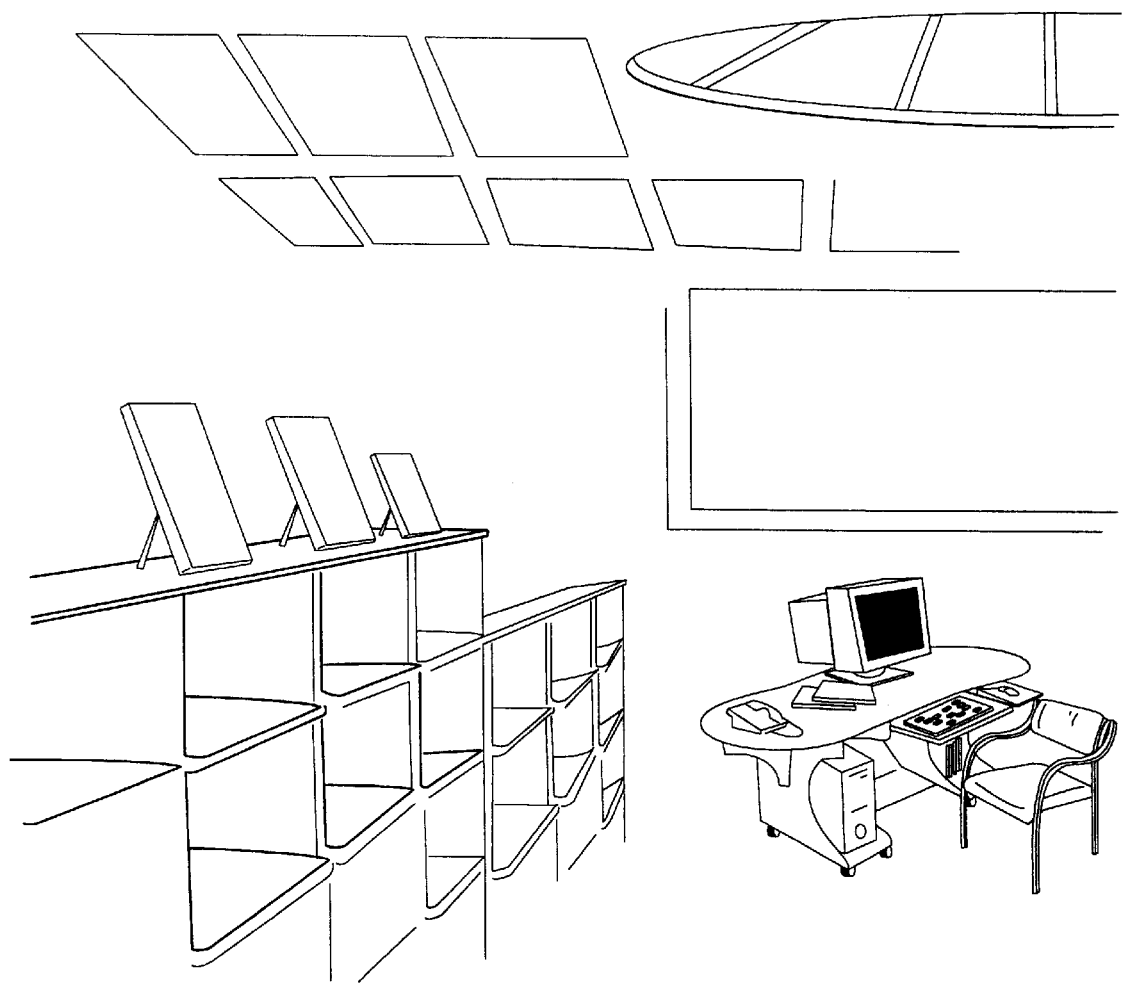
Fig. SS2-71

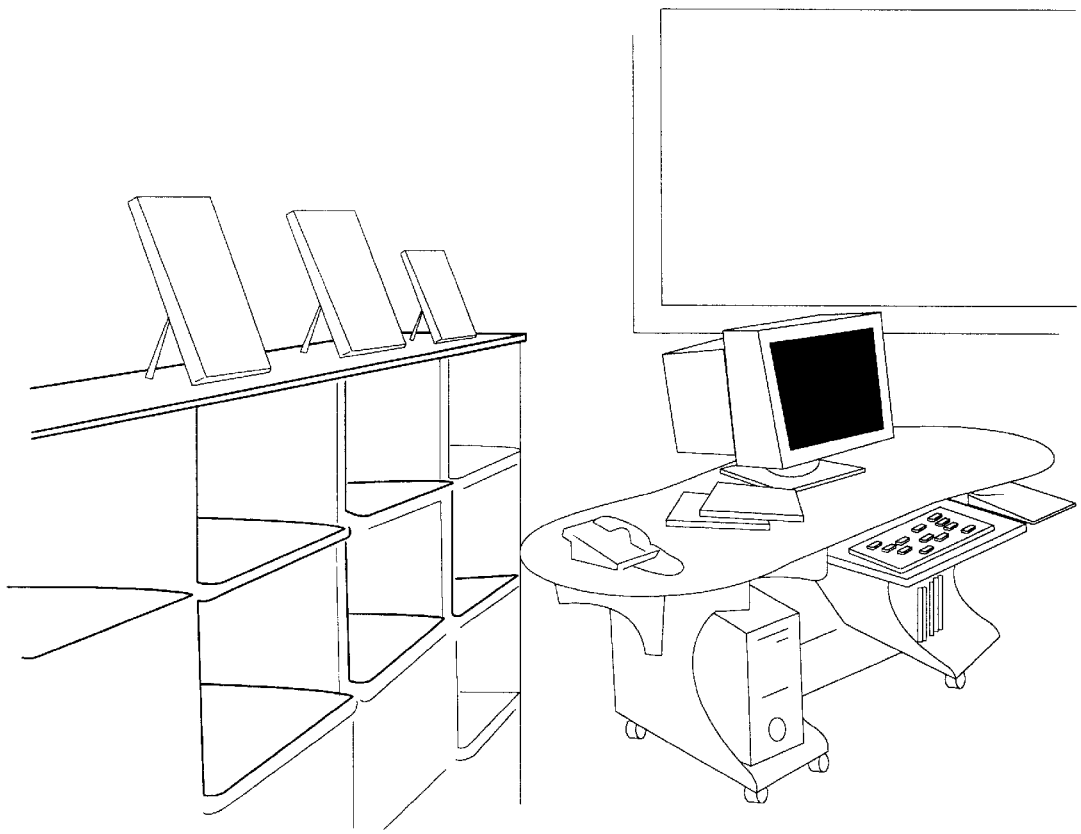
Fig.SS2-72

Fig.SS2-73

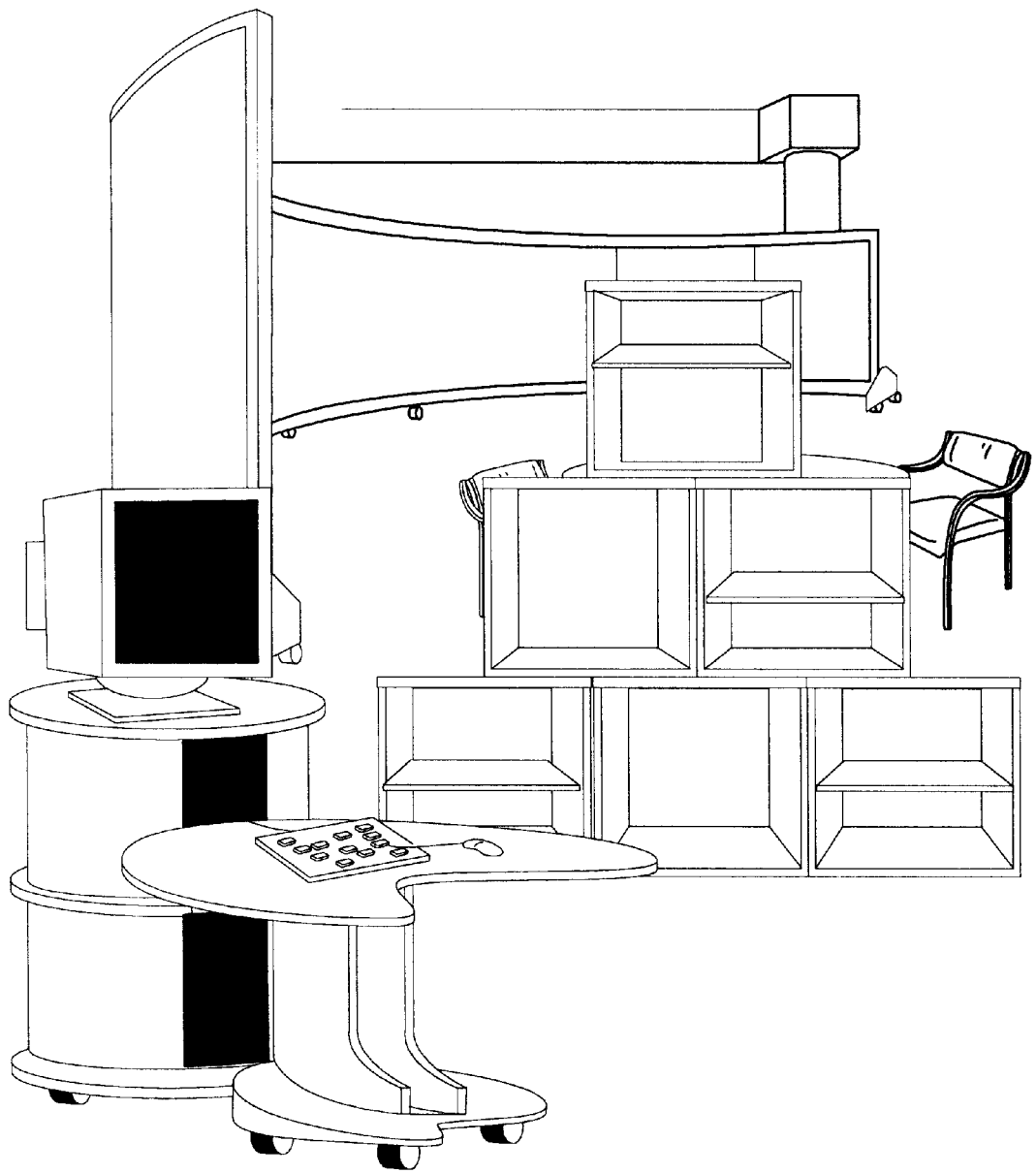
Fig.SS2-74

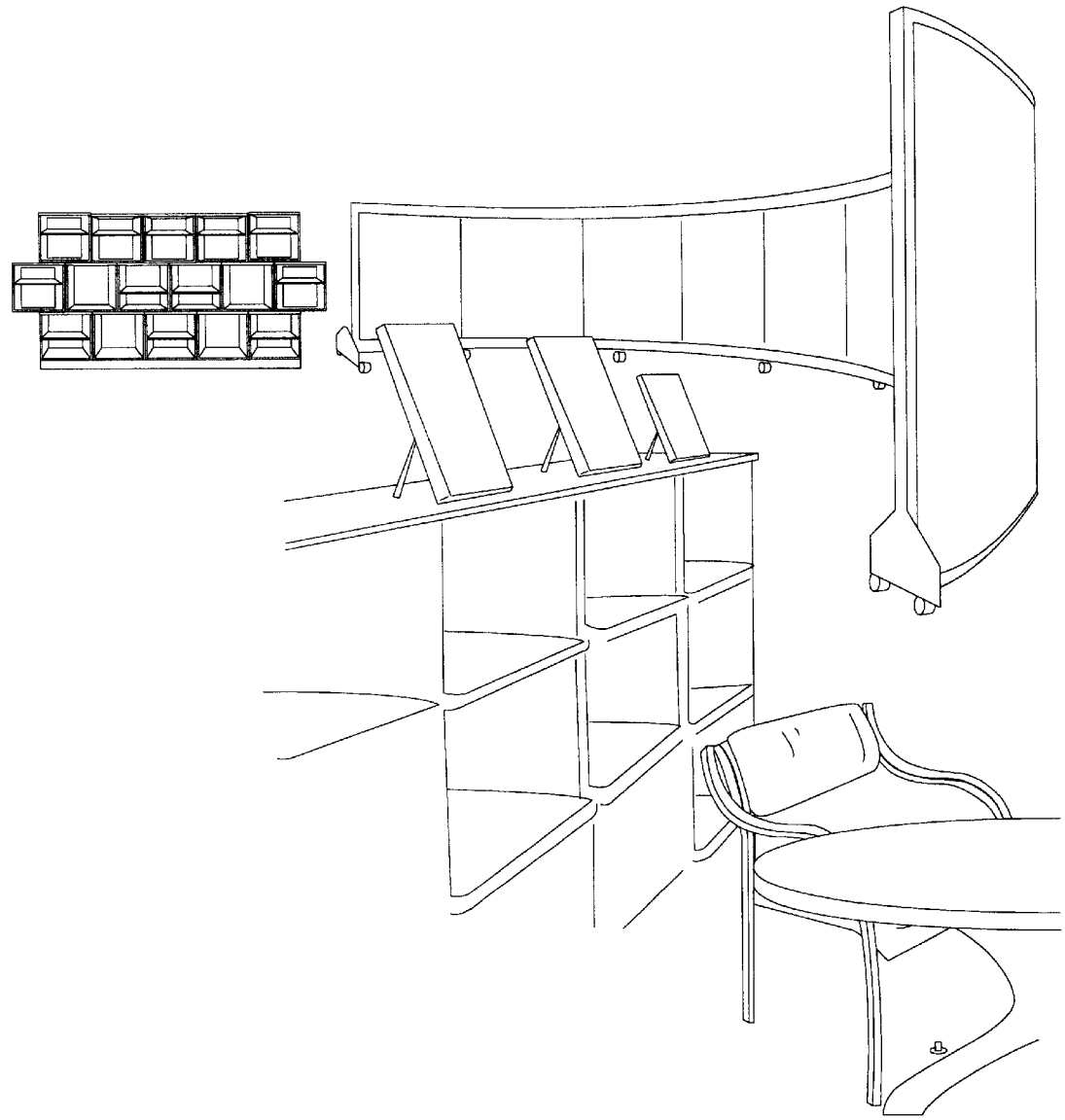
Fig.SS2-75

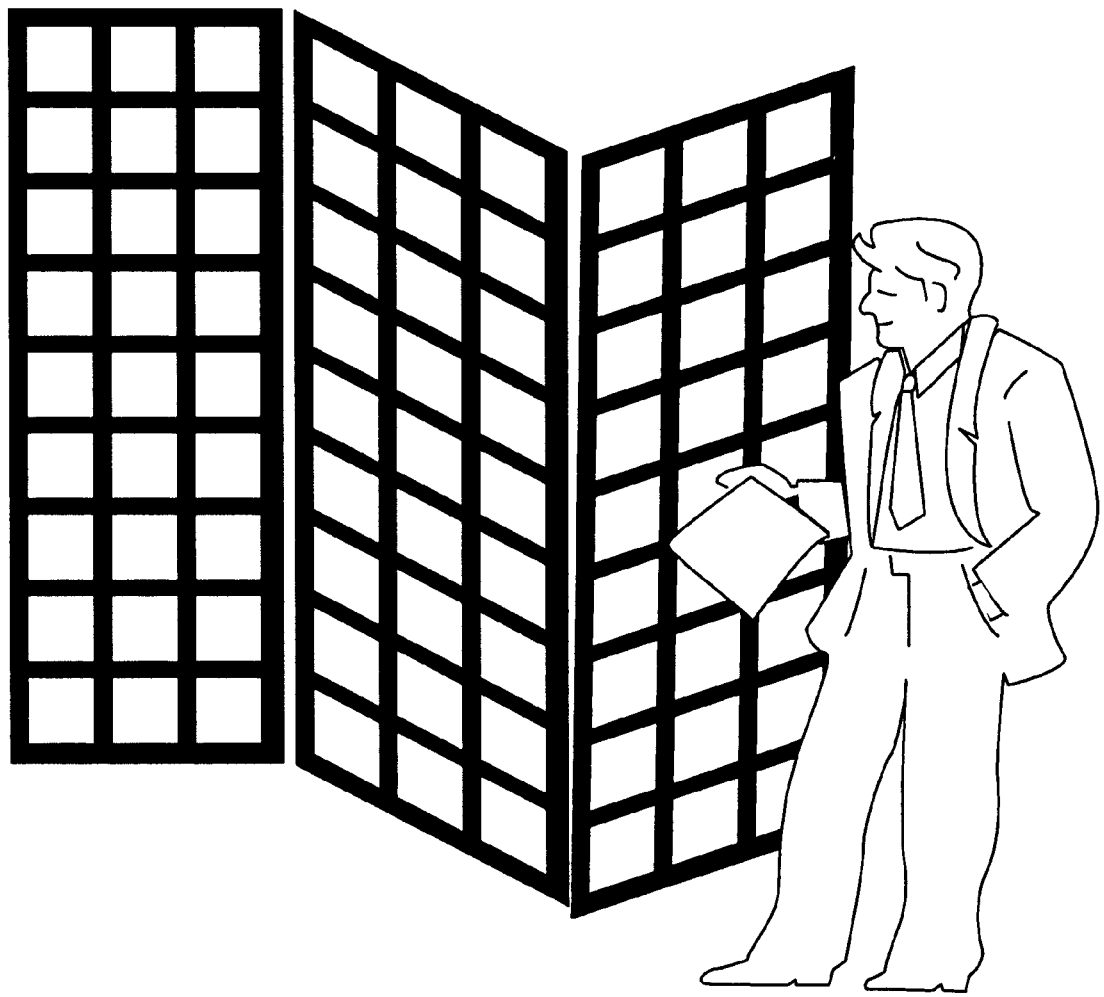
Fig.SS2-76

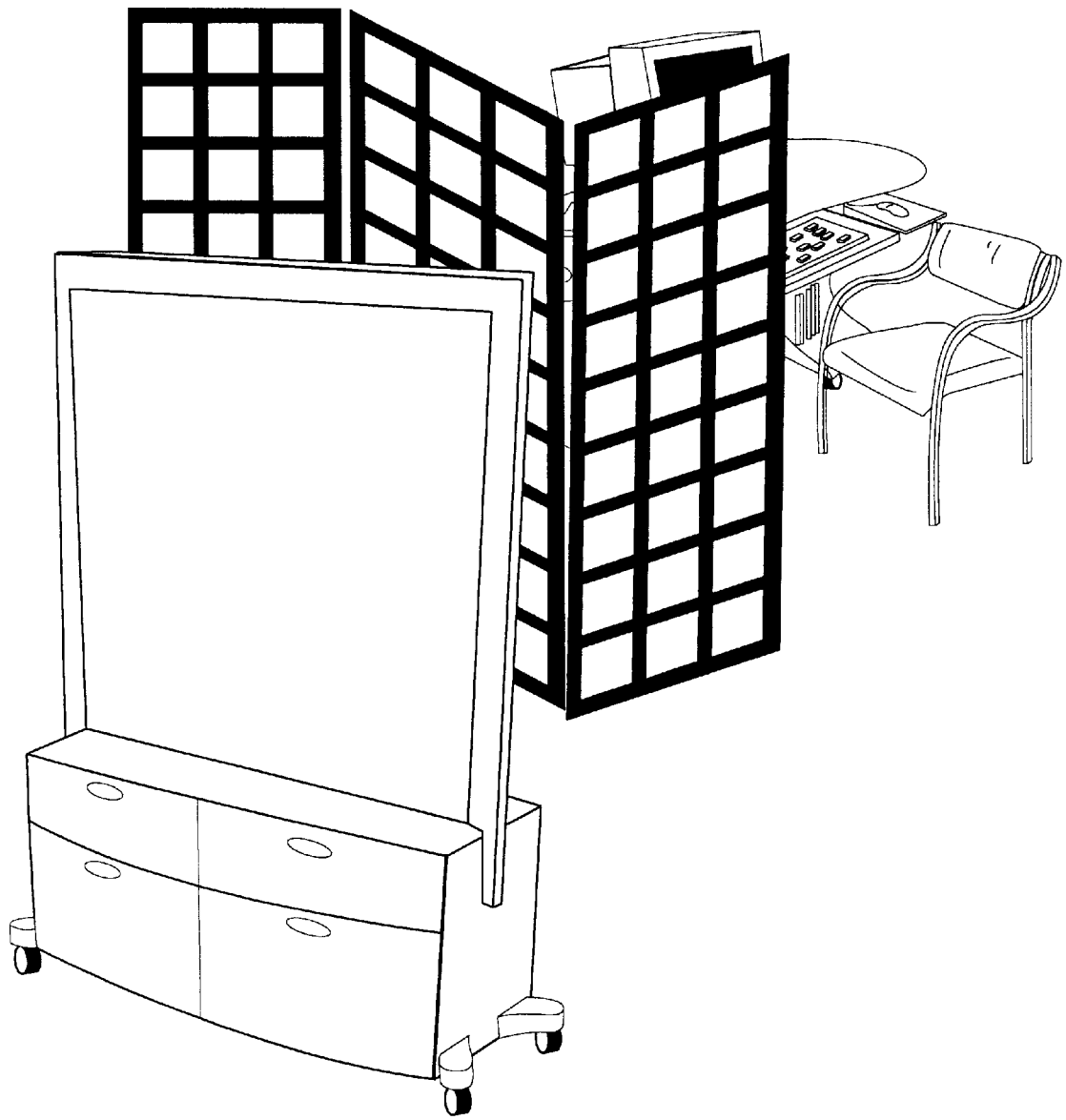
Fig.SS2-77

Fig.SS2-78

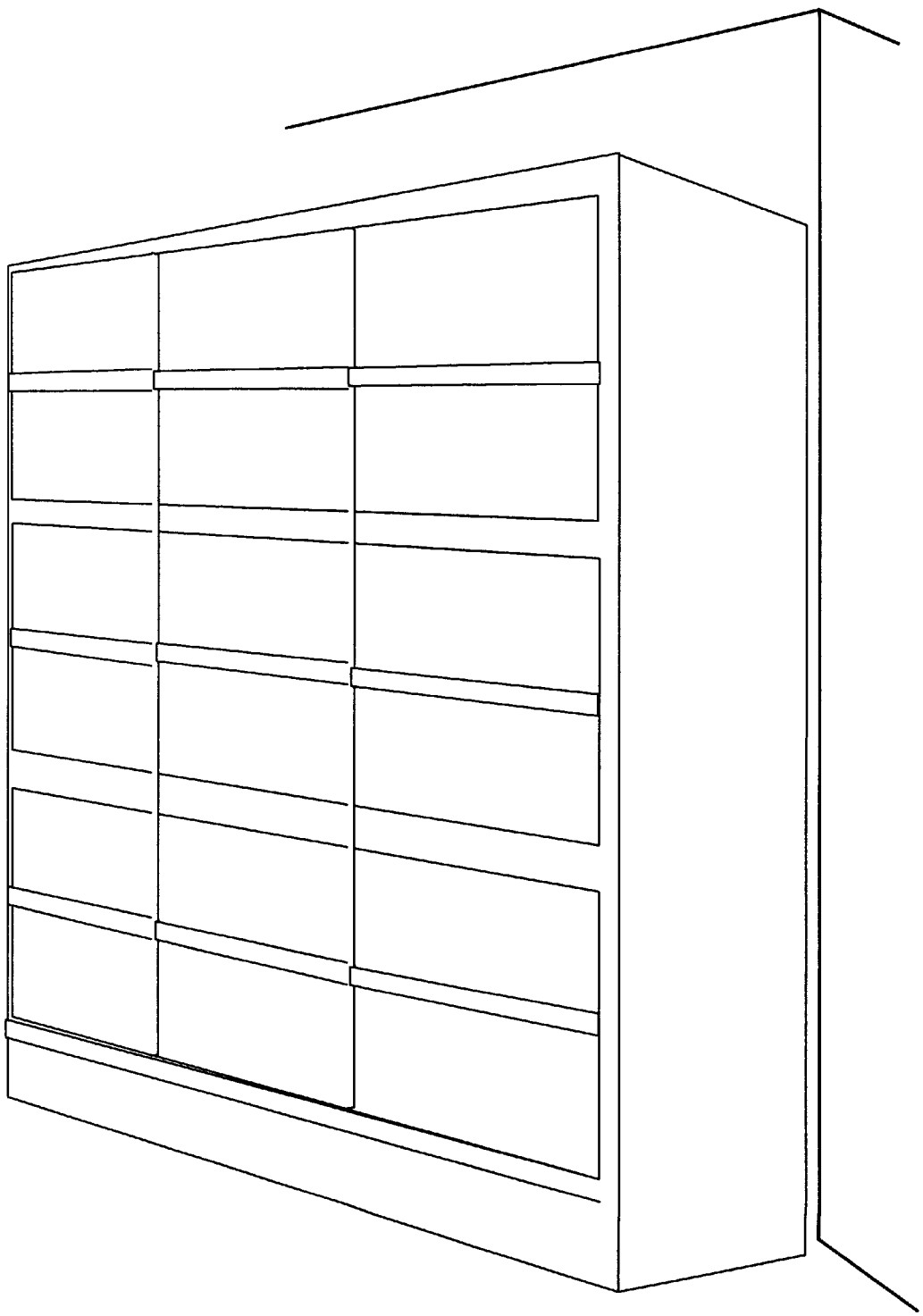
Fig.SS2-79

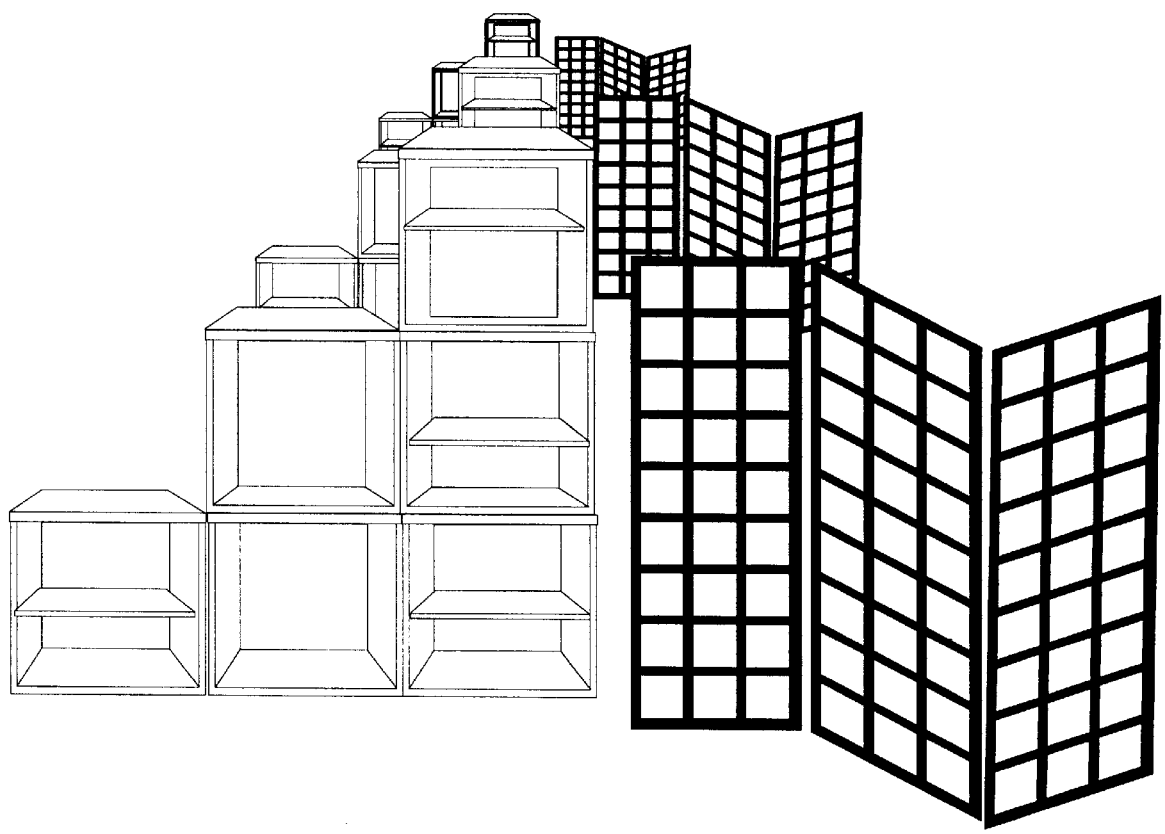
Fig.SS2-80

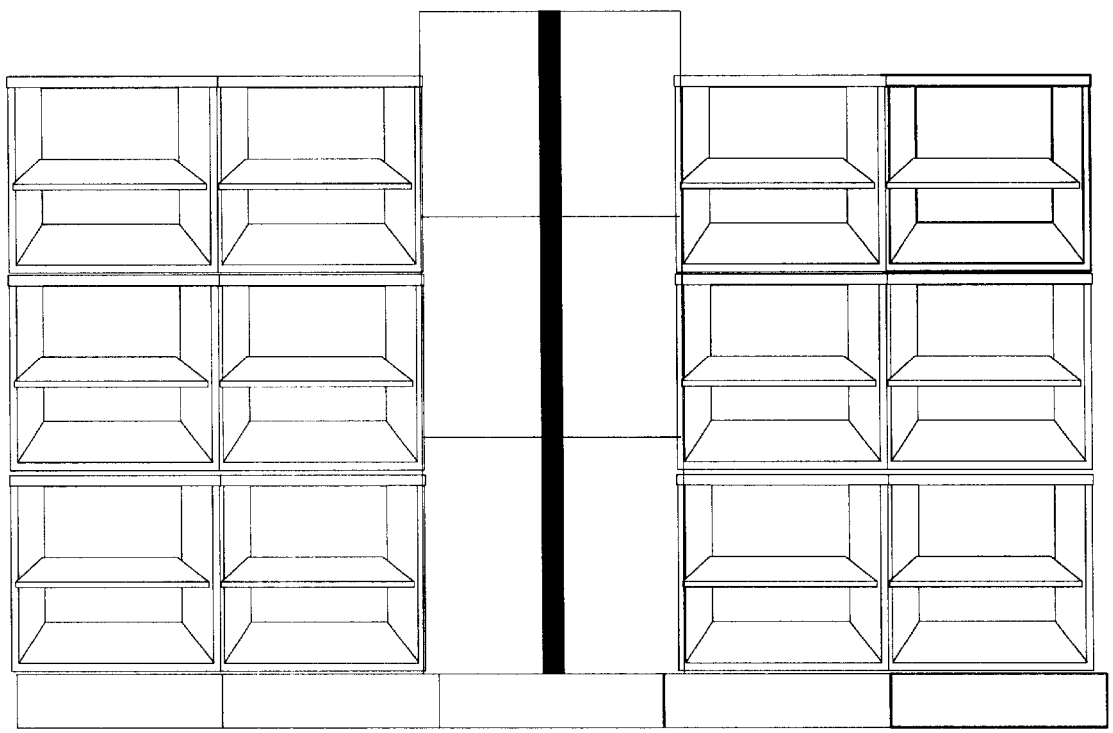
Fig.SS2-81

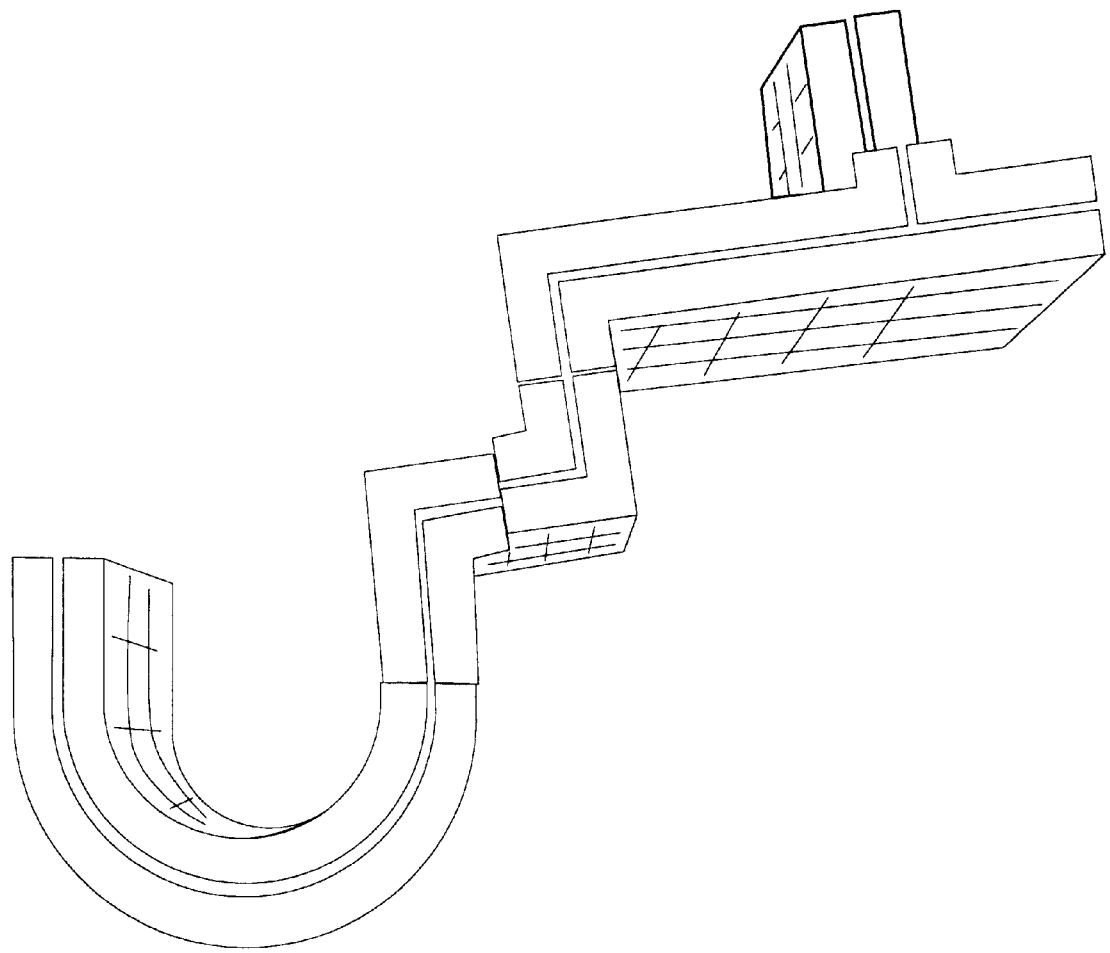
Fig.SS2-82

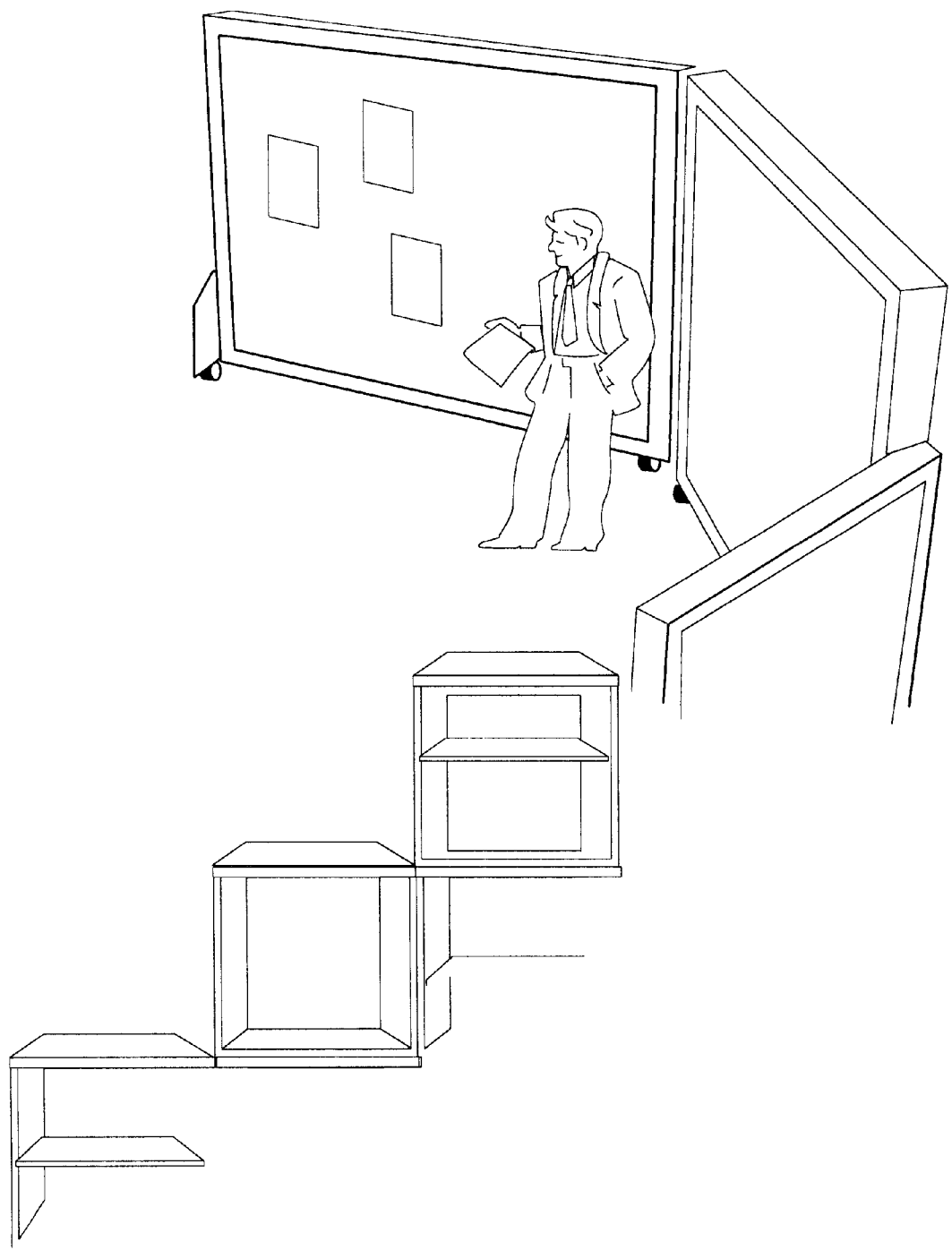
Fig.SS2-83

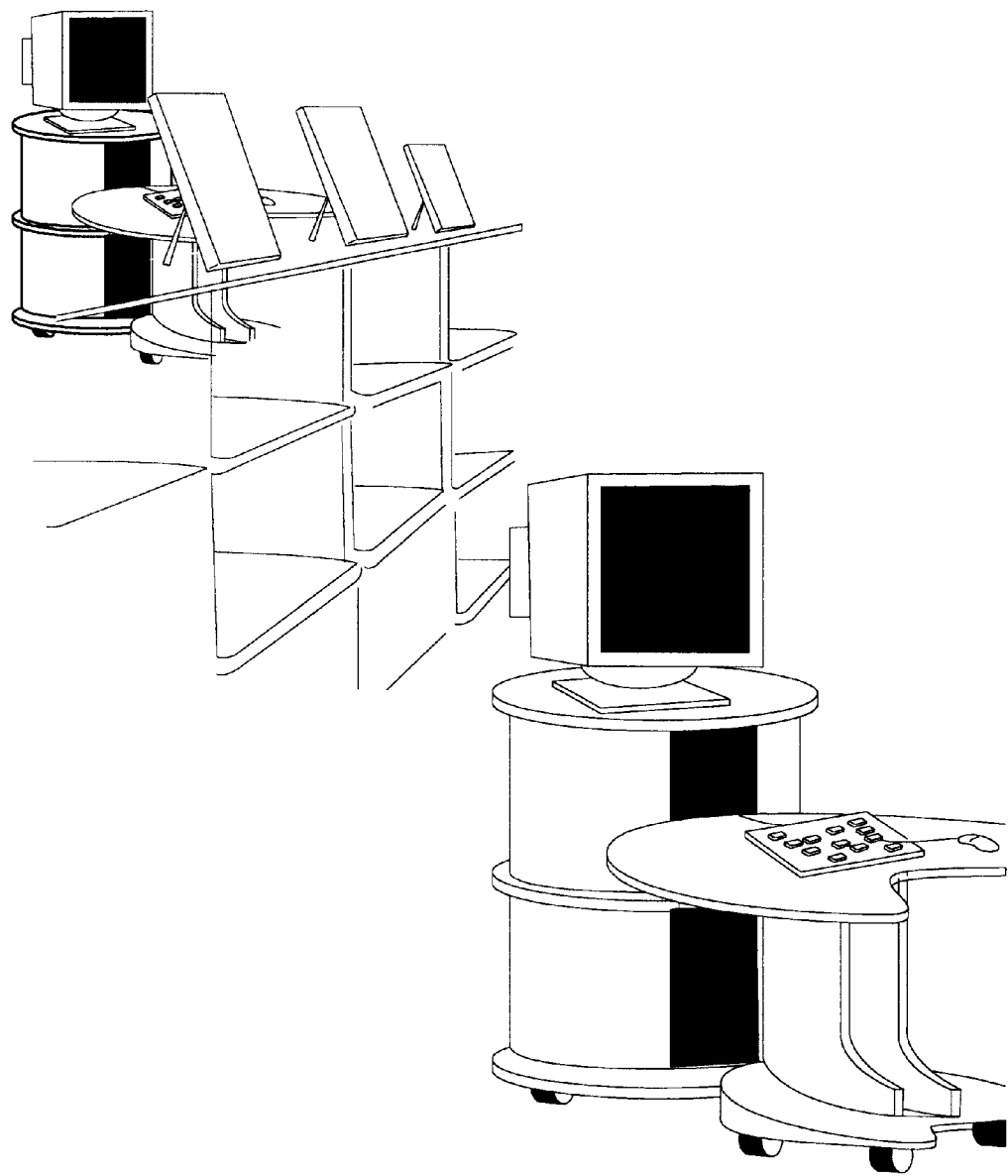
Fig.SS2-84

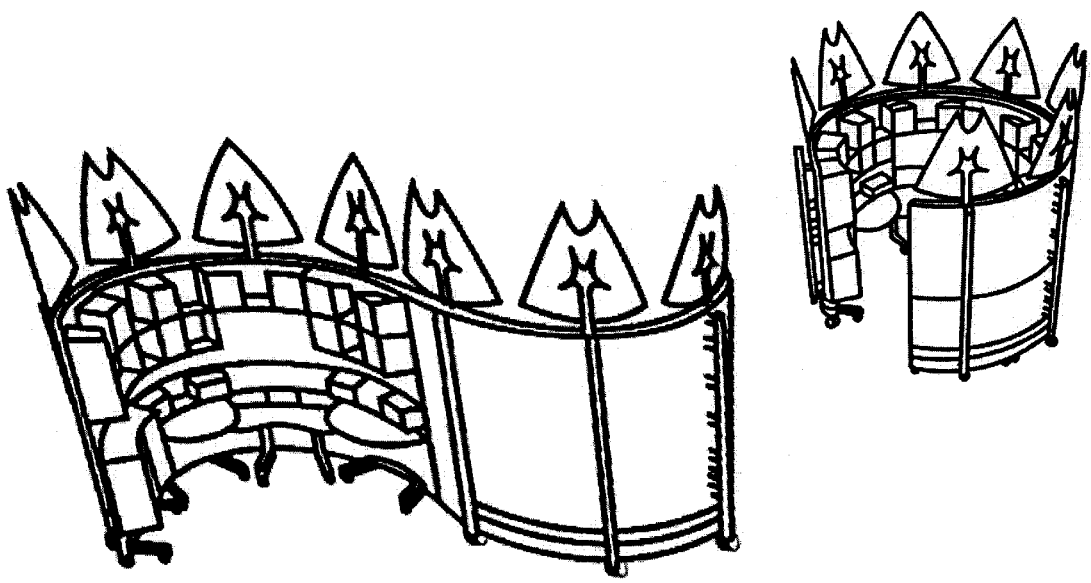
Fig.SS2-85

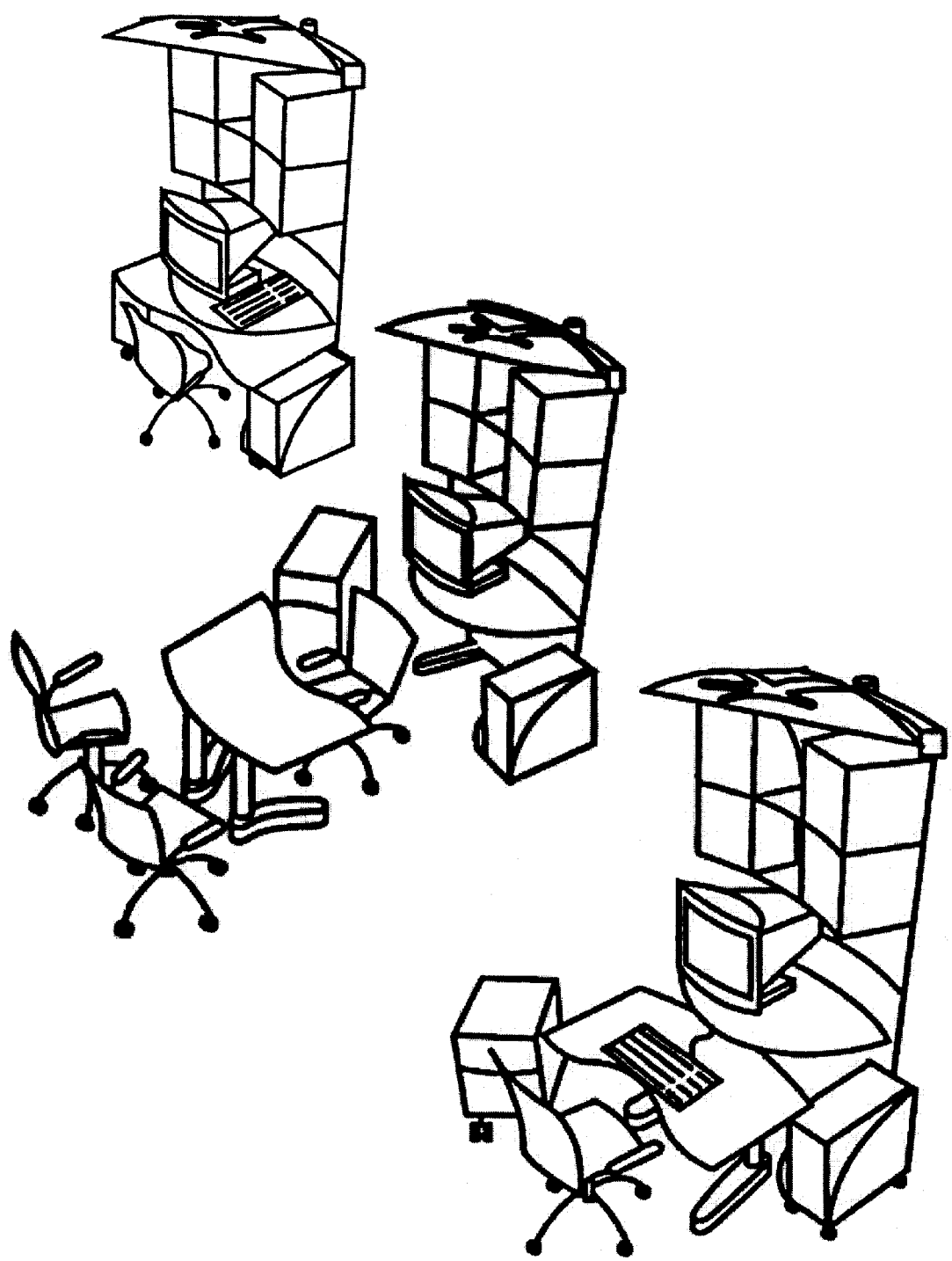
Fig.SS2-86

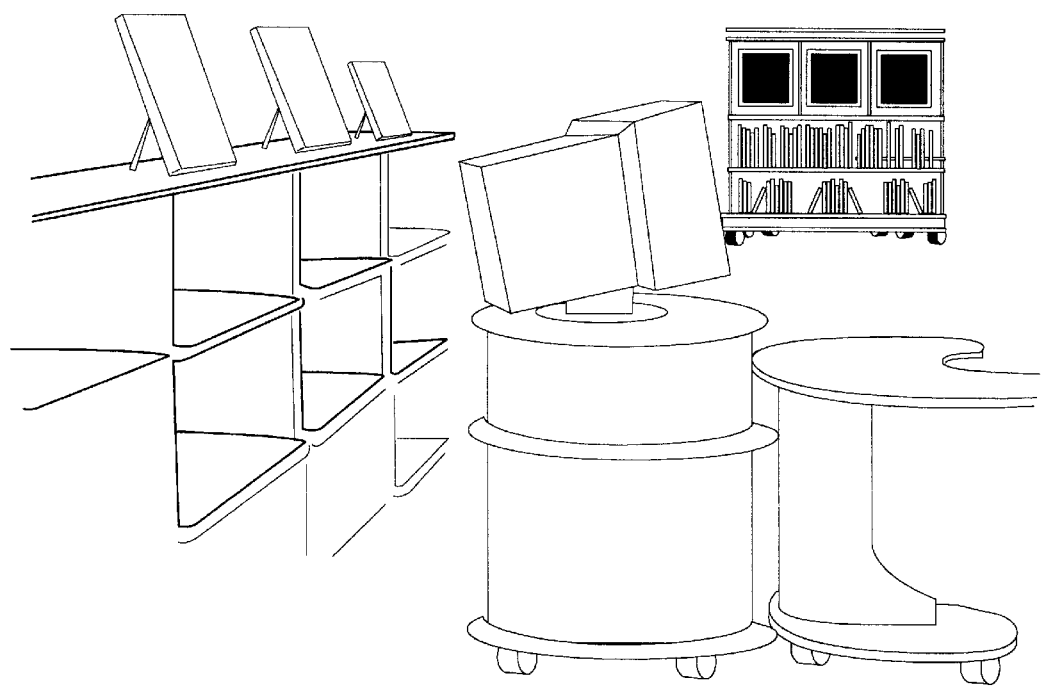
Fig. SS2-87

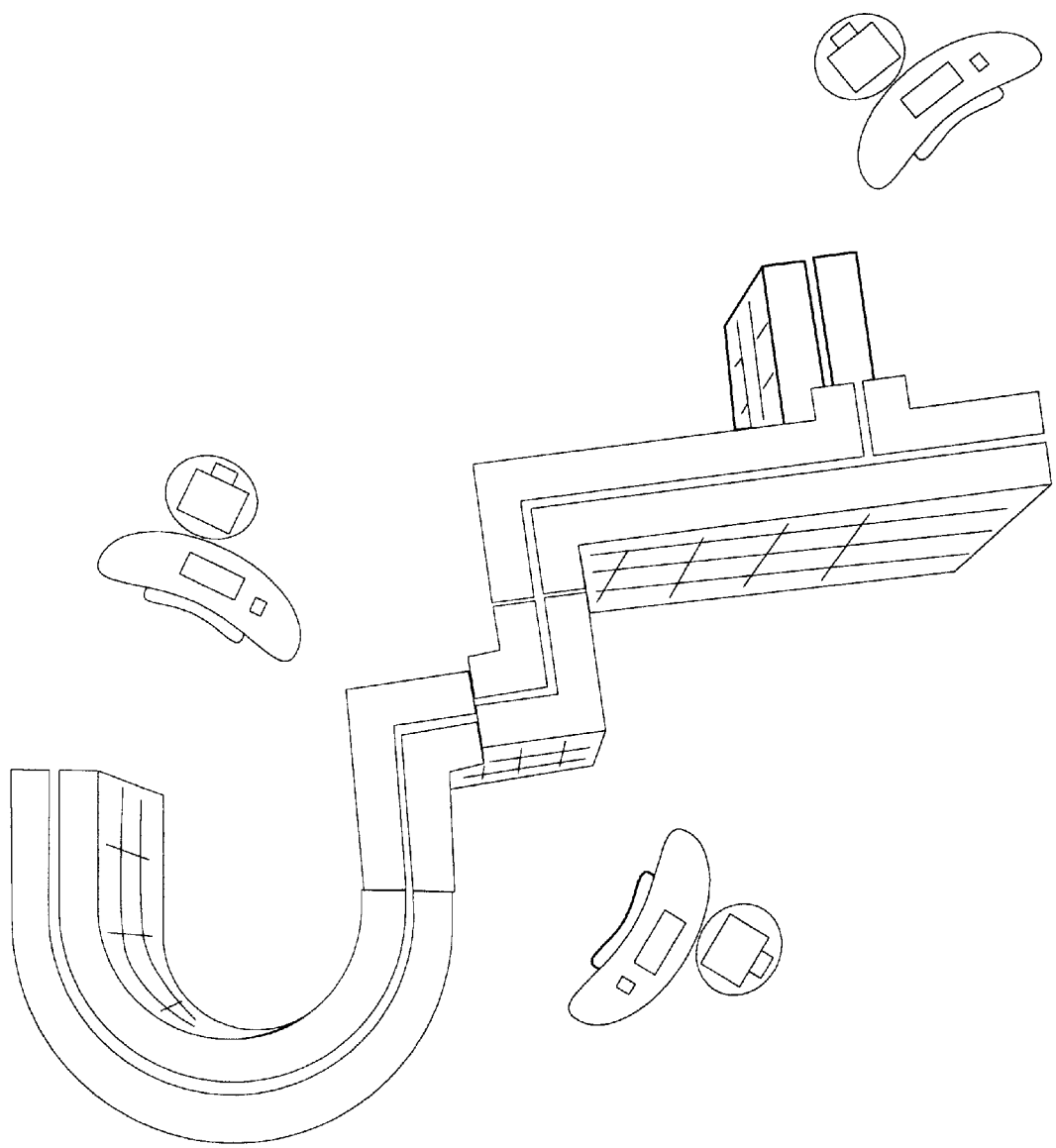
Fig. SS2-88

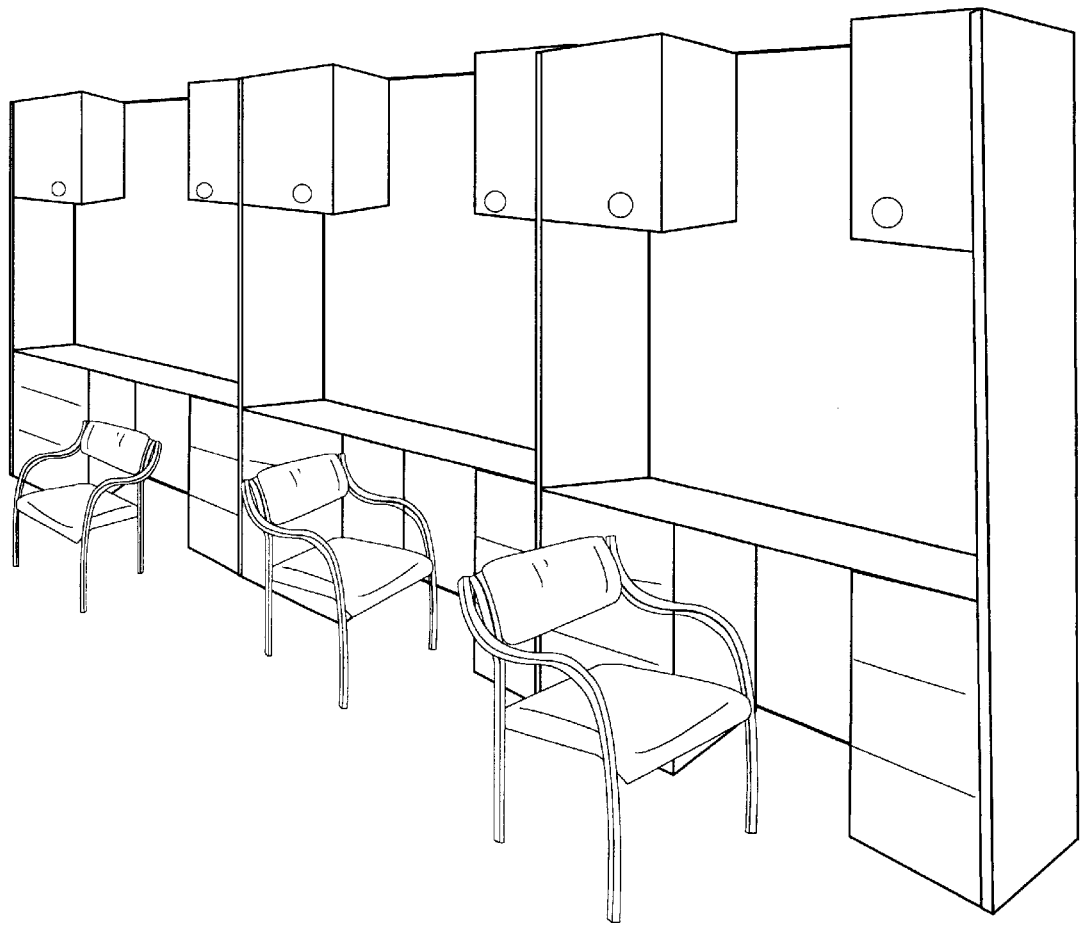
Fig.SS2-89

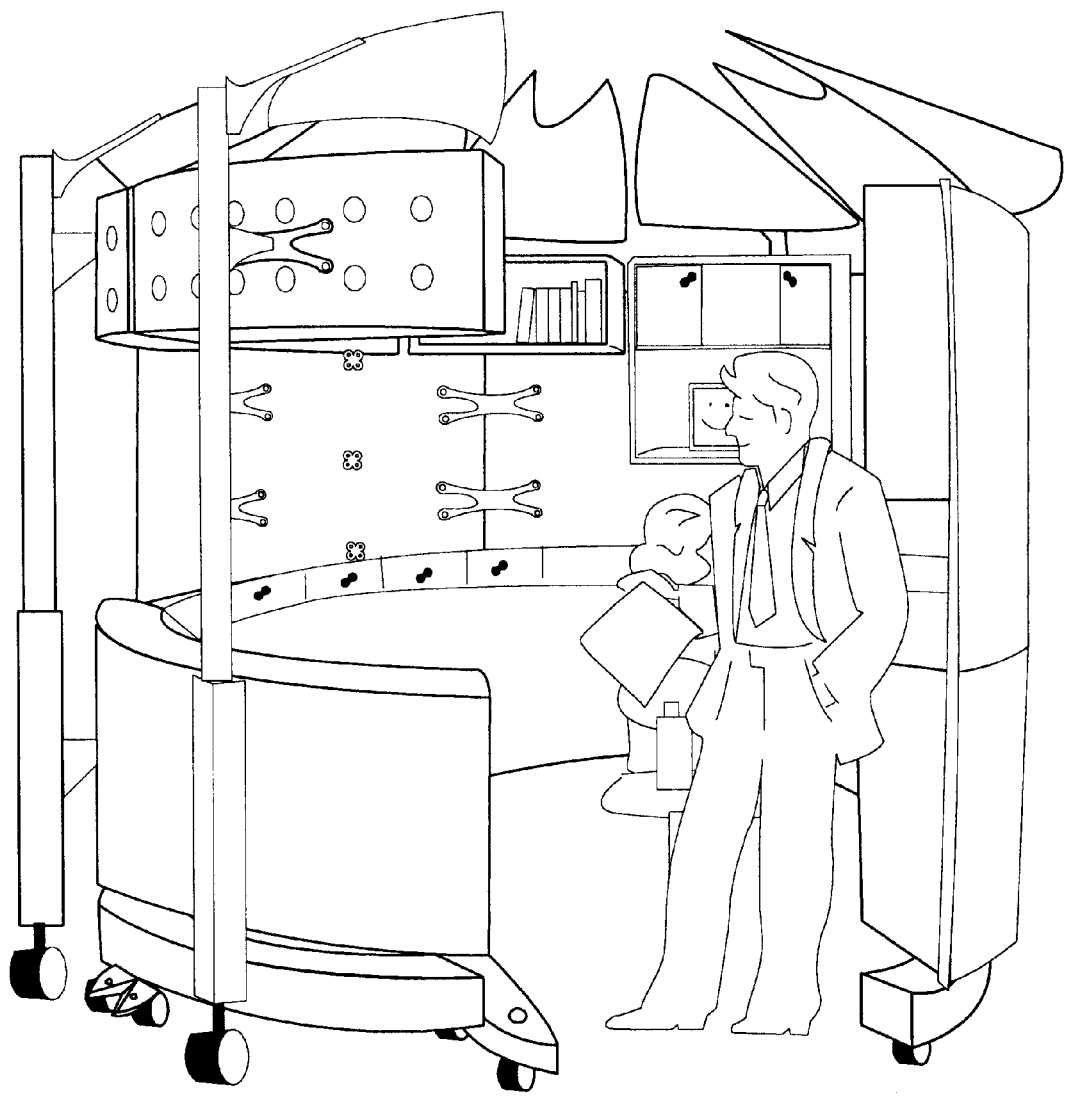
Fig.SS2-90

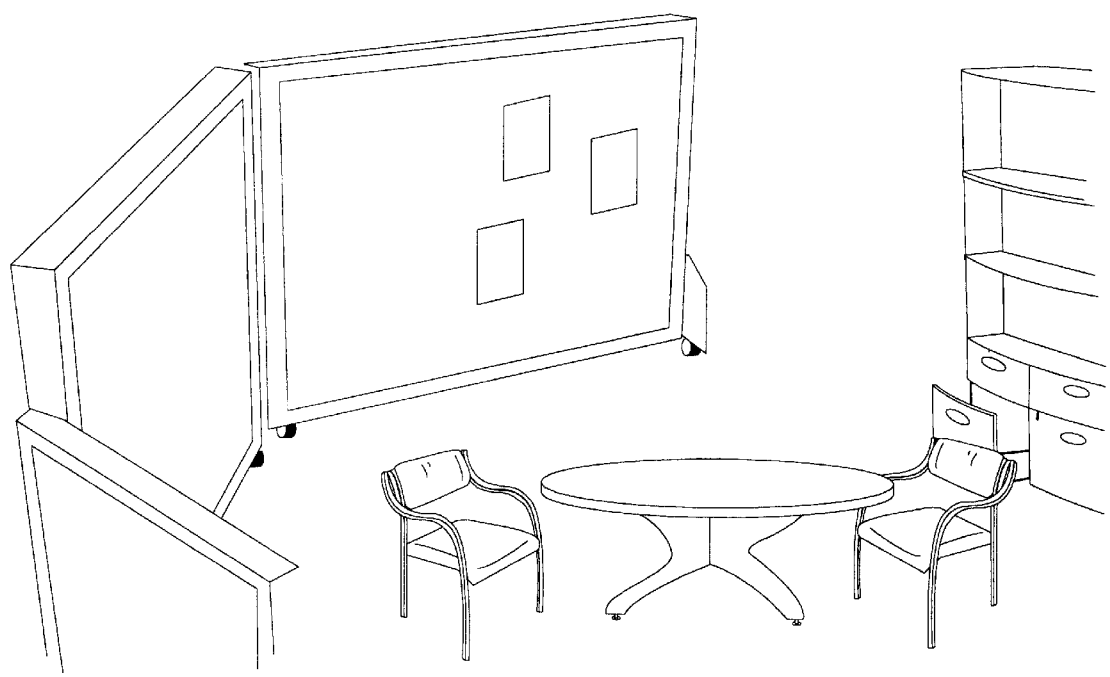
Fig.SS2-91

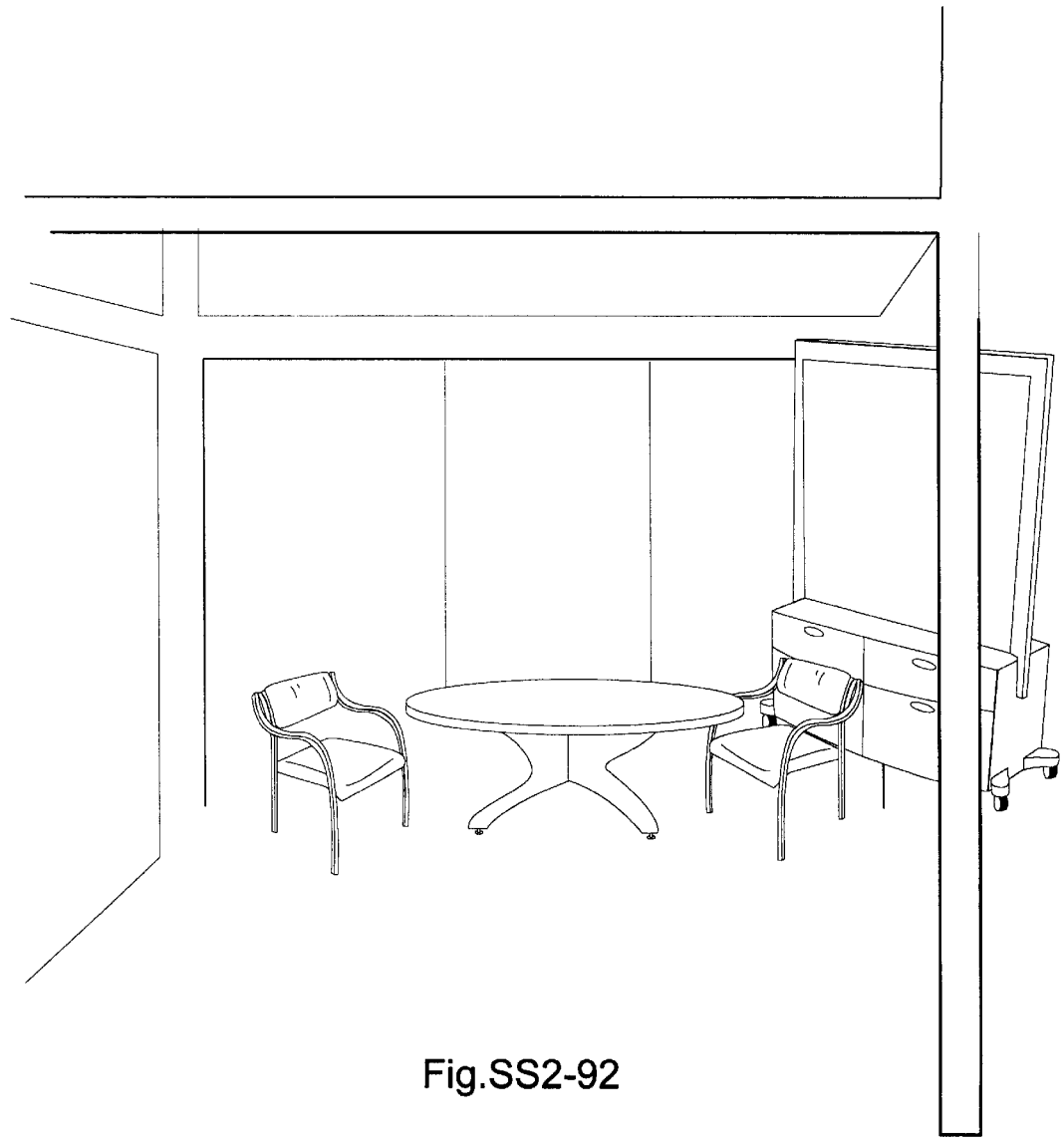
Fig.SS2-92

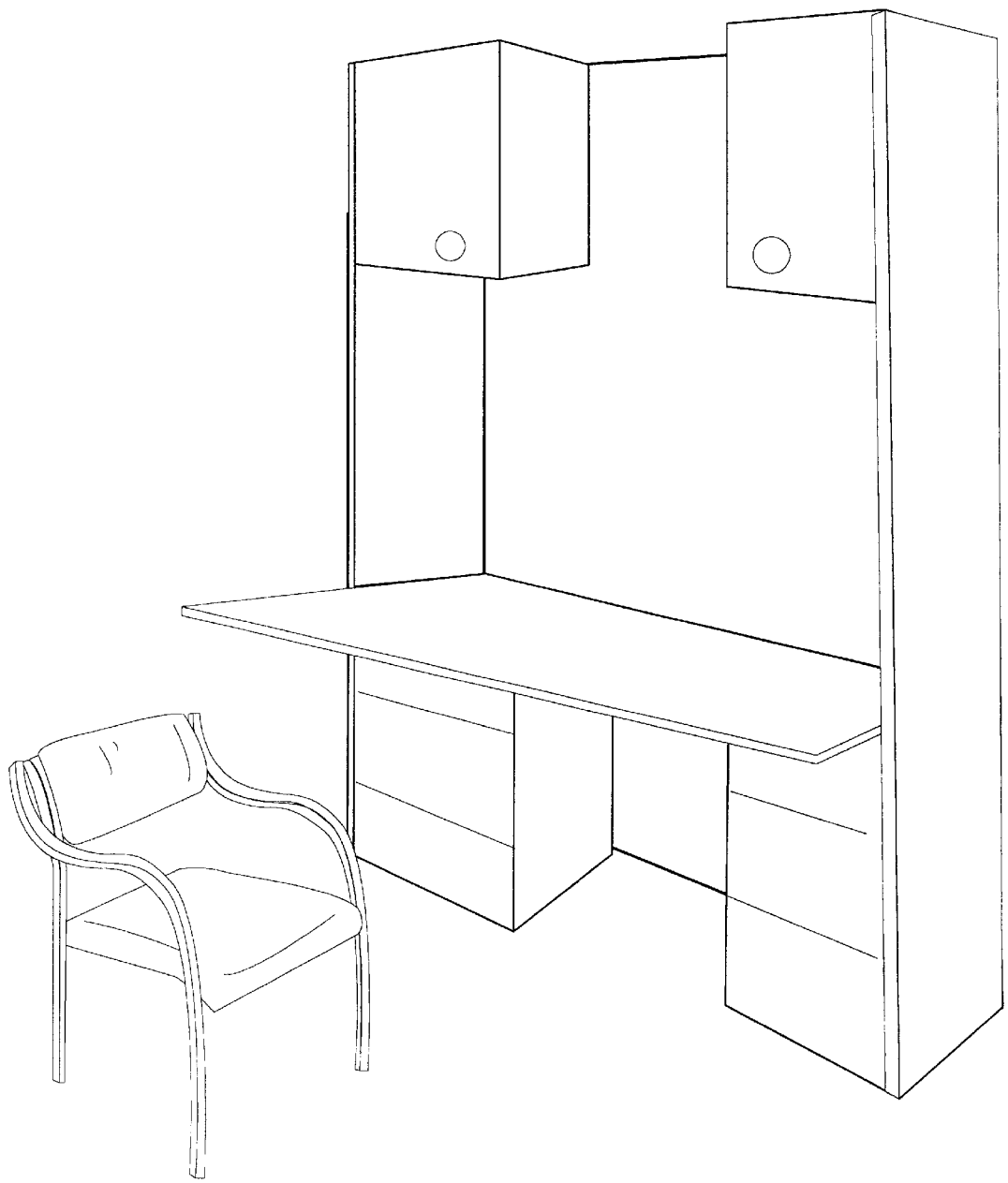
Fig.SS2-93

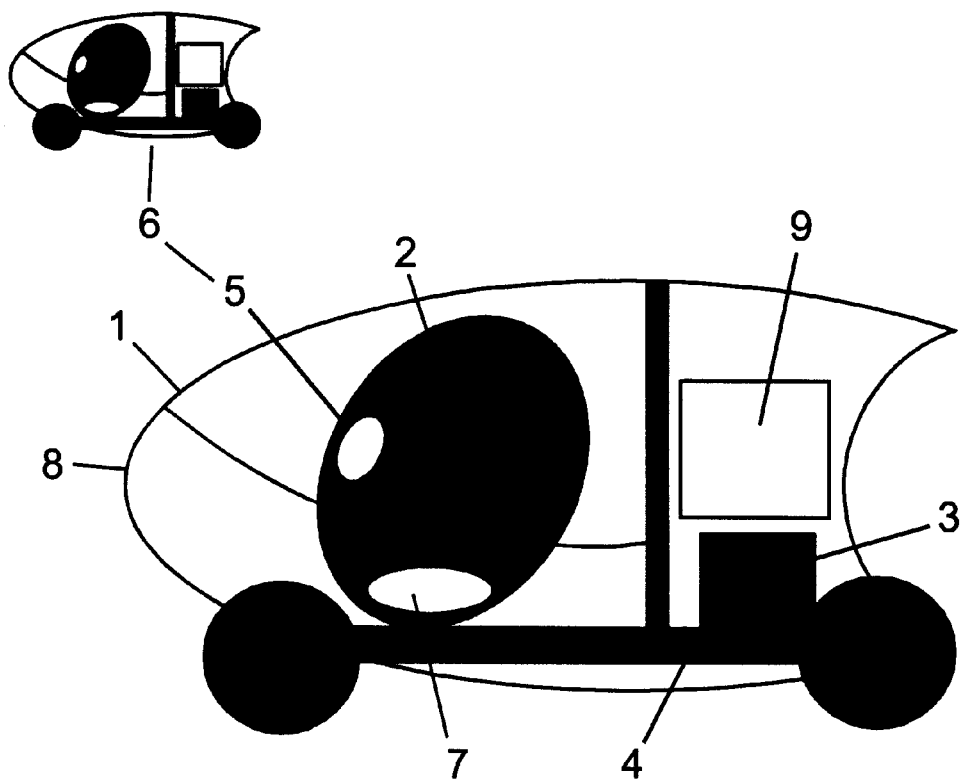
COMPONENTS:
1. Smart, adjustable shrouds
2. Occupant "Egg"(s)
3. Propulsion unit
4. Adaptive tracking system (road, rail, air, etc.)
5. Navigation/GPS/communication system
6. Virtual agent
7. Environment package
8. Impact
9. Storage
Fig. SS4-1

SYSTEM FOR OPTIMIZING INTERACTION AMONG AGENTS ACTING ON MULTIPLE LEVELS

This appln claims benefit of Provisional No. 60/055,051, filed Aug. 8, 1997, 60/063,699 filed Oct. 28, 1997 and 60/068,899 filed Dec. 23, 1997.

FIELD OF THE INVENTION

The present invention broadly relates to a system and method for addressing the paradoxes and problems associated with the Knowledge Economy, and the transition to it. The system and method of the present invention create a unified experience of work that scales from individual thought processes to the building and using of a global system of commerce. Described in several levels of recursion, the system and method of the present invention integrate, into a single system and method several discrete Sub-Systems and methods that comprise a myriad of now unintegrated tools and processes that are conducted across contradictory and non-collaborative environments.

TERMINOLOGY AND REFERENCES

Throughout the present application, certain terms of art are used. To assist in understanding the intended meaning of these terms in this application, reference should be made to certain published works as detailed hereinafter:

ARMATURE: as described by: "*Building to Last*" Architecture as Ongoing Art"—Herb Green, 1981.

PATTERN LANGUAGE: as described by: "*A Pattern Language*" Christopher Alexander 1977 and demonstrated by; "*The Wright Space*" Pattern & Meaning in Frank Lloyd Wright's Houses" Grant Hildebrand 1991. (Both of the above references are described in "The Power of Place—How Our Surroundings Shape Our Thoughts, Emotions and Actions"—Winfred Gallager, 1994 and in "Prospect Refuge"). "Frank Lloyd Wright—A primer in Architectural Principles" Robert McCarter, 1991.

COMPLEXITY ORDER VARIETY: as described in "Architecture—Form, Space, and Order" Francis D. K. Ching, 1996.

ADAPTION: as described in "How Buildings Learn—What Happens After They're Built" Steward Brand, 1994.

PHYSICAL HEALTH, MENTAL WELL BEING, INDIVIDUAL PLACE: as described in "The Power of Place—How Our Surroundings Shape Our Thoughts, Emotions and Actions" Winfred Gallager, 1994, and "Places of the Soul—Architecture and Environmental Design as a Healing Art" Christopher Day, 1993.

META PROGRAMMIMG as described in—"Programming and Meta-Programming in the Human Bio Computer" by John Lilly. 1987 Crown Pubublications AGENTS (AGENCY) as described in "Society of Mind" Marvin Minsky 1988 Simon & Schuster; ISBN: 0671657135

EMERGENCE AND NODES AND PATCHES as described in—"At Home in the Universe" Stuart Kauffman.1995, Oxford Univ Press; ISBN: 0195095995

REQUISITE VARIETY as described in "Designing Freedom" Stafford Beer, John Wiley and Sons and "Diagnosing the System for Organizations" Stafford Beer 1985, John Wiley & Sons ITERATION as described in "The Exemplar" by Robert Carkhuff, 1984, also discussed in "The Gold Collar Worker—Harnessing the Brainpower of the New Work Force" Robert E. Kelley 1995, Addison-Wesley RECURSION as described in "Diagnosing the System for Organizations, Managerial Cybernetics of Organization" Stafford Beer 1995, John Wiley & Sons CONSCIOUSNESS as described in "The Origin of Consciousness in the Breakdown of the Bicameral Mind" Julian Jaynes 1976, Houghton Mifflin Co FEEDBACK as described in "The Human Use of Human Beings, Cybernetics and Society" Norbert Weiner 1950, Houghton Mifflin and "Cybernetics, or Control and Communication in the Animal and the Machine" 1948, MIT Press INFORMATION as described in "Mind and Nature, A Necessary Unity" Gregory Bateson 1979, E. P. Dutton and "Steps to an Ecology of Mind" Gregory Bateson, 1972 Ballantine INTELLIGENCE (multiple) as described in, for example, "Frames of Mind: The Theory of Multiple Intelligences" Howard E. Gardner 1983, Basic Books HEURISTICS as described in "The Metaphorical Brain" Michael B. Arbib, September 1989, John Wiley & Sons In addition the following terms can be difined in the context of Design Shop™ Events.

ANDMap™ Project Management Tool

The term ANDMap stands for Annotated Network Diagram Map and refers to an invention that synthesizes Gannt charts, network diagrams like PERT, CPM or GERT, and process flow charts. The items on the map are plotted to scale over time and may be collected across a series of horizontal tracks, like Gannt charts. A standard set of symbols are employed to represent a range of activities from the strategic (Landmark, Benchmark) to the tactical (Event, Task), to the conditional decision point (Cusp) to the task level (Milestone). Landmarks and Benchmarks can be employed to express large scale ideas like missions, visions and goals. Events are rounded rectangles used to identify activities in points of time. They can be annotated with resource and duration data and used in network diagram fashion. Tasks have symbols representing the start and end of an activity, much the way activities are represented on Gannt charts. The Cusp represents a decision gate that may be found in process charts. Since the ANDMap is laid out with time as one of its axes, loops are usually avoided—currently it's still impossible to go backwards in time—instead a NO decision out of a Cusp will either end in a cessation of the project, an alternative contingency, or an indication that previous work must be redone, and showing this rework extending out along the timeline so the project team can get a visual sense of the impact of the decision. Milestones are used to highlight significant subdivisions of Events or Tasks. All of the symbols are connected by lines that may be coded to represent dependency, parallel processing, or critical information exchange. The symbols and lines may be color coded to provide additional information to the user, and extensive annotations may be written around the symbols on the map to provide explanations.

Author-to-Author

A type of DesignShop module in which each participant has been given a different book to read in advance. At the time of the module, the participants engage in a discussion of the issues facing the enterprise, however, they discuss from the vantage point of the authors they have read. Each participant assumes the personae, knowledge base, vantage point and opinions of the author whose book they were assigned to read. The exercise forces a change of vantage point and introduces new information into the pot. It's a day one or day two exercise.

Breakout

A general activity during a DesignShop when a large group is divided into smaller teams to work on either different issues, or different aspects of the same issue. The space in which this activity takes place is a Breakout Area. The group undertaking this activity is called a Breakout Team. Breakout activities are variously referred to as Breakout Rounds or Design Rounds.

Capture Team

A subset of the KreW of Knowledge Workers in a DesignShop who are assigned to work in a Breakout Area to document, or capture, the discussion in one or more forms: keywords, synthesis (by individual attribution or journalistic summary), graphics from the WorkWalls. The work of this team is published to the DesignShop Journal.

Circle-Up

A ritual for the disciplined sorting of signals to help a Patch (Team) through the process of association and decision-making in support of the next major phase of work. Circle-Up also brings the Patch into unity at a point in time; although unity does not imply consensus in this case. It's also a formal time to acknowledge progress, failures and successes along the Lifecycle of the Web (Enterprise). It's a time to engage the multiple intelligences of the team's members in a process of collaborative design. Commonly a Circle-Up is use to shape the opening and closing of an event. It can put the Patch back in touch with its Vision and the iteration of the work to be done.

Crew (Also spelled KreW) A team of Knowledge Workers charged with supporting an event such as a DesignShop.

DesignShop™ Event

An event whose purpose is to release group genius in the client, condense the time in which a team moves from Scan to Act by an order of magnitude, completely capture and organize all of the information generated, and do all of this in a facilitated way by managing not the people involved, but the Seven Domains that regulate collaboration and evolve ingenuity.

DesignShop Sponsor

Representatives from the client who usually have a considerable stake in the successful outcome of the Design-Shop. They may be project managers, department heads, or CEO's. Sponsors are also participants in the event, although in some cases they may work on the KreW. Some clients have only one sponsor, and others have an entire sponsor team.

Documentation Team

A subset of the KreW whose work comprises capturing reports and conversations that occur when all of the participants are assembled into one group. (The Capture Teams document reports and conversations that happen in Breakout Teams.)

Engagement Team

A group of people who are assigned to work with a specific client over the duration of the relationship. They may also include DesignShop facilitators and Knowledge Workers, but this is not necessary.

Environment

Typically a Management Center, especially in the context of a DesignShop. More generally, any space that has been consciously designed and configured to support a process in a flexible and evolutionary manner. Most of us work in "spaces" (office space, work space, etc.) that are devoid of enlightened, conscious design, and therefore very poorly support our lives and the processes that comprise them.

Facilitator (Sometimes Called the Key Facilitator)

The Facilitator works with the DesignShop Sponsors (which may include members of the engagement team) and the Process Facilitator (representing the KreW) to design the DesignShop before it begins, manage the continuing design and execution of the DesignShop while it is happening, to bring closure to ideas and processes immediately following the event, and to open paths for progress to the next stages of work.

To facilitate means "to make easy." The art of facilitation is the art of bringing clarity and effectiveness to the work process of individuals and groups. The facilitator's mandate is to ensure that the process is designed and implemented in a way that brings out the best thinking of each participant and the best resolution of issues from each group.

Facilitation involves a wide range of actions taken to affect the interaction of agents. It involves bringing order to the universe of thoughts and possibilities about a topic, and giving back to people (or other agents) what they already know, in a way that brings clarity and a foundation for effective action. It involves setting appropriate boundaries (time, physical space, and agreements) within which an individual or group can work effectively. It involves clarifying conditions and goals, through a process we describe as "creating the problem."

Facilitation involves introducing the right "new" information that challenges existing ways of thinking and leads individuals to discover their own unexamined assumptions about a given situation. It involves observation and assessment, and taking actions to ensure that a group's natural biases don't prevent some vantage points from being heard, or certain phases of the creative cycle to skipped. When necessary, the facilitator will interject new challenges to prevent a group from coming to closure on an idea prematurely; and at other times to push a group to closure when the exploration is sufficient and no gain is to be made by working an issue further.

The present inventors reject the notion that the facilitator should be an "objective third party" who does not get involved in content and focuses only on process, performing some kind of umpire or gatekeeper role. The present inventors don't apply the "facilitator as umpire" model for many reasons, including philosophical considerations: no one can ever be completely unbiased, and as modern physics has shown, even the act of observing a process will affect that process. Moreover, it's our experience that the agreements put in place by this model nearly always function more to protect the facilitator than to produce effective results.

Hypertile

The WorkWalls that MG Taylor Corporation manufactures (through Athenaeum international) are made of steel, and therefore accept magnets. Hypertiles are large rectangles of flexible magnetic material, measuring up to 11"×17". It is covered on one side with a sticky surface manufactured by 3M. Large sheets of paper can be adhered to this surface and peeled off without leaving any residue on the back of the. The paper can then be photocopied or scanned for entry into the Knowledge Base.

Knowledge Objects

Pieces of information, usually from outside of the body of knowledge resident in the participants, brought to the attention of the group at the right time to help bring ideas into focus or expand a perception. Knowledge Objects may take the form of articles from magazines or journals, research papers, or databases.

Knowledge Wall

Management Centers have at least one large wall—sometimes up to 50 feet in length, usually the back side of the Radiant Wall—that is covered with a mildly adhesive surface manufactured by 3M. This wall serves as an oversized European-style kiosk. All sorts of information may be posted to the wall. Sometimes portions of the documentation are placed on it. Photographs, color art work, and diagrams are also posted here. Articles from magazines or the Internet are also displayed for participants to browse through. Information is not displayed haphazardly, rather, a layout is thoughtfully designed, making the wall a structured information event.

Knowledge Workers

The individuals who comprise the KreW that supports an event such as a DesignShop. They are responsible for managing the flow of information temporally through the duration of the DesignShop and spatially within the Environment.

Knowledge Worker Sponsor

A Knowledge Worker of at least Journeyman level who is also a Process Facilitator or Facilitator, and whose purpose is to provide an official, facilitative and welcoming link to the work and philosophy of the organization for one or several other Knowledge Workers in the network.

KreW

Another term for the Crew of a DesignShop or other event. The "K" and "W" in the title refer to the abbreviation "KW", or Knowledge Worker. The "re" can take on most any meaning that seems appropriate to the situation.

KWIB

Knowledge Work Information Broker. Each Management Center or KnOwhere store has a KWIB, usually assigned on a rotating basis, to collect, maintain and disburse information concerning events in the center.

Logistics

The KreW facilitates the flow of matter, energy and information through the DesignShop or the Management Center. Logistics focuses on the flow of matter and energy. This includes providing the physical environment, tools, equipment, materials, food. It also calls for the continual refreshing and maintenance of these elements.

Management Center™

Special environment for managing the design and innovation process in the context of expected social-economic change, and for building action plans to accomplish the goals established. By careful facilitation of the elements of environment, information, design and group process, Management Centers decrease the "accident" factor of discovery and synergistic events. Management Centers are "safe" environments in which designers and decision makers can risk exploring and creating new models. Also called "DesignCenters".

Metaphors Exercise

A Breakout Round in which the various teams will compare some "unrelated" system to the situation at hand in a metaphorical way. If the situation concerns a distribution system, a team might be asked to examine how an ant colony manages its distribution system, or how a distribution system might be described in quantum mechanical terms. The purpose is two-fold: (1) to actually learn how other, alien or obscure systems actually manage similar processes, and (2) to see the situation from a radically different vantage point since we know that this is a powerful technique for generating creativity.

Process Facilitator

An individual who facilitates the work of the KreW and the Facilitator during the DesignShop. See roles and duties here.

Production

The subset of the KreW of a DesignShop charged with keeping track of all of the documentation generated by the DesignShop and assembling it into paper and electronic Journals for distribution to the participants, usually within a few days of the end of the event. Journals may be 500 or more pages in length. The new documentation process allows the Journal to be captured in a database for ease of use in an electronic format.

Project Status Map

A project management tool that employs a matrix of projects listed down one side and days or weeks listed across the top. There are two ways to use a project status map: (1) for each sub task within a project, place a tag along the project's line under the date when the sub task is due. Then track the progress of work on each sub task through a system of visual indicators (green for go, red for holding, blue for completed, etc.); (2) if you're tracking a number of identical projects, advance a single tag along each project's line to indicate the status of the project. Project status maps are most appropriate for projects whose scale and complexity tend to make them linear progressions of tasks. If there are many parallel tasks or the duration of the project runs for many quarters or years, an ANDMap or similar project management tool is more appropriate.

Radiant Room

A large space in a Management Center where the participants gather together as one body to hear reports or have synthesis discussions of some sort. The focus of the Radiant Room is a long WorkWall called the Radiant Wall that may be straight, folding or curving depending on the design of the individual center. Some Radiant Walls stretch to over 40 feet in length. The back side of the Radiant Wall is frequently covered with an adhesive material made by 3M to which paper can be adhered and removed many times over. This is called the Knowledge Wall, although you may hear it called the Sticky Wall by old timers in the network.

The term Radiant Wall comes from Isaac Asimov's idea of a Radiant Cube that he introduces in the third volume of his Foundation Trilogy. The cube is a device that holds the plans for the rebirth of an entire galactic civilization, yet sits unobtrusively on a table top. When a Speaker from the Second Foundation focuses his mind on the cube, it projects the plan on the walls of the room. With further mental effort the Speaker can navigate the plan from start to finish, zoom in to more detail or pull out to a more general landscape, and see the record of all the changes that have been made to the plan and all of the contingencies built into it as well.

RDS

Rapid Deployment System. Also called the Transportable Management Center. An entire kit of WorkWalls, Work Stations, Break-out Tables, lighting, computers, network, video cameras, video technical direction equipment, video editing equipment, supplies, library, games and toys sufficient to support a multiple day DesignShop for a group varying from five to one hundred participants and up to thirty or so KreW. The RDS is shipped in trucks and takes a day or two to assemble and tear down depending on the size of the event.

Read Ahead

A collection of materials delivered to participants up to a week or so in advance of a DesignShop. The articles and books chosen for a Read Ahead will serve one of two purposes: provide more information concerning the problem to be created and solved during the DesignShop, and to stretch thinking and introduce new ideas that challenge preconceptions. The Facilitator, Process Facilitator, Sponsor and perhaps one or two KreW members handle the selection, assembly and distribution. Books are ordered through the KnOwhere store.

Report Out

After participants have spent some time in Breakout Teams they are often invited to reassemble as a large group to hear each team report their work. To prepare for this report, the teams are asked to recreate (not copy) their work onto paper covered magnetic Hypertiles (11×17 inches) which will adhere to the porcelain steel WorkWalls. The group reassembles in a large room that usually has a very large, curving WorkWall called the Radiant Wall (some are over 40 feet long). The teams group their Hypertiles on this wall either by team or by some other sorting category, or they place them on the wall as they are being discussed. The tiles can be moved about and drawn around to sort, connect and emphasize ideas.

Rules of Engagement

A list of boundaries that must be set on a DesignShop, session, Management Center or NavCenter in order to secure success. The requirement of having no observers or visitors during a DesignShop is an example (everyone either participates or they are on KreW). Another example is the limitation on the conduct of other business by the participants during the DesignShop (it destroys breakout team integrity and compromises the product to have individuals constantly conducting other business away from the team on the phone).

Scenario Exercise

A module of a DesignShop that is frequently employed to uncover assumptions among the participants regarding how they think about trends, the past and the future. It's usually done in large group on the Radiant Wall. The Radiant Wall is divided horizontally into time frames. Sometimes the Scenario considers the distant past—up to 30,000 years ago, passes through the present (usually the current year plus or minus 5–10 years) and ends sometime in the future. Participants stand before the wall one at a time and state an event they wish to place on the timeline (sometimes further defined by the facilitator's instructions) and perhaps its significance. Then they write that event on the wall under the year it occurred. Then the next participant places their event on the wall. This may continue through all of the participants and through several rounds. The exercise is very flexible in terms of how the wall is laid out, what types of events the participants are asked to place on the wall, and how Sketch Hogs are employed to augment and synthesize the visual display. A good synthesist on the KreW can predict much of the outcome of the DesignShop and the solution to the problem simply by studying a well-executed scenario.

Share-A-Panel

A module of a DesignShop usually preceded by a Take-A-Panel exercise wherein participants assemble into teams and visit each team member's panel—or WorkWall—in succession to hear a report of the work scribed on that panel. After each team member has reported their individual work, the team usually assembles in a Breakout Area to either synthesize what they've heard, or begin work on another exercise. If the total number of participants in a DesignShop is small, they may all participate in the exercise, which is then called a "Walk-About". After each participant has had an opportunity to share their panel, the entire group may assemble for a synthesis discussion or may be divided into Breakout Teams to begin another round of work.

Sketch Hog

Also called a scribe. A KreW member skilled in listening to a conversation or presentation and capturing its essence and significance in illustrated and annotated diagrams on WorkWalls, paper, computer, or in a 3D physical model. Sketch Hogs are called upon to support participants in Breakout Teams to illustrate their ideas, work before the large group during synthesis discussions, create finished art and icons to support the production of the Journal, and to create finished art and diagrams to SUPPORT ANY FOLLOW-ON WORK PRODUCTS.

Sponsor (Client)

(See also DesignShop Sponsor.) An individual or small group who hold primary responsibility or a principal stake in the outcome of a DesignShop, NavCenter, Management Center, or session. Often the sponsor is the champion of the idea which the shop or center is designed to address. The sponsor may also be a manager or executive. Often a sponsor team is assembled made up of representatives from various constituents who comprise the participants in the DesignShop.

Sponsor (Knowledge Worker)

An experienced individual (usually of Journeyman level) who assists and supports another Knowledge Worker through the transition into, through, and out of the ValueWeb™ system. The sponsor is not necessarily a mentor, and is usually chosen my mutual agreement—never assigned. Assigning sponsors would violate the pattern of "Stepping Up" or self-selecting tasks and projects from the work to be done. Sponsors are literally individual transition managers.

Sponsor (NavCenter)

An individual, or most commonly a team who champions the purpose, mission and existence of a NavCenter. Since NavCenters are established to support a particular project or purpose, the Sponsor may also be the project manager. Because a NavCenter represents a way of work which radically departs from the behavior of the rest of the organization, the Sponsor should have a position of authority within the organization as well.

Sponsor Session

Usually a three or four hour session attended by the client sponsor (individual or team), the key facilitator, the process facilitator, and supported by one or more KreW. The purpose of this session is to develop clear objectives for the DesignShop, work on assembling the right participant list, decide on general logistics arrangements, take a first cut at the design of the DesignShop process, and get a general idea of what sort of products should be generated during and after the DesignShop.

Strawdog

Before each DesignShop, the Event Facilitator (Key Facilitator) and/or the Process Facilitator generates a first cut at the design of the event. Sometimes this process is completed formally in a Sponsor Session with the DesignShop Sponsor, the Facilitator and Process Facilitator. These sessions are documented. The Strawdog summarizes the planners' thinking in terms of the purpose of the DesignShop, the desired outcomes and the individual modules that comprise the design. Usually the first half of the shop is outlined in detail; the rest cannot be designed until the shop is underway.

Synergy

In *Synergetics,* R. B. Fuller notes the following with regard to Synergy:

Synergy means behavior of whole systems unpredicted by the behavior of their parts taken separately.

Synergy means behavior of integral, aggregate, whole systems unpredicted by behaviors of any of their components or subassemblies of their components taken separately from the whole.

A stone by itself does not predict its mass interattraction for and by another stone. There is nothing in the separate behavior or in the dimensional or chemical characteristics of any one single metallic or nonmetallic massive entity which by itself suggests that it will not only attract but also be attracted by another neighboring massive entity. The behavior of these two together is unpredicted by either one by itself. There is nothing that a single massive sphere will or can ever do by itself that says it will both exert and yield attractively with a neighboring massive sphere and that it yields progressively; every time the distance between the two is halved, the attraction will be fourfold. This unpredicted, only mutual behavior is synergy. Synergy is the only word in any language having this meaning.

The phenomenon synergy is one of the family of generalized principles that only cooperates amongst the myriad of special-case experiences. Mind alone discerns the complex behavioral relationships to be cooperative between, and not consisting in any one of the myriad of brain-identified special-case experiences.

The words synergy (syn-ergy) and energy (en-ergy) are companions. Energy studies are familiar. Energy relates to differentiating out sub-functions of nature, studying objects isolated out of the whole complex of Universe—for instance, studying soil minerals without consideration of hydraulics or of plant genetics. But synergy represents the integrated behaviors instead of all the differentiated behaviors of nature's galaxy systems and galaxy of galaxies.

Chemists discovered that they had to recognize synergy because they found that every time they tried to isolate one element out of a complex or to separate atoms out, or molecules out, of compounds, the isolated parts and their separate behaviors never explained the associated behaviors at all. It always failed to do so. They had to deal with the wholes in order to be able to discover the group proclivities as well as integral characteristics of parts. The chemists found the Universe already in complex association and working very well. Every time they tried to take it apart or separate it out, the separate parts were physically divested of their associative potentials, so the chemists had to recognize that there were associated behaviors of wholes unpredicted by parts; they found there was an old word for it—synergy.

Because synergy alone explains the eternally regenerative integrity of Universe, because synergy is the only word having its unique meaning, and because decades of querying university audiences around the world have disclosed only a small percentage familiar with the word synergy, we may conclude that society does not understand nature.

In addition, there is a corollary of synergy known as the Principle of the Whole System, which states that the known behaviors of the whole plus the known behaviors of some of the parts may make possible discovery of the presence of other parts and their behaviors, kinetics, structures, and relative dimensionalities.

The known sum of the angles of a triangle plus the known characteristics of three of its six parts (two sides and an included angle or two angles and an included side) make possible evaluating the others. Euler's topology provides for the synergetic evaluation of any visual system of experiences, metaphysical or physical, and Willard Gibbs' phase rule provides synergetic evaluation of any tactile system.

The systematic accounting of the behavior of whole aggregates may disclose discretely predictable angle-and-frequency magnitudes required of some unknown components in respect to certain known component behaviors of the total and known synergetic aggregate. Thus the definitive identifications permitted by the Principle of the Whole System may implement conscious synergetic definition strategies with incisive prediction effectiveness.

Take-A-Panel

A module of a DesignShop wherein the participants take one panel of a WorkWall (about 6' tall by 4' wide) each and compose on it answers to an assignment. The exercise allows all of the participants to be heard, to express their ideas in whatever visual fashion they wish, and have their ideas available to be viewed by other participants and captured by the DesignShop KreW. This exercise is usually succeeded by a Share-A-Panel exercise.

WalkThru

A session during which the DesignShop is designed, including all of the modules, assignments, and team configurations. Day one is rigorously designed, day two a little less so, and day three may be rather sketchy at this point. The Client Sponsors, Facilitators, Process Facilitators and KreW participate in the WalkThru.

WAWD Team

A consortium of knowledge workers, or enterprises of one, who are linked together in a vast value web, and whose expertise, skills, and passions can be focused on helping clients imagine visions and then implement them anywhere on the globe.

Writing Team

A subset of the KreW and Sponsors of a DesignShop charged with crafting the assignments that participants will work on in their Breakout Teams. The term "craft" is key here. Assignments are not composed without considerable thought. When you consider that a single assignment will consume perhaps ⅙ of the duration of a DesignShop and that the reports from such an assignment will steer the entire content and tone of the DesignShop, it's easy to understand their importance.

Work Product

A synthesis or evolutionary product of the DesignShop whose purpose is to either crystallize some concept, detail and illustrate some plan, or take the participants beyond the information of the DesignShop into new realms they may not have considered yet. Its purpose is not to simplify, but to present the complicated and obtuse in a way that is merely very complex—so that it may be understood, but not watered down.

WorkWalls™

Panels of light colored porcelain steel which accept a variety of marking materials such as chalks, dry erase markers, water colors, India ink, pastels, and water based markers. They are used by participants and KreW as a tool to support collaboration. A typical Management Center may have more than 3,000 square feet of this surface available. Large or small groups can illustrate complex issues and detailed plans all within plain view of the entire group, and all easily editable. The amount of information that can be manipulated on these wall systems and the flexibility of erasing or adding to it, dwarfs the capabilities of butcher paper, flip charts, or projection systems. The walls are typically six or more feet high and may be any length. Rolling walls come in lengths from four to sixteen feet in length, some of which are folding. WorkWalls may also be permanently installed within the Environment. The walls are manufactured by Athenaeum International for MG Taylor and distributed by Athenaeum International or through MG Taylor Corporation's chain of KnOwhere stores.

It should be understood that the terms described herein represent, in themselves, a philosophy and pattern language that can be expressed and defined in connection with various Sub-Systems described herein. As noted, many of the foregoing definitions relate principally to the context of Design Shops but the terms can also be used in the context of other systems and processes at other levels of recursion.

BACKGROUND OF THE INVENTION

It is now widely understood that we are in the midst of a global transformation from a manufacturing society to an information based society, i.e. Knowledge economy. As our society makes the transition to a knowledge economy, we must have set in place new ways of working that will be fundamentally different from those we have experienced in the last 100 years. These new ways of working will demand that we view agents (whether individual humans, machines, groups or organizations) as the economy's most important resource and resource creator, the resource that moves and creates information and designs artifacts and solutions. Unlike most natural resources intelligent agents and the knowledge they produce have unlimited potential. Unlike most natural resources these resource are not "lost" when spent and tend to increase in value through use. We have only begun to find ways to effectively tap and nurture this potential for new knowledge. This knowledge will affect everything we do, from tilling the land, to manufacturing vehicles for transportation, to the delivery of education, health and other services. Our investment in intellectual capital and how we organize and manage it will be the key to our society's productivity and growth. Indeed, it may be the key issue in determining if our society can continue to exist at anything near its current level of wealth which is it's present form is created and used by means that are not sustainable over any significant period of time. If we accept and successfully meet the challenge of this window of opportunity, we can experience unprecedented growth and development in the quality of life supported by this society. If we refuse to see the need for this transition, or fail to meet its challenge, we are doomed to decline, not just in power, but in our quality of life.

The nature of the problems that Humankind faces are different than those of prior generations. Problems that are socially significant, offer great opportunity or danger and relate directly to the emerging Knowledge Economy are systemic in nature. These problems do not yield to the kinds of approaches characteristic of simple problems. An example of an systemic problem is a river running through three states, 8 counties and 14 cities. Who owns it, controls it, pollutes it and stewards it? Equally, a systemic problem can be described as a weapon system used by multiple services and countries, deployed globally and employing 40,000 people in it's creation use and support. Systemic problems cannot be solved (without harmful unintended consequences) in a linear fashion from a "parts" perspective using simple tools. Systemic (complex) problems cannot be solved (dissolved) based on definitions formed in a language not able to describe them. Complex solutions cannot be implemented by not adequately adaptive organization transacting business with financial tools that are too cumbersome, based on the structure of a prior economy, ambiguous and lacking sufficient complexity.

The economic shift from an Industrial Economy to a Knowledge Economy has been the subject of a tremendous amount of discussion and commentary in business and political literature. Among other things, it is widely recognized that this Economic Shift creates both opportunities, challenges, problems and paradoxes. What is lacking is a framework for systematically and methodically addressing the paradoxes and problems associated with the Knowledge Economy and the transition to it.

While there is no known system and method for augmenting knowledge commerce, there have been attempts to address discrete Sub-Systems that relate to augmentation of knowledge commerce. Thus, background relating to the principal Sub-Systems of the present invention will now be discussed.

Facilitating Interaction Among Agents

The present inventors have recognized that there are three broad elements that affect the interaction of agents. These may be broadly classified as environment, process and tools (themselves which may considered to be agents). The expression "agent" as used herein refers to individuals, machines, groups of individuals and/or machines, organizations of individuals and/or machines, and other things, such as documents, computer software, and firmware. In addition, agent as used herein is intended to have its broadest meaning. For example, Marvin Minsky in "Society of Mind" defines "agency" as any assembly of parts considered in terms of what it can accomplish as a unit, without regard to what each of its parts does by itself and "agent" as any part or process of the mind that by itself is simple enough to understand—even though the interactions among groups of such agents may produce phenomena that are much harder to understand.

In the latter part of the twentieth century, there have been numerous efforts to facilitate interaction among agents as defined herein, especially in the areas of organizational interaction and, more recently interaction between humans and machines and interaction between machines (e.g., artificial intelligence). In connection with human agents, these efforts have focused on group dynamics and learning. Past approaches tend to focus on a specific element such as environmental factors, process factors or tools. Thus, there are numerous "tools" available to enhance personal or group productivity and a plethora of training and consulting services available. Recent examples include tools such as ergonomic office furniture, personal organizers and new office designs. There are various systems based on management theories such as those set out in "*The Seven Habits of Highly Effective People*" by Stephen R. Covey. For example, numerous training sessions have been conducted based on the "habits" discussed in Covey's book, namely Be Proactive; Begin with the End in Mind; Put First Things First; Think Win/Win; Seek First to Understand, Then to be Understood; Synergize; and Balanced Self-Renewal.

There have been some attempts to offer both tools and services. One example of such a system is The Franklin Covey Company, a joint-venture of Franklin Quest and the Covey Leadership Center. The Franklin Covey Company offers tools, training and consulting services.

While these individual tools and programs vary significantly, they share a common trait—they are narrowly focused on certain aspects that affect interaction among agents or are focused on specific environments or groups of agents.

There has not, to date, been an effort to simultaneously address each of the factors that affect the interaction of agents (e.g., environment, process and tools) in a coordinated and widely applicable way to create an optimal environment for the interaction of agents.

Moreover, to the extent that others have considered "Environment" issues, there has been a focus on the physical environment. There is only limited understanding of the fact that other environments, such as those occurring within a computer, are fundamentally no different from the physical environment. This has become increasingly evident with the advent of object-oriented technologies. Moreover, it is now known that computer environments can exhibit characteristics of the physical environment. For example, there are known computer environments that exhibit evolution, i.e., evolutionary computer models or machines. Nonetheless, there has been no coordinated effort by others to develop a system and process that is adaptable to a broad variety of environments and explore the impact of "environment" in this broad sense.

The narrow focus of others in attempting to address these issues (environment, process and tools) suggests that these elements are independent and affect one another in a linear way. The present inventors have suspected for some time, however, that the interrelationship between each of these elements is non-linear and that it is possible to obtain synergistic effects by simultaneously addressing these elements to create an environment that fosters group genius (i.e., a synergistic outcome that is greater than the sum of the parts).

The present inventors also suspect that synergies can result from a wide variety of multi-agent environments, e.g., environment, process or tools, or other multiple agent synergies such as human-machine interaction. In short, when multiple agents are interacting with one another, there is the possibility of feedback, self adjustment and pattern emergence.

Testing and implementing this insight presented a significant challenge. Demonstrating behavior of complex systems and interactions of agents, or groups or organizations of agents is very difficult if not impossible without real life experience and testing.

Recognizing this, the present inventors have conducted numerous experiments and demonstrations over a period of about twenty years to demonstrate, prove and refine some selected elements of the present invention. These efforts have been concentrated in limited environments. More specifically, the present inventors have conducted experiments to develop certain tools and processes for improving certain aspects of the integrated environment.

As a result of these experiments and the present inventors' experience, certain concepts and system elements have emerged, including tools, elements of environments, environments, agents, and work or tasks. To describe some of the concepts underlying the system and method of the present invention, the inventors have coined certain phrases and have developed a language and grammar system. To assist in the description of the present invention, therefore, the definitions set forth above should be referred to.

In addition, over the past 20 years, the present inventors have developed a visual language consisting of diagrams annotated with labels and glyphs and supported by accompanying text—in short, a visual grammar and symbology to assist Transition Managers in the collaborative design, building and use of Knowledge-based enterprises. The models collectively form a loose grammar and lexicon for people to use when talking about the qualitative dynamics of enterprises undergoing the transition from mechanistic bureaucracies to organic, collaborative networks.

The models have been used in a diagnostic fashion to assist in the practice of limited aspects of applications of the system and process of the present invention by, for example, helping enterprises determine where they are, what's happening and why, and what possible paths may be taken. The models may also be used as templates and design tools for creating collaborative processes.

Although the models can be studied and applied individually, their full power is only unleashed when considered in an interconnected and collective manner. The present inventors have borrowed the subtitle of Hermann Hesse's masterwork Magister Ludi: The Glass Bead Game as a metaphor for describing how to use the models together. Thus, Facilitators and Knowledge Workers play Glass Bead Games by translating current conditions into design solutions by using the models as catalysts and filters.

Even in the experimental application on a limited basis of certain elements of the present invention, modeling language speakers must develop an easy familiarity with the language for it to be of most value. Just like learning a foreign language, at some point they lay aside the dictionaries, grammar books and begin to think in the new language and use the language itself as a vehicle for learning more of it.

The terms that describe the models and their components are purposefully general. Many people begin working through the modeling language with a study of the etymology, or linguistic roots, of the terms. Then, when the terms are linked together within and across models, powerful insights become available.

The models comprise part of an evolving art form that seeks the measure, rhythm and harmony—a synthesis of the features of the complex world of the evolving enterprise. Each model has several features:
a number of components expressed as terms and symbols (glyphs);
a spatial arrangement of these components relative to each other and perhaps to some axis such as time; and
additional connections between the components that indicate flow or dependency.

These language elements, to date, have not been employed on the level of a full Language that is capable of describing, comprehensively, the full range of concerns required by this invention. Practice has been one of diagrams and isolated words used mostly on a notional level. As languages have to evolve, these "words" have evolved as an organic experience of the experiments that have been conducted. Lacking has been a sufficient critical mass of words, as well as, knowledge of the minimal scope of the System and Method necessary for the desired effects to be sufficiently accomplished my one schooled in the art. In addition, words related to logical operations, transactions and some specific terms of art have been missing.

The Language, itself, has not been utilized sufficiently for minimal realization of its intended purpose: a Language artifact competent for describing the interaction of (agent) processes, tools and environments to augment and facilitate synergy among agents of all kinds in a Knowledge Economy.

Experiments have shown, however, that such a Language is possible and necessary for the accomplishment of the present invention and it's intended purpose.

With this background in mind, the experiments and demonstrations that the present inventors have conducted over a period of about twenty years to demonstrate, prove and refine certain elements and limited applications of the present invention may be grouped into several categories. These categories include a Business of Enterprise model that contains all of the clients, the knowledge worker network (past and present), KnOwhere Stores™, client centers and a larger environment of vendors. Specific "products" include DesignShops, Management Centers and NaviCenters™. In the field of management consulting, for example, the present inventors have recognized that the world is going through the largest and most rapid transition in known history. It is the shift from the industrial to the post-industrial or information age. As this a shift occurs, high performance executives and KnowledgeWorkers of all kinds (i.e., transition managers) are grasping the implication of these changes and are taking responsibility for steering them with craft and excellence. Thus, to test the applicability of the present invention to a single environment, the present inventors have developed management centers to research, design, prototype, and market new management systems to empower transition managers.

The information age (Knowledge Economy) will require new capabilities for the creation and application of information and knowledge. These capabilities will result from dramatic expansion in the performance of the intellectual resource—both human and computer-based—available within an organization. Accordingly, the present inventors have designed, developed and delivered tools, processes and environments that facilitate individuals and organizations in their transition to a knowledge-based world.

Moreover, to develop, augment and refine the process of the present invention, the present inventors have conducted a series of DesignShops™. Specifically (and with reference to the definitions set forth herein) the DesignShops, which have been conducted and evolved hundreds of times over the last twenty years, are events whose purpose is to release group genius in the client, condense the time in which a team moves from Scan to Act by an order of magnitude, completely capture and organize all of the information generated, and do all of this in a facilitated way by managing not the people involved, but the Seven Domains that regulate collaboration and evolve ingenuity. The success of these DesignShops is evidenced by both consumer feedback and by the fact that sophisticated public companies are willing and eager to pay large amounts of money to participate in these DesignShops. During the months of July and August, 1998, over 15 DesignShops have been conducted for major organizations in the U.S. and Europe for a market value of over $15,000,000.

For the last twenty years, the present inventors have tested the DesignShop concept hundreds of times with hundreds of organizations and thousands of people. What the DesignShop event has allowed these organizations to do has been to solve their most pressing problems. Groups have used DesignShop events to complete mergers, develop marketing plans, instill new cultures, redesign entire organizations, create shared visions of what is and what can be, resolve seemingly deadlocked union struggles, and design solutions that would have taken months or years of "business as usual" to create, if indeed "business as usual" could have designed a solution at all. An experience of a very different way of working, the DesignShop event proves its value in the results that it produces.

For a DesignShop event, all of the key stakeholders, decision makers and interested parties are brought together so that the decisions that need to be made can be made. During the event, participants rigorously explore their current conditions and their visions of the future, co-design multiple problems associated with the issue being explored, assess the merits of their different problem examples, and decide which problem best represents the issue at hand. Using the power of parallel processing—looking at various issues from different vantage points and synthesizing the results of that examination—participants can deal with the tremendous complexity involved in planning for the future. A large group brings diversity of opinion, knowledge, experience and vantage point, enabling the DesignShop process to release their dynamic group genius. The design of the event follows the SCAN FOCUS ACT process:

During the SCAN phase, the participants confront and process a vast body of information and knowledge. Participants build models of emerging social and economic trends. They establish a common language for the group, identifying terms of art, uncovering assumptions, and discovering the unexpected. A context emerges for the area of focus. Judgment and argument are withheld during this time so that ideas can flow freely. The scan phase is based on the DesignShop axiom, "Creativity is the process of eliminating options." Wise elimination assumes that rich, dynamic, timely options have been explored. The variety of ideas created by thirty, sixty or ninety people multi-tasking allows the participants to design from many different vantage points simultaneously.

In the FOCUS phase, participants use parallel processing to systematically examine the ideas generated during the SCAN phase. The market, financial, cultural, organizational, and social dynamics of the potential paths are explored by modeling and Spoze. Through these exercises, participants set aside prejudices, work through "stretch" models and scenarios as if they were true, then step back and to examine the viability of the different options they have created. Scenarios using convergence possibilities are examined. Participants have said that the FOCUS phase is hundreds of percentage points more productive than a typical meeting day. Each successive round of the iterative process provides more discrimination and clarity to the copdesigns and ideas that the group creates. By the end of FOCUS, participants have a clear vision of the route they will be taking.

During the ACT phase, the ideas and design from the first two phases converge. Throughout the process, ideas have either gained strength and developed or fallen away naturally. The strong components remain, and design ideas turn into programs and projects which are laid out over time. The group reaches a common vision and engineers a comprehensive plan of implementation through group genius. From the rich body of knowledge developed over the previous two days, the group chooses those elements most critical to their organization's particular needs.

In addition, the experience of the past several days becomes the model for a new way of working. As a stand-alone event, the DesignShop can be used to design solutions to tremendous problems. Its greatest value, however, can be found in the pattern of work that the DesignShop process represents. By taking the Ten Step Knowledge Management process with them when they return to their organizations, participants discover that productivity levels of a DesignShop event can be replicated at home.

Whereas the DesignShop has demonstrated certain aspects of the present invention, it's full expression has been hampered by the lack of certain components of the invention, as well as, the non existence of certain Sub-Systems of the present invention. Most notably these have been in the realm of Sub-Systems according to the present invention including Computer and Tool Augmentation (Sub-System 3), Transportation (Sub-System 4), Knowledge Economy components (Sub-System 5) and the full expression of the Modeling Language and related Terms of Art, Pattern language and algorithms. The present expression of the invention brings these elements into harmony allowing the full expression of the DesignShop and related processes in the form of PatchWorks Designs™ and other practices.

Further information concerning the DesignShop process and details of the environments used can be found in the Appendix hereto, which is incorporated herein by reference.

In another example of an application of some of the elements of the present invention to a specific discrete use, the present inventors have also developed and sold management centers that integrate work process design, innovative architecture, technical systems and information management—tools, process and environment. Management centers represent a systematic reinvention of the way people think, decide and work together to accomplish organizational goals. Management centers provide organizations with an enhanced capacity to anticipate, plan, and act. In short, management centers provide Transition Managers with the proper tool to manage what the present inventors have identified as all of the Seven Domains as a total system:

growing and adapting the body of knowledge required to model the internal and external environment and then create appropriate organizational responses;

facilitating the processes of decision making, design, the way work gets done individually or with others in order to release group genius—the genius that provides the enterprise with a competitive and cooperative edge;

creating education systems to help organizations explore beyond their current boundaries of performance and invention, and training systems to set the memes of new performance standards quickly throughout the complexities of the value web;

employing environments that allow individuals and groups to see the whole picture and the details, to collaborate effectively, work individually, and change configuration within a matter of minutes to accommodate the expansion or contraction of ideas, groups, plans and designs;

using technical systems to leverage education systems and more rapidly adapt the body of knowledge to the external business, social, technological and political environment—so much so that truly effective organizations have a greater hand in creating the external environment, and doing so in a responsible, healthy way;

managing projects collaboratively with less waste, more innovation, and an ability to see into the "white space" between activities—the place where unanticipated opportunities are mined and unforeseen disasters averted; and managing the entire value web as a venture, including dozens or thousands of individuals and other organizations into a synergistic whole, each part maintaining its identity and ability to lead sapientially, while contributing to the work of the whole and the other parts. This includes connecting the management centers (and NavCenters as described below) into an extended ValueWeb™ of other centers and resources.

Management Centers were invented to address the specific technological, social and economic conditions and opportunities facing organizations now and in the future. In their broadest terms, these conditions are characterized by a rapid and accelerating rate of change and complexity, and the inability of most organizations to effectively respond to that rate of change through traditional (typically incremental and linear) approaches. To this end, the management centers provide:

the ability to anticipate and track internal and external changes;

the ability to respond quickly and appropriately to new conditions, and thus "turn turbulence into opportunity";

the ability to readily reconfigure internal operations to meet changing demands;

the ability to align members of an organization to address new challenges;

the ability to design new processes and develop the conditions to support high-performance;

the ability to master complexity, and continually be able to discern the critical events and trends in an era of information overload; and the ability for each individual to see the whole as well as the parts, and to apply a systems perspective to their work.

In addition, the present inventors have developed used and sold a specialized form of Management Center known as a NavCenter. NavCenters use combinations of Environments, Processes and Tools (see the Seven Domains model) similar to those found in Management Centers. The difference between Management Centers and NavCenters is the very specific purpose of the NavCenter. While a Management Center is designed to support numerous, large groups doing a variety of work, and NavCenter is designed with a specific purpose in mind. Nested inside a specific company, the NavCenter is the focal point for the entire fulfillment of the company's purpose.

Management and NavCenters, like DesignShops have proven effective tools for Human Agents, but like DesignShops have been hampered by lack of the full expression of the System and Method as described herein. The emerging requirements of the Knowledge Economy demand orders of magnitude increases in human performance—even above that of DesignShop, Management Center and NavCenters which are demonstrated to be at the very top of the present practices of group creativity, group genius, project management and organizational collaboration. It is expected that these processes environments and tools will take a quantum leap in effectiveness and economy with the full expression of the System and Method as described herein.

The four key elements of the NavCenter that serve to realize its purpose are Dialogue, Grok, Align and Act. "Grok", which comes from Robert Heinlein's novel, *Stranger in a Strange Land,* means literally, "to drink". The metaphorical meaning is "to understand, usually in a global sense." In a NavCenter, knowledge is available in ANDMap™, Project Status Map, Time & Task Map, Infolog, WorkWall™, and Knowledge Wall™ systems, and available on the Internet. This information allows any viewer to Grok the whole project and the ways in which the components progress and interact. Each project must be aligned with the purpose of the company and of the NavCenter. As the hub, the NavCenter is the ideal vantage point from which to examine the relationships of the parts to the whole. Alignment does not imply that there will always be agreement—in fact, differences in opinion and vantage points provide the creative tension by which solutions are generated.

In these experiments, the participants are not taught the underlying aspects of the invention, but are rather exposed to discreet embodiments of the process at a high level. This is sufficient to test and prove the process without revealing the underlying concepts or the scalability and applicability of the system and process to other areas. Thus, notwithstanding the public use and testing of these components, the underlying concepts are still not understood within those experiments.

Optimizing Pattern Language Values

The traditional collaborative work space, or office space arrangement used today is a remnant of the 19th Century. It is widely recognized that there are of variety of deficiencies with traditional collaborative work space systems. In part, these problems result from the variety of needs and/or objectives that a collaborative work space must satisfy today. For example, it is desirable to provide knowledge workers with as much work space and as great a variety of work space as possible. On the other hand, there is a desire, for economic reasons, to maximize density (the number of knowledge workers per square foot of office space ). As office space has become more important the desire for density and efficiency has become paramount. It is also recognized that plug and play or modularity of office furniture systems can enhance efficiency. Likewise mobility and user mobility are desirable objectives. These objectives can broadly be termed as addressing human values, that is values related to pragmatic and economic concerns. As used herein the expression "human values" is intended to encompass the range of economic and pragmatic values that are affected by work space design.

From the vantage point of the User, human values include (but are not necessarily limited to):
ABILITY TO CONTROL—light, temp, sound, view, "sense" of isolation or involvement
ADAPTABILITY—minute, hour, day, week month year scales
CONFIGURATION
ADJUSTABILITY TO WORK & USER STYLE
SPACE FOR MULTIPLE TASKS—"open" @ once different tools
INDIVIDUAL & TEAM WORK
PROSPECT
REFUGE
From a manager's vantage point, human values include (but are not necessarily limited to):
USE OF SPACE PER INDIVIDUAL often assumed to require a compromise between economic pressures (less space) and knowledge work requirements (more space).
WIRE MANAGEMENT
  MANY WIRES—Changing all the time
  AVOID PLACEMENT OF WIRES IN BUILT WALLS
  BUILD INTO WORK WALLS, FURNITURE, ARMATURE ELEMENTS.
  PLUG & PLAY—Code Differences
A particularly important concern is ADJUSTABILITY: which involves a variety of objectives, including (but not limited to)
  MINIMIZING "PRIEST HOOD"
  ONLY USER CONFIGURABLE "OFFICE SCALE" FURNITURE
  SYSTEMS
  TRUE ADJUSTABILITY IS NOT "EVERYONE THE SAME SO ANYONE CAN GO ANYWHERE"
  SCALES OF ADJUSTABILITY—Time, Physical, color, texture, movement within personal space within team setups, Building to building Another important concern that is frequently not addressed by standard open space systems is the desire for PLACE OWNERSHIP. To address this concern, one must provide the ability to Customize Individual Spaces to allow work process access and a public/private feel and to Customize Team Spaces. In short, users should be able to "own", customize, keep and evolve their components, including the ability to take components with them (easily) when they move.
COMPLEXITY: Existing Systems inherently lack sufficient complexity to make arrangements that: Achieve density; Achieve individual user require space (and kinds of spaces); Allow full use of foot print (no wasted, single-use spaces); and address: Pattern Languages (Demonstrated values); Armature (Alexander, Ching, Greene, Flun and Brand); Prospect & Refulge (Gallager, Day); Order & Complexity; and Evolution & Adaptation.
  DURABILITY—Modern systems best when new, the materials not repairable, the styles (limited by the system) do not have not intrinsic design—they get old, dated. The present invention is intended to mellow (age gracefully), last for years and be easily fixed & adapted. For example, a standard straight work wall panel can: hang on wall; fold on track or wheels; slide or double hang. Similarly, an individual pod can be one-piece work station, two, three, etc., to complete room (or "s" curve).

Within this universe of concerns, it is widely believed that there are inherent conflicts. For example, the need for greater density, for more knowledge worker space and a greater variety of knowledge worker work space typically believed to directly conflict with the need for greater density. Likewise, the need for greater variety of work space has been viewed as conflicting with the need for greater modularity.

Recently efforts have been focused on the human values concerns. In particular, it has been recognized in the prior art (see U.S. Pat. No. 5,684,469 assigned to Steelcase Inc.) that as modern offices become increasingly complicated and sophisticated the needs of the users for improved utilities support and collaborative work space are increasing. "Utilities," as the term is used, encompass all types of resources that may be used to support or service a worker, such as communications and data used with computers and other types of data processors, electronic displays, etc., electrical power, conditioned water, and physical accommodations, such as lighting, HVAC, security, sound masking, and the like . . . Thus, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will find their place in the workplaces of the future.

One important consequence of the advent of sophisticated electronic offices is the increased need and desirability for distributing utilities throughout the various offices in a manner which can be readily controlled. For example, both personal security and information security are ever-growing concerns in today's office environment, particularly as more and more sensitive business data is being transmitted electronically. Complex video and computer systems have been developed which have a central location from which all workstations in any given grouping and/or building can be continuously monitored, and the security of each associated piece of electronic equipment connected with a communications network can be checked. Related alarms and electronic locking mechanisms are typically integrated into such security systems to provide improved effectiveness. These types of security systems must presently be hard-wired in place in the building and the associated workstations. This serves to increase the cost of the office space, and severely limit its ability to be readily reconfigured.

The efficient use of building floor space is also of great concern, particularly as building costs continue to escalate. Open office plans have been developed to reduce overall office costs, and generally incorporate large, open floor spaces in buildings that are equipped with modular furniture systems which are readily reconfigurable to accommodate the ever-changing needs of a specific user, as well as the divergent requirements of different tenants. One arrangement commonly used for furnishing open plans includes movable partition panels that are detachably interconnected to partition off the open spaces into individual workstations and/or offices. Such partition panels are configured to receive hang-on furniture units, such as worksurfaces, overhead cabinets, shelves, etc., and are generally known in the office furniture industry as "systems furniture." Another arrangement for dividing and/or partitioning open plans involves the use of modular furniture, in which a plurality of differently shaped, complementary freestanding furniture units are positioned in a side-by-side relationship, with upstanding privacy screens available to attach to selected furniture units to create individual, distinct workstations and/or offices. All of these types of modular furniture systems have been widely received due largely to their ability to be readily reconfigured and/or moved to a new site, since they are not part of a permanent leasehold improvement.

To gain increased efficiency in the use of expensive office real estate, attempts are now being made to try to support highly paid knowledge workers with these types of modular furniture systems in open office settings, instead of conventional private offices. However, in order to insure peak efficiency of such knowledge workers, the workstations must be equipped with the various state-of-the-art utilities and facilities discussed above. Since such workstations must be readily reconfigurable to effectively meet the ever-changing needs of the user, the distribution and control of utilities throughout a comprehensive open office plan has emerged as a major challenge to the office furniture industry.

Some types of modular furniture systems, such as selected portable partition panels and freestanding furniture units, can be equipped with an optional electrical powerway, which extends along the entire width of the unit, and has quick-disconnect connectors adjacent opposite ends thereof to connect with adjacent, like powerways, and thereby provide electrical power to an associated furniture group or cluster. Outlet receptacles are provided along each powerway into which electrical appliances can be plugged. Cable troughs or channels are also provided in most such furniture units, so as to form a system of interconnected raceways into which signal and communications wires can be routed. Such cabling is normally routed through the furniture system after the furniture units are installed, and is then hard-wired at each of the desired outlets. While this type of distribution system has proven somewhat effective, the types of utilities provided are rather limited, their distribution is not wholly modular, thereby resulting in higher installation and reconfiguration costs, and there is little or no control for those utilities available, at least on an overall systems level.

The inherent nature of modular furniture systems, which permits them to be readily reconfigured into different arrangements, makes it very difficult to achieve adequate utility distribution and control. To be effective, not only must the furniture units have built-in utility capabilities, but the distribution system should also be able to determine the location of each particular furniture unit within a system of multiple workstations, monitor its utility usage, and then control the same, all at a relatively low cost and readily adaptable fashion, which will function effectively, regardless of where the individual furniture unit is positioned or how it is configured.

So-called "open office plans" typically comprise large, open floor spaces in buildings that are furnished in a manner that is reconfigurable to accommodate the needs of a specific user. Many such open plans includes movable partition panels that are detachably interconnected to partition off the open spaces into individual workstations and/or offices. Such partition panels are configured to receive hang-on furniture units, such as worksurfaces, overhead cabinets, shelves and the like. An alternative arrangement for dividing and/or partitioning open plans includes modular furniture arrangements, in which differently shaped, freestanding furniture units are interconnected in a side-by-side relationship, with upstanding privacy screens attached to at least some of the furniture units to create individual, distinct workstations and/or offices. As recognized in U.S. Pat. No. 5,651,219, these types of conventional workstation arrangements do not optimize human (i.e., economic and pragmatic) design values. For example, conventional designs of these types are not particularly adapted to support workers engaged in group work, such as self-managing teams, or others involved in team problem solving techniques, wherein a relatively large number of workers from different disciplines, such as engineering, design, manufacturing, sales, marketing, purchasing, finance, etc., meet together as a group to define and review issues, and set general policy, and then break out into either smaller sub-groups, or into individual assignments or projects to resolve those specific problems relating to their particular discipline. Group work is steadily gaining importance as a way of improving productivity and time-to-market, thereby emphasizing the need to support such activities more efficiently and effectively.

In addition, built-in offices and conference rooms are typically expensive to construct and maintain, and are not usually considered an efficient use of space in open plan environments. When such conventional rooms are constructed in rented office space, they become permanent leasehold improvements, which must be depreciated over a lengthy time period, and can not be readily moved upon the expiration of the lease. The reconfiguration of such spaces is quite messy, and very disruptive to conducting day-to-day business. Furthermore, with conventional conference room arrangements, breakout meetings among the various sub-groups of workers often prove inconvenient, since the offices of the participant workers are seldom located in close proximity to the conference room.

It is recognized that group problem-solving techniques necessarily involve some degree of interaction between coworkers, thereby creating the need in furnishings for modern office environments to promote the establishment of an optimum balance between worker privacy and worker interaction. Throughout a given workday, an office worker normally oscillates between interaction with others and time spent alone. Each such worker actively seeks out or avoids others based upon their ever changing tasks, objectives, and goals. Furnishings can serve to help these workers better regulate involvement with or isolation from coworkers. For example, fall height offices are known for privacy. Their surrounding walls and door provide privacy by consistently controlling unwanted distractions, but often limit opportunities for spontaneous interaction. On the other hand, open offices precipitate an awareness of coworkers. Furniture and partition based workstations encourage participation by convenient access, but often lack sufficient controls for individual quiet work. Private workspace, and convenient access to coworkers for the completion of work involving group or team efforts are both quite important to the overall success of such collaborative projects.

There have been various attempts to address these pragmatic and economic human concerns. For example U.S. Pat. No. 5,684,469 assigned to Steelcase Inc. proposes a utility distribution system for modular furniture of the type comprising individual furniture units that are juxtaposed to form one or more workstations. A signal conductor is positioned in each furniture unit, and extends generally between opposite sides thereof. Quick-disconnect connectors are provided at the opposite ends of each of the signal conductors, and mate with like quick-disconnect connectors in adjacent furniture units to create a communications network through the workstations. Each furniture unit has a signaler physically associated therewith, which is connected with an associated signal conductor at a coupler. A network controller is operably connected to the network to evaluate the network and/or the associated furniture units. The furniture units may be equipped with one or more utility ports, which are connected with the coupler, and service utility appliances, such as personal computers, telephones, facsimile machines, switches, power outlets, data receptacles, and the like. The utility appliances preferably have memory capability to internally store operating instructions for the same, which are transmitted to the network controller when the utility appliance is initialized.

U.S. Pat. No. 5,675,949 assigned to Steelcase Inc. discloses a utility distribution system is open office plans and other similar settings, that includes a prefabricated floor construction designed to be supported directly on a building floor. The floor construction has a hollow interior which defines at least one raceway to route utility conduits therethrough, and a floor surface on which workstations can be positioned. The utility distribution system also includes at least two utility posts, each of which has a foot which mounts to the floor construction to support the utility posts in a generally upstanding orientation. A utility beam extends generally horizontally between the two utility posts, and is supported thereby. The utility beam has at least one raceway extending longitudinally therealong, with opposite end portions communicating with the utility channels in the utility posts to route utilities therebetween.

U.S. Pat. No. 5,651,219 assigned to Steelcase Inc. describes a workspace module for open plan spaces, and the like, that includes a compact footprint, comprising a free-standing framework supporting a three-sided partition to form an interior workspace and a portal opening for user ingress and egress. A door partition shaped to selectively close the portal opening is movably mounted on the framework. The door partition preferably has an arcuate plan shape, and is positioned adjacent one side of the portal opening, such that shifting the door partition from the fully open position to the fully closed position both increases the amount of the interior space in the workspace module, and alters the plan shape thereof for improved freedom of user movement, while alleviating any sense of user claustrophobia. FIG. 45 of the patent shows a perspective view of an office arrangement that includes a plurality of workspace modules arranged in two clusters, and a furniture positioned in a common area framed by the clusters of workspace modules. FIG. 46 shows a perspective view of an office arrangement including a plurality of workspace modules arranged in two clusters, and a furniture system positioned in a common area framed by the clusters of workspace modules, wherein the furniture system is configured to define two, smaller subgroup workspaces for breakout-type activities. The arrangement of workspace modules 1 shown in FIG. 45, includes tables 142, chairs 143, and mobile displays 144. FIG. 46 shows, a cluster of workspace modules 1 is shown configured in a predetermined arrangement on building floor surface 8, with a unique furniture system 145 positioned in the common workspace 141 to assist in further supporting group work activities. The furniture system 145 includes a plurality of posts or columns 146 which support an overhead framework 147 on the floor surface 8 of the open office space in a freestanding fashion at a predetermined elevation, generally above average user height. A plurality of individual panels 148 are provided, wherein each panel 148 is constructed to permit easy, manual bodily translation of the same by an adult user. A hanger arrangement 149 is associated with overhead framework 147, and cooperates with connectors 150 on panels 148 to detachably suspend panels 148 at various locations along overhead framework 147. Panels 148 are manually reconfigurable between many different arrangements, such as the configurations shown in FIGS. 45 and 46, to support different group work activities. Panels 148 are capable of providing a partitioning function to visually divide at least a portion of the workspace, and/or a display function to facilitate group communications.

U.S. Pat. No. 5,651,219 seeks to provide a compact and dynamic workspace module that is particularly adapted to effectively and efficiently support knowledge workers engaged in group work activities in open plans, and the like. The workspace module is preferably configured such that when the door partition is moved to its fully closed position, the interior workspace expands, the shape changes, and interior walls and appliances are automatically exposed, thereby improving freedom of user movement and user effectiveness, and evoking a sense of roominess and comfort. The workspace module is preferably freestanding, such that it can be easily transported and reconfigured within a given workspace, and may have a knock-down construction which permits the same to be readily disassembled and reassembled at new project locations. The overhead framework may include raceways to equip the workspace module with power, signal, lighting, and other utilities. Communication devices, and other similar office appliances may be built into the interior of the workspace module in a vertically stacked array adjacent one side of the seated user to effectively support the user. A mobile personal storage unit adapts the workspace module to be used by multiple workers, and a mobile worksurface equips the workspace module for both private and conference activities. The workspace module is extremely flexible and dynamic to meet the ever changing needs of various users, is economical to manufacture, capable of a long operating life, and particularly well adapted for the proposed use.

U.S. Pat. No. 5,511,348 assigned to Steelcase Inc. discloses a furniture system particularly adapted to support group activities in open plans. The system includes a plurality of columns supporting an overhead framework on the floor of a building in a freestanding fashion at a predetermined elevation, generally above average user height. A plurality of individual panels are provided, wherein each panel is constructed to permit easy, manual, bodily translation of the same by an adult user. A hanger arrangement is associated with the overhead framework, and cooperates with connectors on the panels to detachably suspend the panels at various locations along the overhead framework. The panels are manually reconfigurable between many different arrangements to efficiently and effectively support different group activities. Preferably, the panels are capable of providing a partitioning function to visually divide at least a portion of the workspace, and/or a display function to facilitate group communications.

While the designs described in these recent patents address some of the human value concerns by providing more efficient systems, they fail to appreciate, much less address, the need to address architectural pattern language values. As a result, the components described are not sufficient to optimize both human and pattern language values. In addition, the emphasis on pragmatic and economic values has led to an emphasis on standardized systems that attempt to achieve maximum efficiency without consideration of other important values such as, high variety, the use of natural materials to achieve true durability, true reconfigurability, architectural armature, prospect and refuge and perhaps most importantly, pattern language values.

Given the emphasis on efficiency and pragmatic and economic concerns, it is not surprising that well known systems that address one or more the previously mentioned objectives do so by sacrificing other objectives.

In particular, conventional furniture systems do not allow optimization of human and pattern language values. With regard to Human Values, the variety of furniture and work space arrangements and configurations does not match the variety needed to solve the problems, i.e., to meet and optimize and (all the pragmatic, human and economic) values. In this way, furniture design limits the range of possible solutions sets and limits the ability to create environments that facilitate collaborative interaction. Moreover, while pattern language values are well documented (see Alexander), most cannot be achieved using conventional "off the shelf" furniture components. Custom design is required. This is very expensive and non-standard and requires a case by case approach.

In addition, there is a continuing need to integrate, preferably in a seamless way, new technologies into the collaborative workspace. Before the advent of the Internet, distributing information to all the interested decision makers was prohibitively expensive. Today, the world wide web is an unparalleled distribution channel, where the cost to provide information to an extra user is essentially zero. This makes massive distribution of corporate data economically feasible for the first time in history, turning every Internet user into a potential customer for data.

With a non-zero demand price, a zero supply marginal cost, and an Internet user base that is growing exponentially, the commercialization of corporate data represents a tremendous business opportunity to the corporations who have the data, and a high value added to the decision makers who need the data. This completely new paradigm is described by some as query tone. This is an analogy to an information revolution of similar proportions which is known today as dial tone. Under query tone, the data warehouse shifts from money sink to profit center, and the average consumer is suddenly able to obtain information previously accessible only to the top management of Global 2000 companies.

Leading companies have proposed a "query tone" enabled world where information flows freely in a frictionless market; a win/win situation where decision makers can obtain all the information they need and corporations can profit from their data warehouses; a society where a person can turn on a computer, and ask any question from any database anywhere, just like today a person can pick up a telephone, and talk to anybody anywhere. Thus the economics and technology are now in place and being continuously improved to allow users to query a wide range of databases to obtain desired information "just in time." The technology preferably allows people to use web browsers to sift through large stores of data. While this technology has wide applicability, there remains a need for an overall process and environment that takes full advantage of "just in time information" and integrates this information into the collaborative work space. Moreover, there remains a need for a system and method for facilitating interaction and transportation of software and other "agents" used to sift through data.

Thus, there remains a need for a comprehensive system and method that provides an optimal solution by addressing each of these of these objectives without sacrificing other objectives.

Thus, there are paradoxes and problems associated with the Knowledge Economy, and the transition to it, that are not addressed by existing systems and methods of work and the tools utilized for conducting commerce.

Integrating/Optimizing Technical Systems to Promote Agent Interaction

Part of the challenge of developing intellectual capital is the need to develop information, communication and thought augmentation systems that can help us (as agents) extend the power of our minds: not only the ability to reason analytically, but the ability to use intuitive processes as well. Ultimately, we need an intelligent partnership among agents (humans, machines, groups, organizations and combinations thereof) that support their work, play, and growth.

This is a radically different concept of "information processing" than the one we find in place today. Existing systems are extremely limited in concept and tend to "automate the 19th Century"—that is, focus on refining processes that were invented in earlier periods and shaped by the limited technology of those times. These "deep" structures limit the utility of the tools even as they become faster and more economical. It is an insight of this invention that tools are not cognitively "neutral" but have embedded process of great value or harm. In the final analysis, this concept demands a synergy between the special capabilities of agents, whether humans, machines, groups, organizations and combinations thereof.

In addition to being structurally based on an old paradigm, existing technical systems are highly fragmented and fail to support agents in a seamless and powerful way. Computer agents are limited to narrow and specialized environments. Human agents have to navigate a plethora of tools and tooling systems and environments in order to perform typical knowledge-based tasks. High level integration of work and the environments of work is not possible. Effective economic agents do not exist on any significant scale. Recent developments in object-oriented programming (and programs like "Java" by Sun Micro Systems), as well as, the development of multimedia and the Internet provide a tooling base upon which a radically different approach is possible. However, the specific conceptual framework, exact configuration of software and the embedded processes mentioned before make this nearly impossible—the critical mass of the industry is moving in another direction.

Transporting Agents and Agent Environment

As indicated above, an important aspect of the present invention is the interaction among the various Sub-Systems. The underlying similarities among these systems make the overall system and process of the present invention widely applicable. There are, naturally, differences among the various agents. One important difference is that, among the different agents discussed herein (including humans, machines, organizations and groups), human agents are the only agent that "times out." To the extent that the human agents are the center of the overall system and process is currently contemplated, this becomes a significant issue.

The human agent or knowledge worker "times out" when he sleeps, engages in recreation or when moving from one location to another. Until very recently, most workers, including knowledge workers, worked in only one location, thus the human agent has been disconnected from the system while engaged in other lifestyle activities (sleeping, recreation) or moving from place to place. With increased use of transportation, the amount of time spent moving from place to place has increased dramatically. Thus, there have been attempts to allow human agents to connect to the system from remote locations. Portable phones, portable pagers and portable computers are examples of such efforts to keep human agents connected. Nonetheless, these systems are, without question, less than perfect in keeping human agents connected with the system.

The system and method for transporting agents and agent environments as an integrated experience is not limited the transport of human agents. To the contrary, the transportation Sub-System of the present invention is scaleable both upward and downward in size to address analogous problems in connection with other forms of agents. Specifically, the system of providing an agent builder, feedback and transportation can be used in the development of "learning systems" and other forms of intelligent agents. An example of a known automated agent system is described in U. S. Pat. No. 5,748,954 issued to Mauldin on May 5, 1998 for a "Method for searching a queued and ranked constructed catalog of files stored on a network."

The Mauldin patent relates to known Internet search engines that use a method of constructing a catalog of files stored on a network comprised of a plurality of interconnected computers each having a plurality of files stored thereon. The method is accomplished by establishing a queue containing at least one address representative of a file stored on one of the interconnected computers, ranking each address in the queue according to the popularity of the file presented by the address, downloading the file corresponding to the address in the queue having the highest ranking, processing the downloaded file to generate certain information about the downloaded file for the catalog, adding to the queue any addresses found in the downloaded file, and determining the popularity of file represented by the addresses in the queue according to how often a file is referenced by a computer other than the computer on that the file is stored.

Because of the vast size of the Internet, specialized types of software agents, referred to as robots, wanderers, or spiders, have been crawling through the Internet and collecting information about what they find. Such robots, however, quickly caused problems. Whenever a robot gained access to a server, the server could be rendered ineffective for its normal purpose while it processed all of the requests for information generated by the robot software. As a result of numerous complaints, guidelines have been developed in that robots perform a search in a manner that avoids a particular server from being seized by the robot. However, such searches often result in particularly relevant files being passed over in favor of much less relevant files.

A second problem is encountered in dealing with the massive amount of information that is uncovered by the robot. Some form of data selection and/or compression is needed to reduce the amount of data retained in the catalog while at the same time maintaining sufficient data to enable the user to make an intelligent choice about the files to be visited. Thus, the need exists for a software robot that can intelligently search through the files of the Internet and for a mechanism for processing the located files for presentation to an end user in a meaningful manner.

Exchanging a Value and Objects that Serve as a Medium of Exchange or a Measure of Value It has long been recognized that direct exchange of items of economic value (e.g., barter) is not always efficient. Thus, there have historically been objects that serve as a measure of value and a system and method for exchanging such objects on a macro economic scale.

The essential ingredients of any economic system or model include the medium of exchange and measure of value as well as the system and method of exchange as well as some system for verifying ownership, enforcing ownership rights and monitoring current value.

All known systems have drawbacks. For example, current systems tend to value those objects that are tangible and easily transferable. But, objects that are tangible and easily transferable are not the only things that have value, nor are they necessarily the most valuable objects. Thus, there remains a need for an improved system and method for exchanging a value and objects that serve as a medium of exchange or a measure of value.

Facilitating Word and Commerce Among Agents in a Knowledge Economy

The true economic value of modern corporations does not lie in the direct assets that appear on their balance sheets, but instead in a wide range of "intangible" assets such as corporate brainpower, organizational knowledge, customer relations, ability to innovate, and employee morale knowledge worker/knowledge base, intellectual property assets, technology base/infrastructure and market position that contribute to an organizations success. As a whole these assets have come to be referred to as "Intellectual Capital."

To provide a common understanding of the components of intellectual capital, we will group the wide range of "intangible" assets into the following broad categories: Knowledge Worker/Knowledge Base, Intellectual Property Assets, Technology Base/Infrastructure and Market Position.

Knowledge Worker Knowledge Base

Knowledge Worker/Knowledge Base refers to the collective know-how, knowledge, expertise, creative capability, leadership, entrepreneurial and managerial skills embodied by the employees of the organization. It may also include the organizational ability to respond to high stress situations. This category also encompasses corporate brainpower, organizational knowledge and ability to innovate.

Intellectual Property

Intellectual Property typically refers to the right to exclude others from things that they would otherwise be free to do. Patents, Trademark rights, Copyright, Semiconductor Topography Rights, and various Design Rights are all examples of intellectual property rights. Intellectual property rights, i.e., the right to exclude, are granted to those who discover new and useful products and processes (patents), to those who create original works involving artistic expression (copyright) and to those who are the first to use a particular name or mark as an indicator of the source or origin of a particular type of goods (trademark). In addition, it is possible to exclude one's employees (and certain persons that have had contact with one's organization) from using know-how and other valuable business information in competition, if one takes steps to protect such assets including know how (by, for example, entering into non-compete agreements with employees). The value of these assets obviously are directly tied to the value of the asset protected.

Technology Base/Infrastructure Assets

Technology Base/Infrastructure assets are those technologies, methodologies and processes that enable the organization to function. Examples include methodologies for assessing risk, methods of managing a sales force, databases of information on the market or customers, communication systems such as e-mail and teleconferencing systems. Basically the elements that make up the way the organization works.

Market Position (increasing returns)

Being a market leader either by having a product that is the industry standard or by offering exceptional customer service has a demonstrable value. Market position may affect the potential an organization. Various proposals have been put forth for measuring one's market position (not just market share). Examples include repeat business percentage, value associated with goodwill such as branding, market dominance due to the market strategy, including positioning strategies that have commercial value. Customer relations, employee morale and market position are all closely related within this category.

Together the assets grouped in these broad categories make up what has come to be referred to as the Intellectual Capital of an organization.

Yet another consequence of the shift to an information based society is the recognition that intellectual capital, however one defines it, will be critically important to all types of organizations.

Though intellectual capital has only recently received attention, some forms of intellectual capital, such as "know-how," have always been critically important to organizations. Even a traditional resource and equipment dependent organization like a coal mine relies to a considerable extent on the "know-how" of its workers. Similarly, throughout industry the value of a production line, chemical plant or other means of production is how it works, not the metal and fasteners. Thus, even in a manufacturing society intellectual capital is hidden within virtually all organizations.

But, in the past, intellectual capital has been overshadowed by more tangible and scarce assets such as plant, equipment and access to limited resources: the essential requirements for manufacturing society businesses. Nonetheless, to produce a product organizations have traditionally had to have "hard assets"—land, factories resources that were all limited in availability i.e., scarce. Thus, wealth depended on scarcity.

The difference in today's economy is that Intellectual Capital is playing a bigger, perhaps paramount role, in the economy. The creation of wealth no longer depends on scarcity. The economic shift that we are currently witnessing may, therefore, be even more fundamental than currently understood: a shift from a resource based economy to a knowledge based economy.

For whatever reason, it is increasingly apparent that Intellectual Capital can no longer be ignored. To date, most energy has been devoted to a search for ways to identify and quantify "hidden" intellectual capital assets which occur or are found to exist in "successful" organizations, because it is recognized that the global economy is becoming increasingly distorted for want of an effective way to identify and measure these assets. Little attention is given to the creation, nurturing and management of intellectual capital in a systematic way.

Lost in the obsession with quantifying what already exists is the fundamental question of how Intellectual Capital is created?

The conventional view is that intellectual capital is something found to exist or something that evolves or occurs spontaneously in successful organizations. Thus, the current discussion focuses on issues such as how to protect intellectual capital, how to show it on balance sheets etc.

There is currently little if any attention given to how to create intellectual capital. Is intellectual capital really something that just happens or is there a systematic approach to creating intellectual capital in a way that enhances its value and protectibility and therefore brings greater wealth to the organization.

SUMMARY OF THE INVENTION

The present invention broadly relates to a system and method for addressing the paradoxes and problems associated with the Knowledge Economy, and the transition to it. The system and method of the present invention create a unified experience of work that scales from individual thought processes to the building and using of a Global system of commerce. The system and method of the present invention integrate, into a single method, a myriad of now unintegrated tools and processes that are conducted across contradictory and non-collaborative environments.

The system and method of the present invention provides a way-of-working that unifies the value of AGENTS of all kinds: Human, machine, environmental and a wide array of tools, infrastructure elements and methods of information storage and commerce.

The scope of this invention relates to the facilitation and augmentation of physical, mental and virtual Agents on multiple levels of recursion ranging from neural nets, bits of computer code, to human thoughts, humans, tools, tool kits, environments, organizations, networks and organizations of networks of a Global scale.

It is a basis of this invention that all things (and "no"-things) can be seen and treated in the language of Object-Oriented "code" that establishes a family of relationships and rules that govern the interactions of the Agents. Further, that complex, emergent "life-like" systems involve the interaction of multiple Agents through multiple iterations and on multiple levels of recursion; that complex behavior emerges as the consequence of iteration, recursion, feedback, critical mass and the specific "genetic code" (rules, algorithms) that govern the interactions.

Complex behavior of complex systems is not predictable nor controllable in the common sense of these words. This gives rise to many problems in the realm of Human actions in complex creative relationships and economies. Prior to the present invention there has been no method and system for describing, creating and acting upon Agents in such a way that desired results can be accomplished in a reliable manner without destroying the phenomena of "group genius" and emergence thus degrading the result to a simple-solution that lacks adequate requisite variety with the situation in focus. In other words, the limits of the methods available, themselves, set the scope of the "solution-sets" available that are increasingly becoming categorically and systematically non-viable.

As Humans struggle with the emerging complexity, time compression, the global nature and virtuality of the so called "Knowledge Economy," these limits of applying essentially linear, sequential, "simple" methods to ever more complex situations becomes creates conditions that are increasingly unstable and dangerous.

There are myriad conditions that have to be understood, organized and acted upon to succeed in the realms covered by this invention; however, prior to this invention, there exists no unifying language, system and method of work to do so. In the realms of Human work processes, environments and tooling which facilitate creativity, as one example, many different languages are employed to "describe" phenomena and direct action. This "Tower of Babel" exists among the fields related to these realms—on the level of recursion related to humans—and, almost totally fails to describe, recognize and provide necessary structure "below" (neural nets, computer codes, tool kits) and "above" (environments, systems, organizations, networks, ecologies) thus making unified, systemic action impossible. This web of phenomena is seen and treated as different, unrelated and often contradictory (the perceived conflict between human economies and natural ecology, as example). This drives immense confusion, poor utilization of resources and an emergent behavior of increasing instability in complex systems such as human collaboration, large organizations, global networks and economies.

It is a significant insight of the present invention that a system and method is required to "see" and treat (act upon) a broad bandwidth of this phenomena in an unified way that:
1) Provides a language (Descriptive, Technical, Pattern Language, Modeling Language, Algorithm, Deep Language) that describes the necessary phenomena, from the levels of neural nets to global economies, as essentially similar and reoccurring, rule based processes that can be treated in consistent, concurrent engineering terms (in other words, the similarities between the complex phenomena can be described);
2) Provides the ability to create environments (made up of processes, environments and tools—which can be also treated as Agents—so that Agents (on the levels of recursion from computer code to networks) can be augmented, facilitated and "acted upon" in such a way as to systematically promote interaction, collaboration, synergy, leading to desired emergent behavior;
3) Provides the processes and rules of interaction so that the proper facilitation of interaction among Agents (of many kinds) is accomplished; so that collaborative environments for these Agents are created; so that tools and a system of tools necessary for Agent interaction and synergy is provided; so that the transportation of Agents (without "down time") and allowing sophisticated interactions (in transit and "parking") is made possible; so that Agents can create and trade value (and form custom economies), and so that, a system and method of work and commerce is made consistent with the realities and conditions of an emergent, global Knowledge Economy;
4) Provides the net result of Human collaboration and "group genius" (with orders of magnitude greater productivity and reduction of time and effort—therefor cost) able to remain requisite with the complexity that humans themselves are creating while being able to better integrate human actions with other natural phenomena.

The insight of the present invention is that "structure wins" and that the factors limiting the present economy are intrinsic, structural and technical. It is not simply a matter of Human imagination, level of effort or good will. To appropriately effect a complex system one must act upon the system as a system. To do this the Law of Requisite Variety (Asby, Beer) must be met. Existing processes, tools and environments do not allow this.

Many aspects of the present system-in-place are contrary to the precepts and necessary conditions for the emergence of a true Knowledge Economy. This is a "technical" problem and the languages, methods and tools of the present economy, as expressed in business, economics, politics and social theory cannot address the necessary levels of "action" that are required. The technical system of communication, banking and legal structures further impede growth and transition. The Industrial Economy cannot evolve into a Knowledge Economy—there are too many systems-in-place that cannot be removed without causing premature failure on the existing order. This would have disastrous results. However, the emerging elements of the new economy are driving unprecedented growth and complexity that can "blow up " the present system's ability to respond. Many "solutions" actually increase complexity further thus increasing the rate of decline of the system that was "fixed."

A new system has to be put in place that can exist in parallel with the old while augmenting the Industrial Economy and replacing it over time. The present invention, therefore, composes a whole system that can emerge, incrementally, augment the existing order but, ultimately, creating a system with orders of magnitude more flexibility and capability of processing complexity.

The interaction and integration of the Sub-Systems described herein is a particularly significant aspect of the present invention. For example, a process on one level of a Sub-System can turn out to be a specialized process of what is another Sub-System. Moreover, a step in a process of one Sub System can turn out to be the same step in the process of another Sub System. This, of course, demonstrates the principles of Recursion and Iteration.

In a broader sense, the interaction and integration of the Sub-Systems and the recursive and iterative aspects of the system and Sub-Systems relate to the issue of intelligence itself. The system and its Sub-Systems are a kit of "tools" or "components" required to making networks and "non-living" systems intelligent. In this sense, the present invention is a system that contains processes that are related to the construction of any "thinking" system and are likely to merge on the level of a PC or in the network itself.

An example of this is that an Agent on the level of an JAVA Applet is seen to be no different than a human Agent in a DesignShop or a KnOwhere Store (as an) Agent in a NetWork. All of these agents act by rules and can be facilitated, for example, as described in Sub System of the present invention pertaining to facilitation of agents. The present inventors have found that it is the similarities among these agents that are critically important. All these exhibit many of the same behaviors and a mind/brain neural Agent as described by Minsky. In contrast, differences are species specific and thus less relevant to the overall system and process of the present invention.

The vantage point of similarities among vastly "different" agents then offers a new perspective for considering the question of what makes "intelligence" or "life". Iteration, Recursion and "Critical Mass" and "Entrainment" and Feedback may well be the principal Agents of what we commonly refer to as Intelligence and self awareness. (see: "Programming and Meta Programming in the Human Bio Computer"—Lilly—and "The Emergence of Consciousness in the Bicameral Mind"—Janes). Naturally it takes the materials of a real species to make a living thing and, naturally, these materials will interact according to their own rules—but this is immaterial to what makes life. "Life" can be breathed into anything if certain aspects and patterns exist. Thus, in addition to iteration and recursion critical mass and entrainment are the foundations here for truly intelligent systems that are, at least life-like—it not capable of evolving into real living systems (Gaia Hypothesis—Lovelock).

In particular, the system of the present invention includes a plurality of real agents each real agent having a plurality of characteristics. Agents are used in the sense previously defined.

The system further includes means for creating virtual agents to represent real agents in the system, each of the agents containing data corresponding to some characteristic of the real agent represented. This means can be a computer capable of copying computer code to replicate another agent or biochemical replicators or humans creating copies of agents. Humans, teams, groups and organizations can create models.

The system further includes means for allowing at least some of the agents to control the degree to which data corresponding to characteristics is revealed to other agents. Humans and agents at higher levels of recursion (teams, groups organizations etc.) plainly have this capability and computers can be programmed to create software agents (e.g., objects or applets) that reveal more or less data to other agents. This feature can also be achieve through known biochemical techniques.

The system further includes means for allowing agents to control other agents, including themselves. Humans and other agents operating at higher levels of recursion typically can control themselves and agents at lower levels of recursion, including tools. Human agents and agents operating at higher levels of recursion can, but do not necessarily have control, over agents at their own level of recursion. Computers can be used to create software agents (e.g., objects or applets) that control other software objects.

The system further includes means for at least some of the virtual agents having an access/use characteristic that allows access or use only to agents having access privilege corresponding to the agent. Computers can be used to create software agents (e.g., objects or applets) that have an access/use characteristic. There are also known biochemical techniques for controlling access. At the human level and higher levels of recursion, there are numerous was of controlling access, including, without limitation, password protection, locks and biometrics tools.

The system further includes means for allowing the agents to posses access or use privileges with respect to access or use of other agents. Computers can assign or grant privileges to software agents (e.g., objects or applets). There are also known biochemical techniques for granting access to certain agents, but not others. At the human level and higher levels of recursion, there are numerous ways of gaining access, including, without limitation, keys passwords, locks and biometrics characteristics.

The system also includes means for allowing agents to control what is revealed by those agents that they control. Computers can limit the degree to which software agents (e.g., objects or applets) communicate with one another. There are also known biochemical techniques for determining certain characteristics of other agents, but not others. At the human level and higher levels of recursion, there are numerous ways of limiting disclosure.

The system also includes means for allowing agents to modify the agents that they control. This means can be a computer capable of altering computer code to modify another agent or biochemical replicators or humans creating copies of agents. Humans, teams, groups and organizations can modify models and lower level agents and some agents at or above their own level of recursion.

The system also includes means for allowing agents to replicate other agents to the extent the characteristics of the other agents are revealed. Again, this means can be a computer capable of copying computer code to replicate another agent or biochemical replicators or humans creating copies of agents. Humans, teams, groups and organizations can create models and other agents through copying what they observe.

The system also includes means for measuring actual performance of agents. Any known measurement means can be used. The measurement may be objective, e.g., a quantity or measured value or the measurement may be subjective, e.g., "good" or "bad."

The system also includes means for inputting expected performance of agents. The means for inputting may be a human to computer data interface, communication between software objects, biochemical communication, a statement of goals and objectives.

The system also includes means for comparing actual performance of agents to expected performance of agents The comparison may be objective, e.g., a difference between a desired and actual quantity or measured value or the comparison may be subjective, e.g., "goals met" or "objectives achieved."

The system also includes means for modifying agents based on the difference between actual performance of agents and expected performance of agents. Again, this means can be a computer capable of copying computer code to modify another agent or biochemical agents or humans altering of agents. Humans, teams, groups and organizations can modify models and other agents through altering the composition of the agent components, e.g., the members of a team or the objects used in an "electronic" environment.

The system also includes means for allowing communication between agents limited to what the agents reveal about themselves. There are myriad forms of agent communication from direct human to human communication to biochemical reaction to electronic communication to communication through networked computers. Any know means of communication may be used.

The system also includes means for determining the location of agents within the system. Again, any known means may be used. Computers can track and keep records of the location of objects in the system or software objects can be programmed to report their own location. With human agents and tools, GPS is an effective way of communicating an agents location to an electronic agent. Any of the senses smell, sound, visual touch can be used to determine location, however.

The system also includes means for determining the health, status or condition of agents within the system. Any known means may be used for this purpose. At lower levels of recursion direct measurement is possible with tools or systems. At higher levels of recursion health, status or condition can be sensed or monitored electronically or determined through inspection by other agents.

The system also includes means for determining the value that other agents places on access, control, use or communication of another agent and report. The means employed can be any form of market (live or virtual), an auction, an electronic or textual reference table, e.g., "the Blue Book," a physical characteristic, e.g., "attraction" or actuarial tables and statistical analyses.

The present invention also contemplates a variety of methods for optimizing interaction among agents that include various combinations of the following steps: creating virtual agents to represent real agents in the system, each of the agents containing data corresponding to some physical characteristic of the real agent represented; at least some of the agents can control the degree to which data corresponding to physical characteristics is revealed to other agents; allowing agents to control other agents, including themselves; at least some of the virtual agents having an access/use characteristic that allows access or use only to agents having access privilege corresponding to the agent; allowing the agents to posses access or use privileges with respect to access or use of other agents; allowing agents to control what is revealed by those agents that they control; allowing agents to modify the agents that they control; allowing agents to replicate other agents to the extent the characteristics of the other agents are revealed; measuring actual performance of agents; inputting expected performance of agents; comparing actual performance of agents to expected performance of agents; modifying agents based on the difference between actual performance of agents and expected performance of agents; allowing communication between agents limited to what the agents reveal about themselves; determining the location of agents within the system; determining the health, status or condition of agents within the system; determining the value that other agents places on access, control, use or communication of another agent and report.

For ease of understanding, the system of the present invention will be described as including six discrete Sub-Systems. The six Sub-Systems of the present invention are linked, connected and integrated in myriad ways at many levels of recursion. The six Sub-Systems of the present invention may be summarized as follows:

1. System and Method for Facilitating Interaction among Agents—Promoting Feedback, Learning and Emergent Group Genius in a Radically Compressed Time Period The system and method for facilitating communication and other interaction among agents (humans, machines, groups, organizations and combinations thereof) provides feedback, learning and self-adjustment among the individual agents thereby creating an environment for interaction (consisting of environment, tools and processes) that facilitates emergent group genius in a radically compressed time period.

The experiments and demonstrations that the present inventors have undertaken have demonstrated that the inter-relationship between environment, process and tools is, as suspected, non-linear and that it is possible to obtain synergistic effects by simultaneously addressing these elements to create an environment that fosters group genius (i.e., a synergistic outcome that is greater than the sum of the parts). In particular, the inventor's past experience has confirmed the usefulness and demonstrated the possibility of the system and process for facilitating communication and other interaction among agents (humans, machines, groups, organizations and combinations thereof, documents, software, hardware, and computers) so as to provide feedback, learning and self-adjustment among the individual agents thereby creating an environment for interaction (consisting of environment, tools and processes) that facilitates emergent group genius in a radically compressed time period.

Thus, where the experiments and demonstrations conducted to date have empirically shown that certain elements of the invention can be applied by highly trained individuals to discrete environments, there remains a need for an automated, widely applicable and easily scaleable system and method for applying the inventor's insights.

The present invention has been developed through the process, demonstrations and refinement described previously. Specifically, the present inventors have developed an integrated process that is self-adjusting, provides feedback, and is emergent. Moreover, by demonstrating the scalability and applicability of this process in a variety of situations, the inventors have demonstrated that this process can be applied to a wide variety of applications involving the interaction of agents (e.g., people, computers, groups, organizations).

It is an object of the present invention to use the inventors' insights and the empirical evidence and experience gained through the experiments and demonstrations described above to develop a system and method which, among other things, facilitates and automates application of the invention to specific environments and widely applicable embodiments.

In general, the system and process of the present invention address environment, process and tools in a way that creates an improved environment for group interaction. At the highest level, these areas are each addressed through description, explanation and specific physical examples. At a deeper level, the elements are addressed through high-level manuals written in a language that can be understood by the agents. At a still deeper level, the essential concepts involved can be described in models and/or glyphs. The glyphs are original artistic expressions of concepts relating to group dynamics. Collectively, the glyphs, when used in connection with a grammar system, constitute a separate language somewhat analogous to a fourth-generation language. At a still deeper level, the present invention makes use of a series of rules or algorithms that effect an environment, process and tools.

As mentioned above, the inventors have developed a language and grammar system to describe some of the concepts underlying the system and method of the present invention. This language and grammar are reflective of elements of tools and other aspects of the invention and are thus critical to a full understanding of the method and system. To this end, the following brief definitions are set forth (further elaboration and explanation can be found in the detailed description below):

Ten Step Knowledge Management: The engine for processing information from events through a knowledge base, into distribution, into design, and on to subsequent events.

Scan-Focus-Act: A basic representation of the creative process in three stages (plus a feedback element).

Business of Enterprise: The network-based architecture for linking the functions of production, investment, consumption and management in the Knowledge-based enterprise.

Stages of an Enterprise: The Lifecycle of the enterprise including special situations such as overshoot and collapse, turnaround, the entrepreneurial button.

5 E's of Education: The necessary and sufficient components of a complete educational package.

Vantage Points: Seven shells of context from philosophy to task that must be in place for enterprises to maintain homeostasis.

Seven Domains: The seven areas that are managed in every enterprise and every activity of the enterprise. When managed properly they ensure corporate health and allow Knowledge-based organizations to grow and profit.

Seven Stages of the Creative Process: The most complex of the creativity models developed by the present inventors, this model explains how problems are created and then solved in a process that is recursive, fractal, cyclic and nonlinear in character.

'Spoze: The 'Spoze model holds the secret for allowing systems to evolve in rapidly changing environments and yet maintain their own homeostasis and identity. Enterprises use 'Spoze to innovate without having to grab on to every new idea that passes by.

Appropriate Response: Every stage of the Creative Process involves producing a result. Superior results can be obtained by filtering or testing competing designs through the six elements of this model.

Three Cat: We all build mental concepts of how things work by observing reality. But to cement the learning, we must build models that exemplify our concept and test these models against what we observe to confirm our understanding.

Design Build Use: The unfolding of a project or creation over time is an interactive, iterative game between the designer, builder and user. However, when we make the process linear, discrete and focused on being "finished", the outcome is a nonliving one.

Creating the Problem: This model explores the relationship between vision and condition that creates the "problem." It continues with a description of the tug and pull of creative tension that brings the vision and conditions together to create a new condition.

The Learning Path: Five Points of Mastery: Instead of the three traditional roles of education (student, teacher, administrator), we present five: the learner, the sponsor, the expert, the facilitator, and the steward. In high performance environments each individual moves from role to role sometimes in rapid succession and sometimes in cycles that span years.

The Four Step Recreative Process: The creative process has many facets and can be understood and practiced from many different vantage points. The Four Step model emphasizes the activity of recreation between each stage of the creative process and shows this recreation as a wave and a particle phenomenon-linear and non-linear approaches.

Each of these essential concepts can be described in models and/or glyphs. The glyphs are original artistic expressions of concepts relating to group dynamics. Collectively, the glyphs, when used in connection with a grammar system, constitute a separate language somewhat analogous to a fourth-generation language. The use of glyphs in the modeling language has several intents:

To convey some additional, deeper sense of each component of a model. This is done by researching the etymology of the word and searching for symbols that support certain meanings that we wish to emphasize. For example, the $5^{th}$ E of Education is EXPLORE. The root of the word means "to search out; cry out aloud." The symbol chosen to represent EXPLORE is an open fan. The fan represents imagination, air and wind. You can envision the fan as a sail of the mind with the human spirit filling it with wind, and the imagination crying aloud for new vistas.

To add a measure of play, fun and interest to the modeling language.

In sum, the present invention provides a system and method that is self-addressing and self-correcting and results in an emergent system, that can be applied to a large variety of situations involving interaction between agents. In this way, the present invention facilitates interaction between agents to promote feedback and self-adjustment to obtain synergy.

The individual experiments and simulations that applicants have conducted over the past two decades have demonstrated that the concept works in a wide variety of contexts and is not restricted or limited to only a single environment. Based on these experiments, therefore, it is reasonable to assume that the present invention can be applied to a wide variety of enterprises to promote group genius and synergy.

To achieve the stated and other objects of the present invention, as embodied and described below, the invention includes a method for fostering creativity comprising the steps of identifying a number of agents and selecting a subset of these agents based on certain determined criteria and other methods. An environment for creative interaction is prepared, and the agents selected are placed within this environment. Work is then performed on these agents in order to develop a result. The result is then evaluated, which produces a first new agent. This first new agent produced is then tested.

Further, the first new agent may be added as an agent to the existing environment, added as an element of the environment, or added as additional work to be performed in the environment by the agents, and the process of the present invention is then repeated with this new element to produce a second new agent.

In addition, the first new agent may be added to an external environment, wherein the first new agent is altered and may return or produce a third new agent for return, in which case, the altered first new agent or the third new agent is added as an agent to the existing environment, added as an element of the environment, or added as additional work to be performed in the environment by the agents, and the process of the present invention is then repeated with this new element to produce another new agent.

The method is consistently repeated until a pattern appears. This pattern can be readily identified and discussed using the specific language developed by the present inventors.

The system and process of the present invention will now be described in connection with the attached drawings.

2. System and Method for Optimizing Agent Pattern Language Values in Collaborative Environments The system and method for optimizing a collaborative work space both in terms of human, (i.e., pragmatic and economic) values and architectural pattern language values provides optimum collaborative work spaces that offer high density, total media integration, greater individual control, larger work spaces, adjustability, reconfigurability and improved pattern language values. The system also includes to a system for design and facility management of such collaborative work spaces and for furniture components for use therein.

The system and method for optimizing a collaborative work space is used in connection with the system and method for facilitating communication and other interaction among agents (humans, machines, groups, organizations and combinations thereof) so as to provide feedback, learning and self-adjustment among the individual agents thereby creating an environment for interaction (consisting of environment, tools and processes) that facilitates emergent group genius in a radically compressed time period.

The present invention provides a system and components for the system to make it possible to optimize the design of a collaborative work space both in terms of human, pragmatic and economic values as well as pattern language values. In part, the present invention results from the present inventors' recognition that systems constructed using linear arrangements of rectangularly-based components are a source of the problem. The variety of objectives that one would ideally like to achieve in a collaborative work space cannot be achieved through the use of known components. An array of new components is required. Thus, the present invention provides a series of components and a system for using these components in combination to achieve results that have not heretofore been obtainable.

In contrast to conventional collaborative environments that do not address the entire range of basic human requirements (they require compromise and tradeoff), there is no need to compromise with the system of the present invention. The present invention provides collaborative work spaces, high density, greater individual control, larger work spaces, adjustability and reconfigurability, addresses pattern language values and provides computer-augmented design and facility management.

The present invention also provides a system for facilitating design and management of collaborative work spaces. The system is based on the recognition that a collaborative work environment is a collection of objects and that the system has rules. Thus, the system of the present invention knows the cost of certain objects, knows the architectural rules, knows the architectural values and knows the rules of pattern language. This is achieved through the use of values stored in memory tables or the like. Moreover, the system can adjust the relative values of things such as architectural values based on a customer's or client's objectives. The system includes means, preferably electronic display monitors, for displaying environmental layout and means, such as icons, for graphically representing objects within the environment. The user can "pick up" and place the objects in desired locations within the environment. The system knows the cost of the objects selected, the architectural rules concerning its placement, the architectural values associated with particular objects in the rules of pattern language. In addition, the system can provide the total cost as well as architectural values score or in the pattern language score, on a real time basis.

In accordance with a further embodiment of the invention, the system of the present invention can be used to manage the environment. In particular, the system can be designed so that the individual system knows what objects are in the environment and where those objects are (how the environment is configured). This can be achieved in a variety of ways such as by placing chips in each of the objects or placing sensors within the environment. In this way, the system can monitor an environment once in place and send a warning, if, for example, an object is moved into a place that is architecturally unacceptable (e.g., an object is moved to place where it blocks the door). Thus, in summary, the system facilitates both design and placement of furniture in office, home and other environments and also monitors the environment once in place. This is done through a system, which can be a central computer and/or plurality of individual objects networked, so long as the system knows what the objects are and what they can do, the rules applicable to the environment and the objects and where the objects are and how they are configured. Thus, the system knows its environment, knows what objects are in its environment and what the rules applicable to that environment are.

The present invention also relates to various furniture components that make it possible to optimize human and architectural pattern language values in a collaborative work environment. In general, a collaborative work environment may be thought of as including various levels of components. In connection with the component described in this application, the components may be grouped in the following levels (from lowest to highest):
I. SUB-COMPONENTS: including, for example, secretaries, file cabinets, pigeon holes and shelves
II. PIECES: including, for example, dogs (work units), wings, tables, kiosks
III. SYSTEMS including, for example, CubeOffice™, WorkPod™, Octopus™ (inside air moving units/lighting)
IV. WORK WALLS™ including, for example, fixed walls, rolling walls, sliding walls, folding walls, and dbl. hung walls.
V. ARMATURE including, for example, beams, trellises, chases, path edges and bases.

At the highest levels (aside from cities and regions themselves), the environment also includes buildings and the rooms within the buildings. The present invention, however, relates primarily to components below these as listed above. These components are described in the figures attached hereto and in the appendices hereto.

One of the principal advantages of the system of the present invention is that the components are provided (as shown in the drawings and appendices) that allow optimization of Pattern Language values. Although certain pattern language values have been used extensively in custom designs by architects such as Wright, there has to date been no way to address most of the pattern language values catalogued by Alexander in practical way with conventional off the shelf furniture, much less furniture that also addresses human values such as economic efficiency, mobility adjustability and the like. Thus, a remarkable aspect of the system of the present invention is that components allow one to address at least 100 of the 253 pattern language values catalogued by Alexander. Further information concerning these pattern language values may be gleaned from "*A Pattern Language*" Christopher Alexander 1977.

Another important aspect of a collaborative environment is access to information. At one level this need can be addressed by providing various printed materials throughout the work space. The furniture components of the present invention are well-suited for this purpose in that they include a variety of shelf space, work surfaces and display surfaces. The work space should, however, also include access to electronic databases including the Internet and data warehouses. To facilitate such access, the environments of the present invention preferably include display monitors throughout the space and furniture components are designed to movably support such monitors. In addition, the furniture components and armature elements are designed to conceal or guide cables and wires connected to electronic components. This collection of components and their arrangement within the environments (as shown in the drawings and appendices) are able to provide total seamless media integration within the environment. In addition, the system is highly scaleable and adaptable to new technologies that are now widely available or likely to become widely available in the next few years, including large scale electronic work walls, electronic assistants, electronic displays, real time video conferencing, intelligent agents and data is warehouses. Collectively, these components provide an environment in which information can be made available as needed, i.e., "just in time information," and remote collaboration is seamless.

Thus, the system and method of the present invention provide an ideal environment for the integration of "query tone" technology in which information flows freely as needed in a frictionless market so that decision makers can obtain all the information they need when needed from data warehouses. Specifically, the environment includes a complete range of fully integrated media sources and displays so that, for example, a knowledge worker can turn on a computer (workstation, network computer, lap top, PDA or intelligent assistant), and ask any question from any database anywhere, in the same way that a knowledge worker today can pick up a telephone, and talk to anybody anywhere. The present invention provides the overall process and environment to take full advantage of "just in time information" and integrate this information into the collaborative work space. Of course, the present invention also contemplates a software agent transportation system that would improve the ability to extract relevant data from databases.

Thus, the present invention provides several functional advantages over known systems. To begin with, the present invention makes it possible to design practical layouts of components that cannot be provided using a known systems based on rectangular components. The system of the present invention is useful in facilitating the interaction among agents, i.e., creating an environment for facilitating the interaction among agents including humans and machines. Moreover, the present invention makes it possible, for the first time to address pattern language values using standard components. In the past, known standardized systems have not been particularly useful in addressing pattern language values.

3. System and Method for Integrating/Optimizing Technical Systems to Promote Agent Interaction This system is, at a high level, a knowledge worker tool kit module of the full system. The overall system not only includes the tool kit, but agent functions, process filters, simulators and data or knowledge warehouses.

According to the present invention, a user builds the agents and then, in accordance with the overall process of the present invention tests the agent, uses the agent, sets a term for the agent and stores the experience. Using principles of iteration and recursion, together with feedback and critical mass, the system becomes self-adapting and self-improving.

Of course, testing the agent requires simulation. The process filters described are up required to replicate a scan build process. In particular, when working with human agents, it is possible to engage in a very different level of consciousness that is often referred to as "brainstorming." Although brainstorming is often referred to as just another kind of thought process, it is in fact an entirely different level of consciousness in which the mind is forming new connections without the constraint of logic. To replicate this process in a machine, it is necessary to use a randomizer that is iterative and self-adapting. At the basic level, the randomizer is able to make random connections of relevant or related pieces of data and then test those random connections to see what type of results they provide. Machines capable of this type of randomizer activity include a so-called "Zwicky box," and other devices that can generate morphological forced connections. The Zwicky Box is named after Fritz Zwicky, a designer who invented the morphological forced connection process as a way of searching for connections that no "logical" mind would make.

Another significant module of the system and method for integrating/optimizing technical systems for promoting agent interaction is the pattern recognizer. The pattern recognizer is a system that analyzes data and looks for patterns in the data. It provides information concerning these patterns as a possible route for gaining feedback. For example, the pattern recognizer may analyze the user's input into the system(textual, audio or visual) and compare these various inputs to see if a pattern can be recognized. If a pattern is recognized, the system can suggest additional inputs that have a similar pattern. The user/system interface may be in the form of the system posing a simple question to the user, "Is this what you are looking for?" or the interface may be automatic or transparent to the user. In this way, the user's acceptance, acquiescence or rejection of the suggestion derived from pattern recognition will allow the system to learn from feedback. The pattern recognizer thus facilitates feedback into the system so that even a generic simple agent can quickly "teach itself" to be a customized agent for the particular user. The agents thus teach themselves through application of the system and method of the present invention.

In this sense, the present invention provides a unified process and system for approaching the wide variety of problems associated with the transformation to a knowledge economy. The system applies a consistent logical sequence to the variety of problems and relies to a large extent on recursion, iteration, critical mass and feedback to allow solutions to emerge even when the underlying rationale for why the solution works may not be fully understood. The basic process follows the three cat model approach of designing, building and testing through simulation and feeding back the results of the simulation to the design.

A central element of the success of this system is that the simulator gets smarter as it goes along. Thus, the simulator has a learning mode. The simulator generates results that are stored in the form of a data or knowledge warehouse, which provides input for future simulations.

It is important to note that the same process applies to all Sub-Systems of the present invention. In this sense, the present invention provides a formal system of a concurrent engineering that is applicable to a wide variety of systems.

Central to the present invention is the iterative building of agents as solutions to complex problems. According to the present invention, the agent (solution) is designed with minimum information and then built. The agent is allowed to act within its environment, and able to provide information concerning its results so that this information can be used in refining the design. Thus, agents evolve or emerge through recursion and iteration.

This is fundamentally different from the approach taken today in trying to design complex solutions using more information from data warehouses in the initial design. If too much complexity is introduced in the design of the initial agent, then the agent is so constrained that it cannot evolve or emerge through actual experience. It is in this sense that the present invention provides an IC factory, in iterative recursive engine of creation. Thus, the present invention is based on the fundamental recognition that knowledge is created only in interaction with reality and the experience gained therefrom. To create a "engine of creation" , therefore, it is necessary to create a system that allows both interaction with an environment (either actual or simulated) and learning from the experience of the interaction. With these two fumndamental characteristics, the ability to improve the agent or the design is limited only by the ability to iterate successive generations of the design through the simulation and learning process. Thus, recursion, interaction and feedback are the key elements to this interactive process.

This system is, at a high level, a knowledge worker tool kit module of the full system. The overall system not only includes the tool kit, but agent functions, process filters, simulators and data or knowledge warehouses.

According to the present invention, a user builds the agents and then, in accordance with the overall process of the present invention tests the agent, uses the agent, sets a term for the agent and stores the experience. Using principles of iteration and recursion, together with feedback and critical mass, the system becomes self-adapting and self-improving.

Of course, testing the agent requires simulation. The process filters described are required to replicate a scan build process. In particular, when working with human agents, it is possible to engage in a very different level of consciousness that is often referred to as "brainstorming." Although brainstorming is often referred to as just another kind of thought process, it is in fact an entirely different level of consciousness in which the mind is forming new connections without the constraint of logic. To replicate this process in a machine, it is necessary to use a randomizer that is iterative and self-adapting. At the basic level, the randomizer is able to make random connections of relevant or related pieces of data and then test those random connections to see what type of results they provide. Machines capable of this type of randomizer activity include a so-called "Zwicky box," and other devices that can generate morphological forced connections. The Zwicky Box is named after Fritz Zwicky, a designer who invented the morphological forced connection process as a way of searching for connections that no "logical" mind would make.

Another significant module of the system and method for integrating/optimizing technical systems for promoting agent interaction is the pattern recognizer. The pattern recognizer is a system that analyzes data and looks for patterns in the data. It provides information concerning these patterns as a possible route for gaining feedback. For example, the pattern recognizer may analyze the user's input into the system(textual, audio or visual) and compare these various inputs to see if a pattern can be recognized. If a pattern is recognized, the system can suggest additional inputs that have a similar pattern. The user/system interface may be in the form of the system posing a simple question to the user, "Is this what you are looking for?" or the interface may be automatic or transparent to the user. In this way, the user's acceptance, acquiescence or rejection of the suggestion derived from pattern recognition will allow the system to learn from feedback. The pattern recognizer thus facilitates feedback into the system so that even a generic simple agent can quickly "teach itself" to be a customized agent for the particular user. The agents thus teach themselves through application of the system and method of the present invention.

In this sense, the present invention provides a unified process and system for approaching the wide variety of problems associated with the transformation to a knowledge economy. The system applies a consistent logical sequence to the variety of problems and relies to a large extent on recursion, iteration, critical mass and feedback to allow solutions to emerge even when the underlying rationale for why the solution works may not be fully understood. The basic process follows the three cat model approach of designing, building and testing through simulation and feeding back the results of the simulation to the design.

A central element of the success of this system is that the simulator gets smarter as it goes along. Thus, the simulator has a learning mode. The simulator generates results that are stored in the form of a data or knowledge warehouse, which provides input for future simulations.

It is important to note that the same process applies to all Sub-Systems of the present invention. In this sense, the present invention provides a formal system of a concurrent engineering that is applicable to a wide variety of systems.

Central to the present invention is the iterative building of agents as solutions to complex problems. According to the present invention, the agent (solution) is designed with minimum information and then built. The agent is allowed to act within its environment, and able to provide information concerning its results so that this information can be used in refining the design. Thus, agents evolve or emerge through recursion and iteration.

This is fundamentally different from the approach taken today in trying to design complex solutions using more information from data warehouses in the initial design. If too much complexity is introduced in the design of the initial agent, then the agent is so constrained that it cannot evolve or emerge through actual experience. It is in this sense that the present invention provides an IC factory, in iterative recursive engine of creation. Thus, the present invention is based on the fundamental recognition that knowledge is created only in interaction with reality and the experience gained therefrom. To create a "engine of creation", therefore, it is necessary to create a system that allows both interaction with an environment (either actual or simulated) and learning from the experience of the interaction. With these two fundamental characteristics, the ability to improve the agent or the design is limited only by the ability to iterate successive generations of the design through the simulation and learning process. Thus, recursion, interaction and feedback are the key elements to this interactive process.

The present invention provides a new framework, processes and algorithms for the performance of knowledge-based work. Future, this invention is based on 20 years of experimentation with Human Agents in the production of real work producing economic value. In these experiments (supported by DesignShop, management center and Nav-Center processes tools and environments) a disciplined, scaleable approach has been developed for the augmentation and facilitation of agents of all kinds. Further, the basic rules for the "manufacturing" of non-human agents have been determined by demonstration and test.

A Human Agent, in a Knowledge Economy, will have an augmentation system that consists of the following components:

A basic, integrated tool kit for drawing, writing, calculating, analyzing, accessing the Internet and other networks, scenario building, planning, project managing, scheduling, full (real time) multimedia augmentation and various custom applications.

An "Agent Builder" for the manufacture and management of a variety of virtual "intelligent" agents to perform tasks, represent existing articles of value and trade, search data bases and other virtual environments, "represent"—as an agent—the Human Agent in conducting negotiations and trades.

A simulator for testing agents and communities of agents to understand their behavior and the behavior of complex environments.

A library and system of processes and process filters for analyzing, testing. designing, engineering and the performance of the majority of (codified) professional services.

A Pattern Recognizer for recognizing patterns in textual, audio or visual inputs or data together with a means for presenting similar data as a suggestion to the user and receiving input (feedback) from the user as to the desirability of the suggestion.

Data Warehouse and Knowledge Base functions.

A "Decider" (Sub-System 1).

A seamless (agent-based) interface that is context sensitive and "learns" the Human Agent's habits and desires.

The above is representational of the elements of the present invention but not exhaustive.

The system for integrating and optimizing technical systems according to the present invention is a powerful tool for supporting the transition to the knowledge economy. It can provide agents with new ways of working. It can aid in the redesign effectively and re-equipment of the workplace to operate effectively in the information age. The system for integrating and optimizing technical systems according to the present invention is a synthesis of elements of the present invention. The components are: 1-Body of Knowledge, 2-Process Facilitation, 3-Educational Programs, 4-Technical Systems, 5-Environments, 6-Project Management, and 7-Venture Management. The finctioning of the system for integrating and optimizing technical systems according to the present invention depends on all the components working together. None can exist alone and have a full expression of the system. This is not to say that each component must function at the same level of sophistication. The components will, in fact, co-exist while each is at a different level of completion and sophistication. The system itself is subject to the same "rules" of creativity and evolution, as are the projects and processes it manages.

The system for integrating and optimizing technical systems according to the present invention is, in broader terms, an idea manager as well as a planning and project manager. The hub of the system is a knowledgebase designed to provide information to the user, information that is relevant to the task at hand, but that also provides gateways to further exploration of the implications of that task. The knowledgebase is designed to support the user's creative process in dealing with any topic. Further, it is designed to act as a "knowledge capture" mechanism through its interaction with the person using it.

Linked to the knowledgebase are a series of modules. The main function of these modules is to allow the user to explore the relationships between ideas about how the future might unfold and the creation of practical plans to guide actions into that future. These modules bring together three of the principal Taylor knowledge technologies: the Scenario; the Strategic Plan and its graphic manifestation, the AND MAP; and the Time and Task management system. The system for integrating and optimizing technical systems according to the present invention also provides a pathway to the corporate knowledgebase and to other application packages that support the creative process, such as word-processing, spreadsheet, graphics and computer aided design.

The system will function as an expert system providing the user with artificial intelligence, as well as tools with which to pursue creative endeavors. The large-scale synthesis of agent intelligence will usher in an era of creative exploration far surpassing any in humanity's experience.

The system for integrating and optimizing technical systems according to the present invention is composed of eight major modules. At the hub of the system is the knowledgebase, the main data base of information resources. The Knowledgebase Interface is the shell that protects the data base and provides the tools to access the data directly or through applications. Outside the shell are the six "principle applications" modules of the system. They are Data Management, General Applications, Tools, Scenario, Strategic Plan and Time and Task Management Modules. Together they form an integrated environment for the creative exploration of ideas about the future. They also provide the means of programming and managing courses of action to provide the transition, for the corporation or organizations between the present and the future. Finally, the system also provides an intelligent link with the corporate past, which it builds upon by documenting corporate actions as they unfold. The system is, therefore, an historian of actions, providing the chronicle as events occur.

The knowledgebase and its interface contain the information upon which the six "applications" draw. The knowledgebase also provides the means of entering and retrieving general information to and from the system. Finally, it provides a means of exploring and creating new ideas, using the creative process and the black box models. The knowledgebase interface will link the specific work modules, called the principle applications, with the knowledgebase and application programs that reside "outside" the system for integrating and optimizing technical systems according to the present invention. It will provide the means of manipulating data so that it is compatible with the needs of the work modules and the outside applications programs.

Ultimately, the knowledgebase interface will manage the expert system aspects of the system for integrating and optimizing technical systems according to the present invention. For example, in a full expert system implementation, when a particular user signs on to work with a module, the system will call up specific parts of the tool kit that the user profile indicates the user prefers to use. The system might also make suggestions on investigative strategies the user might like to pursue, basing the suggestions on the user's level of expertise.

The Scenario Module will facilitate the formulation of ideas about the future. A structured investigation into the past could also be accomplished using this module. Key features will include: 1) the support of several formal methodologies such as morphological and cross-impact analysis, with which the structure of postulated events may be developed and/or analyzed, 2) the ability to access information in the knowledgebase that pertains to an event through a keyword query 3) the ability to compare different scenarios and to analyze the implications of variations between the types of events projected, and variations in the timing of those events.

The Strategic Plan Module facilitates the formulation, testing, and maintenance of broad plans of action. The AND MAP technology will be supported in PERT/CPM or decision network form. Formulation of goals and objectives as well as specific activities within the plan will be linked to scenario events that affect them. Likewise, events within a plan are linked to specific actions within the time and task management system associated with the plan. Through this linkage, the effects of a change in any one of the modules on the other modules will be recorded. Documents that support or explain the plan, or specific actions within the plan, can be retrieved from the knowledgebase. The module will support "what if" computations on a plan or group of alternative plans. The development and alteration of AND maps will be graphically and analytically supported.

The Time and Task Management Module will translate the intent of the strategic plan into a day to day scheduling of actions implementing the plan. Specific work packages will be broken out showing team membership, the responsible manager, time lines, etc. The rate of completion of various work packages and specific actions will be fed back to the strategic plan to monitor plan progress. Possession of a variety of reporting capabilities will be a key feature of both the Strategic Plan and the Time and Task Management modules.

The Tool Kit Module will contain routines that are used in common by the other work modules. For example, statistical analysis of data will be needed in each of the main work modules. When needed, it will be called from the tool kit, 90 that it will not be necessary to have a complete set of code to do statistical work resident within all three of the planning modules. Possibly some simple procedures, such as calculation of the mean and standard deviation of a set of data, will be more efficiently placed within the planning modules themselves. This is an issue to be determined in the future, however.

The planning modules, that is, the Scenario, Strategic Plan, and the Time and Task Management modules, are designed to support a complete planning process. This process can be described in simplified fashion in the following model:

1. define problems and opportunities
2. describe the problems and opportunities in systems terms
3. define goals and objectives to deal with the problems and opportunities
4. define performance specifications to implement the goals and objectives
5. define resources and constraints to accomplish the goals and objectives
6. define the plan of action 7. create work packages to implement the plan
8. create a task management system to control and track work
9. feed back changes in organizational goals and objectives and in resource or constraints to the plan and the task management system
10. feed back changes in the plan's schedule to organizational goals and objectives Each of the above steps in the planning process is related to one of the system for integrating and optimizing technical systems according to the present invention planning modules.

The system of the present invention provides a method of user interaction with the system that allows the user to learn the system's next level of operation while using a lower level. The system of the present invention also creates various scenarios about the future. Be able to test the assumptions within the scenarios to see how reliable they are based on present knowledge and opinion. Be able to compare the probability and the impacts of various scenarios. Be able to monitor the reliability of a given scenario as events unfold.

The system of the present invention also provides a method of exploration of the knowledgebase in a way that gives the user the information s/he is looking for and makes reference to other related information not initially requested.

The system of the present invention, in all modules, provides the ability to work with text and graphic images within the same viewing plane and provides multiple window display.

The system of the present invention also provides the user with the ability to create an outline plan for each working session with the system. It should facilitate the discovery of new information by the user.

The system of the present invention also provides a record of each working session for the user to review and learn from to increase his/her efficiency.

The system of the present invention also provides extensive on-screen help and tutorials to assist the user in operating the system in an efficient and effective manner.

The system of the present invention also provides the user with a "tool kit" of methods for the exploration of the structure of knowledge in selected subject areas aimed toward generating new insights and knowledge. That is, an expert system on the exploration of knowledge.

The system of the present invention also provides the system with the ability to acquire new information from interaction with the user, and to learn the user's methods of operation, in order to assist the user in performing those methods with maximum effectiveness and efficiency.

The system of the present invention also provides the ability for agents within the system to carry on multiple conferences with each other.

The system of the present invention also an analysis of scenario events to show how events are logically connected. Develop strings of events to be inserted into a scenario.

The system of the present invention also shows the variability in the estimates of when an event will happen within a scenario.

The system of the present invention also shows the combined probability of a particular chain of events happening, that is, a risk analysis of the chain of events.

The system of the present invention also correlates the scenario events to specific articles, working papers, etc. that collaborate or dispute the probability of the event occurring.

The system of the present invention also facilitates the formulation of alternative plans of action based on key events in the scenario. Creates network diagrams of these plans. Link activities within the plans to a database of the characteristics of the activities.

The system of the present invention also links key events in the scenario to elements in the strategic plan. Links the work packages in the strategic plan to elements in the time and task management system. When one related element in any module changes, the system will inform the user and/or automatically update related elements in the other modules.

The system of the present invention also creates plans in a decision network format, utilizing the unique symbols and identifying structures of the AND map.

The system of the present invention is also able to analyze a network based on time minimization, cost minimization, and optimization (trade-off between time and cost) criteria. The system of the present invention is also able to compare various plans based on any one or all of the above criteria, i.e. a goals achievement analysis across multiple plans. The system of the present invention is also able to perform "what if" analysis on a plan or plans based on:

a. minimum time with unlimited resources for a given topology.
b. minimum cost criteria
c. specific resource limitations.
d. maximum parallel tracks for network activities The system of the present invention is also able to perform "what if" calculations on a given plan based on:

a. changes in the network topology.
b. changes in the resource allocations on the network.

The system of the present invention can provide the ability to do resource leveling.

The system of the present invention can create descriptions of the network in AND map form, Gantt Chart form, and in activity precedence tables; show the critical path activities for deterministic networks and critical path options for probabilistic networks; report slack times for each non-critical activity. Also show the reduction in slack for non-critical activities as the project progresses, so that these activities do not go critical.

The system of the present invention can create "work packages" that are given to people responsible for given major tasks and that identify the specifications of the work to be done, the time lines to be met, and the resources available to the project team. The reporting schemes for all three major modules will be hierarchical in nature. The first level will give only basic information and each succeeding level will increase the density of information about the queried activity or event.

The system of the present invention can monitor the actual time and resources required by various activities for completion, and feedback those results to an on-going activity type model. Incorporate an analysis of variance to see if the variation in performance is due to the nature of the activity or the nature of the resources: primarily people and their level of training and expertise. Create an activity by activity comparison of the time scheduled versus the actual completion time, and report any slippages in time lines.

Monitoring will be tied to the cost outlay accounting for each activity in the Plan. The time and task system will be tied to an overall project time and cost accounting system. (2)

The strategic plan module parameters are very flexible in order to respond to the variety of types of plans that will be developed using it.

The system learn the user's planning style and provide appropriate information and tools to support that style. The style should also be compared with "ideal" approaches and the user be made aware of the differences in approach, and possible performance differences, between his/her style and the "ideal".

The time and task management system provides a break out on a sub-track basis of who will do what and when. All activities within the time and task management system will be tied to a specific activity within the strategic plan.

The system of the present invention includes time and task reporting systems that are able to call up the "work package" in which are contained the associated project activities, the name of the person responsible for the project's completion, the time frame in the total project, whether the activities in the work package are on the critical path and if not what their slack is.

The system of the present invention also can: record comments and suggestions about the plan from those using the plan; analyze their comments and use the results to bring refinement to the plan.

The system of the present invention also can: create ways of allowing the "line" managers and personnel to design the ways that the time and task management categories are developed, in order to implement the project; create ways of allowing the "line" personnel to have input into the creation as well as the modification of the plan; create a flexible report generator so that information output concerning any of the modules can be customized or called from a standard template.

The system of the present invention also can: provide a project documentation module that records who gets what information, so that updates and changes to the plan can be distributed efficiently to the appropriate people.

The system of the present invention also can: create a user interface that is graphically-oriented and has a menu-command string-icon structure.

The system of the present invention also can employ a "learn as you do" user operation strategy.

The system of the present invention also can: create "fly it" expert systems for each of the main modules.

4. System and Method for Transporting Agents and Agent Environments as an integrated Experience The system and method for transporting agents and agent environments as an integrated experience of the present invention can be used to transport agents, including human agents, within separate environments that are unique to that agent in a remarkable efficient way while optimizing utilization of transportation resources. The system includes transportation modules or "eggs," that can take many different forms. In the case of human transport, the environment can be tailored to an individual's wants, needs and desires. However, all of the "eggs" within the system should minimally be able to know where they are (in the case of human transport this can be accomplished through, for example, a GPS system or the like) and be able to report their location to a central system for coordinating transportation. The eggs should also be able to verify the identity of their occupant. In the case of human transport, this can this could be done, for example, through biometric techniques discussed herein or passwords and keys.

Use of a central system that knows the identity and location of all agents within the system affords tremendous opportunities to facilitate transportation of agents. Moreover, in accordance the system and process underlying this invention, the system is capable of receiving feedback and is thus capable of improving itself through recursion and iteration.

To fully facilitate transportation, the agents within the system must able to communicate to the overall system to indicate a desired location, i.e., where they want to go. The system has predictive capabilities that are improved over time through recursion, iteration and feedback to increasingly improve its ability to facilitate transportation. The transportation system improves the overall system in two ways. First, the transportation Sub-System provides tremendous opportunities to reduce waste in transportation. In the case of human transport, for example, consider, for example, a person going to the airport. Under current systems, the airline has no way of definitively forecasting which passengers holding reservations will actually arrive at the airport. Moreover, the current system for identifying passengers, ticketing passengers and loading passengers onto the plane only begins when the passenger arrives at the airport. Thus, passengers are told to arrive an "hour or two" before scheduled departure time. Although people have generally grown accustomed to this delay, almost all of it is a waste of time. A system that knows the identity and location of agents within the system can accurately forecast which agents will actually arrive in time for a particular flight. In addition, processing the agents is greatly exemplified using the centralized system. By producing these unnecessary delays, the utilization rate or percentage use of expensive assets such as jet aircraft, could be dramatically increased, thus increasing airline profit.

The transportation system offers similar advantages in connection with other modes of transportation. One can appreciate the lack of utilization of modes of transportation by considering the number of cars that are not in use at any one time. The same applies to trucks, boats and trains. A system that is aware of the location and desired destinations of all agents within the system, allows further optimization through multi-modal transportation. In particular, based on past experience, an agent is transported in the most efficient way possible using whatever particular modes of transportation will yield fastest transport. Again, the only systems necessary are the individual environment (agent module) or egg having the ability to know its location, its occupancy, the desired destination of its occupancy and the ability to report all of these to a central system. To make the central system a learning system, however, the system should have a predictive capability to predict the best routing of the agent as well as storage means for keeping track of predictive routing as well as actual results so that the system receives feedback and can then improve itself using principles of recursion and iteration.

Although the greatest inefficiencies in today's economy seem to be in connection with the transportation of human agents, the system described herein is readily adaptable transportation of all forms of agents.

Thus, at one level, the system of transportation serves to generate a vastly improved efficiency and utilization of existing transportation resources. It is expected that this improved efficiency will likely result in changes in the allocation of investment in transportational resources. For example, if one is ensured of having transportation available when and where needed, ownership of transportation assets (and the burdens associated with such ownership) becomes much less desirable to individuals.

As indicated above, the specific form of the transportation module, or egg, can vary. However, it should be appreciated that certain additional efficiencies are offered, especially in the ability to use a multi-modal form of transportation, when the individual transportation module is readily adaptable to different forms of transportation.

The system and method for transporting agents and agent environments as an integrated experience of the present invention is expressly not limited to the transport of human agents. To the contrary, the transportation Sub-System of the present invention is scaleable both upward and downward in size to address analogous problems in connection with other forms of agents. Specifically, the system of providing an agent builder, feedback and transportation can be used in the development of "learning systems" and other forms of intelligent agents.

For example, as noted above, there is still a need for a software robot "agent" that can intelligently search through the files of the Internet and for a mechanism for processing the located files for presentation to an end user in a meaningful manner. Known approaches, including that disclosed in the Mauldin patent attempt to gain information through brute force sifting through files. The fundamental problems with such solutions are that they are not sufficiently scaleable to accommodate exponential growth in use and data to be searched and that the "agents" used are static and do not improve through feedback. The system and method of the present invention can be applied to develop improved "agents" for searching databases. This can be understood as an application of the transportation Sub-System of the present invention (where the "agents" are software objects transported through of a plurality of interconnected computers each having a plurality of files stored thereon) and/or an application of the facilitation Sub-System of the present invention (where the software "agents" interact with one another and the user to develop better agents. This again demonstrates the tight interaction and integration of the Sub-Systems of the present invention.

In addition, the method and system of transporting agents and agent environments as an integrated experience according to the present invention demonstrates the interaction of the entire system. In particular, the system and method are developed by developing a PatchWorks Design (tm) Diagram. In this case, the exercise is aimed at the development process of the Transportation Sub-System of the Invention itself.

The system and method for transporting agents and agent environments as an integrated experience includes various transportation modes for transporting an occupant environment. The environment may be in the form of a contained environment or "egg." The egg itself is a complete user environment that is adaptable to a variety of modes of transportation, for example, the environment may include navigation, GPS and communication systems.

The specific mode of transportation shown can include, among other things, smart adjustable shrouds, impact protection, storage areas, an adaptive tracking system that allows the vehicle or transportation component to be used in the road, rail, air, etc., a propulsion unit and an agent environment package.

In accordance with the method of the present invention, the occupant egg is adaptable to various modes of transportation, and the transportation vehicle itself is adaptable to traditional modes of transportation.

5. System and Method for Structuring and Facilitating Value Exchange among Agents Forming Real and Virtual Economies The present invention further includes objected oriented system and method for exchanging a value and objects that serve as a medium of exchange or a measure of value. In this system, objects, preferably computer software objects, are created to represent the value of various items within the system. Thus, for example, an object could be created to represent the value of a tangible object such as a boat, an object can be created to represent the value of one person's service and so on. Objects can also be created to represent the value of one's future earnings. Each object within the system has certain characteristics. Foremost among the characteristics of each object is an ownership characteristic, which is establishes who, within the system, has ownership with control of the value represented by the object. It is, naturally, critically important that the integrity of the ownership characteristic be maintained. In other words, it is important that one person within the system cannot misappropriate the ownership characteristic from others within the system. Thus, it is contemplated that the ownership characteristic be linked to unique characteristics of the individuals within the system. Examples of appropriate and unique characteristics can include fingerprint patterns, iris patterns, DNA patters and, encrypted code values. Thus, an object "knows" that it is linked to the person having a certain, unique, DNA pattern or fingerprint.

Like the transportation Sub-System, the system for determining the value of objects makes it possible to achieve increased utilization of objects that have value. These can include objects that are physical objects (a boat) or metaphysical objects (the future value of services that can be rendered). At its most basic level, the system includes objects that have value. The system is connected with data resources capable of evaluating or ascertaining the "value" of an object at any particular time. In addition, the object's location is always known and its status (health or condition) is always known. Reporting on location can be done with GPS technology or other similar devices that can ascertain a location precisely. Circuits and chips that measure conditions that are believed to be significant factors in the value of the object can be used to ascertain "status" or "health." In the simple case of a boat, for example, a chip would report whether the boat is afloat or sunk. Initially, the object within the system should be very simple, but should operate through recursion and iteration to refine the predictiveness of the system. Thus, through experience, for example, it will be learned that certain factors affect the value of the objects. The system must be adjusted accordingly. The key it that feedback is used to refine as experience is gained.

Thus, using the system of the present invention, anything that has value to some people can be a commodity. Any commodity in this sense can be a tradable instrument. This allows much greater utilization of assets (for example, future value of services rendered that might otherwise not be used at all).

This system preferably includes a third party agent or enforcement agent, which under current systems could be courts, a legal process generally to enforce rules of exchange and ownership, for example.

This system is useful on an extremely large macroscale and for discrete, definable groups of persons that have a common interest. Thus, it is possible with this system to have multiple, distinct economies. It is contemplated that it will be necessary to include within the system some form of interface with other economies. This Sub-System of the present invention plainly opens doors to even greater utilization of assets to field the economy. Thus, the present invention offers the opportunity to create tremendous wealth since most assets of the economy are, at any given time, inactive because of the inherent limitations of the second wave economy.

It is further contemplated that the system includes means for modeling, sampling, and verifying the current value, preferably in a real time basis, of the objects within the system. Thus, for example, the physical objects that are represented by the software objects within the system could, for example, report signals indicative of their current state to a monitoring system. In the case of a boat, for example, the boat would continuously report its location and that all systems were in order. As long as these signals were received the system would recognize the value of the object representing the boat. However, once the system failed to receive an indication that the boat reported the boat's location and function, it would no longer recognize the value of the object value associated with the object representing the boat. There are, of course, other ways of verifying the values of the objects represented within the system. For example, in the case of tangible objects such as boats and automobiles, there is the conventional techniques for establishing a "blue book value" could be used. It should be appreciated, however, that because of the digital nature of the system and method of the present invention, it is possible, with sufficient input to much more accurately model real world values. The fact or/of ownership and control of the physical object could be continuously verified, but this seems to be unduly complicated using current technology. Thus, it is preferred that the system operate, to some extent, on an "honor system" that is enforced through periodic verification or spot checking as well as by a credit report type system whereby participants within the system can lose the ability to participate within the system if they fail to report or file misleading or fraudulent reports.

In accordance with a preferred embodiment, Biometric verification, in which an individual's identity is checked by examining unique physical characteristics such as fingerprints, eye retinas, palm prints and voice signatures is used to establish and verify ownership.

6. System and Method for Facilitating Work and Commerce among Agents in a Knowledge Economy In accordance with another aspect of the present invention, it is possible to develop a model for a total service network that takes insights and ideas from the creation stage to the organizational stage—an Intellectual Capital Factory.™ In direct contrast to the conventional approach of trying to quantify that which occurs or is found to exist in "successful" organizations, makes it possible to manage and grow intellectual capital from the seed of a good idea. The contrast between these two approaches is as sharp as the contrast between foraging for food in a fertile valley and hydroponic agriculture. Thus, where a conventional view of intellectual capital management might focus on retaining employees that demonstrate creativity, the present invention provides and maintains a work environment that unleashes the creativity that most people have so that "ordinary" individuals achieve the "extraordinary" results that they are capable of.

This Sub-System is really a high level system that combines two things while tying all the rest together. The two things are the PatchWorks Design (tm) Process and the Intellectual Capital Process.

The key to bringing structure to the process of creating intellectual capital may be summarized in the model of an intellectual capital factory or "IC factory." The IC factory is a model for bringing structure to creation, nurturing and protection of intellectual capital.

A central premise of this model is the notion that the creative process cannot be controlled, but it can be managed. The creative process is managed by managing the conditions that create or block creativity. Thus it is necessary to manage the process of information development within a group and manage the process of information development within a group and to manage the energy field around the group. All of this is accomplished through structure that can be managed and modeled as an IC Factory.

The IC factory model provides a system and method for creating and nurturing intellectual capital.

Again, information age products are not capital intensive. Information age products are difficult to create, but easy to recreate or replicate. This is because knowledge-based products result from an insight or idea. Once the insight or idea is recognized a path to creation of the knowledge-based product may be inevitable at least once that path is made clear in the introduction of a product. Thus, for example, knowledge-based products such as computer software are often based on important insight, but once a product becomes available, the product itself can be easily replicated or the insight can be appropriated by others. There are also examples in the life sciences field. For example, the discovery of a new composition, pharmaceutical or gene sequence requires a great deal of research and in some instances an insight. However, once the existence of the composition, pharmaceutical or gene sequence is understood it is easily, in a relative sense, replicated.

The IC factory model represents a structured non-linear non-incremental approach to creating, nurturing and protecting intellectual capital. In this sense, the IC factory structured approach is analogous to hydroponic growth of ideas.

The IC factory requires a knowledge-based (body of knowledge) and systems (educational and technical) for keeping the knowledge-based fresh and current. In addition, there must be systems for facilitating access to the knowledge-based within work groups. Thus, one critical function that must occur within the IC factory is growing and adapting the body of knowledge required to model the internal and external environment. This is done, as mentioned before, by creating education systems to receive inputs from external services—find out what's going on and use technical systems to leverage education systems and adapt a body of knowledge. When these systems are appropriately structured to achieve these functions, ideas are introduced into the system (the IC factory) and rapidly iterated and grown.

The IC factory also includes a structured environment that allows release of group genius. This requires careful attention to the effect of one's environment on one's creativity and productivity. The environments of the present invention are a good example of this type of structured environment, but most current work environments include numerous obstacles to creativity and group genius.

One of the critical elements of any collaborative work environment is to create an environment that allows individuals and groups to see the whole picture and, simultaneously, see details to allow effective collaboration.

In addition, to release group genius, there must be a way to facilitate the process of decisionmaking. We have found that an interdisciplinary approach is particularly helpful. Thus, it is very important to have all stakeholders involved. In the case of a IC factory, the stakeholders would certainly include an expert in intellectual property, an expert in capital financing, and an expert in the particular industry that our idea relates to.

The IC factory also includes a value web that is managed as a venture. The web members provide inputs into the system or venture, but also have separate identities. In this sense, the members of the value web are like software objects and that they bring value to the web and draw value from the web. Examples of web members within an IC factory would include the intellectual property expert member and the capital financing expert member or object. The members or objects can be individuals or groups of individuals or firms.

Obviously, a critical aspect of managing a web of independent agents is the integration and system facilitation function.

The value of members provide feedback loops into areas of interest so as to keep the knowledge base fresh and current.

The IC factory may be industry focused or generalist depending on the available expert objects.

As mentioned above, the IC factory requires a system integrator who bring these various elements together. This is best done using a system and method for facilitating interaction of intelligent agents. In this regard, it should be understood that the agents could be human agents, organizational agents, machine agents and electronic agents.

The present invention achieves hydroponic growth of ideas by removing environmental and structural barriers and expanding an organization's knowledge base. The IC factory approach provides a clear path to directly (not indirectly) proving every element of intellectual capital in a systematic way. Thus, all the traditional components of intellectual capital are proved in a systematic way. Consider, for example, the improvements to corporate brain power, organizational knowledge, customer relations, the ability to innovate, employee morale, the knowledge base, the technology base and the market position. Successful high technology companies empirically know that environment profoundly effects morale. Thus, the emergence of "open work places and casual dress" has been a characteristic feature of emerging growth companies. However, these approaches are working on the edges, but not addressing the environment in a comprehensive way.

In summary, therefore, the IC factory is an open system that incorporate new technologies or individuals for performing the critical functions. Ultimately, the quality of results achieved by the IC factory model will depend on the quality of performing the requisite functions.

The critical functions may be summarized as follows:

(1) Establishing a knowledge base that is continuously refreshed with inputs from outside the organization (IC factory). In the case of an IC factory, the knowledge base must include information concerning intellectual property, a venture capital financing and the particular industry involved.

(2) The information and the knowledge base must be made available to all people that need the information in the collaborative process.

(3) Environmental barriers to collaboration and communication must be removed.

(4) The output of the IC factory must be protectable so as to establish "ownership" of the value created.

The basic team members of an IC factory are selected to achieve the following functions:

1. Intellectual Property: This cannot be addressed after the fact. It must be part o the process of creating product.
2. Incubation: Providing the tangible resources to develop a product and create a product or service.
3. Organizational Building Capacity
4. Financing
5. Operational Capabilities
6. Marketing and Distribution Systems and, perhaps the most important, a system integrative for integrating each of these six other functions.

Finally, and most importantly, there must be a system integrator or facilitator. Intellectual capital involves the interaction among agents. This includes human-human interaction; human to environment interaction; human to machine interaction; and machine to machine interaction. To date, there has been no system and method for facilitating interaction among these various agents. As a result, there is no reliable direct process for moving an idea to a sustainable organization. Communication within the organization is critical to establish dynamic, adaptable self-adjusting organic organization that operates with feedback loops to insure rapid iteration and growth to achieve the desired hydroponic growth of ideas. The IC factory model provides such a process for turning ideas into protectable intellectual capital.

Each of the Sub-Systems of the present invention provide distinct and independently valuable results that contribute to addressing the paradoxes and problems associated with the Knowledge Economy, and the transition to it as described below.

Sub-System 1—Agent Interaction

Dissolves many problems of numerous agents (Humans, computers, books, data bases, environmental and infrastructure elements, multimedia objects, etc.) speaking in non-compatible voices while interacting to solve complex problems associated with the necessity to stay requisite with a quickly changing and transforming environment and economy.

Sub-System 2—Agent Environments

Dissolves many problems of Human (and other Agents) Architectural Pattern Language Values while accomplishing flexibility of arrangement (from workstation component level to building scale), the variety of individual and work spaces necessary for the full range of knowledge-intensive work (including collaboration of different size groups), the integration of multimedia and communication tools, yet, accomplishing and greater utilization of space and utilities than existing systems.

Sub-System 3—Agent Systems

Dissolves many problems of knowledge-augmentation by technical systems and tools for single Agent work and the collaborative interaction of Agents, both real time and asynchronously, through multi-channel and multimedia networks and tool sets.

Sub-System 4—Agent Transportation

Dissolves many problems of seamless and integrated Agent (and agent environments) transportation providing a continuity of work and experience required by the demands of a global economy.

Sub-System 5—Agent Economy

Dissolves many issues of facilitating knowledge-economy Transactions and Agent value accounting while radically reducing the multiplicity of financial instruments (in a myriad of legal environments) now systemic to the industrial-based economy.

Sub-System 6—Agent Work and Commerce

Dissolves many problems of Agent participation in a Complex Global Economy and the TRANSITION to it.

In accordance with the present invention, however, all of these Sub-Systems INTEGRATE into a single system and method-of-work that facilitates a seamless, continuity of effort and high-performance results across what are now partially connected systems, (at different and, often, non-communicating levels of recursion), now delivering a fragmented, expensive and lengthy experience that is not requisite with the existing (let alone future) complexity nor rate-of-change in the global economic environment.

Principles of Iteration and Feedback and the Rule of Recursion, as Used in the Present Invention One important aspect of the present invention is the use of iteration, feedback and recursion in the system and method to consistently provoke emergent behavior. In particular, iteration, feedback and recursion assembled properly along with critical mass and proper scope will generate sufficient complexity to deal with the "Requisite Variety" rule and facilitate emergent behavior in systems. This is significant since the Requisite Variety issue has remained "unanswered" since the foundations of Cybernetics were established in the 40s and 50s. There is no known system and method in which emergent behavior can be consistently provoked outside of the present invention.

Rule of Recursion

All elements that define viability, on one level of recursion, of a system must occur on all levels of recursion of the system.

For a complex agent to be viable or for a simple agent to be effective in a complex environment, (of agents) the Agent must be "acted upon" (and/or be acting) at a maximum of three Levels of Recursion ("above," at the level of the Agent and a level "below" the Agent).

Actions that on a single Level of Recursion that are additive, on multiple Levels of Recursion will usually be multipliers, leverage is accomplished by employing more than one Level of Recursion (thus, dealing with the Requisite Variety Rule; Variety must equal Variety). Generally, greater complexity can be dealt with or accomplished by employing Recursion than by action on one level of a system (given the same number of actions and level of resources).

Emergence happens "between" (out of) Levels of Recursion.

Rule of Iteration

All things being equal, a single iteration of work, in isolation, is additive between steps while multiple iterations of work (in a continuous process) multiplies results.

Work iterations must happen in rapid succession and within time compression for maximum effect.

Rule of Feedback

Feedback is the message from a sensor of the system to the controller of the system of the difference between performance and expectation. Positive feedback amplifies; negative feedback attenuates.

Feedback on feedback and/or feedback between Levels of Recursion is feedback of a complex kind and is required for the governance (self correction) of complex and emergent systems.

Rule of Iterative, Feedback Driven Systems acting on Multiple Levels of Recursion These systems exhibit increasing returns and learning. They co-evolve (with their environment) emergent behavior. They are open-ended and cannot be predicted or controlled.

These systems can be operated in a way so that the desired kinds or results are consistently accomplished. This is possible when the Rules of Iteration, Feedback and Recursion are employed in a System of specific architecture (as described) that employs sufficient critical mass. Emergence is the result of complexity. Complexity is a factor of iteration, feedback, recursion, critical mass and the number of Agent (nodes) interactions in a specific time period and place.

BRIEF DESCRIPTION OF THE DRAWINGS

The present invention will now be described in detail with reference to the attached drawings in which:

Sub-System 1

FIG. SS1-1 is a block diagram of a single iteration of an embodiment of the present invention.

FIG. SS1-2 shows a block diagram of the process of a decision point element contained in the block diagram of a single iteration of an embodiment of the present invention.

FIG. SS1-3 is a block diagram illustrating the plurality of agents and their functions.

FIG. SS1-4 is a block diagram showing elements of the environment.

FIG. SS1-5 is a block diagram illustrating important components of the performing work element of an embodiment of the present invention.

FIG. SS1-6 presents examples or elements of the altered or output agent produced by iterations of an embodiment of the present invention.

FIG. SS1-7 contains examples or elements of the output agent and new environment interaction.

Sub-System 2

FIGS. SS2-1 and 1A show a high level system flow diagram of the system of the present invention;

FIG. SS2-1B shows a sketch of a collaborative work environment according to the present invention. The environment includes tools according to Sub-System 3 of the present invention as well.

FIG. SS2-2 shows a high level view of a system configuration according to the present invention FIG. SS2-3A is a front perspective view of a medium height rolling bookcase;

FIG. SS2-3B is a front perspective view of a full height rolling bookcase;

FIG. SS2-3C is a perspective view of a stack of chairs;

FIG. SS2-4 is a front perspective view of a kiosk;

FIG. SS2-5 is a front perspective view of another kiosk;

FIG. SS2-6 is a front perspective view of a work unit;

FIG. SS2-7 is a perspective view of a plurality of shelf cubes arranged to provide a portion of a cube-office system;

FIG. SS2-8 is another view of stacked shelf cubes that can be used in a cube office system;

FIG. SS2-9 is a perspective view of a portion of an environment that includes work walls, an enclosed space, worktable, and chairs;

FIG. SS2-10 is a front perspective view of a plurality of bookshelves grouped together with working walls to divide a room;

FIG. SS2-11 is a perspective view of a kiosk and a wing component docked together;

FIG. SS2-12 is a perspective view of a work unit;

FIG. SS2-13 is another view of the work unit of FIG. SS2-12 and also shows rolling work walls in the background;

FIG. SS2-14 is another view of a kiosk component according to the present invention;

FIG. SS2-15 shows the kiosk of FIG. SS2-14 at a reduced height and docked with a wing component;

FIG. SS2-16 is a perspective view of a kiosk of the type described previously in connection with FIG. SS2-4 in which an oval work surface is inserted into one of the slots of the kiosk;

FIG. SS2-17 is a perspective view of a kiosk in use;

FIGS. SS2-18–20 show portions of an environment according to the present invention;

FIGS. SS2-21–30 are various perspective views showing one embodiment of the work pod component of the present invention;

FIGS. SS2-30A–50 are various perspective views showing alternative pod constructions and configurations according to the present invention;

FIGS. SS2-51–53 are perspective views showing a single section from which the work pod can be constructed;

FIGS. SS2-54 and 55 are perspective views of a cube office system according to the present invention.

FIG. SS2-56 is a schematic view of a polycentric work area layout;

FIGS. SS2-57–62 are perspective views showing a Rapid Deployment System (RDS) type environment in use;

FIG. SS2-63 is a perspective view of an adjustable wing, a kiosk and a smaller wing and a movable storage file;

FIG. SS2-64 is a perspective view of a work surface according to the present invention;

FIGS. SS2-65 and 66 are perspective views of a portion of an environment in which cube systems are used to divide an environment into different sections;

FIG. SS2-67 is a perspective view showing several aspects of an environment according to the present invention;

FIG. SS2-68 is a perspective view of curved cube systems according to the present invention;

FIGS. SS2-69–71 are perspective views of architectural armature and pattern language features according to the present invention;

FIGS. SS2-72 and 73 are perspective views of a cube office system according to the present invention;

FIGS. SS2-74–82 are perspective views of cube office system components and assemblies according to the present invention;

FIG. SS2-83 is a perspective view of a wall-mounted folding workwall;

FIG. SS2-84 is a perspective view of cube components of the present invention;

FIG. SS2-85 is a perspective view of a pod assemblies according to the present invention;

FIG. SS2-86 is a perspective view showing side-by-side work stations;

FIG. SS2-87 is a perspective view of a work environment that includes cubes and a work surface with a wing component;

FIG. SS2-88 is a perspective view of a cube office system that includes curved cube components and a wing component;

FIG. SS2-89 is another perspective view of an environment that includes pullout work surfaces an drawers;

FIG. SS2-90 is a perspective view of a five section pod.

FIG. SS2-91 is a perspective view of an environment that shows a modular seating niche;

FIG. SS2-92 is a perspective view of a work area constructed using reconfigurable walls that include utility panels;

FIG. SS2-93 is a perspective view of a component according to the present invention that includes a foldup work station.

Sub-System 4

FIG. SS4-1 schematically illustrates an embodiment of the occupant module (virtual agent) of the present invention.

In addition, reference should be made to the attached appendices, which show various component designs and system layouts that, by themselves, form part of the present invention and are used in the system of the present invention.

DETAILED DESCRIPTION

The present invention provides a unified process and system for approaching the wide variety of problems associated with the transformation to a knowledge economy. The system applies a consistent logical sequence to the variety of problems and relies to a large extent on recursion, iteration, critical mass and feedback to allow solutions to emerge even when the underlying rationale for why the solution works may not be fully understood. The basic process follows an approach of designing, building and testing through simulation and feeding back the results of the simulation to the design.

The same process applies to all Sub-Systems of the present invention. In this sense, the present invention provides a formal system of a concurrent engineering that is applicable to a wide variety of systems.

Central to the present invention is the iterative building of agents as solutions to complex problems. According to the present invention, the agent (solution) is designed with minimum information and then built. The agent is allowed to act within its environment, and able to provide information concerning its results so that this information can be used in refining the design. Thus, agents evolve or emerge through recursion and iteration.

This is fundamentally different from the approach taken today in trying to design complex solutions using more information from data warehouses in the initial design. If too much complexity is introduced in the design of the initial agent, then the agent is so constrained that it cannot evolve or emerge through actual experience. It is in this sense that the present invention provides an IC factory, an iterative recursive engine of creation. Thus, the present invention is based on the fundamental recognition that knowledge is created only in interaction with reality and the experience gained therefrom. To create a "engine of creation", therefore, it is necessary to create a system that allows both interaction with an environment (either actual or simulated) and learning from the experience of the interaction. With these two fundamental characteristics, the ability to improve the agent or the design is limited only by the ability to iterate successive generations of the design through the simulation and learning process. Thus, recursion, interaction and feedback are the key elements to this interactive process.

The system and method of the present invention includes the following Sub-Systems:

1. A system and method for facilitating interaction among agents promoting feedback, learning and emergent group genius in a radically compressed time period;
2. A system and method for optimizing agent pattern language values in collaborative environments;
3. A system and method for integrating/optimizing technical systems to promote agent interaction;
4. A system and method for transporting agents and agent environments as an integrated experience;
5. A system and method for structuring and facilitating value exchange among agents forming real and virtual economies; and
6. A system and method for facilitating work and commerce among agents in a knowledge economy.

To fully appreciate the system and method and Sub-Systems of the present invention, one must understand the Levels of Language involved as described hereinafter.

Levels of Language

There is language inherent in us. Social beings organize and co-evolve and adapt through the use of language. This language is both verbal and not, and grows and expands as our psychological and knowledge-based foundation develops from intense experience, physical and mental travel, and study. A simple concept to remember when thinking about language, and its importance in society, is that "everything speaks". Each action, word, behavior, organization or product does not tell; it speaks. To better understand the breadth of emergence of solutions made possible by the present invention, and to facilitate agents toward it, one must be able to understand and use the following Levels of Language required by the System and Method of the present invention.

DESCRIPTIVE LANGUAGE Normal Use (NU); Explains the organic and inorganic agent ENVIRON- MENTS in which we live and work. Agent-individuals explain the "sky" as "blue", the "light" as "amber", the "climate" as "comfortable". We explain the "office" as "creative", or "flexible", or "rigid". We explain the "organization" as "innovative", or "mundane", or "mainstream".

Descriptive language describes the design of agent environments in relation to the five senses of the human body; sight ("light" and "dark"), smell ("good" and "bad"), sound ("loud and "quiet"), touch ("rough" and "smooth"), and taste ("delicious" and "awful"). Descriptive language provides context for the concept of primary and secondary color, explaining how red, yellow, and blue can flower purple, green, and brown. Descriptive language distinguishes our natural resources . . . water, wood, coal, oil, iron ore. Descriptive language is an essential ingredient in creating an agent environment experience as a tool for facilitating agent interaction to breakthrough results.

TECHNICAL LANGUAGE Terms of Art (ToA); Explains the TOOLS of the mind in the form of buildings, infrastructures, computers, electronic devices, modes of transportation, and more. Earth is an organization in itself, formed of many cultures of living systems; animals, people, groups, organizations, communities, businesses. Each applies unique technical language to its agents. The Term of Art for the agent who created Windows Operating System is "Microsoft". The Term of Art for the appliance that bakes slices of bread is "toaster". The Term of Art for a team of individuals working together within a company may be "Strategic Business Unit", or "Marketing Department". We use Technical Language (Terms of Art) in all disciplines including manufacturing, law, medicine, technology, education, etc. With each new discipline you begin to acquire mastery in, a new set of Technical Language (Terms of Art) you will have to learn. In organizations we create brands, symbols, icons, and slogans that work as modern technical languages. Developing a vast technical language prepares agents for success in a knowledge economy. The most obvious representation of Technical Language (Terms of Art) are glossaries, indexes, dictionaries, manuals, brochures, etc.

PATTERN LANGUAGE Solution Sets (SS); Explains solutions to what we understand to some degree, and we find difficult to change. These are rigid patterns of behavior, language, architecture, organization, that once observed become obvious, but seldom we take time to understand them. Within major disciplines of work (architecture, education, systems thinking, biology, technology, mathematics, social sciences, physics, anthropology, etc.), agents connect Technical Language and Descriptive Language creating solutions to society's most common problems. Understanding this knowledge allows agents to understand the world. English, Spanish, French and Japanese are pattern languages for their respective cultures, solutions that solve "the problem" of communication. The language may change, or not, to benefit society and to increase understanding. Understanding English allows agents to understand other agents who also understand the solution society calls English. When the same agent understands the solution-French, it increases its knowledge, and ability to communicate, by an order of magnitude, and so on. The same could be said about a computer, as you add software programs making it multi-functional and cross-platform.

Consider the young woman, agent-Mary, who at an early age travels long distances, across culture and gathers technical language along the way. She enters a multi-national organization and spends time in several different strategic business units (SBU's). She brings a great deal more solutions to her work, because of the patterns she has learned from her experience. Consider a student of medicine, who becomes an expert in a bone of the knee, in the mechanics of it, how it moves, etc. Compare this person to an architect, biologist, technocrat, mathematician. What if all this knowledge were combined, through practice and study? What if we viewed the world through a broad based lens, covering many disciplines, not just one? Agents collect these solutions from a variety of sources, most common of which are formal education and experience.

The present inventors have found that an element of emergence of solutions is the ability to augment ones experience with the appropriate Knowledge Objects in the form of articles, books, research materials, scientific explanations, mechanical objects, and much, much more. The experience that agents bring to their work can currently be augmented with knowledge objects (books, Internet research, stories, mechanical objects, etc.) including texts covering several disciplines, familiar and not. These knowledge objects each provide unique solution sets that can be applied to the complex problems of a group, AND solutions that facilitators can use to accelerate Emergence of solutions. Sample of this knowledge base includes . . .

MG Taylor Corporation Archives housed on Hilton Head Island, S.C.
www.mgtaylor.com
A Pattern Language by Christopher Alexander
Living Systems by James Grier Miller
The complete works of Frank Lloyd Wright
Turtles, Termites, and Traffic Jams by Mitchel Resnick
Out of Control by Kevin Kelley
Co-opetition by Adam M. Brandenburger and Barry J. Nalebuff
The Art of War by Sun-Tzu
The Society of Mind by Marvin Minsky
The Glass Bead Game by Hermann Hesse
At Home in the Universe by Stuart Kauffman
Biomimicy by Janine M. Benyus
Being Digital by Nicholas Negroponte
The Web of Life by Fritjof Capra
and more . . .

Of course, the knowledge base available to all agents is currently increasing exponentially with improvements to communication and data mining technologies.

Agent Definition

According to another aspect of the present invention, agents may be uniquely and precisely defined. This is useful in building electronic or virtual agents according to the present invention.

Preferably the Agent definition "code" will contain (at least) the following: 1) Level of Recursion (as we talked about Wednesday). 2) Iteration number (in a sequence of facilitated activities—this could be done by InfoLog #). 3) The material composition of the Agent (by category). 4) The medium of the Agent (in terms of the System). 5) The FUNCTION of the Agent (which is the sum of all the agents that make up the Agent in the language (level) of algorithm. Thus, this code could look something like this:
$R^2$/wid.1223990034.00123455.sts/dig/vNW/kLOC-pITRAV-r&n
In this instance, the Agent is on Recursion 2 ($R^2$), the InfoLog# states the place, time and person using/accessing/"owning" the Agent, that the Agent is digital in physical nature and posted on the Internet (or equivalent) and is made of three agents (functions) scripts: "Know your location," "Purchase Integrated Travel Ticket" and "Report and Notify" (the results).

Other forms of code can be used and there is additional information that can go into this. Moreover, Color and size can be used to add further description.

MODELING LANGUAGE Design and Process Terms (D/PT); Explains the PROCESS we use to work, interact, live, transport, build, etc. The models have formal and informal "rules of engagement" which are flexible, sometimes broken, boundaries for agent interaction. Some of us choose to explore these models, drill deep into them, break old models, and create new ones.

In accordance with an important aspect of the present invention, the present inventors have created modeling language for organizations to use to develop common understanding—a means to view existing conditions in alternative ways. This modeling language provides a vehicle for Agents to communicate on all levels, in any environment, at all times.

Creating common language among agents improves efficiency and profitability when solving complex problems. The modeling language of the present invention includes the following models:

Three Cat Model

The Three Cat Model is a metaphor for info management in the act of creation. The model summarizes the acts of observing reality, forming a concept, and testing that concept by building a model to reveal our understanding. The model is then compared to reality for verification, the concept is adjusted, the model rebuilt, and so on.

🐱 Real Cat: Actually, we don't really ever see the real cat. Our senses gather signals from the visible part of the electromagnetic spectrum, fluctuations in air pressure that register on our ears as sound, and the electrochemical signals that result from physically touching an object. Because our information concerning real cat is most incomplete, there's always more to learn.

🐱 Conceptual Cat: As we observe real cat, we create mental models to use as aids in decision making. We learn to associate current phenomenon with past occurrences of similar phenomenon. We make decisions based on projections of past behavior onto the current situation. Lacking any such direct associations, we are forced to invent.

🐱 Mechanical Cat: In order to test our concept, we create physical models and compare them to the reality. The artist paints; the engineer builds scale models; the business person turns to planning software and spreadsheets; the writer composes stories.

Now, what about the connections between the three cats? There are two lines that connect any two cats. The squiggle line is the symbol for a resistor in electronics and refers to the attenuation of information in that direction. So, for instance, the communication of information from Real Cat to Concept Cat is severely attenuated. The triangle line is another symbol borrowed from electronics—an amplifier. The information running from Concept Cat back up to Real Cat is amplified.

Using the model: 3 Cat Analysis describes a methodology for testing ideas through modeling and taking action. When an idea is only a concept, people can argue endlessly whether it will work or not work. It is usually far more effective to take the concept into action, by creating a physical world, or better yet, a demonstration, prototype, or other real world test. This is particularly true when accompanied by a feedback-driven process that encourages ongoing learning and discovery. Many concepts are hard to explain, yet are readily understood when demonstrated.

The 3 Cat Model may be applied to planning as well. A trap with planning is to believe that the plan is what you will go out and do. When results (the real cat) deviate from the plan (your mechanical cat), use this information to modify your actions, strategies and tactics accordingly, steering toward your vision (your concept cat). Can the model by "two-catted:? Yes, but very carefully. Using only two cats in the model has great uses, but also great abuses. Refrain from "two-catting" until you fully understand the relationships between each cat in the model.

Vantage Points Model

☯ Philosophy: The fundamental—usually hidden—beliefs that unite the components of an Enterprise, enabling them to act as a cohesive whole. Properly applied, philosophy enables both innovation and stability.

☯ Culture: Defines the various components of the Enterprise and their relationship to one another in action. Also encompasses standard behaviors of these components—behaviors which are manifestations of the Philosophy.

☯ Policy: At the broadest level, statements of purpose, intent and goals. At a narrower level, Policy can specify boundaries on the design and prosecution of Strategy, Tactics, Logistics and Tasks. Policy states the rules of the game.

☯ Strategy: The organization, disposition and direction of large scale forces over space and time to achieve the objectives of Policy, maintain homeostasis in a competitive and cooperative environment, and manage growth. Also the set of recognized "patterns of play" known or suspected to produce favorable results when implemented.

☯ Tactics: The art of matching the resources of Logistics with Strategy and deploying these effectively and efficiently in the game.

☯ Logistics: All of the issues concerning resources, energy knowledge, and the mechanics of their distribution and storage throughout the Enterprise.

☯ Tasks: The work to be done and how it's actually done. The way a tool is untreated, of course speaks plainly of the philosophy and culture of the user.

In a way, you can never understand the philosophy of a system or enterprise until you are immersed in the tasks that comprise its daily functions. The task provides a mental elevation from which the whole essence of the system can be contemplated. The philosophy and culture of an organization will be expressed in the way an associate is taught or allowed to perform its tasks. By observing people performing various tasks, by sensing the atmosphere, energy and ethics of the environment, most anyone can determine the true expressed philosophy of any organization.

On the other hand, sometimes immersion in daily tasks can blind people to culture and philosophy, or cause them to accept it too casually. Many of our actions are based on essentially hidden stimuli and barely understood themes. Most of us can't spend all of our time evaluating various philosophies; it's easier to accept one and act out from it. Philosophies accepted as truth are very hard to shake or adapt to changing circumstances.

The Vantage Points are meant to be managed and designed-used as templates and auditing tools. The Vantage Points break down into three overlapping zones from special types of management emphasis.

Design and mange Philosophy, Culture and Policy to steer the evolution of the enterprise.

Design and manage Policy, Strategy and Tactics to steer the operational and structural support of the enterprise.

Design and mange Tactics, Logistics and Tasks to steer the work to be done by the enterprise.

Seven Domains Model

The seven areas that are managed in every enterprise and every activity of the enterprise. When managed properly they ensure corporate health and allow Knowledge-based organizations to grow and profit.

⸸ Body of Knowledge: The sum total of information and information about how to get information that the system requires to remain viable, to improve and innovate.

✤ Process Facilitation: The philosophy and methods for removing obstacles and clearing paths so that processes within the system flow naturally and efficiently.

ŏ Education: The processes and methods by which the system learns: how it explores, experiences, gathers explanations and examples, and how it sets cybernetic expectations.

✼ Environment: The physical, emotional and metaphysical field within which the system plays its role. But the system is not merely subject to the environment—it creates and is created by it.

⁂ Technical Systems: Artifacts created and employed to amplify, modulate or attenuate the other domains so that the system can be internally and externally requisite and cybernetically responsive.

ť Project Management: The philosophy, culture and methods employed by the system to efficiently allocate resources and monitor energy flow in the pursuit of finite, temporal objectives.

⚘ Venture Management: The philosophy, culture and methods employed by the system to determine (not just manage to) its cybernetic homeostasis and engage in complex activities designed to explore unknown opportunities for growth and transformation.

Most of us tend to examine the domains serially. We talk about them one at a time and one after the other. There's nothing wrong with this approach; it is, however, a woefully incomplete approach. The domains are connected to one another in weblike fashion. It's much more interesting and valuable, therefore to think about things like the Environment of Process Facilitation, or the Environment of Technical System, or the Technical Systems of the Body of Knowledge, or the Venture Management of Education.

A frequently asked question about the domains concerns why human resources or team spirit or some other people-oriented domain seems to be missing. People are not resources to be managed. Instead, people collaboratively manage the Seven Domains to achieve together what they cannot achieve separately.

A venture is composed of projects and processes. These two overlap—there's no clear definition that divides projects from processes. Both must be managed and facilitated to maintain balance and growth. The Venture lives within and creates its environment or environments—the field on which the game is played. It calls upon a body of knowledge to execute its projects and processes. It employs technical systems that enable its metabolism to remain requisite with its surroundings—managing lags, avoiding collisions, employing hunting strategies as guidance mechanisms for staying on specification, compensating for unwanted changes in energy thruput or system velocity. Finally, it engages an education system to manage learning—a discovery and feedback system whose purpose is to add to, analyze, and winnow the body of knowledge.

S'Poze Model

New pieces of information are constantly trying to penetrate the boundaries of one's paradigm. In order to survive, a paradigm must have strong boundaries, which consequently means that few new ideas can get in. Playing "Spoze" allows us to set up a neutral space to see what would happen IF a new idea were to enter a paradigm.

⚭ Encounter: At this stage, the system's current Paradigm meets up with a high information messaging event. Either the new information represents a threat and the system must learn new strategies for thwarting it, or it contains a potential benefit and the system must learn how to take advantage or it.

i New information: Systems are receiving all kinds of messages from other system and the environment in general. Information is the result of a system's interpretation of a message, including whatever meaning it assigns to the message based on past experience. The measure of information is proportional to its uncertainty, or surprise. The more surprising the message, the more information it contains.

❡ Paradigm: For a living system to make decisions, it must be able to compare the nature of sensory input that it receives to some model that predicts probable future outcomes based on stored previous experiences involving that input. It represents a guide to success given a variety of situations. The sum total of these situations and the guideline stored in the system comprise its paradigm.

☼ S'poze: It is not advisable for a system to accept any and all New Information to add to its Paradigm. The process of modeling enables the system to play "what if" without actually engaging in a potentially threatening experience.

✻ Incorporation: If the results of the simulation seem favorable, the system may incorporate the New Information into its Paradigm and begin making decisions based upon this new mixture.

Example: Like Scan Focus Act, this is a naturally occurring model. A common example used in describing Scan Focus Act will also serve here—the story of the lioness hunting wildebeest on the plains of the Serengeti. The lioness Scans the herd for a potential meal. Focuses on likely candidates and then Acts explosively to chase one down. That's a simple description of the process from the vantage point of creativity. But what's going on from a signal processing standpoint?

New information about the herd and perhaps other animals lurking about, is constantly streaming into the lioness' senses. This new information, according to James Miller's Living Systems model is processed by a function called the Associator. The Associator compares the input to patterns and models in Memory, searching for overlaps that trigger the Decider function to initiate some physiological activity in response. New information that enters the system as a result of this response is fed back into Memory to update the pattern. This trio of functions—Associator, Memory and Decider—represents the learning process. Thus, the lioness learns how to spot potential meals among the animals in the herd. It also learns different strategies for approaching and chasing its meal. The activity of the Associator is one representation of playing S'poze. The Associator is trying to build little vignettes (or scenarios) of future predictions based on a comparison of new information and old memories.

Strategies for playing S'poze: It may seem from looking at the model that the activity of S'poze is played outside of the host system, in some safe, confined area. This is not the case. S'poze is played in real life with an element of risk. Playing S'poze is required for the organization to continue to learn, and also to spawn offspring that can successfully adapt to changing conditions in the wider ecosystem. The risk is unavoidable.

The most complete way for an enterprise to play S'poze is to create offspring, preferably through "recombination of DNA." In enterprises, recombination occurs when two or more organizations share ideas and strengths to form a separate project or enterprise for the purpose of testing the quality of the ideas in action. You can simulate all you want, but at some point you really just have to do it to know whether it will succeed.

Appropriate Response Model

✹ Efficacious: It's defined as "the power or capacity to produce the desired effect." By contrast, the word effective means "having the intended or expected effect." The difference lies in the use of the work "power." An efficacious design exudes power and this power is efficiently directed to yield predictable results.

☉ Proper Scope: This element contains the power inherent in the first element. An excellent design should properly fill its niche and not strive for too much, nor suffer from a timid presence. The boundaries of the design must be clearly defined. This does not mean they must form a contiguous presence, only that by some combination of matter, energy and information the solution is able to distinguish itself clearly from other elements in its environment.

⋎ True to Nature: A design that is true to nature is composed of elements that support one another, that do not conflict, and whose capabilities are mutually requisite. In a growing seedling, the roots, stem and leaves all remain requisite with one another: the leaves don't photosynthesize too much or too little, the stem is sized just right to provide structural support and the transport of materials up and down. A design should be elegant, all of its parts fitting together in a pleasing fashion that makes people want to employ it.

⊙ Anticipatory: Designs, or solutions to problems are living systems. As such, they must include the apparatus and processes necessary to use models based on past experience, along with current data gathering to make predictions concerning the future behavior of other systems in the environment. At the lowest level, this serves survival; at higher levels, anticipatory hardware and software enable systems to effectively collaborate with one another to support both the homeostasis and evolution of their collective ecosystem.

⥮ Self-correcting: Once a system can make predictions about the future, it must compare these predictions with its current behavior and implement changes to adjust its behavior to bring it into harmony with its future models. In this sense it's bringing its vision of the future back to the present.

⊅ Sustainable: Finally, a system must be able to survive birth, grow to maturity, and reproduce itself. It must do this without depleting the systems that support its growth, otherwise it will cause its own demise.

Every stage of the Creative Process involves producing a result. Superior results can be obtained by filtering or testing competing designs through the six elements of this model.

The model has six elements grouped into two sets of three. The first set includes functional qualities: Efficacy, Scope, Nature. The second set embraces living system capabilities: Sustainability, Self-Correction, Anticipatory. These divisions seem somewhat arbitrary. The ability of a system to anticipate future events can be seen as either a functional quality or a living system capability. However, the ability to extrapolate events into the future, the ability to use this extrapolation to correct behavior in real time, and the ability to grow and reproduce oneself are characteristics that clearly set living systems apart from mechanical or nonliving systems. A hammer produces a desired effect (efficacy), is built with a particular scope of work in mind (scope), and has qualities that keep its parts requisite with each other (nature). However, it is not sustainable; rather it degrades and is incapable of reproduction. It embodies no ability to correct itself or learn. And it certainly cannot anticipate future results.

Design—Build—Use

The most common approach to designing, building or using most anything is linear. In its extreme incarnations, not only is there no feedback between stages, but the individuals involved in each stage are different as well as do not communicate across the boundaries between stages. The traditional, linear approach of the model generates static, non-living artifacts which can be torn down in response to a wide range of demands upon their flexibility. Life becomes an unending compromise. The model should grow from a linear process to cycles of feedback.

✎ Design: Create sketches, models, plans, schedules, and bud gets convey a sense of the scope of the project in many different dimensions. This is not done merely at the beginning of the project, but as a sort of continuous process throughout the life of the building. The design takes into account past and present work process requirements, and the uncertainty associated with the future as well.

◇ Build: There must be a process for rapid execution of the design that allows frequent adjustments to the realities of a build-out and the changing perceptions of the user as the design unfolds. The process and the product (space) must provide for this speed throughout the occupancy so that the enterprise of users does not have to waste time and talent in reconfiguring itself to meet changing conditions.

⌇ Use: As the environment is used, it will change the processes that take place within it. These changes, in addition to events in the external environment will drive a demand for the work space to adjust its function, and to do so rapidly. The design and build capacities must always be readily at hand.

The cyclic model illustrates the requisite relationship between design, build and use. The designer and the design process is connected to both the user and the builder. The builder and the building process is connected to the user and designer. The user and the processes employed by the user in the conduct of the business of the enterprise is connected to the designer and builder. These interconnecting feedback loops imply that the designer, builder and user remain connected throughout the lifespan of the enterprise. It also requires that the products of this collaboration be stable enough to provide day-to-day integrity and flexible enough to allow radical, rapid redesign to fit the changing needs of the user over time. It means that the environment is never "finished" and that it is constantly able to provide a "just enough, just in time" solution. Things that are "finished" in our emerging world are dead.

Requisite Variety V=0; V≠0

Degrees of Freedom (to act)

Transition Management (acting in tacit [ ] degrees of Freedom)

"No our there" (Recursion Issue)
Increasing Returns Model
180° Principle
Levels of Recursion of the system It is important to reemphasize that not only must the three different entities communicate and collaborate, but their processes must dovetail as well. That means that the design, build and using processes should not inhibit each other or create confusion. For the user it indicates a mental shift in understanding that a design and build capability occupy a permanent part of the larger web of the enterprise. It also changes the way that equity, debt and cash flow are treated within the value web between the builder, designer and user.

Scan-Focus-Act

Scan-Focus-Act is a basic model for the process of planning, decision-making and creative problem-solving. To get a picture of how the model works, imagine a hungry lioness on the plains of the Serengeti. She Scans her domain for luncheon possibilities (note that scanning frequently takes a long time), Focuses on particularly attractive selections and positions herself appropriately, then Acts to bring the meal down.

⋇ Scan: To Scan is to seek ideas and perspectives that are new and challenging to your existing world view. You survey conditions and possibilities relative to your plan, and seek insights that may come from outside you organization and industry. You are also seeking to expose hidden assumptions that may limit the options you can see or consider. In the Scan phase we build conceptual, mental models.

◙ Focus: To Focus is to take the ideas generated in the Scan phase that are best suited for your plan and begin iterating them. In this phase, ideas are treated as models to be tested and explored, not judged or condemned. In the Focus phase you should choose a frame of reference, and narrow your options to only a handful. At length, a decision is made and it's time to . . .

✗ Act: To Act is to take your ideas and designs and put them into action. The process begins by selecting the strongest ideas, and formulating them into plans and actionable steps.

↻ Feedback: The result of an experience is fed back as learning to the next iteration of the process. Feedback is termed positive if the desire is to grow the system, and can be negative if homeostatic control, or goal-seeking is the object.

≜ Movement through the model: One of the dangers of the Scan-Focus-Act model is to assume that the model is designed in a linear of cyclic fashion. There are six different combinations of the scan-focus-act model. These should not be thought of as different models, but as strategies to be used in different situations. For instance, it is not always necessary or viable to start with a scan phase. If you're driving on the highway and see a car in front of you swerve out of control, you may describe you reaction as Acting first to avoid collision, then Focusing on next alternatives, choosing to bring the car to a controlled stop along the roadside, and then taking a longer Scan around to see what's going on. This might be the most useful way to explain how the model felt in this particular situation. However, it is also true that a lightning quick Scan occurred the instant you noticed the other car swerve out of control. It was followed by an equally lightning quick Focus, perhaps a reflex decision-making and choice of an option to take—avoiding collision. Within the Act, you've scanned and focused.

The pace of the model varies greatly. Sometimes the stages unfold rapidly one after the other. Other times they creep along at a glacial pace. Scan may take a second or two but the Focus and Act stages might drag on for weeks. Or it might work the other way around. Sometimes teams struggles for a long time trying to bring a coherent sense of vision to a project and once it clicks in place, the Focus and Act phases follow swiftly.

It is important to note that although each phase does not adhere to a set time frame, one should refrain from becoming "bogged-down" in a single phase. For example, some people or enterprises have great ideas and can never bring them to fruition (stuck in Scan). Or they may entertain in a slavish, myopic view of annual plans and budgets, thereby missing opportunities and hampering implementation (stuck in Focus). Perhaps their days are spent "putting out fires" and they never seem to have time to innovate or make systematic efforts to improve (stuck in Act). Or, a lingering introspection promotes timidity (stuck in Feedback).

Model of the Creative Process

≜ Identity: In this phase, you study the world around you and observe data, facts, and feelings. Your task is to identify your conditions and your relationship to these conditions.

◈ Vision: In this phase you seek what can be created. Often this is an image of the "end state" you want to achieve, with hardly a clue as to how to get there.

✦ Intent: Here you size up the situation and decide to "do something" about it. Primarily, this is the phase of personal ownership and commitment, where you make solving the problem part of your personal quest.

⚡ Insight: This is the "Aha!" stage in which a synthesis occurs between all that has gone before; the confusion starts to make sense.

Engineering: It's time to put ideas into practice. Once insight is achieved, one has the information, plan, or design that allows for detailed-level questions to be asked.

◇ Building: In this phase, you take the numbers and the schedules and do it. This is the phase of production, marketing, and entrepreneurship.

⎇ Using: Often forgotten, this phase is when the consumer uses the end product, of the entire process that we can truly evaluate our success. Inevitably, when this phase is not ignored, the process brings new insight.

This model explains how problems are created and then solved in a process that is recursive, fractal, cyclic and nonlinear in character.

The most striking feature is the bipartite division that separates the Using stage from the Identity stage and cuts the insight stage in half. The model "starts" with the Identity stage and the purpose of the first half is creating the problem. The second half has the job of solving the problem which the first half created, thereby producing a new Condition in the Using stage, out of which the first half will again have to create a new problem.

The first half of the process is individual and the last half collective. This is so because until an idea has a physical manifestation, it cannot be perceived in a useful collective manner. Ideas have no value merely as ideas; they must be expressed in specific form. Likewise, manifestations have no value unless they can be translated into ideas to be transported, improved and evolved.

The whole purpose of the first half of the creative process is to investigate, discover and discern the operating mechanics, cybernetic connections, and principles of self-organization of the existing system. Then—maybe—we can act upon the system with intelligence. Or at least envision a new system that produces different condition more in line with our vision.

Business of Enterprise

The players and their roles in the model:

⁂ The Investor: The investor provides capital to the enterprise and gets a return of and on the investment. However, more and more investors are also providers and customers.

⁂ The Producer: The producer still makes the product or creates the service. But producers are more involved in understanding how the company works through programs like open book management.

⁂ The Customer: The customer purchases and uses the product. But customers are also interested in how well and ethically the companies are run—they vote with their investments. And customers are included in production.

⁂ The Management: Management balances the business of the whole web, but the management function is more distributed. There is more management going on, but fewer managers.

Some companies are learning how to transform a zero-sum game into an infinite game. In a zero sum game, there's a finite amount of resource and the game is to decide how it gets distributed. In an infinite game, the purpose of the game is to continue the game—to grow and expand the resource base and the distribution model. The best models to use when playing infinite games are living systems models.

But just growing an organization does not eliminate the conflict inherent in the old model of business. After all, many organizations experience tremendous growth rates yet only exacerbate the conflicts between their constituents. There are two more factors that must be added for the new model to be truly transformative.

Take another look at the picture of the model. You're looking for the connections between constituents. Management is the largest hub connecting the constituents, but there is a whole web of lines that connect customers, producers and investors. It's these many subnetworks that tie the players more tightly together and make them interested in their shared fortunes. These links represent true knowledge—or experientially applied information about how the different portions of the enterprise work, and about how the enterprise works together as a whole. With this knowledge in hand, each constituent can act responsibly with respect to the enterprise and serves in a small cybernetic-style management role.

There's one more necessary factor that doesn't jump out at you from the model. Not only are subgroups of constituents linked together into mini nets but an individual constituent may play more than one role. An individual could be an investor, a customer and a producer all at once, and therefore have a true stake in every facet of the enterprise. To leverage that stake, the individual must also play a role in the management function—in understanding the body of knowledge that helps him or her make good decisions as a customer, investor and producer.

The 5 E's of Education

The role of education is to serve as a catalyst for innovation, problem reformulation, and organizational renewal. The 5 E's are principles of education—and of leadership—for effective organizations. These components are:

⁂ Explain: The learner needs a "background" composed of information and theory in order to intellectually understand. This "body of knowledge creates a context for action.

⁂ Experience: The learner and teacher must have experience which embodies what is to be learned. Explanations and experience work together to personalize and bring meaning to the learner.

⁂ Expectation: Expectations must be high in order for growth.

⁂ Example: People will learn from what you do, not from what you say you are. To some extent, you are the subject you are teaching.

⁂ Explore: The most powerful learning occurs when the learner is challenged and encouraged to take their understanding further, into "uncharted waters". True exploration means leaving certainty behind.

These principles can be applied to any learning/teaching situation. The model implies that explanations and examples form the foundation of education, but this doesn't mean that they necessarily come first in the process of education. Perhaps exploration and some experience come first—then out of the experience the learner can extract explanations and develop a systematic approach to hunt for further examples to confirm, deny, or expand their conclusions. In practice, the process tends to jumble all of the 5 E's together, calling upon whichever one is required by the learner to take the next step or receive the next insight. If an event lacks one or several of the E's chances are its benefits will be marginalized.

Structure of the model: In this fluid model, explanation and example form the core. They are surrounded by a sac and membrane of expectation. Beyond that lies another, larger area of exploration. The membrane surrounding the entire model is experience.

It's clear that expectations exceed simple explanation and example. But they also, clearly must fall short of exploration, with it's hidden element of the unknown and undiscovered. One of the keys to understanding this model is to realize that experience enfolds it all. Even the act of hearing or reading an explanation is an experience. If you imagine experience to be a separate exercise from explanation, then the setting and force of the explanations will likely suffer.

Experience should be managed using the Seven Domains as a template, for all experiences are facilitated one way or another. Frequently the facilitative aspects are left to chance, or hidden or poorly designed, but they are present. And experience should be crafted.

Thus, we can couch experience in terms of the other four E's, with the following result:

the experience of explanation is in the ability to listen, focus and absorb (not necessarily referring to only an auditory process).

the experience of expectation is acknowledging mastery and the path to be taken the experience of exploration is a sense of wonder and a willingness to risk.

the experience of experience . . . (any philosophers out there?)

Stages of an Enterprise

⁂ Conception: This is where ventures and enterprises originate.

⁂ Looping: Most ideas go through a roller coaster ride of peaks of success followed by valleys of near collapse before they become viable—capable of separate existence.

✦ Success: At this stage, the enterprise is viable. This means it understands as an organism how to maintain its metabolism from month to month, and how to grow.

⩓ Overshoot and Collapse: If the enterprise does not learn how to maintain homeostasis, it may overshoot its envelope of healthy growth and then rapidly collapse upon itself.

⊙ Entrepreneurial Button: Newly conceived ideas within an existing Enterprise, even if tested through the looping stage, cannot become viable unless the Entrepreneurial Button is pushed. There must be an overt recognition of the need for and value of the new idea or it will not be allowed to grow.

⌬ Mature: The Enterprise passes through probably its longest and most stable stage. This is also the most favorable time for spawning new enterprises although many ventures fail to do so until it's almost too late . . .

↺ Turnaround: Ventures lose their ability to maintain homeostasis and begin to collapse. Usually this is due to a lag time in the organization's ability to respond to or anticipate external or internal rates of change; it falls behind or leaps too far ahead and is exposed.

≋ Demise: Eventually all organizations reach their demise. Sometimes it's the easiest way for the enterprise to allow new ideas to escape and try for viability.

The Entrepreneurial Button

To make a big leap of innovation the Entrepreneurial Button must be pushed. This means one of several things:

An entirely new entity is born, unencumbered by the structures and culture of its parent. Perhaps the company spawns a subsidiary, or a venture with a partner. Or enterprising employees go off on their own with better ideas that were not being heard. The result is the zone of innovation for the new entity. The parent may go on to struggle for quite a while, unable to transform itself from within.

The parent organization undergoes a metamorphosis or rebirth, shedding its inhibiting cultures, philosophies and policies. The result is the intergenerational enterprise trajectory which shows the parent organization making steady improvements and then leaping to a new level of innovation.

In either case, the Entrepreneurial Button is not simply a zone where transformation just happens. The button doesn't occur at some predetermined location in the model, although there are more or less favorable times—one of the most favorable being the period of maturity, just after success.

Pushing the button is a conscious decision. Much of the conceptual work will already have been done. The new idea will have passed through some looping already before the decision is made to launch it. The people making the decision are not always the executive management. An idea can be so powerful that it may "seek out" other people to launch it if no one in the parent organization is interested.

Ten Step Knowledge Management

⚡ Event: The event is some process undertaken by one or several "Knodes" (Knowledge Nodes) that produces information.

✎ Documentation: The information is captured, encoded in the form of a message, tagged for shipping, transduced across the Event membrane, and transferred via some signal, medium, and channel to the K-Base.

▣ K-base: The K-Base serves as repository, or data warehouse, and router for messages in the enterprise.

◈ Distribution: The documentation is repackaged, encoded, transduced, and transmitted across the Web (Enterprise) to all parties that need the information as potential Compelling input.

✐ Tracking: Tracking records the condition, origin and destination of each message that crosses the K-Base membrane (transduction), it creates a history of the use of the K-Base.

↵ Feedback: Knodes transmit information back to the K-Base concerning any State Changes they have experienced as a result of receiving and processing the original information.

▣ K-Base: The K-Base stores the feedback.

↳ Design: The original information and the feedback are used to design the next iteration of work—the facilitation of the next event, or process.

◉ Read-Ahead: A read-ahead is advance information transmitted to the future event's participants.

⚡ Event: The cycle ends as it begins.

Meetings and events are an integral part of the creative cycle that allows organizations to solve problems and implement programs. Substantial leaps in productivity and effectiveness can be achieved by managing this process according to the 10-step model.

The model in flow: Note that the K-Base is embedded within the tracking system ring. This means that any message-bearing signal that enters or leaves the K-Base domain is logged-out—not just those from the distribution stage. Information within events, documentations, feedback, designs, and read-ahead all pass through the tracking system into the K-Base, out through the tracking system again and through distribution out to the Enterprise.

Think about the model being used not by a group or team, but by a single individual. And imagine this individual has no artifact or tool for recording incoming and outgoing information: information must be passed by work of mouth. In this case, the individual's brain is the K-base and the tracking system. Distribution happens by story-telling. Feedback is a direct communication process, design is creativity, the read-ahead is verbal or perhaps environmental preparation for the next event. Documentation and the K-Base are inseparable.

Note that some information is also passed directly from one step to another without passing through the K-Base. In fact, the vast majority of information in practice is either passed directly from one step to another or lost from the system altogether. Enterprises and other living systems survive by managing a small amount of the data that arrives at their senses, converting it into information and applying it experientially as knowledge.

The modeling language described herein is more than a shorthand. The modeling language functions the same way as any high level language in a computer. In addition to the glyphs and meanings that are set forth, there are certain transactional terms including Boolean operators such as greater than, equal to, larger than, less than, and, or and not. In addition, the language should include operators such as take, by, act on and the like.

Another important aspect of the language described herein is that the language is representational. Because the language is visual, both the color and size can have an exact and referential meaning. Thus, by assigning a referential meaning to each color, context can be added to the message conveyed by the glyphs. Likewise, size can have a exact and referential meaning, for example, size can indicate importance. The bigger the glyph, the more important the concept explained by that glyph.

Every organization, system, nation, community, agent, uses its own inherent models of work. Once agents are able to understand the current model they work within, they are able to iterate the model for higher performance, and allow colleagues to "step into" proven productive models, to facilitate Emergence of solutions.

ALGORITHM Rule Statements (RS); Explains our experience. Interaction among agents, neuralgic behavior, fundamental building blocks. The economic, industrial, and information age work we do today is built upon algorithmic equations and rules. Rarely is it believed that ecosystems, organizations, companies, individuals are built, at the core by algorithms. Contrary to common belief, the present inventors have found that behavior within groups, among agents, is repeatable, driven by rules, and can be demonstrated as such. Regardless of the dynamics of the individuals, the groups, the organizations and the issue they wish to "solve", certain predictable combinations of events and patterns will occur if predictable, patterned rules are followed in the facilitation process.

Rules for Facilitating Emergence of Solutions Among Agents

RULE OF RECURSION

All elements that define viability, on one level of recursion, of a system must occur on all levels of recursion of the system. For a complex agent to be viable or for a simple agent to be effective in a complex environment, (of agents) the Agent must be "acted upon" (and/or be acting) at a minimum of three Levels of Recursion ("above," at the level of the Agent and a level "below" the Agent).

Actions that on a single Level of Recursion that are additive, on multiple Levels of Recursion will usually be multipliers. Leverage is accomplished by employing more than one Level of Recursion (thus, dealing with the Requisite Variety Rule: Variety must equal Variety). Generally, greater complexity can be dealt with or accomplished by employing Recursion than by action on one level of a system (given the same number of actions and level of resources). Emergence happens "between" (out of) Levels of Recursion.

RULE OF ITERATION

All things being equal, a single iteration of work, in isolation, is additive between steps while multiple iterations of work (in a continuous process) multiplies results. Work iterations must happen in rapid succession and within time compression for maximum effect.

RULE OF FEEDBACK

Feedback is the message from a sensor of the system to the controller of the system of the difference between performance and expectation. Positive feedback amplifies; negative feedback attenuates. Feedback on feedback and/or feedback between Levels of Recursion is feedback of a complex kind and is required for the governance (self correction) of complex and emergent systems.

RULE OF ITERATIVE, FEEDBACK DRIVEN SYSTEMS ACTING ON MULTIPLE LEVELS OF RECURSION

These systems exhibit increasing returns and learning. They co-evolve (with their environment) emergent behavior. They are open-ended and cannot be predicted or controlled. These systems can be operated in a way so that the desired kinds of results are consistently accomplished. This is possible when the Rules of Iteration, Feedback and Recursion are employed in a System of specific architecture (as described) that employs sufficient critical mass. Emergence is the result of complexity. Complexity is a factor of iteration, feedback, recursion, critical mass and the number of Agent (nodes) interactions in a specific time period and place. For example, within a group of 60 people (agents) there is bound to be the one individual who is "the skeptic", that person who believes it to be his or her duty to challenge, complain, question, disbelieve, etc. Most leaders, facilitators, managers, believe, in order to "deal" with this person they will have to closely "manage" the attitude The resources of the group and management must be cajoled to fight down this evil force. The present inventors have found that the ordeal of the skeptic should receive little more attention than any other. Pattern analysis proves that the skeptic will do either of two things, 1) evolve into something else, or 2) will make others have to answer his or her questions.

The former occurs as a result of being listened to. Outside the context of the home environment, brought to a neutral, patterned space, colleagues will find time and refuge in listening to the ideas of the skeptic. This will allow closure for the skeptic, and movement into other behavior. The latter occurs when the issues being tackled need the "devils" advocate, in order to answer questions that may not arise in traditional conversation. Similarly, once the questions are answered, the loop closed, the skeptic moves into a similar or altogether different role in regards to the next issue. The rule, thus, becomes apparent. When agent-behavior "skeptic" occurs, allow pattern language (solution set) 1) evolve into something else, or 2) make others answer his or her questions; to happen. Study the behaviors of Einstein, Bach, Michael Jordan, Kennedy, Iaccocca, Da Vinci, and you find similar rules. They have high tolerance for ambiguity, they work on specific "problems" or "works of art" (is there a difference?) for specific amounts of times, in certain environments. A third rule is that each includes in the process of work, the creation of a physical environment (studios, offices, stadiums, etc.) where their personal emergence of solutions can flourish. They are 18–25 rules that highly productive and innovative people share. In combination, these rules become solution sets (Pattern Language) that allows agents (groups) to solve complex problems in compressed time periods.

DEEP LANGUAGE Machine Language (ML); Explains the mind of individuals, the engine of automobiles, the code of computer programs, so deep that it hasn't yet, been totally understood by all humans. This is explained in connection with the exemplary Sub-Systems of the present invention as follows. It is noted, however, that it is possible to construct other sub-systems using the system and method of the present invention.

SUB-SYSTEM 1—System and Method for Facilitating Interaction Among Agents Promoting Feedback, Learning and Emergent Group Genius in a Radically Compressed Time Period This level of the system promotes Feedback, Learning, and Emergent Emergence of solutions in a radically compressed time period. The system and methods work to dissolve many problems of numerous agents (humans, computers, books, data bases, environmental and infrastructure elements, multimedia objects, etc.) speaking in non-compatible voices while interacting to solve complex problems associated with the necessity to stay requisite with a quickly changing and transforming environment and economy.

SUB-SYSTEM 2—System and Method for Optimizing Agent Pattern Language Values in Collaborative Environments This system and method dissolves many problems of Human (and other Agents) Architectural Pattern Language Values while accomplishing flexibility of arrangement (from workstation component level to building scale), the variety of individual and work spaces necessary for the full range of knowledge-intensive work (including collaboration of different size groups), the integration of multimedia and communication tools, yet, accomplishing a greater utilization of space and utilities than existing systems.

SUB-SYSTEM 3—System and Method for Integrating/Optimizing Technical Systems to Promote Agent Interaction This system and method dissolves many problems of knowledge-augmentation by technical systems and tools for single Agent work and the collaborative interaction of Agents, both real time and asynchronously, through multi-channel and multimedia networks and tool sets.

SUB-SYSTEM 4—System and Method for Transporting Agents and Agent Environments as an Integrated Experience This system and method dissolves many problems of seamless and integrated Agent (and agent environments) transportation providing a continuity of work and experience required by the demands of a global economy. An integrated transportation system, with seamless continuity between modes (personal/public; land/air/water) can be accomplished by "decomposable" modular structures employing units of various sizes. These units dock to home, hotels, and offices. They configure into cars, buses, airplane, and ship assemblages and fully employ AutoTracking (communication between agents). The transportation components are virtual, in a network of seamless communication and location tracking, allowing for variable real-time cost risk accounting, agreement execution, and value exchanges. The facilitation of this integrated experience of travel (Emergence of solutions), will add value and time to each iteration of work performed by the workforce in the 21st Century.

SUB-SYSTEM 5—System and Method for Structuring and Facilitating Value Exchange Among Agents Forming Real and Virtual Economies This system and method dissolves many issues of facilitating knowledge-economy Transactions and Agent value accounting while radically reducing the multiplicity of financial instruments (in a myriad of legal environments) now systemic to the industrial-based economy. The systematic, networked economy will create true ValueWebs (not supply-chains), where customers, investors, producers, and manufacturers and users will integrate. Organizations in America and across the globe will continue to better understand Intellectual Property and Capital, on many levels of recursion, and how it can be used for value and cash flow creation to self fund an enterprise.

SUB-SYSTEM 6—System and Method for Facilitating Work and Commerce Among Agents in a Knowledge Economy This system and method dissolves many problems of Agent participation in a Complex Global Economy and the TRANSITION to it. The major disciplines . . . business, architecture, physics, transportation, biology, economics, systems thinking, lean manufacturing, engineering . . . those things required for knowledge based creation will evolve, and connect. Within this system of disciplines all things can be explained. As the current flood of information continues, organizations will need to mobilize for this paradigm shift toward pattern language solutions. The reality of "work environment" will evolve to meet the demands of the knowledge intensive and flexible workforce. The "work tool" will evolve to meet the demands of the knowledge intensive and flexible workforce. The "work process" will evolve to meet the demands of the knowledge intensive and flexible workforce.

With this context, the Sub-Systems of the present invention are further described as follows.

1. System and Method for Facilitating Interaction Among Agents Promoting Feedback, Learning and Emergent Group Genius in a Radically Compressed Time Period An embodiment of the present invention is described in FIGS. 1–7. FIG. SS1-1 provides a block diagram overviewing a single iteration of the method of the present invention. The steps of the present invention are not intended to occur in a particular order; they may occur simultaneously or in an orderly fashion, but not necessarily in the order illustrated in FIG. SS1-1. Moreover, the specific steps shown are illustrative, not exhaustive. The process and system can include other steps.

The method shown in FIG. SS1-1 illustrates only a single iteration of an embodiment of the present invention. An important aspect of the present invention is that the process occurs on multiple levels of recursion. Thus, it is contemplated that other iterations can, and preferably do, occur consecutively or in a chain-like manner, such as feeding the resultant agent or product of an iteration into a subsequent iteration; in addition, simultaneous multiple iterations can occur at different levels of interaction. For example, some agents within a particular iteration, such as a facilitator, may also conduct additional iterations relating to any particular step in the process or mirroring part or all of the iteration.

The system and process of the present invention are most productive when there are multiple levels of recursion and feedback occurring simultaneously. The use of an interactive process that includes multiple levels of recursion, feedback and self-adjustment yields a system and process that can be used to facilitate the interaction among agents such that synergistic results occur. In solving complex problems, for example, the system and process need not address the entire problem at once, but instead evolves toward a solution. In short, problems are dissolved, not solved.

In the single iteration shown in FIG. SS1-1, in step S1, a group or pool of agents for potential use with the system are identified. This identification step can be performed by a user of the system or by persons or systems outside the system of the present invention. These agents can include, for example, intelligent agents, persons, documents, computer software, firmware, living things, computers, and other objects. Collection by a system or person outside the system of the present invention could include, for example, a company selecting particular intelligent agents, documents, programs, and people as potential agents to be included for a particular iteration.

In step S2, an operation is conducted upon these agents. In an embodiment of the present invention, this operation includes selecting particular agents fitting a predetermined cross-section of skills or other creativity elements designed to foster operation of the present invention. The predetermined cross-section is dependent on the scope of the iteration; for example, if a particular problem is attempting to be solved for a particular group of agents, the nature of the problem and group suggests an appropriate cross-section. In addition, an embodiment of the present invention contains factors that support develop of a generic cross-section, which is alterable using iteration-specific information.

The selection process of step S2 can include, for example, querying the pool of agents for responses used in determining their amenability for the particular iteration. The querying can be intended to illicit characteristics about the agent that correspond or mesh with those characteristics identified for the predetermined cross-section. In addition, the substance of the responses themselves are useful in developing the cross-section.

In step S3, the agents selected as a result of the process of step S2 are added to an environment that has been created in step S4. Adding the agents can include connecting computers or agents via a network or other electronic or other coupling. It can also include collecting persons or groups of persons in a particular place.

Creating the environment of step S4 also includes such things as creating a particular network, designing a particular workspace, programming a computer, or other methods of collecting agents. In addition, other elements of the environment may be created. In particular, if the environment includes persons, the environment can include particular amenities designed to foster effective operation of the present invention. For example, the environment may include sectioned areas for collecting groups, wall surface writing and drawing capabilities to allow the agents to continuously maintain information in an easily viewable area, computers for use of agents, television or other video capabilities, and toys, games, books, and other tools designed to assist agents in communicating ideas and performing other functions that comprise the function of the present invention.

In step S5, the user or agents within the system perform work. The type of work performed by the agents can include a variety of tasks or exercises designed to encourage identification and detailed definition of problems or issues specific to the iteration using methods of approaching the problems or issues that are outside the agents' usual scope of problem solving patterns. The exercises and tasks can include collecting information, role playing, game playing, research, analysis, and reporting, model building, illustration of issues using three dimensional objects and tools, and other problem-solving activities.

The results of the processes of steps S3, S4, and S5 are production of new agents, such as documents, computer programs, suggested problem approaches analogous to issues at hand, and proposed solutions. In step S6, a sophisticated decision process occurs, which is further detailed in FIG. SS1-2, described below. The outcome of the decision process produces one of two outputs to other steps. In the first output branch, the resultant new agent is fed back to the current iteration. The first step of the feedback process is to test the new agent in step S7. In step S8, a decision is made as to whether to input the new agent as a perform work function for step S5. Alternatively, the system proceeds to step S9, in which a decision is made whether to input the new agent to the environment, step S4, thereby effectively creating a new environment, or to input the new agent as another agent in the system, step S3.

In the second output branch, the output of step S6 serves as input, step S10, to a new environment. In step S11, the agent is then altered as a result of its incorporation into the new environment. In step S12, the altered agent is evaluated in a sophisticated decision process similar to step S6, as described in more detail in relation to FIG. SS1-2 below. The results of this decision process are either to feed the resultant newly altered agent back to the current iteration, via step S7, or to exit the agent from the iteration.

The exit of the agent from the current iteration can serve a variety of functions. For example, the exiting agent can provide input to another iterative process using the present invention. The exiting agent can also simply exit the process.

Two examples of the operation of an iteration of the present invention as described in FIG. SS1-1 follow. These examples are intended to be illustrative only. The examples are not intended to limit the application of the system to a particular set of agents, a particular iteration, or a particular environment. The examples are also not intended to imply that a single iteration or a particular order of steps are necessary.

The first example illustrates a facilitated creativity workshop process. In a workshop using the present invention, some number of steps of the workshop are automated, such as computerized, using the method and system of the present invention. In this example, referring to FIG. SS1-1, in step S1 a group of persons are identified as a pool of potential agents to assist in solving a particular problem; in this example, both the pool of people and the particular problem are identified by a company.

In step S2, persons in the pool are provided with information and queried by a user, such as a facilitator, who also serves as an agent, in a targeted manner designed to illicit information about their potential amenability to the problem identified and the set of skills selected by the user. A computerized matrix of skill needs matched to the problem at hand is used to select from the pool; the matrix is partially fulfilled using a selection process. In this example, this process of matching skill results, problem-specific issues, and a matrix are automated. In addition, other agents are identified, such as intelligent agents designed to obtain particular information from the Internet. These intelligent agents can be either commercially available or specifically designed and tailored to the particular problem at hand. Also as a part of step S2, either separately or as an element of the pool selection process, a set of documents and other informational items are provided to the agents.

In step S3, the persons and intelligent agents selected are collected in a common environment, which is created in step S4. The environment can include furniture conducive to creativity, moveable walls that participants can write on, toys, games, video displays, computers, and other tools for creatively producing examples and illustrating points.

Contemporaneously with steps S3 and S4, exercises or other tasks are selected for performance by the agents as step S5. These exercises can include collecting information, such as automatically searching the Internet, role playing, game playing, analysis, reporting, or other problem-solving activities. These exercises are designed to encourage the agents to function or think about problems in a way that facilitates identification and detailed definition of the problem at hand using methods outside the scope of the usual problem solving of the agents. For example, a subgroup agents may be assigned to study and system in nature that may be suggestive of the problem at hand. The subgroup then provides their analysis and results to the selected group as a whole, which is then used for additional analysis and problem clarification. An intelligent agent may be assigned to obtain information about elements of nature when the problem is focused on a business issue.

In step S6, a decision is made as to whether the results are fed back, step S7, to the current iteration, as additional work performance, step S8, or into the environment or as additional agents, step S9. Alternatively, the results may be passed to an outside environment, step S10. In this example, the decision process is facilitated via input and evaluation using a computer program.

Following step S10, the agent is altered by the outside environment in step S11. The altered agent is then tested in step S12, in a manner similar to that of step S6, and a decision is made as to whether to exit the agent from this iteration, or to return the agent or additional information obtained as part of the altered output agent process to the current iteration through step S7.

As an example feed to an outside environment in steps S10 and S11, an initial proposal regarding the problem at hand could be sent via an agent to the management of the company. The management of the company could then provide feedback to the agent, who then returns to the environment of the current iteration to continue the iterative process.

In the second example, much more of the process is automated, such as by computer program and computerized intelligent agents. In this example, in step S1, a group of intelligent agents, each having specific functions and missions, are developed, step S2, by a user at a terminal to solve a particular problem. The functions and missions of these intelligent agents are identified or developed based on cross-indexing of preselected creativity traits and the scope of the problem at hand. In this example, an automated process assists the user with developing this cross-index.

The agents are then connected and communicate with the user via computer connection, which serves as the environment, step S4. As the user performs work, step S5, the agents provide a variety of inputs based on their assigned functions. For example, an agent could be assigned to search the Internet for associative ideas based on use of particular keywords by the user. Thus, as the user word processes and creates keywords some agents would continuously search and display results associated with keywords or combinations of keywords.

As the user works on the problem, the results of the keyword combinations are fed back in steps S7, S8, and S9, as additional work and to other intelligent agents performing other functions; the results of these functions are also continuously provided to the user as part of the environment. In this way, a continuous feedback loop of information from the various agents, including the user, would serve as a growing set of information that is simultaneously displayed in the user's environment. At some point the user outputs the results, step S10, alters the results outside the process, step S11, and then makes a decision, step S12, as to whether the outputted result is sufficient to solve the problem for the user's needs or whether the result should return to the process, step S7, for further iteration.

The decision step S6 is a complex process that may in itself incorporate an entire iteration of the process shown in FIG. SS1-1. As shown in FIG. SS1-2, this process includes the following steps. In step S20, the original state model applicable to the iteration at hand is inputted, and in step S21 a current state model is inputted. In step S22, these two models are compared to develop a differential or delta between them. In step S23, a matrix and set of rules applicable to the issue of the iteration are developed. In step S24, the matrix and set of rules are inputted with the delta. In step S25, a first combination of the matrix and rules are applied to the delta. In step S26, subsequent combinations of the matrix and rules are iteratively applied to the delta until a provisional dissolve of the delta is reached. This process can include agents, an environment, and performance of work, as described in relation to FIG. SS1-1. In step S27, the agent produced by the combination of matrix and rules is applied to the delta to produce a provisional dissolve. In step S27, this agent is shipped either back into the current iteration, or out to a new environment, or both. A similar process occurs with regard to step S12 of FIG. SS1-1, and can occur with regard to steps S8 and S9.

FIGS. SS1-SS1-3 through 7 comprise block diagrams illustrating elements supporting the various steps shown in FIG. SS1-1. In FIG. SS1-3, the plurality of agents and their functions 1 include people 2, machines 3, computers 4, software 5, firmware 6, living things 7, objects 8, input and output both among agents and external to agents 9, and an operating system 10.

In FIG. SS1-4, elements of the environment 20 include one or more agents 21, architectural components 22, objects 23, variable boundaries 24, information 25, location (micro and macro) 26, tools 27, energy 28, input and output 29 both among elements of the environment 30 and to external elements from the environment 31, and an operating system 32. Variable boundaries can include, for example, the porosity of the environment. This variable is matched to the environment based on the agents, the scope and nature of the work, and the influence of other environmental factors. Important influences on the agent or agents in relation to the environment include energy 33, the physical nature of the agents 34, the knowledge and intellectual properties of the individual agents 35, the agents' psychological makeup 36, and the knowledge base of agent characteristics 37, both for the agents as individuals 38 and as a group 39.

FIG. SS1-5 illustrates important components of the performing work element 45 of the present invention. These components include identifying or developing a goal model 46, such as an end state model that enables the problem to be created and dissolved, acquiring experience 47, reframing 48, recognizing patterns 49, building models 50, simulating 51, selecting 52, testing 53, deciding 54, and iterating 55. In addition, input and output 56 among the components and from the components to external components and an operating system 57 make up aspects of the perform work element 45 of the present invention.

FIG. SS1-6 presents examples or elements of the altered or output agent 60 produced by iterations of the present invention. The output agent 60 consists of one or more of an altered input agent 61, altered environment elements 62, new agents 63, such as work products or non-autonomous agents, and agent mission maps 64. In addition, input and output 65 among the components and from the components to external components and an operating system 66 make up aspects of the output agent element 60 of the present invention.

FIG. SS1-7 presents examples or elements of the output agent and new environment interaction 70. These elements include the output agent medium 71, such as a document or a program, mission 72, output agent feedback and communication 73, and new environment feedback and communication 74. In addition, input and output 75 among the components and from the components to external components and an operating system 76 make up aspects of the output agent and new environment interaction element 70 of the present invention.

Other aspects of the system and process of the present invention may be gleaned by reviewing the attached Appendices, which are incorporated herein by reference.

2. System and Method for Optimizing Agent Pattern Language Values in Collaborative Environments At its highest level, the currently preferred embodiment of the system for optimizing human and architectural pattern language values of the present invention is based on the recognition that a collaborative work environment is a collection of objects and that the system has rules. Thus, the system comprises a computer system that has means for storing information concerning: what objects can be used within an environment, the cost of each of the objects, the architectural rules governing the objects and the environment, the architectural values associated with the objects and the environment and knows the rules of pattern language. This data can be stored in memory tables or any other suitable means.

Since some of the values, such as architectural values, vary according to a customer's taste or preferences, the system preferably includes means for adjusting the relative values of things such as architectural values based on a customer's or client's objectives.

The system also includes means, preferably electronic display monitors, for displaying a representation of the environmental layout and means, such as icons, for graphically representing objects within the environment. In the preferred embodiment. the user can use a pointing tool, such as a mouse, to "pick up" and place the objects in desired locations within the environment. Since the system knows the cost of the objects selected, the architectural rules concerning its placement, the architectural values associated with particular objects in the rules of pattern language, the system can provide the total cost as well as architectural values score or in the pattern language score, on a real time basis.

In accordance with a further embodiment of the invention, the system of the present invention can be used to manage the environment. In particular, the system can be designed so that the individual system knows what objects are in the environment and where those objects are (how the environment is configured). This can be achieved in a variety of ways such as by placing chips in each of the objects or placing sensors within the environment. In this way, the system can monitor an environment once in place and send a warning, if, for example, an object is moved into a place that is architecturally unacceptable (e.g., an object is moved to place where it blocks the door). Thus, in summary, the system facilitates both design and placement of furniture in office, home and other environments and also monitors the environment once in place.

While there are various ways of operating and configuring the system of the present invention, FIGS. SS2-1 and 1$a$ show a high level system flow diagram and FIG. SS2-2 shows a high level view of one possible system configuration according to the present invention.

As shown in FIG. SS2-2, the system is adapted for use by a User 1 working at a personal computer or work station 2 that includes a display monitor, which serves as the display means. Personal computer 2 may also include a CPU for performing all system functions or, as shown, the computer may be linked, as indicated at 4 and 6, to a network 5 that includes a mainframe or server computer 7. Although a specific hardware configuration is shown, the hardware configuration is not critical to the system of the invention. Specifically, as noted before, all the system functions could be performed on a stand-alone computer. The system stores (preferable in RAM) data concerning various objects (indicated as objects 1, 2 . . . n) that are available for use within the environment. For each object, the system should store at least data concerning the object's size, shape and location within the environment. The system also stores in memory data relating to the parameters of the environment and applicable architectural rules. Again, the location of this memory within the system and environment is not critical. For example, much of the information concerning the attributes of the objects could be stored within or on the objects themselves if each object includes a microchip or even a CPU. There are, of course, various ways of identifying the location of an object within the system, including, without limitation, sensors, radio signals hardwiring and infrared signals and the like. the objects should preferably be "networked" in a broad sense so that they can communicate with or be sensed by other parts of the system. Moreover, if the object is capable of reconfiguration, the system preferably includes some means (either internal or external to the object itself) for recognizing the current configuration of each object.

The system also includes various tables containing information concerning the objects selected. Specifically, the system preferably includes at least three tables: a table concerning the cost of each available object; a table concerning the architectural value associated with each available object; and a table concerning the pattern language value associated with each available object.

The system shown in FIG. SS2-2 operates as shown in FIGS. SS2-1 and 1$a$. Specifically, the system initially prompts, preferably through the display monitor, the customer to input his or her name at Step S1. At step S2, the customer is asked to select an objective. This objective may be selected from a menu that includes choices such as "MAXIMUM ECONOMIC EFFICIENCY" or "MAXIMUM PATTERN LANGUAGE VALUE" or more detailed choices such as "MAXIMIZE NATURAL LIGHT" or "MAXIMIZE DENSITY." Alternatively, this list could include, as a subroutine, a customer questionnaire from which data could be obtained concerning customer preferences.

Regardless of how the customer preferences are ascertained, the system preferably includes a means such as one of the computers 2, 7 for adjusting architectural and pattern language values stored in the tables as shown at Step S3. More specifically, the values contained in Tables 2 and 3 which identify an architectural value and a pattern language value associated with each object are updated to reflect the customer's preference. Thus, for example, if a customer has indicated that there is a premium for economic efficiency, then those architectural values that provide, for example, greater density are given a higher value. Alternatively, if the customer has indicated a preference for maximum natural light, those objects that enhance natural light will receive greater value.

At Step S4, the customer is asked to select or input environment parameters. This could be done in several different ways. The customer could be presented with several standard environmental configurations ("boxes") and asked to select among these if the design is being done for a building with the standard box-type layout. More likely, however, the customer is asked to provide an outline of the environment parameters of the environment for which the design is intended. This would include an outline of the exterior walls, including an indication of doors, windows and utilities.

Based on the input at Step S4, the system, at Step S5, displays the environment as specified by the customer. In addition, at Step S6, the system displays representations, preferably icons, of available objects for location within the environment. Preferably, the available objects are displayed in proportion to their size or, if this is not practical, are displayed to scale once selected.

The system also, at Step S7, displays the cost, architectural values and pattern language values of the system as designed thus far. At this initial step, these values will, of course, naturally, be 0.

Each time an object is placed within the environment, a determination is made, at Step S9, whether the location selected within the environment satisfies the set of architectural rules (stored within the system) that are specified for the particular jurisdiction. If not, the system outputs an error message (at Step S10) explaining the problem and prompting the user to select another option. If, on the other hand, the location satisfies all applicable architectural rules, then the cost, architectural and pattern language score is updated at Step S11, the display of the environment is updated at Step S12 and the display of available objects is updated at Step S13.

The user is then prompted, at Step S14 to confirm the selection. If the user chooses not to confirm the selection, then the object is deleted from the display of the environment at Step S15 and the tables and display are updated (reset) at Step S16.

If, at Step S14, the user confirms the selection and placement of the object, then an inquiry is made, at Step S17, as to whether the design is complete. If not, the user is returned to Step S8 and the process is repeated until the design is complete. Once the design is complete, the user is given an opportunity, at Step S18, to print out or to otherwise record the final design in the system, and the process is complete.

As mentioned previously, the present invention also relates to various furniture components that make it possible to optimize human and architectural pattern language values in a collaborative work environment. In general, a collaborative work environment may be thought of as including various levels of components. At the highest levels (aside from cities and regions themselves), the environment includes buildings and the rooms within the buildings. The present invention, relates primarily to components below these levels which may be characterized as follows: armature level components; divider (WorkWall™) level components; work station system level components; sub-components; and, at the lowest level, pieces. The present invention provides components specifically assigned to optimize human and architectural pattern language value at each of these levels. These components are described in the figures attached hereto and in the appendices hereto.

FIG. SS2-1B shows a sketch of a collaborative work environment according to the present invention. The critical aspect of this collaborative environment is the overall integration of media into the work environment. Thus, the environment of the present invention can include a range of multi-media devices, including whiteboards that are marked using markers, pixilated writing boards for enhanced 3D-type graphics, electronic whiteboards that allow electronic input and output, whiteboards that include full color scanning and copying capabilities and interactive whiteboards. As used herein, the term "whiteboards" is intended to encompass the full range of work walls or writing walls, and is not intended to be limited to such walls that are the color white. Indeed, the standard writing walls of the present invention are preferably gray in color.

With specific reference to FIG. SS2-1B, the environment shown includes a large-scale whitewall 10 that could be either a marker-type whitewall, or an electronic whitewall. The environment also includes a large-scale video screen 20 to allow remote collaboration. Additionally, knowledge workers are shown working with a variety of components including laptop computers 30, personal digital assistants 40 and a collaborative multi-screen work station 50. This sketch shows a the total integration of media into the environment and the use of the furniture systems of the present invention within the environment. The workwall 10 includes a series of Hypertiles™ and discloses the possibility of an intelligent assistant.

The fully integrated environment of the present invention, an example of which is shown in FIG. SS2-1B, allows rapid prototyping in a collaborative way. The environment also allows for the facilitation of interaction among intelligent agents to achieve rapid design and rapid prototyping. Preferably, the environment can include multiple generations of development in a single space.

The use of media, which is most completely illustrated in FIG. SS2-1B, is an important aspect of the present invention.

In this regard, it should be understood that the environments of the present invention are scaleable and adaptable to new generations of media. The environments allow full integration of a variety of media and are responsive to the needs of all of the senses.

To provide further understanding of how these components make it possible to optimize both human and architectural pattern language values various components, sub-components and pieces will now be illustrated and described with reference to FIGS. SS2-3A–93. In addition, reference should be made to the attached appendices which are part of this specification and show various component designs and system layouts that, by themselves, form part of the present invention and are used in the system of the present invention.

To begin with, FIGS. SS2-3A–C show various components. In particular, FIGS. SS2-3A and 3B shows rolling bookcases of various heights. This type of component can be used to provide mobility and variation in scale of furniture that makes partitioning of space possible. Different ranges of partitioning of any work space can be achieved through the use of components of various heights. FIG. SS2-3B also shows how moving storage capabilities can be provided.

FIG. SS2-3C shows a perspective view of a stack of chairs that can be arranged according to users' preference. Reconfigurability is important to address human values such as economic efficiency and flexibility.

FIG. SS2-4 shows a kiosk component that includes multiple work surfaces including a work surface on which a key board is shown as supported. The work surface can be moved into one of three different slots to allow work surface height adjustments. Moreover, the slots can receiving work services with a different configuration. The top of the base supports a computer monitor. The entire structure supported on rolling casters (wheels) so that the kiosk can be easily moved by the user without technical assistance.

FIG. SS2-5 illustrates the flexibility of the basic kiosk structure that results from the use of a work surface receiving slot. In particular, FIG. SS2-5 shows a kiosk that is similar to the kiosk in FIG. SS2-4 except that the work surface with a different configuration has been inserted into the work surface receiving slot.

FIG. SS2-6 shows a work unit that is a complete portable assistant. The unit contains two compartments for letter-hanging files and eight drawers for storage. The unit also includes a double sided write-on, write-off WORK WALL™. Preferably, the surface of the WORK WALL™ is magnetic to hold magnetic tiles or other pieces. The work unit includes smooth-riding casters to allow mobility without technical assistance. Thus, this single unit provides a file for storing information, drawers, work walls, and the ability to provide a work space as desired all in a component that is mobile.

FIGS. SS2-7 and 8 shows plurality of shelf cubes arranged to provide a portion of a cube-office system. The shelf cube provides adjustability without technical assistance (note FIG. SS2-8) and can be used to divide an office space. Each cube is a modular, versatile and efficient approach to shelving needs. The cubes preferably include dimple-like indentations on the top and rounded nubs on the bottom of each unit so that the shelf cubes are stackable and extremely stable. Each unit can stand alone or can or be combined with others stacking up to four cubes tall in four directions. The system also can include a plurality of base units as shown to provide stability of the cube office system. The system of the present invention preferably includes units of different width such as, for example, six inch, twelve inch and eighteen inch wide units. The user can assemble cube system with minimal number of tools.

FIG. SS2-9 shows a portion environment that includes work walls, an enclosed space, worktable, and chairs. Among other things, this portion of the environment includes WORK WALLS™ supported on wheels to provide mobility, flexibility and efficient storage. WORK WALL™, are an entire work space on wheels and include an off-white writing surface made of porcelain steel that provides opportunity for drawing directly on the surface and also allows easy attachment magnetic display tiles to the surface. According to another aspect of the present invention, either the surface itself or the tiles attached thereto can be provides with a sticky surface such as a POST-IT (® 3M Corp.) surface. In accordance with one aspect of the present invention, the display panel surfaces are provided with a roughened texture to allow users to write on the wall with a variety of graphical tools (conventional "white boards" can only be written on with markers). Alternatively, a portion of the panel surface may be pixelated (roughened) to provide a region that can be written on with other graphical tools (chalk, crayons, pencils etc.). The inventors have found that this allows much greater graphical expression. Finally, at least some of the WORK WALLS™ or other display panels should be tall (more than six feet high) so that they can be used as room dividers to partition an environment in different rooms.

The portion of the environment shown in FIG. SS2-9 also includes a architectural armature elements including hollow beam in the upper right portion of the drawing. This beam serves both a functional purpose (covering cables) and a pattern language purpose in addition to providing a sense of place (architectural armature).

FIG. SS2-10 shows a plurality of bookshelves grouped together with WORK WALL™ display panels acting as a room divider. Display monitors are included as a part of the environment in accordance with the present invention.

FIG. SS2-11 shows a kiosk component and a wing component docked together. The ability of component to dock with one another is an important aspect of the present invention in that it provides efficient utilization and easy user configurability. The kiosk is similar to the kiosk previously described and includes surfaces for accommodating a computer and a monitor intended for single or multiple users and viewers. Computer cables are managed through a built-in cord channel. The lower cabinet space is designed to accommodate computer central processing units or supplies and is accessible in the front. The entire unit can be easily maneuvered and relocated on its smooth-rolling casters. In this view, the kiosk is combined with a MEDIUM WING™ component to build a cohesive, portable workstation.

The wing component is a flexible work surface designed to adapt to a variety of needs. The wing component is extremely portable and can be easily maneuvered on its smooth-rolling casters to fit in almost any work area. The height of the work surface is adjustable to accommodate a user that is either sitting or standing. The curved work surface design surrounds the user with an efficient work surface and the built-in tilted foot rest makes the wing as comfortable as it is versatile.

FIGS. SS2-12 and 13 show a work unit that can consolidates various traditional office elements into a single, efficient non-traditional piece. The unit combines a roll-out work surface and rolling storage for tools and hanging files. The work unit has two shelves above the surface and includes built-in grooves for pens and pencils. The folded work station section smoothly overlaps the cart section to form a compact station that will conveniently fold and unfold. As shown this unit can be constructed on a small scale to accommodate both adults and children in the work environment. FIG. SS2-13 also a portion of the environment in which the work unit is located including rolling work walls in the background.

FIGS. SS2-14–17 show various aspects of the kiosk component of the present invention. FIGS. SS2-14 and 15 show how the kiosk is adjustable in height by allowing one portion to slide within another portion. FIG. SS2-15 shows the kiosk of FIG. SS2-14 at a reduced height and docked with a wing component. FIG. SS2-16 shows a kiosk of the type described previously in connection with FIG. SS2-4 in which an oval surface is inserted into one of the slots of the kiosk. FIG. SS2-17 shows the kiosk in use where the user is standing.

FIGS. SS2-18–20 show portions of an environment according to the present invention including large scale rolling work walls, radiant room and armature components. The armature components which appear as beams along the ceiling of the environment provide a sense of place and also function to conceal cables and other utility connections. The portion of the environments shown in these figures demonstrate the ability to achieve architectural scale and pattern language values using the components within the environment, the possibility of providing of multimedia integration, and particularly in FIG. SS2-20, the use of architectural armature and provision of work surfaces.

FIGS. SS2-21–30 show various view of one embodiment of the work pod component of the present invention. As shown in these views, the WORK POD includes a plurality of modular section units. Each unit is suspended from its own external mast or support. The mast or supports are supported on smooth rolling casters and designed to allow a variety of components to be snapped on, such as overhead storage and shelf units, workstations, tool caddies and tables that rotate out into the center of the pod for use by small teams.

A unique articulating translucent vane attaches to the top of the mast. The vane incorporates the pods lighting system and also allows the pods residents to make adjustments to direct that light in also adjust ventilation.

Each section of the pod may be deployed independently or in combination with one or more other sections to form a variety of configurations. A common set-up is the circular one shown in FIGS. SS2-21–30, but other set-ups are possible and may be employed by several pod residents to help the facilitate their current work process. Thus, the pod may be moved and reconfigured by the resident without any technical assistance.

FIGS. SS2-30A–50 show alternative pod constructions and configurations according to the present invention. As shown in FIG. SS2-30A, the pod can be hinged to roll in to different configuration other than the circular configuration previously described. FIGS. SS2-30A–50 also show other aspects of the pod design including the use of sub-components such as secretaries, file cabinets, pigeon holes and shelves. Each of these sub-components can be supported (directly or indirectly) on the mast and is supported on rolling casters. The adjustability of the translucent vane is also evident in these drawings. Preferably, the light source is directed toward these vanes so that it is reflected down by the vane onto the user to allow variable lighting. The light source itself may be used as a handle for adjusting the location of the translucent vane as shown, for example, in FIGS. SS2-34, 36 and 38.

FIGS. SS2-40 and 41 show an arrangement where the pod sections are used in a somewhat straight configuration. FIG.

SS2-42, on the other hand, shows an arrangement in which the pods sections are arranged in an S-curve. From all these drawings, it is readily apparent that the pod design offer a tremendous level of adjustability and possible configurations. FIG. SS2-47, for example, shows an arrangement in which pods are arranged in a rectangular fashion.

FIG. SS2-37 shows how a wire chase can be incorporated into the pod design. FIG. SS2-38 shows how lights perform as moving petals with the light itself acting as a handle.

FIGS. SS2-51 and 52 show a single unit or section from which the work pod can be constructed. As shown therein, the entire system is hung from a mast that is supporting rolling casters. The system shown includes an adjustable work surface that may be pulled out from a rolling computer support, work surfaces at a variety of heights, and shelves as well as adjustable lighting. FIG. SS2-53 shows a perspective view of a work section in which one of work surface system pulled out and used as a small conference table.

The WorkPod returns to active duty an old architectural Pattern Language value of A-Room-Within-A-Room. This pattern language value was used extensively in custom designs, by Wright and is recognized by Alexander. To date, however, there has been no practical way to do it with furniture. Let alone, furniture that moves. The Work Pod also provides knowledge workers significantly larger work areas and several of them. The Pod can function as a conference room for four (swing out desks configure to a table), a work are for a Team of three and a home for a single individual. A landscape of WorkPods, distributed in an appropriate pattern and augmented with the components of the present invention can accomplish the same density of typical solutions while providing greater individual spaces and a larger number of functional-type areas—Radiant Rooms as example. The system of the present invention uses available space and makes circulation paths serve many purposes. These layouts cannot be achieved with conventional furniture approaches. Even the better known mobile pieces have failed to grasp the importance of the larger armature-level pieces and thus can not replicate the effect of the present invention.

FIGS. SS2-54 and 55 show perspective views of a cube office system according to the present invention. Specifically, FIG. SS2-54 shows an essentially top view showing two-layers of cubes arranged the space in between. The space between the cubes, typically about 3 inches, can be used for acoustics (by providing reflective or absorbing surfaces), for utilities (by allowing a post and beam wire guide arrangement) and to allow for adjustable dividers, such as shoji screens, to be concealed. In this way, the cube office system can be used to provide great flexibility in dividing an environment to work spaces and to give users adjustability (through the use of shoji screens) as to degrees of privacy and the like.

FIG. SS2-56 shows one version of a polycentric work area layout that is possible in accordance with the present invention. In this instance, the work area layout follows a city metaphor with the principal flow of people through the layout indicated as "Main Street." As shown, this layout features maximum natural light to all work areas, omnidirectional access to work areas; promotes interaction at the team, unit and company levels and allows individual and team control of access and privacy. The layout also utilizes circulation areas for storage, group tools, display and visual variety, reinforces individual team and unit identity. In addition, the layout reinforces certain building features, including an atrium, the outer wall articulation, column spacing, all which can be accomplished with one semi-custom, locally built system. This layout also allows maximum future flexibility for new layouts. It is important to note, however, that FIG. SS2-56 is just one example of a layout that can be accomplished using a flexible system of components of the type described herein. Examples of other layouts (but not all possible layouts) are shown in the appendices hereto. An important aspect of the present invention is, indeed, the flexibility that is available.

FIGS. SS2-57–62 are perspective views showing a Rapid Deployment System (RDS) version of the system of the present invention in use. The components used in the Rapid Deployment System are essentially the same as those used and described elsewhere, but these components can be moved into a generic environment such as a hotel conference facility and set up quickly to establish a suitable, although not necessarily ideal, environment for facilitating group collaboration. An important feature of the components used in the RDS is the extreme mobility and ruggedness of these components.

In FIG. SS2-57, the folding work walls are used to set up a small group work area. In FIG. SS2-58, a circular table is also used as a writing surface. FIG. SS2-59 shows a larger portion of the environment, in which the flexibility that can be achieved using the components of the present invention is evident. FIGS. SS2-60–62 similarly show how a large undistinctive space such as a hotel conference room can be turned into a series of work areas using the components of the present invention.

FIG. SS2-63 is a perspective view of several components of the present invention. The system shown includes a wing with adjustable height, a kiosk and a smaller wing, as well as a movable storage file. FIG. SS2-64 is a perspective view of a work surface according to the present invention. FIGS. SS2-65 and 66 are perspective views of a portion of an environment in which cube systems are used to divide an environment into different sections.

FIG. SS2-67 is a perspective view showing several aspects of an environment according to the present invention. As shown, the environment includes curved work walls that divide the environment, architectural armature features that are suspended from the ceiling and also provide lighting, a movable work wall in use, movable supports for television sets and the like, the use of live plants within the environment and a great deal of natural light.

FIG. SS2-68 shows curved cube system according to the present invention, as well as a portion of the environment that includes natural light from the ceiling, as well as a multi-level environment.

FIGS. SS2-69–71 show other architectural armature and pattern language features according to the present invention, including a skylight, as shown in FIG. SS2-69, a unique ceiling structure as shown in FIG. SS2-70 and suspended beams as shown in FIG. SS2-71. These figures also show other aspects of the environment of the present invention.

FIGS. SS2-72 and 73 show perspective views of a cube office system according to the present invention. The particular office shown has an outside window to allow natural light to pass in. The interior wall, however, is formed by a stack of cube components (each of which has an interior shelf). Although only one side of the divider is shown, the divider preferably consists of back-to-back shelf units separated by a gap of about three inches. The gap allows for a beam that carries electrical wiring and the like to be located between the unit as shown above the stack of cube units. Moreover, a shoji screen door or similar sliding door can be mounted for sliding between the stacked cubes to provide a door to allow privacy, if necessary, while still allowing light from more than one side of the room, which is an important pattern language value. Similarly, the Plexiglas that extends from the top of the stacked cubes to the ceiling to provide some sound insulation and a sense of privacy without blocking the light. As shown best in FIG. SS2-73, the Plexiglas that extends to the ceiling has no impact on the ceiling surface. Thus, the entire arrangement is extremely mobile and can be assembled into any generic undistinguished office space.

FIGS. SS2-74–82 show various views of cube office system components and assemblies according to the present invention. Again, while a cube office system allows tremendous flexibility, a preferred form of assembly includes cubes stacked back-to-back with a gap in between to allow a shoji screen and utility beam to be located between the stacked cubes. This gap is shown well in the end view portion of FIG. SS2-81 and in the perspective view of FIG. SS2-82. FIGS. SS2-76 and 77 show the shoji screen door quite well.

FIG. SS2-83 shows a wall-mounted folding workwall in which a portion, shown on the left, of the workwall is hinged to allow flexibility of dividing space and breakout areas.

FIG. SS2-84 shows another use of the cube components of the present invention, namely providing the individual worker work areas that are partially separated from one another. The work areas also include a wing component and a table component.

FIG. SS2-85 shows a perspective view of a pod assembly according to the present invention.

As noted above, one of the principal advantages of the system of the present invention is that the components provided allow optimization of Pattern Language values. Although certain pattern language values have been used extensively in custom designs by architects such as Wright, there has to date been no way to address most of the pattern language values catalogued by Alexander in practical way with conventional off the shelf furniture, much less furniture that also addresses human values such as economic efficiency, mobility adjustability and the like. Thus, a remarkable aspect of the system of the present invention is that components allow one to address at least 100 of the 253 pattern language values catalogued by Alexander. Further information concerning these pattern language values may be gleaned from "A Pattern Language" Christopher Alexander 1977. Specifically, and without limitation, the following values, listed with the number assigned by Alexander, may be addressed using the system of the present invention:
1. INDEPENDENT REGIONS
2. DISTRIBUTION OF TOWNS
5. LACE OF COUNTRY STREETS
8. MOSAIC OF SUB CULTURES
9. SCATTERED WORK
14. IDENTIFIABLE NEIGHBORHOOD
15. NEIGHBORHOOD BOUNDARY
19. WEB OF SHOPPING
24. SACRED SITES
26. LIFE CYCLE
28. ECCENTRIC NUCLEUS
29. DENSITY RINGS
30. ACTIVITY NODES
31. PROMENADE
36. DEGREES OF PUBLICNESS
37. HOUSE CLUSTER
41. WORK COMMUNITY
45. NECKLACE OF COMMUNITY PROJECTS
57. CHILDREN IN THE CITY (Furniture scaled for children & tools, i.e., WorkWalls, etc.
59. QUIET BACKS (through layouts using city metaphor made possible by:
   Armature Elements
   Systems Pieces: WorkWalls, Pods, Cube Office making a landscape (foreground, middle, background)
   Variety of shapes, textures, colors and degrees of view—solid, translucent, transparent, open
60. ACCESSIBLE GREEN
67. COMMON LAND
68. CONNECTED PLAY—Armature & Systems Components—Landscape
69. PUBLIC OUTDOOR ROOM
79. YOUR OWN HOME—Work pods, cube offices, work furniture clusters, work walls
80. SELF-GOVERNING WORK SHOPS & OFFICES
82. OFFICE CONNECTIONS
83. MASTER AND APPRENTICES
88. STREET CAFE
93. FOOD STANDS
94. SLEEPING IN PUBLIC
102. FAMILY OF ENTRANCES
107. WINGS OF LIGHT
110. MAIN ENTRANCE
111. HALF HIDDEN GARDEN
112. ENTRANCE TRANSITION
114. HIERARCHY OF OPEN SPACE
115. COURTYARDS THAT LIVE—Armature, systems layout, etc.
117. SHELTERING ROOF—Trellises
119. ARCADES—Armature
120. PATHS & GOALS—Wire Chase System, Elements In Background
121. PATH SHAPE—Wire Chase System On Floor
124. ACTIVITY POCKETS—Layout Clusters, WorkWalls, Radiant Rooms
127. INTIMACY GRADIENT—Cube Offices, Pods—Variety
128. INDOOR SUNLIGHT—Articulatum to outside Windows in Skylights—advantage building assets
129. COMMON AREA AT THE HEART
130. ENTRANCE ROOM
131. THE FLOW THROUGH ROOMS
132. SHORT PASSAGES
133. STAIRCASE AS A STAGE
134. ZEN VIEW
135. TAPESTRY OF LIGHT & DARK
146. FLEXIBLE OFFICE SPACE
   Flexibility of Layout
147. COMMUNAL EATING
148. SMALL WORK GROUPS—Flexibility—Reconfiguration (teams come & go)
149. RECEPTION WELCOMES YOU
150. A PLACE TO WAIT
151. SMALL MEETING ROOMS
152. HALF-PRIVATE OFFICE—Cube Office Octopus pods can do this—Armature with furniture. flexibility
153. ROOMS TO RENT—Office Hoteling—adjustability allows it
156. SETTLED WORK
157. HOME WORKSHOP—Take It Home scale/style allows it
159. LIGHT ON TWO SIDES OF EVERY ROOM—Flexibility of layout translucent effect of Cube Office & Pods (room within a room)
161. SUNNY PLACE—Take advantage of it
164. STREET WINDOWS—Take advantage of it
165. OPENING TO THE STREET—Take advantage of it
176. GARDENSEAT
179. ALCOVES—Armature, Pods, Cube Office, Work Walls 180. WINDOW PLACE
185. SITTING CIRCLE
190. CEILING HEIGHT VARIETY—Armature, Trellises, Pod Peddles
191. THE SHAPE OF INDOOR PLACE
192. WINDOWS OVERLOOKING LIFE—"Windows" in Cube Office Pods
193. HALF OPEN WALL—Cube Office Work Pods
194. INTERIOR WINDOWS—"Windows" in Cube Office Pods
196. CORNER DOORS
197. THICK WALLS
198. CLOSETS BETWEEN ROOMS
200. OPEN SHELVES
201. WAIST HIGH SHELF PLUS POD—Cube Office System
202. BUILT IN SEATS—Armature systems (Platforms)
204. SECRET PLACE—Flexible layout allows this
205. STRUCTURE FOLLOWS SOCIAL SPACES—on our scale: the work dictates the shape not the system
225. FRAMES AS THICKENED EDGES—WorkWall trim & other elements
235. SOFT INSIDE WALLS—Fabric on pods, screens, etc.
236. WINDOWS WHICH OPEN WIDE
237. SOLID DOORS WITH GLASS—Cube Office
239. SMALL PANES—Cube Office
241. SEAT SPOTS
243. SITTING WALL
244. CANVAS ROOFS—Cube Office Trellises
249. ORNAMENT—with sub-components—with system complexity—ornamental effect
250. WARM COLORS
252. POOLS OF LIGHT
253. THINGS FROM YOUR LIFE—the system provides space to do this.

Another important feature of the collaborative environments of the present invention are their ability to provide access to information through a totally integrated multimedia approach ranging from providing various printed materials and graphics throughout the work space to the use of "just in time" information systems. The furniture components of the present invention are well-suited for this purpose in that they include a variety of shelf space, work surfaces and display surfaces. The work space also preferably includes access to electronic databases including the Internet and data warehouses. To facilitate such access, the environments of the present invention include display monitors throughout the space and furniture components are designed to movably support such monitors. In addition, the furniture components and armature elements are designed to conceal or guide cables and wires connected to electronic components. This collection of components and their arrangement within the environments as shown in the drawings and appendices are able to provide total seamless media integration within the environment. In addition, the system is highly scaleable and adaptable to new technologies that are now widely available or likely to become widely available in the next few years, including large scale electronic work walls, electronic assistants, electronic displays, real time video conferencing, intelligent agents and data warehouses. Collectively, these components provide an environment in which information can be made available as needed, i.e., "just in time information," and remote collaboration is seamless.

Moreover, the system and method of the present invention provide an environment that is uniquely complementary to systems, such as "query tone" technology, for providing "just in time information." Specifically, as illustrated in FIG. SS2-1B and elsewhere, the environment includes a complete range of fully integrated media sources and displays so that, for example, a knowledge worker can turn on a computer (workstation, network computer, lap top, PDA or intelligent assistant), and ask any question from any database anywhere, in the same way that a knowledge worker today can pick up a telephone, and talk to anybody anywhere.

As noted previously, the present invention particularly relates to a system and method for optimizing a collaborative work space that is used in connection with the inventor's system and method for facilitating communication and other interaction among agents (humans, machines, groups, organizations and combinations thereof) so as to provide feedback, learning and self-adjustment among the individual agents thereby creating an environment for interaction (consisting of environment, tools and processes) that facilitates emergent group genius in a radically compressed time period.

3. System and Method for Integrating/Optimizing Technical Systems to Promote Agent Interaction This Sub-System of the present invention provides a new framework, processes and algorithms for the performance of knowledge-based work. Future, this invention is based on 20 years of experimentation with Human Agents in the production of real work producing economic value. In these experiments (supported by DesignShop, management center and NavCenter processes tools and environments) a disciplined, scaleable approach has been developed for the augmentation and facilitation of agents of all kinds. Further, the basic rules for the "manufacturing" of non-human agents have been determined by demonstration and test.

A Human Agent, in a Knowledge Economy, will have an augmentation system that consists of the following components:

A basic, integrated tool kit for drawing, writing, calculating, analyzing, accessing the Internet and other networks, scenario building, planning, project managing, scheduling, full (real time) multimedia augmentation and various custom applications.

An "Agent Builder" for the manufacture and management of a variety of virtual "intelligent" agents to perform tasks, represent existing articles of value and trade, search data bases and other virtual environments, "represent"—as an agent—the Human Agent in conducting negotiations and trades.

A simulator for testing agents and communities of agents to understand their behavior and the behavior of complex environments.

A library and system of processes and process filters for analyzing, testing. designing, engineering and the performance of the majority of (codified) professional services.

A Pattern Recognizer for recognizing patterns in textual, audio or visual inputs or data together with a means for presenting similar data as a suggestion to the user and receiving input (feedback) from the user as to the desirability of the suggestion.

Data Warehouse and Knowledge Base functions.

A "Decider" (Sub-System 1).

A seamless (agent-based) interface that is context sensitive and "learns" the Human Agent's habits and desires.

The above is representational of the elements of the present invention but not exhaustive.

This Sub-System is, at a high level, a knowledge worker tool kit module of the full system. The overall system not only includes the tool kit, but agent functions, process filters, simulators and data or knowledge warehouses.

According to the present invention, a user builds the agents and then, in accordance with the overall process of the present invention tests the agent, uses the agent, sets a term for the agent and stores the experience. Using principles of iteration and recursion, together with feedback and critical mass, the system becomes self-adapting and self-improving.

Of course, testing the agent requires simulation. The process filters described are required to replicate a scan build process. In particular, when working with human agents, it is possible to engage in a very different level of consciousness that is often referred to as "brainstorming." Although brainstorming is often referred to as just another kind of thought process, it is in fact an entirely different level of consciousness in which the mind is forming new connections without the constraint of logic. To replicate this process in a machine, it is necessary to use a randomizer that is iterative and self-adapting. At the basic level, the randomizer is able to make random connections of relevant or related pieces of data and then test those random connections to see what type of results they provide. Machines capable of this type of randomizer activity include a so-called "Zwicky box," and other devices that can generate morphological forced connections. The Zwicky Box is named after Fritz Zwicky, a designer who invented the morphological forced connection process as a way of searching for connections that no "logical" mind would make.

Another significant module of the system and method for integrating/optimizing technical systems for promoting agent interaction is the pattern recognizer. The pattern recognizer is a system that analyzes data and looks for patterns in the data. It provides information concerning these patterns as a possible route for gaining feedback. For example, the pattern recognizer may analyze the user's input into the system(textual, audio or visual) and compare these various inputs to see if a pattern can be recognized. If a pattern is recognized, the system can suggest additional inputs that have a similar pattern. The user/system interface may be in the form of the system posing a simple question to the user, "Is this what you are looking for?" or the interface may be automatic or transparent to the user. In this way, the user's acceptance, acquiescence or rejection of the suggestion derived from pattern recognition will allow the system to learn from feedback. The pattern recognizer thus facilitates feedback into the system so that even a generic simple agent can quickly "teach itself" to be a customized agent for the particular user. The agents thus teach themselves through application of the system and method of the present invention.

In this sense, the present invention provides a unified process and system for approaching the wide variety of problems associated with the transformation to a knowledge economy. The system applies a consistent logical sequence to the variety of problems and relies to a large extent on recursion, iteration, critical mass and feedback to allow solutions to emerge even when the underlying rationale for why the solution works may not be fully understood. The basic process follows the three cat model approach of designing, building and testing through simulation and feeding back the results of the simulation to the design.

A central element of the success of this system is that the simulator gets smarter as it goes along. Thus, the simulator has a learning mode. The simulator generates results that are stored in the form of a data or knowledge warehouse, which provides input for future simulations.

It is important to note that the same process applies to all Sub-Systems of the present invention. In this sense, the present invention provides a formal system of a concurrent engineering that is applicable to a wide variety of systems.

Central to the present invention is the iterative building of agents as solutions to complex problems. According to the present invention, the agent (solution) is designed with minimum information and then built. The agent is allowed to act within its environment, and able to provide information concerning its results so that this information can be used in refining the design. Thus, agents evolve or emerge through recursion and iteration.

This is fundamentally different from the approach taken today in trying to design complex solutions using more information from data warehouses in the initial design. If too much complexity is introduced in the design of the initial agent, then the agent is so constrained that it cannot evolve or emerge through actual experience. It is in this sense that the present invention provides an IC factory, in iterative recursive engine of creation. Thus, the present invention is based on the fundamental recognition that knowledge is created only in interaction with reality and the experience gained therefrom. To create a "engine of creation", therefore, it is necessary to create a system that allows both interaction with an environment (either actual or simulated) and learning from the experience of the interaction. With these two fundamental characteristics, the ability to improve the agent or the design is limited only by the ability to iterate successive generations of the design through the simulation and learning process. Thus, recursion, interaction and feedback are the key elements to this interactive process.

The system for integrating and optimizing technical systems according to the present invention is a powerful tool for supporting the transition to the knowledge economy. It can provide agents with new ways of working. It can aid in the redesign effectively and re-equipment of the workplace to operate effectively in the information age. The system for integrating and optimizing technical systems according to the present invention is a synthesis of elements of the present invention. The components are: 1-Body of Knowledge, 2-Process Facilitation, 3-Educational Programs, 4-Technical Systems, 5-Environments, 6-Project Management, and 7-Venture Management. The functioning of the system for integrating and optimizing technical systems according to the present invention depends on all the components working together. None can exist alone and have a full expression of the system. This is not to say that each component must function at the same level of sophistication. The components will, in fact, co-exist while each is at a different level of completion and sophistication. The system itself is subject to the same "rules" of creativity and evolution, as are the projects and processes it manages.

The system for integrating and optimizing technical systems according to the present invention is, in broader terms, an idea manager as well as a planning and project manager. The hub of the system is a knowledgebase designed to provide information to the user, information that is relevant to the task at hand, but that also provides gateways to further exploration of the implications of that task. The knowledgebase is designed to support the user's creative process in dealing with any topic. Further, it is designed to act as a "knowledge capture" mechanism through its interaction with the person using it.

Linked to the knowledgebase are a series of modules. The main function of these modules is to allow the user to explore the relationships between ideas about how the future might unfold and the creation of practical plans to guide actions into that future. These modules bring together three of the principal Taylor knowledge technologies: the Scenario; the Strategic Plan and its graphic manifestation, the AND MAP; and the Time and Task management system. The system for integrating and optimizing technical systems according to the present invention also provides a pathway to the corporate knowledgebase and to other application packages that support the creative process, such as word-processing, spreadsheet, graphics and computer aided design.

The system will function as an expert system providing the user with artificial intelligence, as well as tools with which to pursue creative endeavors. The large-scale synthesis of agent intelligence will usher in an era of creative exploration far surpassing any in humanity's experience.

The system for integrating and optimizing technical systems according to the present invention is composed of eight major modules. At the hub of the system is the knowledgebase, the main data base of information resources. The Knowledgebase Interface is the shell that protects the data base and provides the tools to access the data directly or through applications. Outside the shell are the six "principle applications" modules of the system. They are Data Management, General Applications, Tools, Scenario, Strategic Plan and Time and Task Management Modules. Together they form an integrated environment for the creative exploration of ideas about the future. They also provide the means of programming and managing courses of action to provide the transition, for the corporation or organizations between the present and the future. Finally, the system also provides an intelligent link with the corporate past, which it builds upon by documenting corporate actions as they unfold. The system is, therefore, an historian of actions, providing the chronicle as events occur.

The knowledgebase and its interface contain the information upon which the six "applications" draw. The knowledgebase also provides the means of entering and retrieving general information to and from the system. Finally, it provides a means of exploring and creating new ideas, using the creative process and the black box models. The knowledgebase interface will link the specific work modules, called the principle applications, with the knowledgebase and application programs that reside "outside" the system for integrating and optimizing technical systems according to the present invention. It will provide the means of manipulating data so that it is compatible with the needs of the work modules and the outside applications programs.

Ultimately, the knowledgebase interface will manage the expert system aspects of the system for integrating and optimizing technical systems according to the present invention. For example, in a full expert system implementation, when a particular user signs on to work with a module, the system will call up specific parts of the tool kit that the user profile indicates the user prefers to use. The system might also make suggestions on investigative strategies the user might like to pursue, basing the suggestions on the user's level of expertise.

The Scenario Module will facilitate the formulation of ideas about the future. A structured investigation into the past could also be accomplished using this module. Key features will include: 1) the support of several formal methodologies such as morphological and cross-impact analysis, with which the structure of postulated events may be developed and/or analyzed, 2) the ability to access information in the knowledgebase that pertains to an event through a keyword query 3) the ability to compare different scenarios and to analyze the implications of variations between the types of events projected, and variations in the timing of those events.

The Strategic Plan Module facilitates the formulation, testing, and maintenance of broad plans of action. The AND MAP technology will be supported in PERT/CPM or decision network form. Formulation of goals and objectives as well as specific activities within the plan will be linked to scenario events that affect them. Likewise, events within a plan are linked to specific actions within the time and task management system associated with the plan. Through this linkage, the effects of a change in any one of the modules on the other modules will be recorded. Documents that support or explain the plan, or specific actions within the plan, can be retrieved from the knowledgebase. The module will support "what if" computations on a plan or group of alternative plans. The development and alteration of AND maps will be graphically and analytically supported.

The Time and Task Management Module will translate the intent of the strategic plan into a day to day scheduling of actions implementing the plan. Specific work packages will be broken out showing team membership, the responsible manager, time lines, etc. The rate of completion of various work packages and specific actions will be fed back to the strategic plan to monitor plan progress. Possession of a variety of reporting capabilities will be a key feature of both the Strategic Plan and the Time and Task Management modules.

The Tool Kit Module will contain routines that are used in common by the other work modules. For example, statistical analysis of data will be needed in each of the main work modules. When needed, it will be called from the tool kit, 90 that it will not be necessary to have a complete set of code to do statistical work resident within all three of the planning modules. Possibly some simple procedures, such as calculation of the mean and standard deviation of a set of data, will be more efficiently placed within the planning modules themselves. This is an issue to be determined in the future, however.

The planning modules, that is, the Scenario, Strategic Plan, and the Time and Task Management modules, are designed to support a complete planning process. This process can be described in simplified fashion in the following model:

1. define problems and opportunities
2. describe the problems and opportunities in systems terms
3. define goals and objectives to deal with the problems and opportunities
4. define performance specifications to implement the goals and objectives
5. define resources and constraints to accomplish the goals and objectives
6. define the plan of action
7. create work packages to implement the plan
8. create a task management system to control and track work
9. feed back changes in organizational goals and objectives and in resource or constraints to the plan and the task management system
10. feed back changes in the plan's schedule to organizational goals and objectives Each of the above steps in the planning process is related to one of the system for integrating and optimizing technical systems according to the present invention planning modules.

The system of the present invention provides a method of user interaction with the system that allows the user to learn the system's next level of operation while using a lower level. The system of the present invention also creates various scenarios about the future. Be able to test the assumptions within the scenarios to see how reliable they are based on present knowledge and opinion. Be able to compare the probability and the impacts of various scenarios. Be able to monitor the reliability of a given scenario as events unfold.

The system of the present invention also provides a method of exploration of the knowledgebase in a way that gives the user the information s/he is looking for and makes reference to other related information not initially requested.

The system of the present invention, in all modules, provides the ability to work with text and graphic images within the same viewing plane and provides multiple window display.

The system of the present invention also provides the user with the ability to create an outline plan for each working session with the system. It should facilitate the discovery of new information by the user.

The system of the present invention also provides a record of each working session for the user to review and learn from to increase his/her efficiency.

The system of the present invention also provides extensive on-screen help and tutorials to assist the user in operating the system in an efficient and effective manner.

The system of the present invention also provides the user with a "tool kit" of methods for the exploration of the structure of knowledge in selected subject areas aimed toward generating new insights and knowledge. That is, an expert system on the exploration of knowledge.

The system of the present invention also provides the system with the ability to acquire new information from interaction with the user, and to learn the user's methods of operation, in order to assist the user in performing those methods with maximum effectiveness and efficiency.

The system of the present invention also provides the ability for agents within the system to carry on multiple conferences with each other.

The system of the present invention also an analysis of scenario events to show how events are logically connected. Develop strings of events to be inserted into a scenario.

The system of the present invention also shows the variability in the estimates of when an event will happen within a scenario.

The system of the present invention also shows the combined probability of a particular chain of events happening, that is, a risk analysis of the chain of events.

The system of the present invention also correlates the scenario events to specific articles, working papers, etc. that collaborate or dispute the probability of the event occurring.

The system of the present invention also facilitates the formulation of alternative plans of action based on key events in the scenario. Creates network diagrams of these plans. Link activities within the plans to a database of the characteristics of the activities.

The system of the present invention also links key events in the scenario to elements in the strategic plan. Links the work packages in the strategic plan to elements in the time and task management system. When one related element in any module changes, the system will inform the user and/or automatically update related elements in the other modules.

The system of the present invention also creates plans in a decision network format, utilizing the unique symbols and identifying structures of the AND map.

The system of the present invention is also able to analyze a network based on time minimization, cost minimization, and optimization (trade-off between time and cost) criteria. The system of the present invention is also able to compare various plans based on any one or all of the above criteria, i.e. a goals achievement analysis across multiple plans. The system of the present invention is also able to perform "what if" analysis on a plan or plans based on:

a. minimum time with unlimited resources for a given topology.

b. minimum cost criteria c. specific resource limitations.

d. maximum parallel tracks for network activities

The system of the present invention is also able to perform "what if" calculations on a given plan based on:

a. changes in the network topology.

b. changes in the resource allocations on the network.

The system of the present invention can provide the ability to do resource leveling.

The system of the present invention can create descriptions of the network in AND map form, Gantt Chart form, and in activity precedence tables; show the critical path activities for deterministic networks and critical path options for probabilistic networks; report slack times for each non-critical activity. Also show the reduction in slack for non-critical activities as the project progresses, so that these activities do not go critical.

The system of the present invention can create "work packages" that are given to people responsible for given major tasks and that identify the specifications of the work to be done, the time lines to be met, and the resources available to the project team. The reporting schemes for all three major modules will be hierarchical in nature. The first level will give only basic information and each succeeding level will increase the density of information about the queried activity or event.

The system of the present invention can monitor the actual time and resources required by various activities for completion, and feedback those results to an on-going activity type model. Incorporate an analysis of variance to see if the variation in performance is due to the nature of the activity or the nature of the resources: primarily people and their level of training and expertise. Create an activity by activity comparison of the time scheduled versus the actual completion time, and report any slippages in time lines.

Monitoring will be tied to the cost outlay accounting for each activity in the Plan. The time and task system will be tied to an overall project time and cost accounting system. (2)

The strategic plan module parameters are very flexible in order to respond to the variety of types of plans that will be developed using it.

The system learn the user's planning style and provide appropriate information and tools to support that style. The style should also be compared with "ideal" approaches and the user be made aware of the differences in approach, and possible performance differences, between his/her style and the "ideal".

The time and task management system provides a break out on a sub-track basis of who will do what and when. All activities within the time and task management system will be tied to a specific activity within the strategic plan.

The system of the present invention includes time and task reporting systems that are able to call up the "work package" in which are contained the associated project activities, the name of the person responsible for the project's completion, the time frame in the total project, whether the activities in the work package are on the critical path and if not what their slack is.

The system of the present invention also preferably includes means to: record comments and suggestions about the plan from those using the plan; analyze their comments and use the results to bring refinement to the plan.

The system of the present invention also preferably includes means to: create ways of allowing the "line" managers and personnel to design the ways that the time and task management categories are developed, in order to implement the project; create ways of allowing the "line" personnel to have input into the creation as well as the modification of the plan; create a flexible report generator so that information output concerning any of the modules can be customized or called from a standard template.

The system of the present invention also preferably includes means to: provide a project documentation module that records who gets what information, so that updates and changes to the plan can be distributed efficiently to the appropriate people.

The system of the present invention also preferably includes means to: create a user interface that is graphically-oriented and has a menu-command string-icon structure.

The system of the present invention also preferably includes means to employ a "learn as you do" user operation strategy.

The system of the present invention also preferably includes means to: create "fly it" expert systems for each of the main modules.

4. System and Method for Transporting Agents and Agent Environments as an Integrated Experience The system and method for transporting agents and agent environments as an integrated experience of the present invention can be used to transport agents, including human agents, within separate environments that are unique to that agent in a remarkable efficient way while optimizing utilization of transportation resources. The system includes transportation modules or "eggs," that can take many different forms. In the case of human transport, the environment can be tailored to an individual's wants, needs and desires. However, all of the "eggs" within the system should minimally be able to know where they are (in the case of human transport this can be accomplished through, for example, a GPS system or the like) and be able to report their location to a central system for coordinating transportation. The eggs should also be able to verify the identity of their occupant. In the case of human transport, this can this could be done, for example, through biometric techniques discussed herein or passwords and keys.

Use of a central system that knows the identity and location of all agents within the system affords tremendous opportunities to facilitate transportation of agents. Moreover, in accordance the system and process underlying this invention, the system is capable of receiving feedback and is thus capable of improving itself through recursion and iteration.

To fully facilitate transportation, the agents within the system must able to communicate to the overall system to indicate a desired location, i.e., where they want to go. The system has predictive capabilities that are improved over time through recursion, iteration and feedback to increasingly improve its ability to facilitate transportation. The transportation system improves the overall system in two ways. First, the transportation Sub-System provides tremendous opportunities to reduce waste in transportation. In the case of human transport, for example, consider, for example, a person going to the airport. Under current systems, the airline has no way of definitively forecasting which passengers holding reservations will actually arrive at the airport. Moreover, the current system for identifying passengers, ticketing passengers and loading passengers onto the plane only begins when the passenger arrives at the airport. Thus, passengers are told to arrive an "hour or two" before scheduled departure time. Although people have generally grown accustomed to this delay, almost all of it is a waste of time. A system that knows the identity and location of agents within the system can accurately forecast which agents will actually arrive in time for a particular flight. In addition, processing the agents is greatly exemplified using the centralized system. By producing these unnecessary delays, the utilization rate or percentage use of expensive assets such as jet aircraft, could be dramatically increased, thus increasing airline profit.

The transportation system offers similar advantages in connection with other modes of transportation. One can appreciate the lack of utilization of modes of transportation by considering the number of cars that are not in use at any one time. The same applies to trucks, boats and trains. A system that is aware of the location and desired destinations of all agents within the system, allows further optimization through multi-modal transportation. In particular, based on past experience, an agent is transported in the most efficient way possible using whatever particular modes of transportation will yield fastest transport. Again, the only systems necessary are the individual environment (agent module) or egg having the ability to know its location, its occupancy, the desired destination of its occupancy and the ability to report all of these to a central system. To make the central system a learning system, however, the system should have a predictive capability to predict the best routing of the agent as well as storage means for keeping track of predictive routing as well as actual results so that the system receives feedback and can then improve itself using principles of recursion and iteration.

Although the greatest inefficiencies in today's economy seem to be in connection with the transportation of human agents, the system described herein is readily adaptable transportation of all forms of agents.

Thus, at one level, the system of transportation serves to generate a vastly improved efficiency and utilization of existing transportation resources. It is expected that this improved efficiency will likely result in changes in the allocation of investment in transportational resources. For example, if one is ensured of having transportation available when and where needed, ownership of transportation assets (and the burdens associated with such ownership) becomes much less desirable to individuals.

As indicated above, the specific form of the transportation module, or egg, can vary. However, it should be appreciated that certain additional efficiencies are offered, especially in the ability to use a multi-modal form of transportation, when the individual transportation module is readily adaptable to different forms of transportation.

The system and method for transporting agents and agent environments as an integrated experience of the present invention is expressly not limited to the transport of human agents. To the contrary, the transportation Sub-System of the present invention is scaleable both upward and downward in size to address analogous problems in connection with other forms of agents. Specifically, the system of providing an agent builder, feedback and transportation can be used in the development of "learning systems" and other forms of intelligent agents.

For example, as noted above, there is still a need for a software robot "agent" that can intelligently search through the files of the Internet and for a mechanism for processing the located files for presentation to an end user in a meaningful manner. Known approaches, including that disclosed in the Mauldin patent attempt to gain information through brute force sifting through files. The fundamental problems with such solutions are that they are not sufficiently scaleable to accommodate exponential growth in use and data to be searched and that the "agents" used are static and do not improve through feedback. The system and method of the present invention can be applied to develop improved "agents" for searching databases. This can be understood as an application of the transportation Sub-System of the present invention (where the "agents" are software objects transported through of a plurality of interconnected computers each having a plurality of files stored thereon) and/or an application of the facilitation SubSystem of the present invention (where the software "agents" interact with one another and the user to develop better agents. This again demonstrates the tight interaction and integration of the Sub-Systems of the present invention.

In addition, the method and system of transporting agents and agent environments as an integrated experience according to the present invention demonstrates the interaction of the entire system. In particular, the system and method are developed by developing a PatchWorks Design (tm) Diagram. In this case, the exercise is aimed at the development process of the Transportation Sub-System of the Invention itself.

The system and method for transporting agents and agent environments as an integrated experience includes various transportation modes for transporting an occupant environment. The environment may be in the form of a contained environment or "egg." The egg itself is a complete user environment that is adaptable to a variety of modes of transportation, for example, the environment may include navigation, GPS and communication systems.

The specific mode of transportation shown can include, among other things, smart adjustable shrouds, impact protection, storage areas, an adaptive tracking system that allows the vehicle or transportation component to be used in the road, rail, air, etc., a propulsion unit and an agent environment package.

In accordance with the method of the present invention, the occupant egg is adaptable to various modes of transportation, and the transportation vehicle itself is adaptable to traditional modes of transportation.

In operation, the system can be used as, among other things, a virtual facilitator. In particular, the system includes agents that can reach out and scan data bases throughout the world and bring back "new" and "interesting" information without being overly constrained. This information is chunked into different categories, but not too stringently. These creative "agents" know that part of good design is heuristic searches and unexpected finds.

Agent scanning is but the first step. Next, the agents connect, sort, merge, and find complimentary and contrary data, and offer these chunks of information to their partner, which could be a human user. The user may hunt for information without knowing the exact nature of what she or he is looking for. The user need only know some of the characteristics of what is needed. This is a significant advantage of the present invention even when compared to a "query tone" system of the type currently contemplated, but not implemented, by others.

Agents organize questions/scenarios for the user to respond to. Some agents require the user to do some back casting from the future; others focus the user on convergent ideas; agents could even ask the user to read contextual articles. Thus, the system (machine) acts as a facilitator of human agents. Moreover, the agents can work with multiple people and teams simultaneously. A user can call colleagues, interrupting their work, and ask them to join in group exercises. The system may employ a Zwicky Box or some other means of implementing a morphological forced connection process as a way of searching for connections that no "logical" mind would make.

As part of the Focus step, the agents can provide users a set of scenarios that ask them to think diligently about what they want to do. Other humans that are not deeply involved in the work can be brought into the process at the suggestion of the machine agents to offer fresh insights and perspective. The other humans are thus "agents".

The agents are also capable of feeding information back to the user, asking further questions, clarifying and most important, eliminating options. The user need not prioritize; since, through operation of the system, ideas get stronger through the iterations of original intent and vision and the information the agents were able to bring to the users (human agents). The system can also display or flash models on the user's screens encouraging the users to "Invent the real problem" and reminding the users where they were in the creative process. Axioms such as "Creativity is the elimination of options" can be displayed as a traveling banner across my screen. The agents convey the idea that it is important to eliminate by design and not prioritize by order of yesterday's logic.

User's immersed in interaction with the system may find it difficult to quit, thus, the system should include means for warning of the user's exhaustion and need to sleep and assimilation. The agents can also suggest and print out articles for the users to read before retiring.

In the ACT stage, the user's screens can display a large ACT written across them to alert the user's that the time to begin pulling things together has arrived. The system can display an ANDMap that has, for example, a time line of three years across the top and familiar tracks down the side: financial, marketing, product development; resource utilization, etc. At some point on the ANDMap, for example eleven months down the product track, a three dimensional Landmark Circle identifies when the initial product ships. Touching this landmark causes all the relevant information that had been considered to show up on the screen, including, for example, all of the assumptions that would make this timing "right." The user's may be prompted to add Events to the Map that needed to happen before shipping and also to name things that needed to happen after shipping. The system can also ask the user "So what" and "Now what" questions. Everything added to the map by the users causes the agents to retrieve information and attach the information it to the symbol. At any time, the user may pull up charts showing percentage of likelihood of meeting the deadline or of what would be needed financially during this phase of the work, etc. Within a short time, the user has an ANDMap completed and next steps in hand. This information is all neatly packaged in the user's computer ready and waiting for the user. The system can also provide feedback letting the user know what her or his biases were in how the user thought and worked. The system can then suggest ways to let her or his intuition reveal itself a bit more and suggest hat the user to read certain books for this purpose. The use of the system and method of the present invention to foster the creative process is based on the recognition that we are all inherently creative, that genius lies just under the surface of most organizations; and that they had a process for systematically releasing this genius, no matter what the complexity of the idea.

The agents described above need not be expensive. The can be constructed using JAVA or XML software objects and available on an as needed basis. Thus, for example, a user may be plugged plugged in a smart card at the beginning of the session to allow the Agents to purchase information. The user can see the charges adding up. Retrievals might cost between 10¢; or $25 (as examples) so that at the close of the session the user will have spent less than $250. This is certainly reasonable considering the user's savings in time and frustration.

In accordance with another aspect of the present invention, the system can accommodate results based payment. For example, the system can provide free or relatively free demonstrations to show the value of the service. The system can report to the user how much the session would cost. The system could then offer the user the choice of either walking away with her or his package or creating a value proposition under which the system agents or vendors would become ongoing partners and obtain profit participation if the project was successful.

4. System and Method for Transporting Agents and Agent Environments as an Integrated Experience FIG. 4 demonstrates the method and system of the present invention by developing a PatchWorks Design (tm) Diagram. In this case, the exercise is aimed at the development process of the Transportation Sub-System of the Invention itself. This example serves to "demonstrate" one of the Sub-Systems of the present invention in a somewhat self-referential way and also shows why it takes the "System" to make the System. In addition, this Figure represents a high level design of a complex engagement as it would be done by a person skilled in the art and communicating to someone skilled in the art.

Though FIG. 4 initially appears very dense and difficult to understand, the density and complexity and the FIG. 4, itself, exhibits certain Pattern Language (which is a term of art defined above) conventions that are used in the present invention and require skill in the art to understand. The objective is for the user to have to rethink and recreate the process embedded in the present invention to understand it. This is intrinsic to the present invention on all Levels of Recursion (which is a term of art defined above). Also, the present invention allows an order-of-magnitude compression in the representation of knowledge not only in its use and creation. Using the Glyphs is not just to save some space—it allows a visual gestalt while conveying exact meaning to any member of a community-of-work that knows the code.

As indicated above, an important aspect of the present invention is the interaction among the various Sub-Systems. Again, it is the underlying similarities among these systems that make the overall system and process of the present invention so widely applicable. There are, naturally, differences among the various agents. One important difference is that, among the different agents discussed herein (including humans, machines, organizations and groups), human agents are the only agent that "times out." To the extent that the human agents are the center of the overall system and process is currently contemplated, this becomes a significant issue.

The human agent or knowledge worker "times out" when he sleeps, engages in recreation or when moving from one location to another. Until very recently, most workers, including knowledge workers, worked in only one location, thus the human agent has been disconnected from the system while engaged in other lifestyle activities (sleeping, recreation) or moving from place to place. With increased use of transportation, the amount of time spent moving from place to place has increased dramatically. Thus, there have been attempts to allow human agents to connect to the system from remote locations. Portable phones, portable pagers and portable computers are examples of such efforts to keep human agents connected. Nonetheless, these systems are, without question, less than perfect in keeping human agents connected with the system.

In accordance with the system and method for transporting agents and agent environments as an integrated experience of the present invention, on the other hand, agents, including human agents, can be transported within separate environments that are unique to that agent. In the example described in FIG. 4, for example, the environment is referred to as an egg, but the environment could obviously take many different forms. The environment can be tailored to an individual's wants, needs and desires. However, all of the "eggs" within the system should minimally be able to know where they are (through, for example, a GPS system or the like) and be able to report their location to a central system for coordinating transportation. The eggs should also be able to verify the identity of their occupant. This could be done, for example, through biometric techniques discussed herein or passwords and keys.

It can be appreciated, therefore that if there is a central system that knows the identity and location of all agents within the system, there are tremendous opportunities to facilitate transportation of agents. Moreover, in accordance the system and process underlying this invention, the system is capable of receiving feedback and is thus capable of improving itself through recursion and iteration.

To fully facilitate transportation, the agents within the system must able to communicate to the overall system to indicate a desired location, i.e., where they want to go. The system has predictive capabilities that are improved over time through recursion, iteration and feedback to increasingly improve its ability to facilitate transportation. The transportation system improves the overall system in two ways. First, the transportation Sub-System provides tremendous opportunities to reduce waste in transportation. Consider, for example, a person going to the airport. Under current systems, the airline has no way of definitively forecasting which passengers holding reservations will actually arrive at the airport. Moreover, the current system for identifying passengers, ticketing passengers and loading passengers onto the plane only begins when the passenger arrives at the airport. Thus, passengers are told to arrive an "hour or two" before scheduled departure time. Although people have generally grown accustomed to this delay, almost all of it is a waste of time. A system that knows the identity and location of agents within the system can accurately forecast which agents will actually arrive in time for a particular flight. In addition, processing the agents is greatly exemplified using the centralized system. By producing these unnecessary delays, the utilization rate or percentage use of expensive assets such as jet aircraft, could be dramatically increased, thus increasing airline profit.

The transportation system offers similar advantages in connection with other modes of transportation. One can appreciate the lack of utilization of modes of transportation by considering the number of cars that are not in use at any one time. The same applies to trucks, boats and trains. A system that is aware of the location and desired destinations of all agents within the system, allows further optimization through multi-modal transportation. In particular, based on past experience, an agent is transported in the most efficient way possible using whatever particular modes of transportation will yield fastest transport. Again, the only systems necessary are the individual environment (agent module) or egg having the ability to know its location, its occupancy, the desired destination of its occupancy and the ability to report all of these to a central system. To make the central system a learning system, however, the system should have a predictive capability to predict the best routing of the agent as well as storage means for keeping track of predictive routing as well as actual results so that the system receives feedback and can then improve itself using principles of recursion and iteration.

Although the greatest inefficiencies in today's economy seem to be in connection with the transportation of human agents, the system described herein is readily adaptable transportation of all forms of agents.

Thus, at one level, the system of transportation serves to generate a vastly improved efficiency and utilization of existing transportation resources. It is expected that this improved efficiency will likely result in changes in the allocation of investment in transportational resources. For example, if one is ensured of having transportation available when and where needed, ownership of transportation assets (and the burdens associated with such ownership) becomes much less desirable to individuals.

As indicated above, the specific form of the transportation module, or egg, can vary. However, it should be appreciated that certain additional efficiencies are offered, especially in the ability to use a multi-modal form of transportation, when the individual transportation module is readily adaptable to different forms of transportation.

One example of the system and method for transporting agents and agent environments as an integrated experience is shown in FIG. 4. Specifically, as shown therein, the system itself includes an agent environment or transportation module 2 in the form of an occupant "egg". The system of the present invention includes various transportation modes for transporting the occupant module or egg, one of which is shown schematically in FIG. 4.

The egg itself is a complete user environment that is adaptable to a variety of modes of transportation, for example, in the illustrated embodiment, the environment includes navigation, GPS and communication systems. Most critically, the occupant module includes means for communicating with a central processor (central system); means for ascertaining its own location precisely (GPS or the like); means for identifying/confirming its occupancy, i.e., who is in the module; and means for determining its occupants' desired destination (means for receiving input).

With these characteristics, the occupant module or egg becomes a virtual agent or representation of the occupant that can be processed by the central processor.

The specific mode of transportation shown is a module that includes, among other things, smart adjustable shrouds 1, impact protection 8, storage areas 9, an adaptive tracking system 4 that allows the vehicle or transportation component to be used in the road, rail, air, etc., a propulsion unit 3 and an agent environment package 7.

In accordance with the method of the present invention, the occupant module or egg is adaptable to various modes of transportation, and the transportation vehicle itself is adaptable to traditional modes of transportation.

FIG. 4 also illustrates how other aspects of the present invention can be used in the development process of the transportation sub-system of the invention itself. This example serves to demonstrate one of the Sub-Systems of the present invention in a somewhat self-referential way, and also shows why it takes the "system" to make the system.

Thus, FIG. 4 shows an example of the use of the modeling language and systems of the present invention in problem solving.

Thus, it is apparent that Agents cannot be disconnected from the ability to ACT—this is critical for HUMAN Agents in a Knowledge Economy, and, they must be able to do so in real time. Computer code "agents" are now shipped in "eggs" it is called encapsulation. The Transportation Sub-System of the present invention piece is both INTRINSIC to the overall System and Method of the present invention, AND, it has a numerous implications to existing day-to-day transportation systems.

It should be appreciated that the system and method for transporting agents and agent environments as an integrated experience of the present invention is not limited the transport of human agents. To the contrary, the transportation Sub-System of the present invention is scaleable both upward and downward in size to address analogous problems in connection with other forms of agents. Specifically, the system of providing an agent builder, feedback and transportation can be used in the development of "learning systems" and other forms of intelligent agents.

For example, as noted above, there is still a need for a software robot "agent" that can intelligently search through the files of the Internet and for a mechanism for processing the located files for presentation to an end user in a meaningful manner. Known approaches, including that disclosed in the Mauldin patent attempt to gain information through brute force sifting through files. The fundamental problems with such solutions are that they are not sufficiently scaleable to accommodate exponential growth in use and data to be searched and that the "agents" used are static and do not improve through feedback. The system and method of the present invention can be applied to develop improved "agents" for searching databases. This can be understood as an application of the transportation Sub-System of the present invention (where the "agents" are software objects transported through of a plurality of interconnected computers each having a plurality of files stored thereon) and/or an application of the facilitation Sub-System of the present invention (where the software "agents" interact with one another and the user to develop better agents. This again demonstrates the tight interaction and integration of the Sub-Systems of the present invention.

5. System and Method for Structuring and Facilitating Value Exchange Among Agents Forming Real and Virtual Economies The present invention further includes objected oriented system and method for exchanging a value and objects that serve as a medium of exchange or a measure of value. In this system, objects, preferably computer software objects, are created to represent the value of various items within the system. Thus, for example, an object could be created to represent the value of a tangible object such as a boat, an object can be created to represent the value of one person's service and so on. Objects can also be created to represent the value of one's future earnings. Each object within the system has certain characteristics. Foremost among the characteristics of each object is an ownership characteristic, which it establishes who, within the system, has ownership with control of the value represented by the object. It is, naturally, critically important that the integrity of the ownership characteristic be maintained. In other words, it is important that one person within the system cannot misappropriate the ownership characteristic from others within the system. Thus, it is contemplated that the ownership characteristic be linked to unique characteristics of the individuals within the system. Examples of appropriate and unique characteristics can include fingerprint patterns, iris patterns, DNA patters and, encrypted code values. Thus, an object "knows" that it is linked to the person having a certain, unique, DNA pattern or fingerprint.

Like the transportation Sub-System, the system for determining the value of objects makes it possible to achieve increased utilization of objects that have value. These can include objects that are physical objects (a boat) or metaphysical objects (the future value of services that can be rendered). At its most basic level, the system includes objects that have value. The system is connected with data resources capable of evaluating or ascertaining the "value" of an object at any particular time. In addition, the object's location is always known and its status (health or condition) is always known. Reporting on location can be done with GPS technology or other similar devices that can ascertain a location precisely. Circuits and chips that measure conditions that are believed to be significant factors in the value of the object can be used to ascertain "status" or "health." In the simple case of a boat, for example, a chip would report whether the boat is afloat or sunk. Initially, the object within the system should be very simple, but should operate through recursion and iteration to refine the predictiveness of the system. Thus, through experience, for example, it will be learned that certain factors affect the value of the objects. The system must be adjusted accordingly. The key it that feedback is used to refine as experience is gained.

Thus, using the system of the present invention, anything that has value to some people can be a commodity. Any commodity in this sense can be a tradable instrument. This allows much greater utilization of assets (for example, future value of services rendered that might otherwise not be used at all).

This system should also include a third party agent or enforcement agent, which under current systems could be courts, a legal process generally to enforce rules of exchange and ownership, for example.

This system is useful on an extremely large macroscale and for discrete, definable groups of persons that have a common interest. Thus, it is possible with this system to have multiple, distinct economies. It is contemplated that it will be necessary to include within the system some form of interface with other economies. This Sub-System of the present invention plainly opens doors to even greater utilization of assets to field the economy. Thus, the present invention offers the opportunity to create tremendous wealth since most assets of the economy are, at any given time, inactive because of the inherent limitations of the second wave economy.

It is further contemplated that the system includes means for modeling, sampling, and verifying the current value, preferably in a real time basis, of the objects within the system. Thus, for example, the physical objects that are represented by the software objects within the system could, for example, report signals indicative of their current state to a monitoring system. In the case of a boat, for example, the boat would continuously report its location and that all systems were in order. As long as these signals were received the system would recognize the value of the object representing the boat. However, once the system failed to receive an indication that the boat reported the boat's location and function, it would no longer recognize the value of the object value associated with the object representing the boat. There are, of course, other ways of verifying the values of the objects represented within the system. For example, in the case of tangible objects such as boats and automobiles, there is the conventional techniques for establishing a "blue book value" could be used. It should be appreciated, however, that because of the digital nature of the system and method of the present invention, it is possible, with sufficient input to much more accurately model real world values. The fact or/of ownership and control of the physical object could be continuously verified, but this seems to be unduly complicated using current technology. Thus, it is preferred that the system operate, to some extent, on an "honor system" that is enforced through periodic verification or spot checking as well as by a credit report type system whereby participants within the system can lose the ability to participate within the system if they fail to report or file misleading or fraudulent reports.

One form of identification is Biometric verification, in which an individual's identity is checked by examining unique physical characteristics such as fingerprints, eye retinas, palm prints and voice signatures. Because they are unique to each individual, biometrics can prevent theft or fraud. Unlike a password or PIN, a biometric trait cannot be lost, stolen, or recreated.

Among the most reliable and widely accepted methods in biometrics is fingerprint identification. The method of verifying a person's identity is popular because the fingerprint is the most convenient biological characteristic to identify. it takes little time and effort for somebody using a fingerprint identification device to have their fingerprint scanned. Studies have also found that using fingerprints as an identification source is the least intrusive of all biometric techniques.

Verification of fingerprints is the fastest and most reliable of all other biometric methods. Users will not experience as many errors in matching when they use their fingerprint and the device requires very little space on a desk or in a machine. One of the biggest fears of fingerprint technology is the theft of fingerprints. Skeptics point out that latent or residual prints left behind on the glass of a fingerprint scanner may be copied. However, there are known devices that only detect live fingers and a copy of a fingerprint will not work.

Leading companies now offer devices that can take advantage of the security and convenience of fingerprints. These devices include a completely self-contained scanner that automatically performs enrollment, comparison and verification of a user's fingerprint. With an internal CPU and non-volatile memory, the device processes and matches fingerprints internally in less than a second and requires no additional hardware to function. The known fingerprint identification unit is easy to use and requires little time to match and verify a fingerprint. To begin using a known fingerprint identification unit, you must first enroll your fingerprint (similar to setting up a password). During the enrollment process, the scanner captures a partial image of your fingerprint called the fingerprint template. The known fingerprint identification unit only captures a sampling of the fingerprint and does not store the entire image of the fingerprint. This helps reduce the stored template size, increases speed, and protects the user by avoiding potential privacy problems. When the time comes for you to access a computer or validate your fingerprint, just place your finger on the known fingerprint identification unit; it scans the fingerprint and captures an image of your print. The internal CPU then compares the image to the stored templates. In less than a second, a match or rejection is made and the result is sent back to your PC for proper access. Users can adjust the verification level on the known fingerprint identification unit to match their application needs. The device offers five settings for closeness of match, depending on the level of security required and the importance of user friendliness. Since the known fingerprint identification unit does all of its processing internally, it is also platform independent and will work with a variety of systems ranging from embedded controllers to high-end workstations.

In addition, the known fingerprint identification unit is a compact, light weight device that can fit in the palm of your hand. The known fingerprint identification unit has the capability to enroll, scan, process, or match fingerprints internally in less than a second. With an internal CPU, custom ASIC, and memory, the known fingerprint identification unit can quickly process various fingerprint related tasks. The internal CPU removes the burden of complex fingerprint calculations from the host machine. Since the known fingerprint identification unit is not dependent on an external processing unit, results are always fast, reliable, and consistent. The known fingerprint identification unit also comes with internal flash RAM for storing fingerprint templates. This internal memory eliminates the need for an external database to store templates. The known fingerprint identification unit's nonvolatile memory can store many fingerprint templates and it can verify a finger against any one of them in less than a second. It also allows you to store templates on an external host machine. The known fingerprint identification unit contains a biometric sensor that detects whether a finger has been placed on the fingerprint scanner. It will allow only a "real" finger to register. This precautionary feature prevents fraud and allows it to tell the difference between a real finger and an imitation. This biometric sensor on the known fingerprint identification unit is also used to trigger the scanning process.

6. System and Method for Facilitating Work and Commerce Among Agents in a Knowledge Economy In accordance with another aspect of the present invention, it is possible to develop a model for a total service network that takes insights and ideas from the creation stage to the organizational stage—an Intellectual Capital Factory.™ In direct contrast to the conventional approach of trying to quantify that which occurs or is found to exist in "successful" organizations, makes it possible to manage and grow intellectual capital from the seed of a good idea. The contrast between these two approaches is as sharp as the contrast between foraging for food in a fertile valley and hydroponic agriculture. Thus, where a conventional view of intellectual capital management might focus on retaining employees that demonstrate creativity, the present invention provides and maintains a work environment that unleashes the creativity that most people have so that "ordinary" individuals achieve the "extraordinary" results that they are capable of.

The focus of the present invention is not "finding the hidden wealth within organizations," but rather systematically managing and nurturing the growth of insights and ideas into successful organizations that have a wealth of intellectual capital.

The underlying process is analogous to an "Agriculture of Ideas." Just as agriculture involves providing a suitable environment and removing obstacles to growth, our systematic approach to creating intellectual capital involves cultivate and nurturing ideas from the seed stage to the producer/ company stage in an accelerated way by creating an environment that fosters creativity and removing barriers to creativity. The result of the process is hydroponic-like growth of ideas—an IC Factory™.

The IC Factory™

Vast amounts of capital are no longer needed to create value and wealth. Consider the software industry, the requirements for entry are basically a god idea and a personal computer. Hardware manufacturers, on the other hand, are saddled with costs and competitive concerns that software manufacturers can ignore. Hardware manufacturers must, for example, compete against foreign manufacturers with far lower production costs and underwrite factory facilities.

This is just one example of the implications of the shift from a resource-based economy to a knowledge-based economy. In a resource-based economy much of industry is labor intensive, in contrast, a knowledge-based economy is knowledge intensive. Moreover, in a resource-based economy it is important to be near transportation and communication nodes and the location must be near resources that are consumed in creating products. In a knowledge-based economy, on the other hand, physical location is less important, particularly with the advent of the Internet and other forms of communication that allow collaboration on individuals in remote locations.

The key to bringing structure to the process of creating intellectual capital may be summarized in the model of an intellectual capital factory or "IC factory." The IC factory is a model for bringing structure to creation, nurturing and protection of intellectual capital.

A central premise of this model is the notion that the creative process cannot be controlled, but it can be managed. The creative process is managed by managing the conditions that create or block creativity. Thus it is necessary to manage the process of information development within a group and manage the process of information development within a group and to manage the energy field around the group. All of this is accomplished through structure that can be managed and modeled as an IC Factory.

The IC factory model provides a system and method for creating and nurturing intellectual capital.

Again, information age products are not capital intensive. Information age products are difficult to create, but easy to recreate or replicate. This is because knowledge-based products result from an insight or idea. Once the insight or idea is recognized a path to creation of the knowledge-based product may be inevitable at least once that path is made clear in the introduction of a product. Thus, for example, knowledge-based products such as computer software are often based on important insight, but once a product becomes available, the product itself can be easily replicated or the insight can be appropriated by others. There are also examples in the life sciences field. For example, the discovery of a new composition, pharmaceutical or gene sequence requires a great deal of research and in some instances an insight. However, once the existence of the composition, pharmaceutical or gene sequence is understood it is easily, in a relative sense, replicated The IC factory model represents a structured non-linear non-incremental approach to creating, nurturing and protecting intellectual capital. In this sense, the IC factory structured approach is analogous to hydroponic growth of ideas.

The IC factory requires a knowledge-based (body of knowledge) and systems (educational and technical) for keeping the knowledge-based fresh and current. In addition, there must be systems for facilitating access to the knowledge-based within work groups. Thus, one critical function that must occur within the IC factory is growing and adapting the body of knowledge required to model the internal and external environment. This is done, as mentioned before, by creating education systems to receive inputs from external services—find out what's going on and use technical systems to leverage education systems and adapt a body of knowledge. When these systems are appropriately structured to achieve these functions, ideas are introduced into the system (the IC factory) and rapidly iterated and grown.

The IC factory also includes a structured environment that allows release of group genius. This requires careful attention to the effect of one's environment on one's creativity and productivity. The environments of the present invention are a good example of this type of structured environment, but most current work environments include numerous obstacles to creativity and group genius.

One of the critical elements of any collaborative work environment is to create an environment that allows individuals and groups to see the whole picture and, simultaneously, see details to allow effective collaboration.

In addition, to release group genius, there must be a way to facilitate the process of decisionmaking. We have found that an interdisciplinary approach is particularly helpful. Thus, it is very important to have all stakeholders involved. In the case of a IC factory, the stakeholders would certainly include an expert in intellectual property, an expert in capital financing, and an expert in the particular industry that our idea relates to.

The IC factory also includes a value web that is managed as a venture. The web members provide inputs into the system or venture, but also have separate identities. In this sense, the members of the value web are like software objects and that they bring value to the web and draw value from the web. Examples of web members within an IC factory would include the intellectual property expert member and the capital financing expert member or object. The members or objects can be individuals or groups of individuals or firms.

Obviously, a critical aspect of managing a web of independent agents is the integration and system facilitation function.

The value of members provide feedback loops into areas of interest so as to keep the knowledge base fresh and current.

The IC factory may be industry focused or generalist depending on the available expert objects.

As mentioned above, the IC factory requires a system integrator who bring these various elements together. This is best done using a system and method for facilitating interaction of intelligent agents. In this regard, it should be understood that the agents could be human agents, organizational agents, machine agents and electronic agents.

The present invention achieves hydroponic growth of ideas by removing environmental and structural barriers and expanding an organization's knowledge base. The IC factory approach provides a clear path to directly (not indirectly) proving every element of intellectual capital in a systematic way. Thus, all the traditional components of intellectual capital are proved in a systematic way. Consider, for example, the improvements to corporate brain power, organizational knowledge, customer relations, the ability to innovate, employee morale, the knowledge base, the technology base and the market position. Successful high technology companies empirically know that environment profoundly effects morale. Thus, the emergence of "open work places and casual dress" has been a characteristic feature of emerging growth companies. However, these approaches are working on the edges, but not addressing the environment in a comprehensive way.

In summary, therefore, the IC factory is an open system that incorporate new technologies or individuals for performing the critical functions. Ultimately, the quality of results achieved by the IC factory model will depend on the quality of performing the requisite functions.

The critical functions may be summarized as follows:

(1) Establishing a knowledge base that is continuously refreshed with inputs from outside the organization (IC factory). In the case of an IC factory, the knowledge base must include information concerning intellectual property, a venture capital financing and the particular industry involved.

(2) The information and the knowledge base must be made available to all people that need the information in the collaborative process.

(3) Environmental barriers to collaboration and communication must be removed.

(4) The output of the IC factory must be protectable so as to establish "ownership" of the value created.

The basic team members of an IC factory are selected to achieve the following functions:

1. Intellectual Property: This cannot be addressed after the fact. It must be part o the process of creating product.
2. Incubation: Providing the tangible resources to develop a product and create a product or service.
3. Organizational Building Capacity
4. Financing
5. Operational Capabilities
6. Marketing and Distribution Systems and, perhaps the most important, a system integrative for integrating each of these six other functions.

Finally, and most importantly, there must be a system integrator or facilitator. Intellectual capital involves the interaction among agents. This includes human-human interaction; human to environment interaction; human to machine interaction; and machine to machine interaction. To date, there has been no system and method for facilitating interaction among these various agents. As a result, there is no reliable direct process for moving an idea to a sustainable organization. Communication within the organization is critical to establish dynamic, adaptable self-adjusting organic organization that operates with feedback loops to insure rapid iteration and growth to achieve the desired hydroponic growth of ideas. The IC factory model provides such a process for turning ideas into protectable intellectual capital.

What is claimed is:

1. An iterative, feedback driven system for optimizing interaction among agents acting on multiple levels, the system comprising:

a plurality of real agents each real agent having a plurality of characteristics;

means for allowing at least some of the agents to control the degree to which data corresponding to characteristics is revealed to other agents;

means for allowing agents to control other agents, including themselves;

means for allowing the agents to posses access or use privileges with respect to access or use of other agents;

means for measuring actual performance of agents;

means for inputting expected performance of agents;

means for comparing actual performance of agents to expected performance of agents;

means for modifying agents based on the difference between actual performance of agents and expected performance of agents; and means for allowing communication between agents limited to what the agents reveal about themselves.

2. The system of claim 1, used for facilitating interaction among agents promoting feedback, learning and emergent group genius in a radically compressed time period.

3. The system of claim 1, used for optimizing agent pattern language values in collaborative environments the system further comprising;

means for creating virtual agents to represent real agents in the system, each of the agents containing data corresponding to some characteristic of the real agent represented;

means for at least some of the virtual agents having an access/use characteristic that allows access or use only to agents having access privilege corresponding to the agent;

means for allowing agents to control what is revealed by those agents that they control;

means for allowing agents to modify the agents that they control; AND means for determining the location of agents within the system.

4. The system of claim 1, used for integrating/optimizing technical systems to promote agent interaction the system further comprising:

means for creating virtual agents to represent real agents in the system, each of the agents containing data corresponding to some characteristic of the real agent represented;

means for at least some of the virtual agents having an access/use characteristic that allows access or use only to agents having access privilege corresponding to the agent;

means for allowing agents to control what is revealed by those agents that they control;

means for allowing agents to modify the agents that they control;

means for allowing agents to control what is revealed by those agents that they control; and means for allowing agents to modify the agents that they control.

5. The system of claim 1, used for transporting agents and agent environments as an integrated experience the system further comprising:

means for creating virtual agents to represent real agents in the system, each of the agents containing data corresponding to some characteristic of the real agent represented;

means for at least some of the virtual agents having an access/use characteristic that allows access or use only to agents having access privilege corresponding to the agent;

means for allowing agents to control what is revealed by those agents that they control;

means for allowing agents to modify the agents that they control; and means for determining the location of agents within the system.

6. The system of claim 1, used for structuring and facilitating value exchange among agents forming real and virtual economies the system further comprising:

means for creating virtual agents to represent real agents in the system, each of the agents containing data corresponding to some characteristic of the real agent represented;

means for at least some of the virtual agents having an access/use characteristic that allows access or use only to agents having access privilege corresponding to the agent;

means for allowing agents to control what is revealed by those agents that they control;

means for allowing agents to modify the agents that they control;

means for determining the location of agents within the system; and means for determining the health, status or condition of agents within the system.

7. The system of claim 1, used for facilitating work and commerce among agents in a knowledge economy the system further comprising:

means for creating virtual agents to represent real agents in the system, each of the agents containing data corresponding to some characteristic of the real agent represented;

means for allowing agents to replicate other agents to the extent the characteristics of the other agents are revealed;

means for at least some of the virtual agents having an access/use characteristic that allows access or use only to agents having access privilege corresponding to the agent;

means for allowing agents to control what is revealed by those agents that they control;

means for allowing agents to modify the agents that they control;

means for determining the location of agents within the system; and means for determining the health, status or condition of agents within the system.

8. An iterative, feedback driven method for optimizing interaction acting on multiple levels, the method comprising:

identifying a plurality of real agents each real agent having a plurality of characteristics;

allowing at least some of the agents to control the degree to which data corresponding to characteristics is revealed to other agents;

allowing agents to control other agents, including themselves;

allowing the agents to posses access or use privileges with respect to access or use of other agents;

measuring actual performance of agents;

inputting expected performance of agents;

comparing actual performance of agents to expected performance of agents;

modifying agents based on the difference between actual performance of agents and expected performance of agents; and allowing communication between agents limited to what the agents reveal about themselves.

9. The method of claim 8, used for facilitating interaction among agents promoting feedback, learning and emergent group genius in a radically compressed time period.

10. The method of claim 8, used for optimizing agent pattern language values in collaborative environments the method further comprising the steps of;

creating virtual agents to represent real agents each of the agents containing data corresponding to some characteristic of the real agent represented;

at least some of the virtual agents having a access/use characteristic that allows access or use only to agents having access privilege corresponding to the agent;

allowing agents to control what is revealed by those agents that they control;

allowing agents to modify the agents that they control; and determining the location of agents.

11. The method of claim 8, used for integrating/optimizing technical methods to promote agent interaction the method further comprising the steps of:

creating virtual agents to represent real agents each of the agents containing data corresponding to some characteristic of the real agent represented;

at least some of the virtual agents having a access/use characteristic that allows access or use only to agents having access privilege corresponding to the agent;

allowing agents to control what is revealed by those agents that they control;

allowing agents to modify the agents that they control;

allowing agents to control what is revealed by those agents that they control; and allowing agents to modify the agents that they control.

12. The method of claim 8, used for transporting agents and agent environments as an integrated experience the method further comprising the steps of:

creating virtual agents to represent real agents each of the agents containing data corresponding to some characteristic of the real agent represented;

at least some of the virtual agents having a access/use characteristic that allows access or use only to agents having access privilege corresponding to the agent;

allowing agents to control what is revealed by those agents that they control;

allowing agents to modify the agents that they control; and determining the location of agents.

13. The method of claim 8, used for structuring and facilitating value exchange among agents forming real and virtual economies the method further comprising the steps of:

creating virtual agents to represent real agents each of the agents containing data corresponding to some characteristic of the real agent represented;

at least some of the virtual agents having a access/use characteristic that allows access or use only to agents having access privilege corresponding to the agent;

allowing agents to control what is revealed by those agents that they control;

allowing agents to modify the agents that they control;

determining the location of agents; and determining the health, status or condition of agents.

14. The method of claim 8, used for facilitating work and commerce among agents in a knowledge economy the method further comprising the steps of:

creating virtual agents to represent real agents, each of the agents containing data corresponding to some characteristic of the real agent represented;

allowing agents to replicate other agents to the extent the characteristics of the other agents are revealed;

at least some of the virtual agents having a access/use characteristic that allows access or use only to agents having access privilege corresponding to the agent;

allowing agents to control what is revealed by those agents that they control;

allowing agents to modify the agents that they control;

determining the location of agents within thesystem; and determining the health, status or condition of agents.

* * * * *